United States Patent [19]

Bernick et al.

[11] Patent Number: 4,821,170
[45] Date of Patent: Apr. 11, 1989

[54] INPUT/OUTPUT SYSTEM FOR MULTIPROCESSORS

[75] Inventors: David L. Bernick, Felton; Kenneth K. Chan, San Jose; Wing M. Chan, Fremont; Yie-Fong Dan, San Jose; Duc M. Hoang, San Jose; Zubair Hussain, San Jose; Geoffrey I. Iswandhi, Sunnyvale; James E. Korpi, Santa Clara; Martin W. Sanner, Los Gatos; Jay A. Zwagerman, Saratoga; Steven G. Silverman, Santa Clara; James E. Smith, Sunnyvale, all of Calif.

[73] Assignee: Tandem Computers Incorporated, Cupertino, Calif.

[21] Appl. No.: 40,513

[22] Filed: Apr. 17, 1987

[51] Int. Cl.[4] ............................................. G06F 15/16
[52] U.S. Cl. ................................................... 364/200
[58] Field of Search ... 364/200 MS File, 900 MS File

[56] References Cited

U.S. PATENT DOCUMENTS

| 4,228,496 | 10/1980 | Katzman et al. | 364/200 |
|---|---|---|---|
| 4,480,307 | 10/1984 | Budde et al. | 364/200 |
| 4,564,900 | 1/1986 | Smitt | 364/200 |
| 4,590,554 | 5/1986 | Glazer et al. | 364/200 |
| 4,654,857 | 3/1987 | Samson et al. | 371/68 |

Primary Examiner—Gary V. Harkcom
Assistant Examiner—C. H. Lynt
Attorney, Agent, or Firm—Townsend and Townsend

[57] ABSTRACT

In a digital computer system which employs a plurality of host processors, at least two system buses and a plurality of peripheral input/output ports, an input/output system is provided whereby ownership of the input/output channels is shared. The device controller employs a first port controller having a first ownership latch, a second port controller having a second ownership latch, a first bus, a dedicated microprocessor having control over the first bus (the MPU bus), a second, higher-speed bus, a multiple-channel direct memory access (DMA) controller which is a state machine which controls the second bus (the data buffer bus), a bus switch for exchanging data between buses, a multiple device peripheral device interface, namely a Small Computer System Interface (SCSI), and at least provision for interface with data communication equipment (DCEs) or data terminal equipment (DTEs). The DMA controller arbitrates data bus usage and can allocate alternate bus clock cycles in response to requests to exchange data and is capable of supporting overlapping transfers. The microprocessor is allowed access to the data buffer bus only if the data buffer bus is not in use for data transfer. The latches associated with each port grant ownership to either port or both ports allowing data exchange between addressed peripheral devices and requesting ports.

23 Claims, 12 Drawing Sheets

INPUT/OUTPUT SYSTEM FOR MULTIPROCESSORS

BACKGROUND OF THE INVENTION

The present invention relates generally to communication between a plurality of digital processors in a multiprocessor-based computer system and peripheral devices, such as disk drives and tape drives, which operate at disparate speeds. More particularly the invention relates to an architecture for communicating between two independently-operating ports and peripheral devices coupled to a version of the Small Computer System Interface (SCSI).

Several classes of digital computer systems use a plurality of independent processors to perform computer operations. Examples include fault-tolerant, modular and parallel processing systems. These processors, herein referred to as host processors, require digital data exchange (input and output) with other devices, known as peripherals.

Typically data is exchanged via a system bus under the supervision of a bus controller. Information exchanged with the peripheral devices is typically under the supervision of an input/output subsystem called a device controller.

In one example of a multiprocessor-based fault-tolerant computing system disclosed in U.S. Pat. No. 4,228,496 to Katzman et al., a device controller is provided which facilitates exchange of high speed, essentially synchronously-communicated data with relative low-speed, essentially asynchronous peripheral devices. The device controller is constructed to insure that no single host processor failure can impair system operation. The Katzman et al. patent is incorporated herein by reference and made a part hereof, since a specific embodiment of the present invention is intended to improve upon the device controller disclosed in the Katzman et al. patent.

The device controller in the Katzman et al. patent is constructed with the intention of handling exchange of data at relatively high data rates as far as the host processor is concerned in order to minimize interference with programs running in the host processors. The device controller is an interrupt-driven system and provides an input/output program interrupt (IO interrupt) only upon completion of a data transfer in order to relieve the host processor of the burden of being dedicated to the peripheral device during data transfer. The device controller has multiple ports, each of which is logically and physically independent of all other ports so that each device controller can be connected for access to at least two different host processors.

To accomplish its tasks, the device controller of the computing system disclosed in the Katzman et al. patent employs a microprocessor which is dedicated to input/output operations (I/O MPU). The I/O MPU controls an input/output bus structure internal to the device controller (device controller bus structure) over which is carried all data from any requesting host processor and any responding peripheral device as well as data intended solely for its own operation and control of commands. It is through this internal bus structure that the host processor informs the I/O MPU of data transfer type, requested peripheral device, data block size, priority and the like. It is also through the I/O MPU and the device controller bus structure that "ownership" of the operation of the device controller is effected.

Experience with the device controller in accordance with the patent has uncovered a number of shortcomings. For example one shortcoming is within the device controller itself. It has been discovered that, despite the advantage of independent control of the input/output functions by a dedicated microprocessor, such an arrangement does not make the most efficient usage of the valuable time of the host processor. It has been found that even the fastest microprocessors still require a finite time to interpret commands (e.g., input/output requests), which does not make efficient use of time on both the device controller bus structure and on the system bus in the relatively complex environment of a multiprocessor system.

Moreover, in the device controller of the Katzman et al. patent, the device controller is constructed to grant "sole ownership" to only one host processor at a time through a switching scheme which selects among ports of the device controller. Conventionally, there are only two ports and only one ownership latch which grants ownership to either a first port or a second port and hence only one channel I/O bus. Hence, even though there are in theory multiple paths to a peripheral device through a device controller, only one peripheral can be used by a host processor, and only one host processor can have access to any peripheral through the device controller when but a single port is in use and in the process of exchanging data. Access to the device controller from other host processors must thereafter be made through the host processor having ownership of the device controller. This represents a serious shortcoming when several peripheral devices are coupled through a single device controller and several host processors desire access to those pheripheral devices.

Another shortcoming of the device controller in accordance with the invention disclosed in the Katzman et al. patent is the limited ability to connect the device controller with large numbers of peripheral devices or peripheral devices having an interconnection structure of selected types which have been widely accepted as standards. With the proliferation of peripheral device types, it is no longer feasible to construct a dedicated interface for each type or brand of peripheral device, each with its unique requirements and characteristics. This is particularly true at the growing "low end" of the computer market, where systems once costing hundreds of thousands of dollars are being superseded by system costing only a fraction of its predecessor. One reason has been standardization, which creates economies of scale.

However, there has been little done to merge fault-tolerant computing systems with their advantages with the various standard input/output interfaces or buses. One emerging peripheral device input/output interface is the SCSI bus, which is now widely accepted for many personal computer applications. As a consequence, many low-cost yet high-quality peripheral devices are now available.

What is needed is a device controller which is not subject to these shortcomings.

SUMMARY OF THE INVENTION

According to the invention, in a digital computer system which employs a plurality of host processors, at least two system buses and a plurality of peripheral input/output ports, an input/output system is provided whereby ownership of the input/output channels is shared. The device controller includes a first port controller having a first ownership latch, a second port controller having a second ownership latch, a first bus, a dedicated microprocessor having control over the first bus (the MPU bus), a second, higher-speed bus, a multiple-channel direct memory access (DMA) controller which is an extremely fast state machine, which controls the second bus (the data buffer bus) and access to the input/output ports, a bus switch whereby data communicated between devices on the MPU bus and devices on the data buffer bus are exchanged efficiently, a multiple port peripheral device interface, such as a Small Computer System Interface (SCSI), and at least provision for interface with data communication equipment (DCEs) or data terminal equipment (DTEs). The data buffer bus operates in a synchronous manner. The DMA provides dynamic arbitration of the use of channels of the DMA. The DMA allocates alternate bus clock cycles in response to requests to exchange data. The microprocessor is allowed access to the data buffer bus only if the data buffer bus is not in use for data transfer.

In a specific embodiment, the data buffer bus has coupled to it all input/output ports to the system bus, the DMA controller, a high-speed buffer memory, the bus switch, and a multiplexed SCSI controller, and the MPU bus has coupled to its a microprocessor, program memory, data memory, command registers, communications devices (such as interfaces for data terminal equipment and data communication equipment), and the bus switch. All data is routed through the data buffer bus. The microprocessor configures the SCSI controller and the DMA controller for the type of data exchange. The latches associated with each port grant ownership to either port or all ports allowing data exchange between addressed peripheral devices and requesting ports. Ownership is not surrendered so long as a host processor has need of a device controller.

The invention will be better understood by reference to the following detailed description taken in conjunction with the accompanying drawings.

DESCRIPTION OF SPECIFIC EMBODIMENTS

Figure 1:
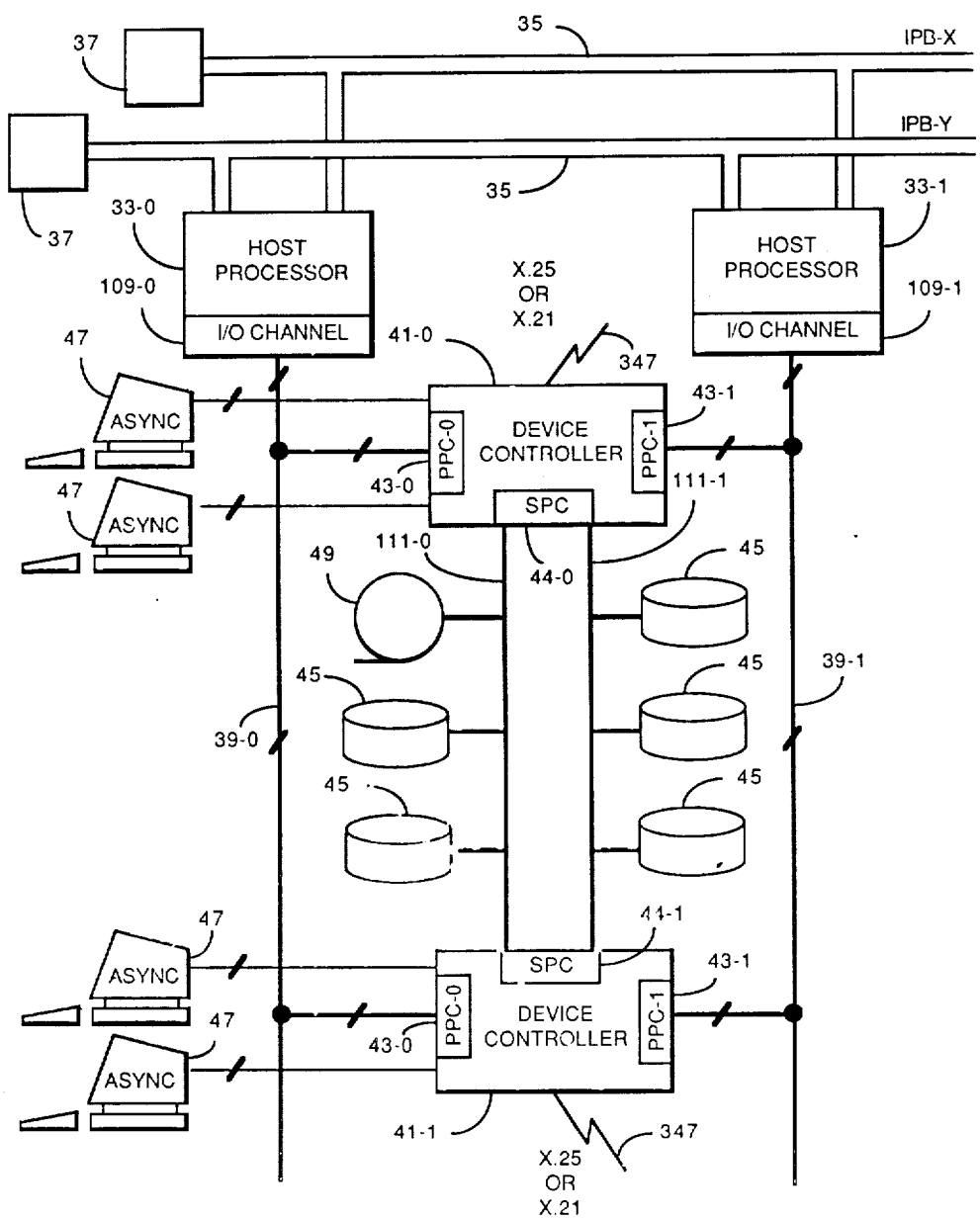
FIG. 1 is a block diagram view of a multiprocessor system constructed in accordance with one embodiment of the present invention, including a plurality of dual-port device controllers sharing peripheral devices coupled to Small Computer System Interface buses.

Reference is made to FIG. 1 for an overview of a specific embodiment of the invention. In FIG. 1, several processor modules, hereinafter host processors 33 (also designated 33-0 and 33-1), are connected by dual interprocessor buses (IPBs) 35, and X bus (IPB-X) and a Y bus (IPB-Y). Each bus 35 is controlled by a bus controller 37. Each host processor 33 is provided with an input-/output channel (I/O channel) 109 (designated 109-0 and 109-1) coupled to a channel I/O bus (CIO bus) 39 (designated 39-0 and 39-1).

FIG. 1 also shows a plurality of device controllers 41 (designated 41-0 and 41-1) connected in accordance with the invention. The CIO bus 39 of each host processor 33 is coupled to preferably at least one port of each device controller 41, and more specifically, first CIO bus 39-0 is connected to a first peripheral port controller (PPC-0) 43-0 of each device controller 41-0 and 41-1 and second CIO bus 39-1 is coupled to a second peripheral port controller (PPC-1) 43-1 of a each device controller 41-0 and 41-1.

The device controller 41 is provided with a protocol controllers (SPC) 44 for two peripheral device buses 111 of a standardized configuration known as the Small Computer System Interface (SCSI), designated herein SCSI-0 111-0 and SCSI-1 111-1. The SCSI standard has been described in publications by the American National Standards Institute as ANSI Standard X3.131-1986, and commercial component parts are available for implementing functions of the SCSI bus. For example, in a specific embodiment of the invention, the SCSI interface is implemented by a type MB87030 chip made by Fujitsu and available from Fujitsu America of Santa Clara, Calif.

The primary function of the SCSI buses 111 is to provide port connections for standard SCSI peripherals, such as a tape drive 49 (with internal SCSI controllers) and disk drives 45 (with internal SCSI controllers). The SCSI bus is of a type which allows more than one device controller to be connected thereto. (For example, up to eight units or devices, including device controllers, can be connected to a single SCSI bus.) Hence, both the first device controller 41-0 and the second device controller 41-1 are connected to the first SCSI bus 111-0, the first SCSI bus 111-0 having connected thereto a first set of SCSI peripheral devices 45 and 49. In addition, the first device controllers 41-0 and the second device controller 41-1 are also connected to the second SCSI bus 111-1, the second SCSI bus 111-1 having connected thereto a second set of SCSI peripheral devices 45. Thus each CIO bus 39 has at least two paths to each SCSI device 45 or 49, and each host processor has at least four paths (two through another host processor via an IPB 35) to each SCSI device 45 or 49. This configuration substantially enhances the reliability of the overall computer system and permits the temporary removal for example of one device controller without compromising access to any other of the SCSI devices.

As a further feature, the device controllers 41 may also provide for access to or from the host processors 33 for asynchronous terminals 47 and packetized communication links 347 including links conforming to the ANSI protocol standards X.25 or X.21.

The configuration and computer architecture represented by FIG. 1 is a new type of system representing a departure and enhancement over the structure disclosed in the Katzman et al. patent, incorporated herein by reference.

Figure 2:
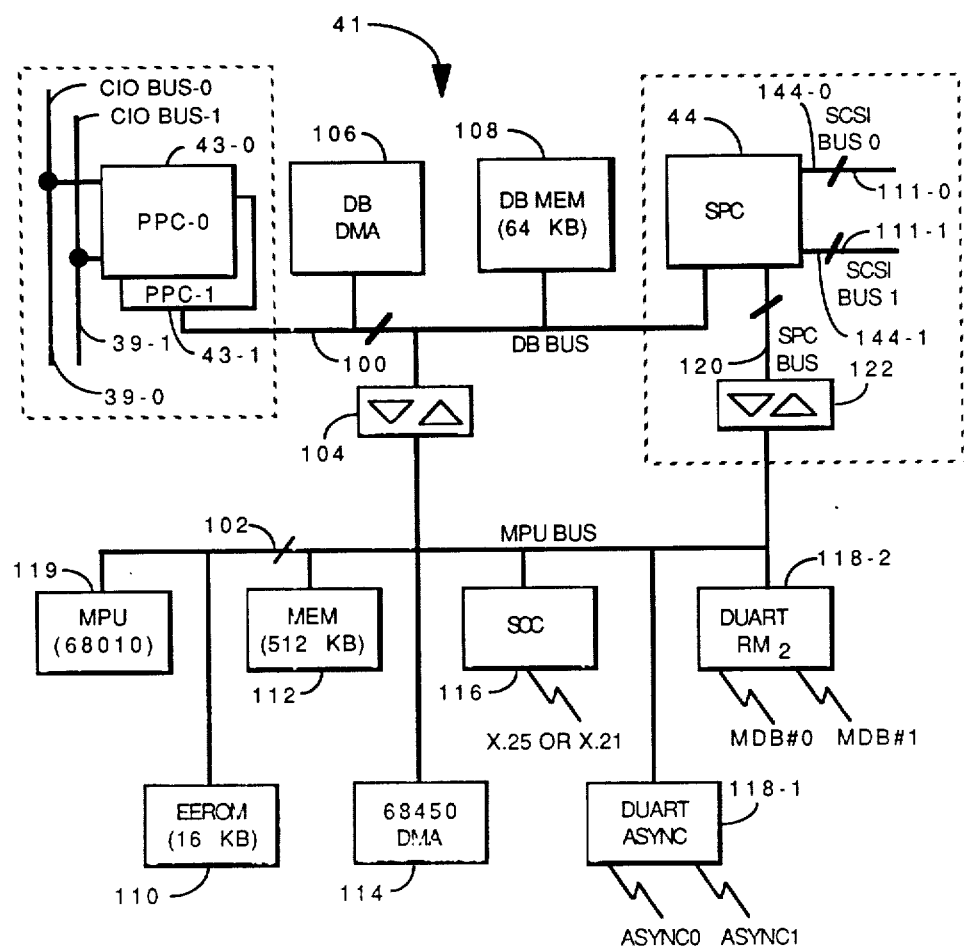
FIG. 2 is a simplified block diagram of one embodiment of a device controller according to the invention illustrating a direct memory access controller, a data buffer bus, a microprocessor bus, a bus switch and two SCSI buses.

Referring now to FIG. 2, there is shown a block diagram of the device controller 41 in accordance with a specific embodiment of the invention. According to the invention, there is provided in combination a data buffer bus (DB bus) 100 and a microprocessor bus (MPU bus) 102 coupled to one another by means of a first bus switch (DBBS) 104. In accordance with the invention, the DB bus 100 is a synchronous bus whose operational clock rate is a substantially different rate than the MPU bus 102, and the DBBS 104 is a bus switch which buffers transfers of data and commands between the DB bus 100 and the MPU bus 102 to assure timely transfer of data and commands between the buses operating at disparate clock rates.

Coupled to the BS bus 100 are a data buffer direct memory access controllers (DB DMA) 106, the first PPC 43-0, the second PPC 43-1, the SPC 44 and a high speed read/write random access memory (DB MEM) 108 for temporary storage of all data-type information transferred over the DB bus 100.

Coupled to the MPU bus 102 is a microprocessor (MPU) 119 (such as a type 68010 microprocessor made by or under license to Motorola), instruction memory such as Electronically Erasable Read Only Memory (EEROM) 110 in the amount of 16 KB, random access memory (MEM) 112 in the amount of 512 KB, a conventional direct memory access controller (DMA) 114 such as a type 68450 DMA device made by, e.g., Hitachi (part HD68450), and a standard serial communication chip device (SCC) 116 (such as a Zilog Z8030) serial communication chip) supporting both X.25 bit-oriented packet protocol and X.21 byte-oriented packet protocol, at least one standard dual universal asynchronous receiver-transmitter (DUART) 118-1 and 118-2 such as a Signetics type 2861 chip made by signetics. The external configuration of the SCC 116 and the DUARTs 118 are device dependent and so require no further explanation.

The DMA 114 is used to transfer data to and from the SCC 116 or the DUARTs 118 and the MEM 112 on the MPU bus. It cooperates closely with the MPU 119. DMA 114 channels can be programmed to move large data blocks and generate an interrupt signal to the MPU 119 at the end of a transmission.

The SPC 44 has two ports 144-0 and 144-1 for SCSI buses 111-0 and 111-1. The SCSI buses are multiplexed. In addition, as explained hereinafter, an SPC bus 120 is provided as part of the SPC configuration together with SPC bus switch 122, which provides bi-directional command and control coupling between the MPU bus 102 and the SPC bus 120.

The device controller 41 generates or responds to a plurality of interrupts on interrupt lines (not shown for clarity). The interrupts are generated by I/O channels through the PPCs 43, by I/O devices through the SPC 44, by DMA channels from the DB DMA 106 or DMA 114, by communication interfaces such as the SCC 116 and the DUARTs 118, by timeouts and by hardware errors. Of primary interest is the interrupt issued by the PPCs 43 in response to an EIO from a host processor.

Figure 3:
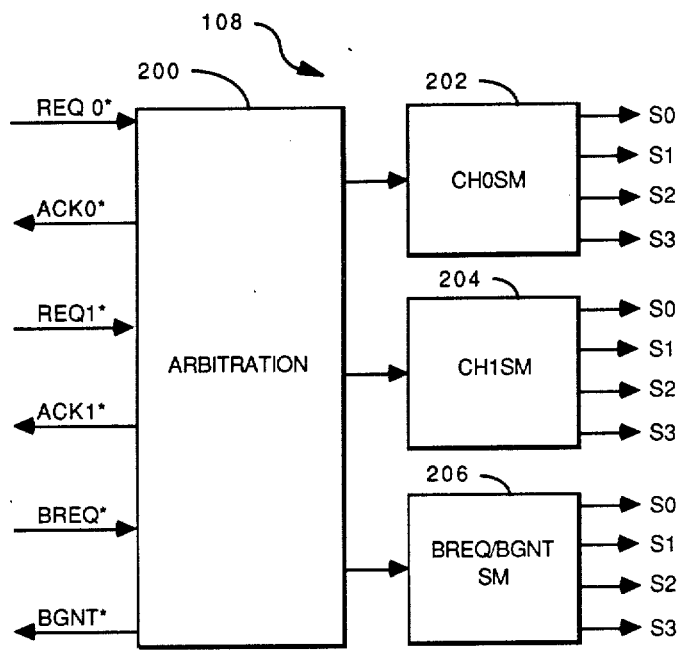
FIG. 3 is a simplified block diagram of one embodiment of a dual-channel DMA controller.

With reference to FIG. 3, the DB DMA 106 is a very fast state machine whose function is to control access to the DB bus 100. The DB DMA 106 employs a technique known as dynamic arbitration to allocate time for data transfer on the DB bus 100 between the PPCs 43 and the peripheral devices through the SPC 44. To this end, the DB DMA 106 includes arbitration logic 200 for allocating time on the DB bus 100 (FIG. 2) between two channels of data transfer functions as well as device controller management functions carried out under control of the MPU 119, all of which require usage of the DB bus 100. The DB DMA 106 is a dual channel device which is capable of concurrent support for two channels of data, of being reprogrammed to support chaining of consecutive frames of data without having to repeat an interrupt cycle for each frame of data, and of being reprogrammed to support data transfer at twice the standard rate by use of both channels for a single task.

Figure 4:
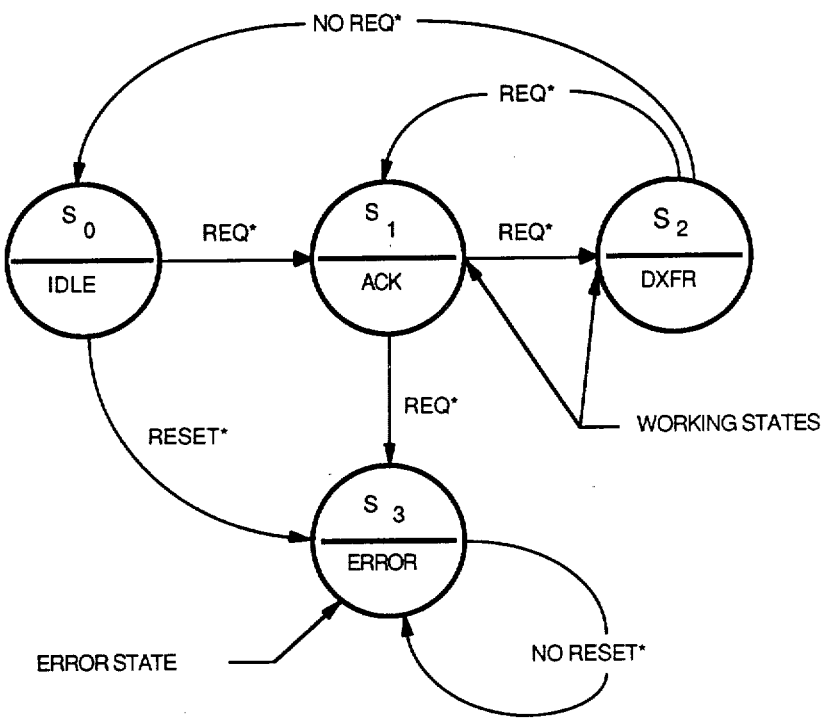
FIG. 4 is simplified state diagram of operation of one embodiment of a dual-channel DMA controller.
Figure 6:
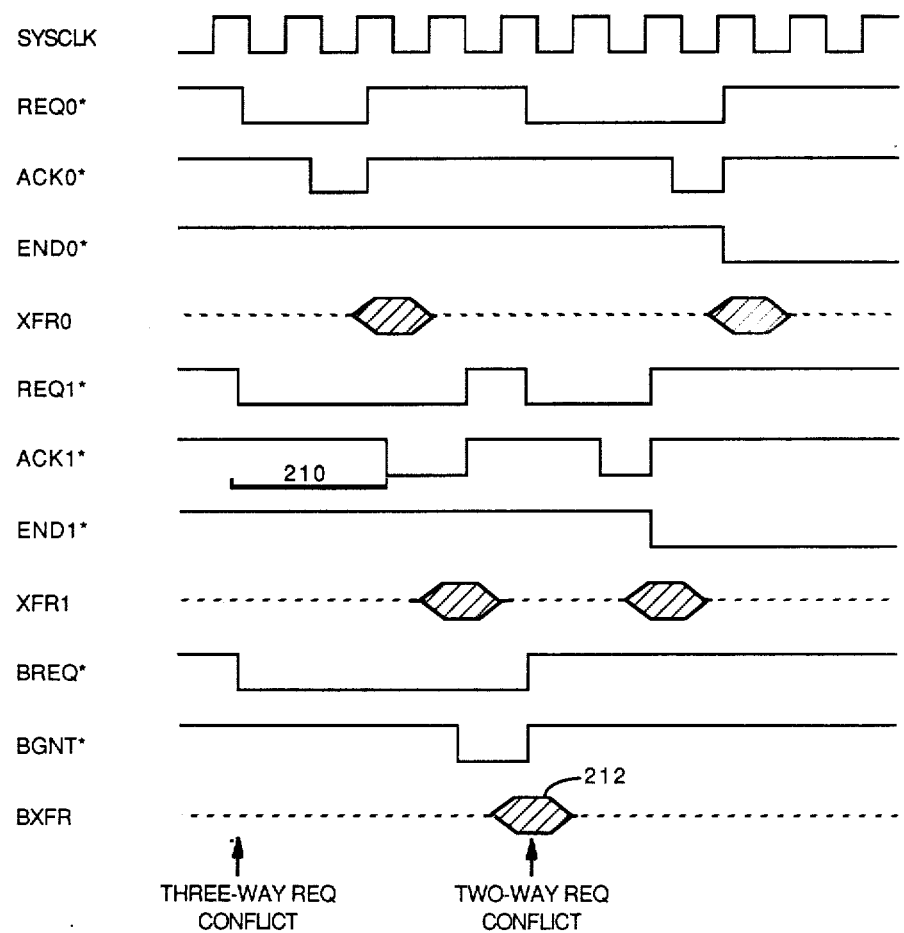
FIG. 6 is a timing diagram illustrating one type of operation of a specific embodiment of a dual-channel DMA controller.

Referring to FIG. 3, FIG. 4 and FIG. 6 together, the arbitration logic is responsive to the following requests: Request for Channel 0 (REQO*) (the * is used to denote logic LOW is TRUE), Request for Channel 1 (REQ1*), and bus request for the MPU 119 (BREQ*). The DB DMA issues at least the following interrupts: Acknowledge availability of Channel O (ACKO*), Acknowledge availability of Channel 1 (ACK1*), Bus usage granted in response to BREQ* (BGNT*). A sample of the relative timing of each of these interrupts is shown in FIG. 6 in relation to a system clock (SYSCLK) and two-channel data transfer (XFRO and XFR1). FIG. 6 illustrate operation of the DB DMA 106 if all request signals are asserted simultaneously. First a three-way conflict is illustrated and then a two-way conflict between channels is illustrated. Data transfer via a single channel is permitted to occur no more often than one-half of the available time. However, the DB DMA 106 via the arbitration logic 200 exercises such control over the DB bus 100 that virtually no clock cycle is wasted if there is data to be transferred or a command to be processed. The maximum latency (210 FIG. 6) from DMA Request to DMA Acknowledge is two clock cycles for either channel of the DB bus 100. (The latency time for a bus request depends on the load on the channels. There may be a timeout provided for example. In the extreme, the latency time can be no longer than the time required to exhaust the queue of outstanding channel requests, since all channel requests are generated by the MPU 119.)

Referring again to FIG. 3 and FIG. 4, the arbitration logic is in communication with three substantially identical state machines, a channel 0 state machine (CHO SM) 202, a channel 1 state machine (CH1 SM) 204 and a bus request/bus grant state machine (BREQ/BGNT SM) 206. Each of the state machines 202, 204, 206 is substantially identical in that each has four states S0, S1, S2, S3 as represented in FIG. 4. State S0 is the idle state; state S1 is the acknowledge state following any request made (REQ0, REQ1, BREQ) during the idle state; state 2 is a data transfer state; and state 3 is the error state. When either or both data transfer channels are inactive (CHO SM 202 and/or CH1 SM 204 are in the idle state S0) and the BREQ* signal is asserted, then the DB bus 100 is relinquished to the MPU 119 for one transfer period (e.g., BXFR 212 FIG. 6). When any of the state machines 202, 204, 206 is in the idle state S0, assertion of a Request signal (REQ*) causes transition to state S1. When the state machine is in state S1, the DB DMA 106 is computing the address to be used by the DB MEM 108 as well as address parity for the next address. State S1 is the Acknowledge state, meaning that the state machine expects a certain sequence of signals following issuance of an acknowledgement to the requesting element. Specifically, continued assertion of a Request signal (REQ*) and transfer of data is expected following state S1; otherwise an error condition is indicated (state S3). The state machine transitions between state S1 and state S2 until all data transfer is complete and the Request signal is withdrawn (REQ* disasserted). When in state S1 REQ* is disasserted, the state machine transitions to the Error state S3. It remains in the "Error" state until assertion of the Reset signal. When the Reset* signal is asserted in the Error state, the state machine is restored to the Idle state S0. When the state S2 is invoked, data transfer takes place; hence its designation as the Data transfer state (DXFR). If the request signal (REQ*) remains disasserted, the state machine reverts to state S1. If no new Request signal is asserted before a Reset signal (RE-SET*) is asserted, the state machine returns to the Idle state S0. If however in state S2 the request signal REQ* is disasserted, the state machine also returns to the Idle state S0.

Each of the channels for data transfer (XFR0 and XFR1 of FIG. 6 referring to CH0 and CH1, respectively) operate independently of one another but of course cannot, during the same bus cycle, transfer data between the same peripheral device through the SPC 44 and the same requesting port PPC-0 43-0 or PPC-1 43-1. Every normal data transfer is written to or read out of a memory location in the DB MEM 108 which has been designated by the memory address output (MADRS) 224 of the DB DMA (FIG. 5).

Figure 5A:
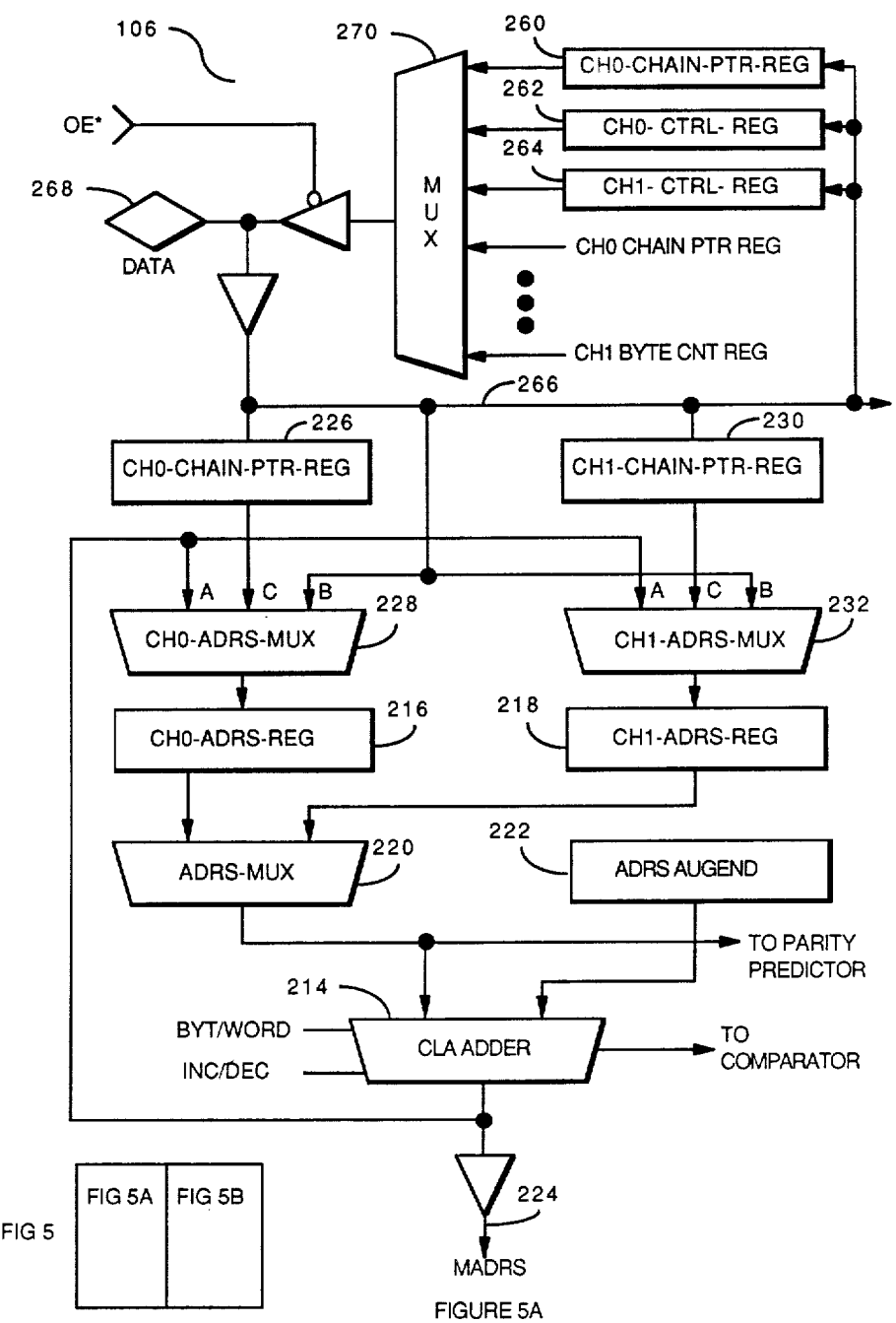
FIG. 5 shows the orientation of 5A and 5B which together form a block diagram of the architecture of a specific embodiment of a dual-channel DMA controller.
Figure 5B:
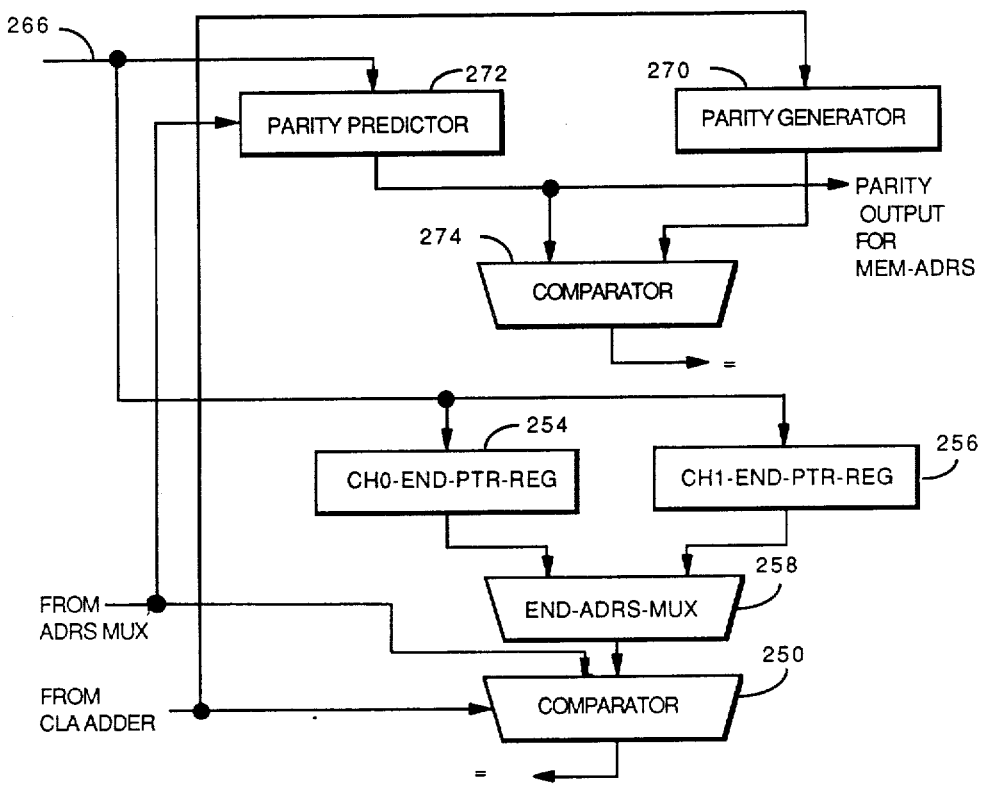

Referring to FIG. 5, there is shown a diagram of the architecture of the DB DMA 106. A key feature of the architecture is a fast adder or more specifically a two level Carry Look Ahead (CLA) adder which is capable of doing add and subtract operations for the channel address generation in less than one clock period. The contents of channel 0 and channel 1 address registers 216 and 218 are provided as one input to the CLA adder 214 via an address multiplexer ADRS MUX 220. The augend address (ADRS AUGEND) 222 is provided as the other input to CLA adder 214, the output of which is the memory address (MADRS) in the DB MEM 108 to or from which the data on the DB bus 100 is written or read.

The DB DMA 108 is capable of chaining related data in a block for continuous transfer of priority data at the designated standard data transfer rate. This is a function which would normally be carried out by the MPU 119 (FIG. 2) and would require that an interrupt cycle be repeated for each frame of data. However, the DB DMA 106 according to the invention is instead employed for this purpose. The result is a substantial increase in speed of selected data transfer operations of the device controller 41.

Referring to FIG. 5, a Master Control register 260, a Channel 0 control register 262, and a Channel 1 control register 264 are coupled to receive input data via a register bus 266 from a data input/output port 268 and further to provide output to a the register bus 266 and the data input/output port 268 via a register multiplexer 270. Further as shown in FIG. 5, and now referring to the mode of operation as well as the architecture, a Channel 0 chain pointer register CH0 CHAIN PTR REG 226 is coupled to Channel 0 address multiplexer 228 to the Channel 0 address register CH0 ADR REG 216, and Channel 1 chain pointer register CH1 CHAIN PTR REG 230 is coupled to Channel 1 address multiplexer 232 to the Channel 1 address register CH1 ADR REG 218. The chaining function is enabled by placement of a suitable command word in the channel control register 262. Once chaining has been enabled, the respective channel address registers 216 and 218 of the enabled channel are loaded from the corresponding channel chain pointer register 226 or 228, so that chained sequencing is started. Chained sequencing continues until chain parameters are fetched from memory; thereafter regular channel operation resumes. The ability to reprogram a channel of DB DMA 106 for chaining operations while supporting normal functions on other channels represents a departure from known technology in this field.

In order to check for completion of each transfer, a comparator 250 is provided for comparing the content of the active channel address register 216 or 218 via the address MUX 220 with the content of the corresponding end pointer register 254 or 256 via an end address multiplexer (END-ADRS-MUX) 258. The output of the comparator 250 is either an Equal or NOT Equal value, which is used to control data transfer.

Another feature of the invention is the use of address parity prediction to assure that the system is operating properly. More specifically, address parity of the next scheduled address is predicted and compared with actual parity to assure that data is actually being progressively transferred to and from the proper memory locations. To this end a conventional parity generator 270 is provided having as its input the output of the CLA adder 214, a parity predictor 272 having as its input the output of the channel address register 216 or 218 via the output of the address multiplexer 220 and as its other input selelected control bits of the corresponding channel control register 262 and 264 via the multiplexer 270 through register bus 266. The outputs of the parity generator 270 and the parity predictor 272 are coupled to a comparator 274. The channel control register 262, 264 contains information regarding the type of transfer and the address increment for each channel. The channel address register 216, 218 contains the current address of each channel. The parity predictor 272 comprises means for combining the address increment and the current address to obtain a predicted parity. The output of the comparator 274 is thus an indication of whether the current parity and the parity predicted from the previous address. Inequality is an error condition.

Figure 7:
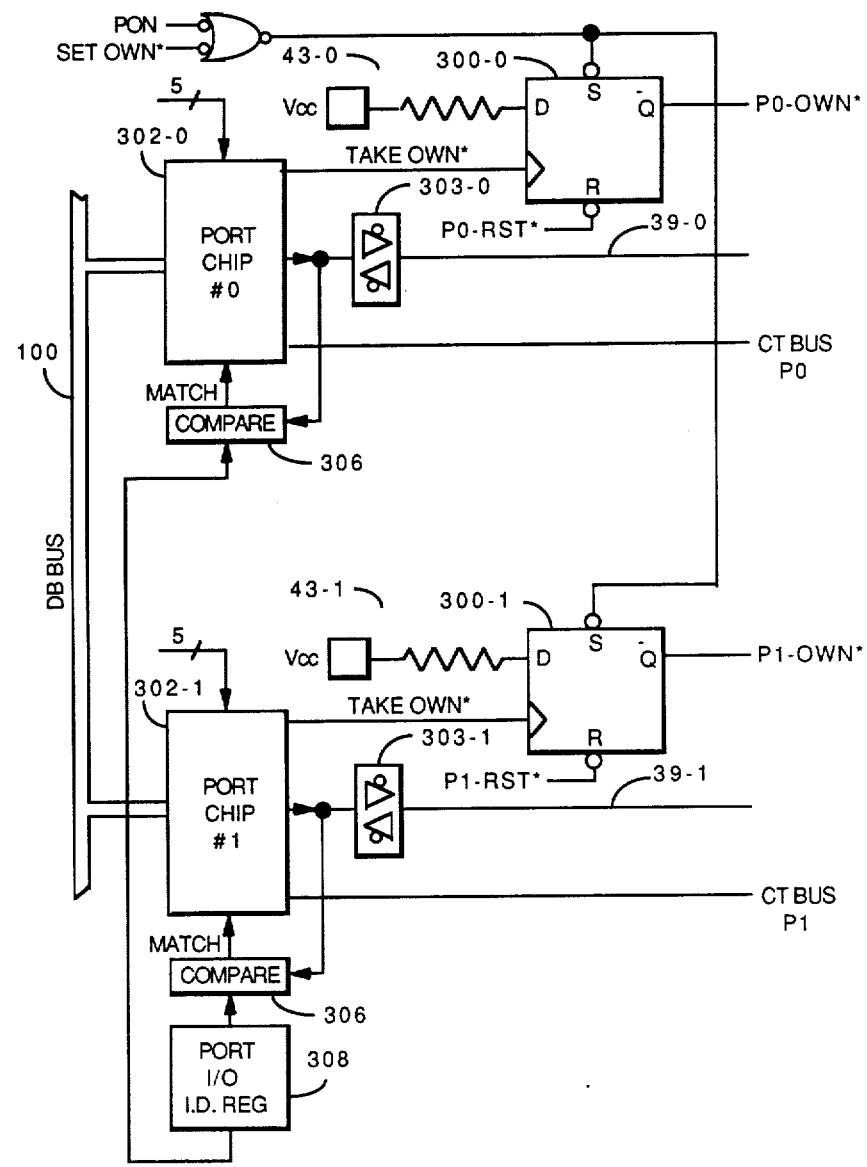
FIG. 7 is a block diagram of a specific embodiment of two peripheral port controllers according to a specific embodiment of the invention.

FIG. 7 is a block diagram of a specific embodiment of two peripheral port controllers (PPCs) 43-0 and 43-1 according to a specific embodiment of the invention. According to the invention there is associated with or incorporated into each PPC 43 an independently operated PPC latch 300 (PPC-0 has PPC latch 300-0 and PPC-1 has PPC latch 300-1). Each PPC latch 300 operates independently so that two I/O channels can have ownership set simultaneously. In a specific embodiment as shown in FIG. 7, each PPC 43-0, 43-1 includes a port chip 302-0, 302-1 coupled to a data buffer 303-0, 303-1 whereby EIOs issued on the CIOs 39-0, 30-1 cause interrupts and set the PPC latches 300-0, 300-1. The port chips 302-0, 302-1 also provide limited data buffering between the CIOs 39-0, 39-1 and the DB bus 100. Each PPC 43 has the following registers for receiving EIOs and data buffering:

Buffer_A: a data buffer
Buffer_B: a data buffer
Buffer_C: a data buffer
RAC: register for storage of the Read Address and Command word of a reconnect sequence
RIC: register for storage of the Read Interrupt Cause word of an interrupt sequence
RIST: register for storage of the Read Interrupt STatus word of an interrupt sequence
LAC: register for storage of the Load Address and Command word of an EIO sequence
LPRM: register for storage of the Load PaRameter word of an EIO sequence
Status: three registers providing access by the MPU 119 to status signals within the PPC
Flag Control: register whereby the MPU 119 can set and clear various flags in the PPC
Burst Length: register controlling the maximum number of word in a single reconnect burst (maximum 128).

The DB DMA 106 has direct access to the three Buffers A, B and C for both read access and write access. These buffers are word-wise registers configured in a bidirectional queue. These registers are clocked by the system clock (SYS_CLK) (associated with the host processors) during transfers in from the DB bus 100 to the CIO 39. During out transfers they are clocked by the CIO 39 channel handshake signal SVO (see the Katzman et al. patent for further explanation of the CIO 39). Two three-bit circular shift registers are used as pointers. The first pointer is clocked by SYS_CLK, and the shift is enabled by the DMA_ACK signal from DB DMA 106 (FIG. 6). The second pointer is clocked by SVO, and shift is enabled by an IN or OUT TBUS command through the CIO 39. The two pointers keep track of the next register (Buffer A, B, or C) to be loaded with data or unloaded. At two-bit synchronous counter keeps track of the number of words in the buffers A, B, and C. The synchronous count is used to determine when the DMA_REQ* signal must be asserted, and it is available to the MPU 119 via the status registers.

In the idle state the PPC latches 300 do not assert a "Port Own" signal (PO_OWN* by PPC latch 300-0 and P1_OWN* by PPC latch 300-1). However, whenever the appropriate EIO is received by the PPC chip 302, a "take ownership" interrupt signal is asserted (Takedown*) by the PPC chip 302 to the PPC latch 300 via signal line 304. Each PPC port 41 is properly identified via comparators 306 and appropriate switches 308. The addressed PPC latch 300 asserts port ownership (PO_OWN* and P1_OWN*) as interrupts to the MPU 119. It is thereafter the task of the MPU 119 to interpret the EIO, to designate which of the ports is to have which data channel of the DB bus 100 and to configure the DB DMA 108 to so allocate the two data channels CH0 and CH1 of the DB bus 100 to one or both of the designated ports. Because of dual ownership through the PPC latches 300 and dual channel operation of the DB DMA 106, the device controller can handle all of the protocols and data transfers to and from peripheral devices within a common time frame and as far as the CIO buses 39 are concerned, simultaneously. Each PPC 43 is capable of essentially simultaneous operation. In simultaneous operation, a first PPC 43-0 can actively transfer data and commands while the second PPC 43-1 can also actively transfer information; however such transfer is limited to commands.

All of this is done without direct data transfer via the MPU 119, which represents a substantial departure from other device controllers known in this field, i.e., device controllers which can be reconfigured in accordance with the type of data transfer desired.

In the process of receiving an EIO, the DB DMA 106 must grant bus access to the MPU 119. To this end, the MPU 119 responds to the appropriate interrupt issued by the PPC 43 by issuing a BRQT signal to the DB DMA 106 via the bus switch 104.

Figure 11:
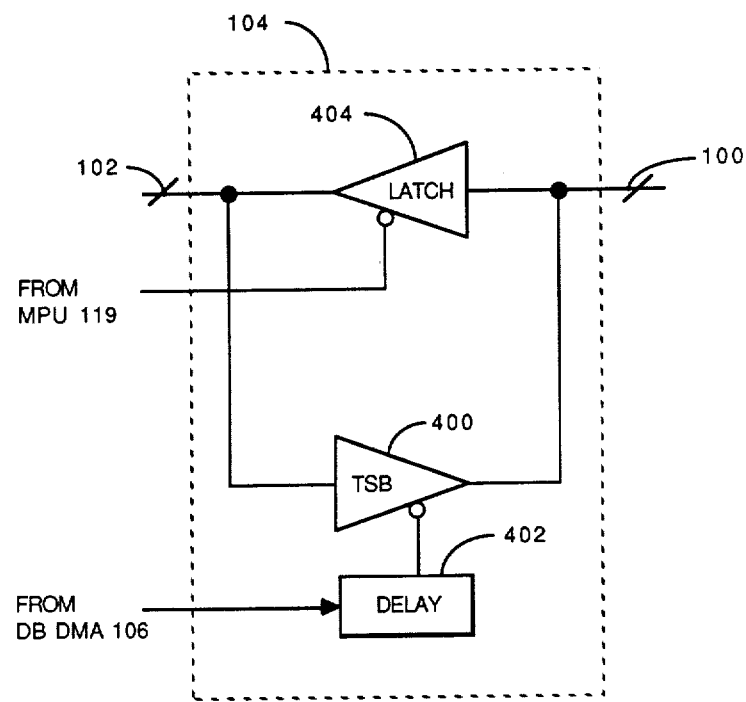
FIG. 11 is a block diagram of a bus switch in accordance with a specific embodiment of the invention.

Referring to FIG. 11, there is shown one embodiment of the bus switch 104. The bus switch 104 comprises a three-state buffer 400, a delay means 402 and a latch 404. The output enable terminal of the three state buffer 400 is controlled from the DB DMA 106 (a clock line synchronized with the channel in use) through the delay means 402 whose function is to enable the three-state buffer 400 after sufficient time has elapsed following a prior transfer of data to minimize interference between consecutive data blocks from the MPU bus 102 to be transferred to the higher speed DB DMA bus 100. The delay means 402 typically provides a 20 ns delay and therefore a 20 ns window between data transfers between data transfers operating on a 200 ns clock. The bus switch 104 further comprises a latch 404 which is coupled to receive data from the higher speed DB bus 100. It operates to latch the received data for use by the slower MPU bus 102. The latch 404 is also a three state device wherein the output enable terminal is under control of the MPU 119, since the MPU 119 decides when to read the contents of the latch 404. Significantly, operational control of the bus switch 104 resides in the DB DMA 106, and more particularly is part of the arbitration logic 200 and Bus Request/Bus Grant protocol of the BREQ/BGNT state machine 206 for communication with MPU 119 and any other element coupled to the MPU bus 102. (Most data transfer for example is via the memory 112 under control of the 68450 DMA 114.) Operation of the bus switch 104 in conjunction with the MPU 119 is illustrated by the following example.

The transfer of the EIO to the MPU 119 is from the PPC 43 through the bus switch 104 to the MPU 119. The PPC 43 issues an interrupt to the MPU 119 which in turn initiates a Bus Request to the DB DMA 106. The DB DMA 106 then issues a Bus Grant to the MPU 119. The MPU 119 then captures the EIO from the PPC 43 via the DB bus 100 and the bus switch 104. The MPU 119 then interprets the command structure while the DB DMA 106 controls other data transfers on the DB bus 100. Once the MPU 119 has completed interpretation of the EIO it again requests a bus cycle of the DB bus to access the DB DMA 106 to instruct it regarding the port and from of data transfer. Once a Bus Grant is given the MPU 119 transfers instructions to the registers of the DB DMA 106 via the bus switch 104.

One of the significant advantages of the multiple-bus architecture of the invention wherein the synchronous buses are coupled by bus switches which comprises buffers and latches is that different speed devices can be interfaced very easily and even changed if necessary. For example, if it is desired to substitute a faster microprocessor chip in the position of MPU 119, it becomes the relatively trivial task of exchanging components and boosting MPU bus clock speed. The speed and operation of the DB bus 100 is not affected.

The MPU 119 accesses the SPC 44 via the SPC bus switch 122 and SPC bus 120 in order to configure the SPC 44 for the data transfer designated by the EIO and related vectors.

Figure 8:
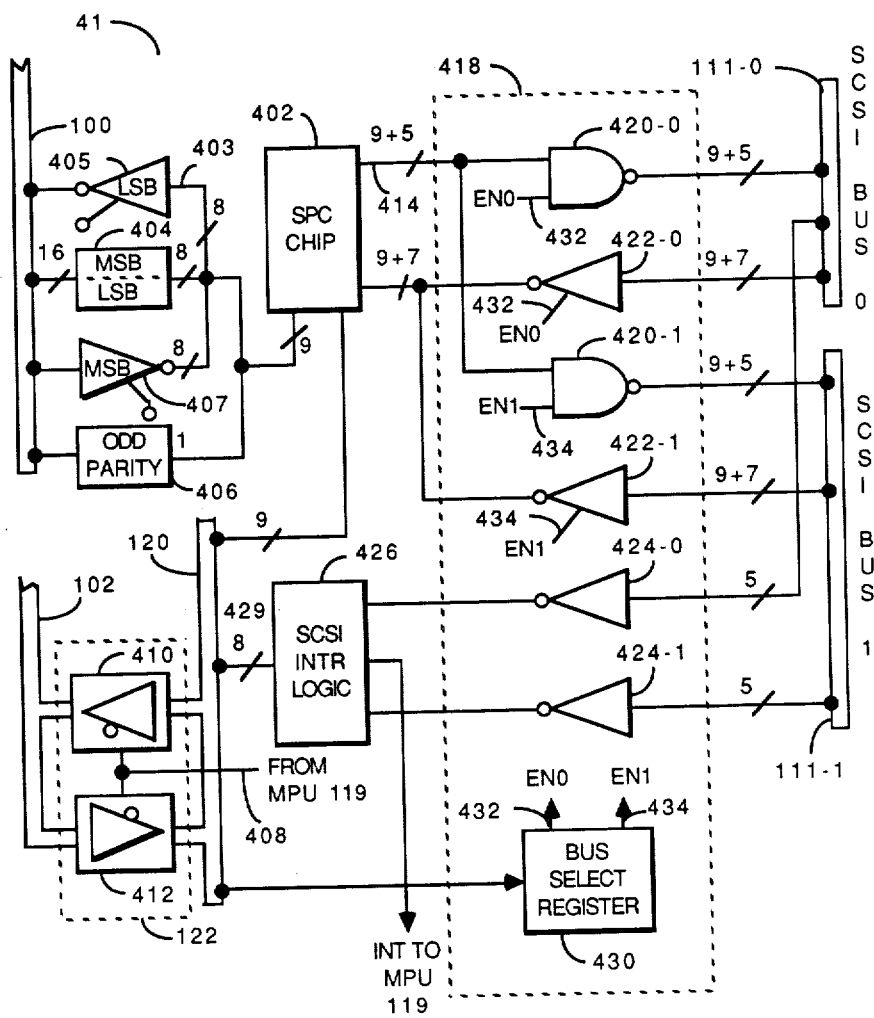
FIG. 8 is a block diagram of a specific embodiment of a Small Computer System Interface controller according to the invention.

Referring to FIG. 8, there is shown the SPC 44 in accordance with the invention. The SPC 44 is built around a SCSI Protocol Controller Chip (SPC Chip) 402 which in a specific embodiment may be a type MB87030 supplied by Fujitsu. The SPC Chip 44 is coupled indirectly to the DB bus 100 and directly to the SPC bus 120. Coupled between the DB bus 100 and the SPC chip 402 is a byte assembly register 404 on the DB bus 100, which assembles the data bytes for the SPC Chip 402 to be passed via lines 403, and a parity register 406 which creates odd parity for data in the byte assembly register 404 to provide compatibility with the parity expected by the SPC Chip 402.

The SPC bus switch 122 comprises a latch 410 and a buffer 412. It is coupled between the MPU bus 102 and the SPC bus 120 to provide bi-directional command and control coupling between the MPU bus 102 and the SPC bus 120. The SPC bus switch 122 is enabled by a signal on interrupt line 408 from the MPU 119 to latch 410 and buffer 412.

Since the SPC chip 402 has only one SCSI port, provision must be made according to the invention to connect two SCSI buses 111-0 and 111-1. Therefore SPC Chip 402 provides a set of driver lines 414 and receiver lines 416 to a multiplexer set 418. In the illustrated embodiment, the multiplexer set 418 for the SPC Chip 402 itself comprises first and second sets of dual input open collector output NAND gates 420-0 and 420-1 which are functional as enablable drivers for SCSI bus 0 111-0 and SCSI bus 1 111-1, respectively, and corresponding first and second sets of inverters 420-0 and 420-1, which are functional as three-state receivers for SCSI bus 0 111-0 and SCSI bus 1 111-1, respectively. In addition third and fourth inverter sets 424-0 and 424-1 are coupled as receivers from the respective SCSI buses 111-0 and 111-1 and supplied to SCSI interrupt logic means 426, which is coupled to the SPC bus 120 and which has interrupt line 428 which is coupled to the MPU 119. Still further, a bus select register 430 is provided on the SPC bus 120 which has an outputs an Enable Bus 0 line 432 and an Enable Bus 1 line 434. Enable Bus 0 line 432 is coupled to drivers 420-0 and receivers 422-0 associated with SCSI bus 0 111-0, and Enable Bus 1 line 434 is coupled to drivers 420-1 and receivers 422-1 associated with SCSI bus 1 111-1.

The SPC 41 can respond with programming commands from the MPU 119 via the SPC bus 102 directed to the SPC Chip 402, can pass data (read and write) to/from the DB bus 100 from/to either SCSI bus 111-0 or 111-1 as selected by a command from the MPU 119 via the bus select register means 432, or it can interrupt the MPU 119 via interrupt line 428 from the SCSI interrupt logic means responsive to signals from peripheral devices on either SCSI bus 111-0 or 111-1. Hence, the device controller 41 permits multiple access from multiple channels to multiple devices on selectable SCSI buses within the same operational cycle, during two or more overlapping commands.

To facilitate odd byte transfers on the DB bus 100 to/from the SPC Chip 402, the byte assembly register 404 can be read and written in word mode by the MPU 119 via the DB bus 100. This facilitates data transfer between an eight bit device (the SPC Chip 402) and a high speed sixteen bit bus (DB bus 100). Specifically, during IN mode transfers from the SPC Chip 402, the first byte to the DB bus 100 is stored in the most significant byte side of the byte assembly register 404 and when the second byte is ready, the first byte is passed from the byte assembly register 404 to the most significant byte side of the DB bus 100 while the least significant byte is passed via three state driver 405 to the least significant byte side of the DB bus 100. During OUT mode transfers to the SPC Chip 402, the least significant byte of the DB bus 100 is transferred to the least significant byte side of the byte assembly register 404 as the most significant byte of the DB bus 100 is transferred directly to the the SPC through three state driver 407. The next byte transferred to the SPC Chip 402 is the least significant byte from the byte assembly register 404.

The SCSI interrupt logic means 426 is a logic device which controls three conditions loosely referred to as interrupts from each of the two SCSI buses 111 thereby providing an interrupt on interrupt line 428 to the MPU 119 under six possible conditions. The conditions are: (1) SCSI Bus was Reset; (2) SCSI Bus was Free; (3) Device Controller is being Reselected on the SCSI bus. All six conditions are "OR" ed together so that any one of the conditions will cause the interrupt to issue via interrupt 428 to the MPU 119.

The six conditions to cause the interrupt can be individually enabled, read and cleared from the MPU 119 by means of six lines to read/write/control port 429 coupled to registers within the SCSI interrupt logic means 426. In addition a master interrupt enable may be provided via a seventh line to read/write/control port 429. These interrupts monitor both of the SCSI buses 111 independently of the SPC chip 402 and of the multiplexer 418 by means of receivers 424-0 and 424-1. Even if the interrupt line 428 is not enabled, the status of the interrupt registers can be polled by the MPU 119 via the SPC bus 120.

The MPU 119 is used for performing the programming of the SPC 44. More specifically, the MPU 119 sets up queues of instructions for the ports and for individual devices in memory MEM 112 which are communicated to the SPC 44 in order to request. The MPU 119 can be handling several tasks at the same time, such as a read of one device which requires a seek before data can be transferred. The MPU 119 can proceed to execute the instruction queue of another device task for another device while awaiting completion of the seek on the first device. In this manner, the processing power of the MPU 119 is used more efficiently.

Figure 9:
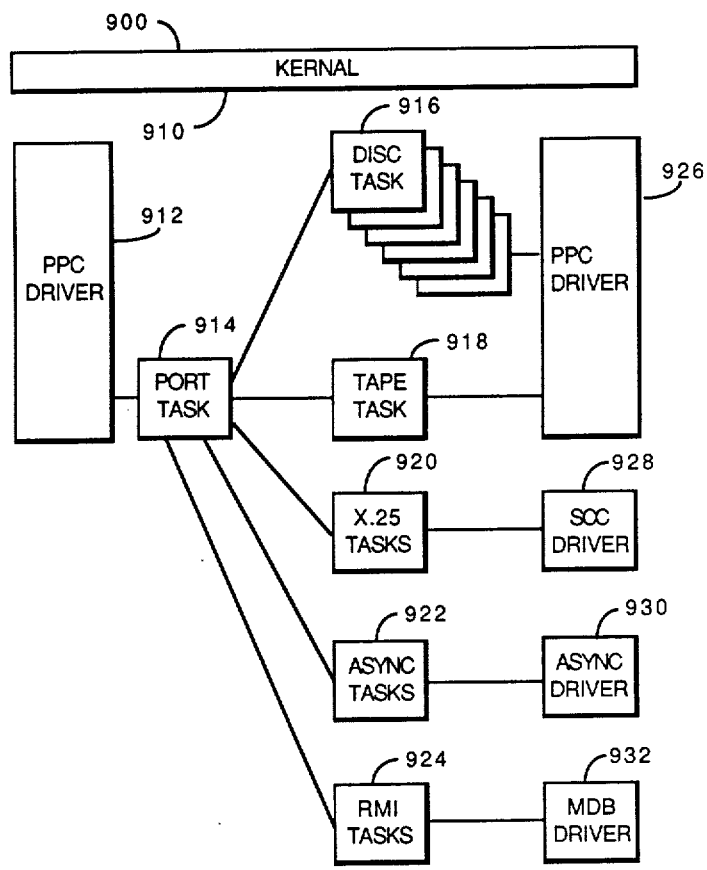
FIG. 9 is a block diagram illustrating a specific embodiment of the relationship between software modules according to the invention.

Referring to FIG. 9, there is shown a block diagram illustrating a specific embodiment of the software structure 900 according to the invention. The software structure 900 is divided into modules according to function, including supervision, device drivers and input/output tasks. The software structure 900 comprises a kernel 910 or operating system, a peripheral port control driver module (PPC driver) 912, a port task 914 logically coupled between the PPC driver and all other tasks, including but not necessarily limited to a task 916 and closely-related utilities, a tape task 918, packet communication (using X.25 protocol) (X.25) tasks 920, asynchronous communication (async) tasks 922, and remote maintenance interface (RMI) tasks 924.

The disk task 916 and the tape task 918 are logically coupled to an SCSI peripheral control (SPC) driver 926. The X.25 tasks 920 are logically coupled to a serial communication control (SCC) driver 928. The async tasks 922 are logically coupled to an async driver 930. The RMI tasks are coupled to a maintenance-diagnostics bus (MDB) driver 932. As it is not necessary to an appreciation of the invention to understand the details of the specific drivers or tasks, only selected drivers or tasks are discussed hereinafter for illustration purposes. It is sufficient to one of ordinary skill in the art to know that remote maintenance is provided via the MDB driver which provides device control to a maintenance-diagnostics bus, that the SCC driver 928 controls a standard SCC chip such as a Zilog Z8030 serial communication chip supporting both X.25 bit-oriented packet protocol and X.21 byte-oriented packet protocol, and that the async driver 930 controls standard dual universal asynchronous receiver-transmitters (DUARTs) such as a Signetics 2861 chip.

The kernal 910 is a standard operating system available as a commercial product for the 68000 family of microprocessors. (The 68000 family is made by or under license from Motorola, Inc.) A specific example of a kernel 910 is the T8120 common kernel software module used with Tandem brand computer systems made by Tandem Computers, Inc., of Cupertino, Calif.

Figure 10:
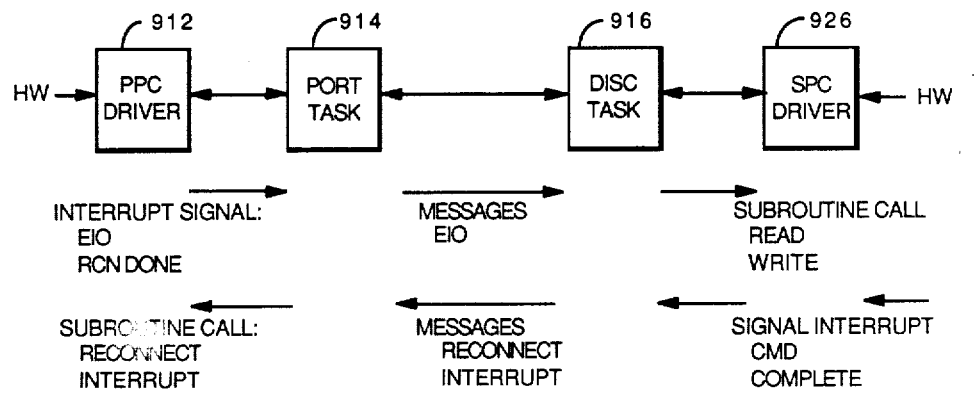
FIG. 10 is a block diagram illustrating a specific embodiment of calling protocols between software modules according to the invention.

Referring to FIG. 10, and using as an example a communications between one host processor (not shown, see FIG. 1) via the PPC driver 912 and one associated port (not shown, see FIG. 1) and a peripheral device (not shown, see FIG. 1) on the SCSI bus (not shown, see FIG. 1) accessible via the SPC driver 926 and associated hardware, the function of the drivers is to respond to hardware-generated interrupts (such as an interrupt associated with an Execute Input Output command) (EIO) issued by a host processor (not shown, see FIG. 1) in order to engage a port task 914 to pass messages (including messages associated with the EIO) to another task such as a disk task 916, instructing the other task 916 to carry out a desired action, such as to call a "read data" or "write data" subroutine, to communicate to the peripheral device (not shown) via a driver, such as the SPC driver 926. In response, when the read or write task is done, in the exemplary embodiment, the peripheral device (not shown) generates another hardward interrupt which is received and interpreted at the SPC driver 926 to generate a signal indicating that the command has been completed. The signal CMD COMPLETE or its equivalent is communicated to the disk task 916, which in turn conveys a message to the port task to issue a reconnect or an interrupt. The port task then makes a subroutine call to the PPC driver 912 to issue the reconnect or the interrupt to the host processor.

Thus, communication between the host processor and the device controller is by means of an EIO addressed to a peripheral device under control of a device controller, and the device controller responds to the host processor by a reconnect burst or an interrupt.

The port task 914 and related software have the following characteristics of interest:

The port task 914 sends the EIO Request message it receives to the device task 916 based on the controller address. If the host processor 33 issues multiple EIOs to the same controller address, the port task 914 will send multiple messages to the same device task.

The port task 914 does not associate EIOs with reconnects or interrupts. All decisions to reconnect and interrupt are made by the device tasks.

The port task 914 does not have the concept of ownership. If an ownership concept is necessary, it is provided by the host processor. As far as the device controller itself, the device controller can be owned by both channels simultaneously. Thus all EIOs having the same controller address from either channel are directed to the same device task.

The port task 914 receives the address of each data block from the device tasks and then breaks the data block into bursts to be sent or receive. If the address of the data block is in the memory MEM 112, it will move the data between MEM 112 and DB MEM 108 by using one of two reserved 256 data buffers in the DB MEM 108, moving data into one buffer while reconnecting to the host processor via the PPC on the other buffer.

The port task 914 times the reconnect and interrupt requests. If the PPC 43 does not complete in time, the port task 914 resets the PPC 43 and returns to the the device task with an error status.

Events such as Takeown EIO, Kill EIO and Channel Reset are reported as status to Reconnect, Interrupt and Read_Status and are not sent as messages or broadcast to the device tasks. Channel Reset causes the device controller 41 to reset to its idle state. Takeown EIO requires no action but indicates that a transfer has been aborted.

The port usage operates within the following constraints:

EIOs will be accepted from either port at all times.

A host processor interrupt will be issued only when a port is not in the reconnect condition.

Data for the main memory of the host processor is sent or received subject to availability of memory space in the DMA data buffer (DMA DB MEM 108).

An exemplary listing of device tasks and drivers used in accordance with the invention is provided in Appendix A accompanying this application. However, the operation of the invention would be clear to one of ordinary skill in this art from the foregoing description.

The invention has been explained with reference to specific embodiments. Other embodiments will be apparent to those of ordinary skill in this art in light of this disclosure. It is therefore not intended that this invention be limited except as indicated by the appended claims.

```
$CUERVO.T8121C00.PPCS    1987/4/1  14:22

1        TTL  'TALON PPC DRIVER/INTERRUPT HANDLER BANNER/COPYRIGHT'
 2
 3     ***********************************************************************
 4     *                                                                     *
 5     *                                                                     *
 6     *            TALON PPC DRIVER/INTERRUPT HANDLER                       *
 7     *                                                                     *
 8     *       SOURCE FILE --- T9330A00.PPCS                                 *
 9     *                                                                     *
10     *                                                                     *
11     ***********************************************************************
12
```

```
*****************************************************************
*                                                                *
*           Copyright (C)  Tandem Computers, Incorporated        *
*        1979, 1980, 1981, 1982, 1983, 1984, 1985                *
*                                                                *
*   These computer program listings and specifications, herein, are the *
*   property of Tandem Computers, Inc. and shall not be reproduced or  *
*   copied or used in whole or in part as the basis for manufacture or *
*   sale of items without written permission.                    *
*                                                                *
*              Protected as an unpublished work.                 *
*                                                                *
*****************************************************************

TTL  'PPC DRIVER'
        PAGE
        SECTION 0
*
*
*   PPC DRIVER CONTROL BLOCK EQUATES (VISIBLE)
*
              OFFSET  0
    P_REQ      DS.B  1        REQUEST CODE              : BYTE
    P_REQMOD   DS.B  1        REQUEST CODE MODIFIER     : BYTE
    P_REPLY    DS.B  1        DRIVER REPLY              : BYTE
    P_IREPLY   DS.B  1        INTERRUPT HANDLER REPLY   : BYTE
    P_CURTCB   DS.L  1        CALLING TASK'S TCB ADR    : LONG

P_EIOBUF   DS.L  1        EIO BUFFER ADDRESS        : LONG
    P_BURST    DS.B  1        BURST REQUEST (IN WORDS)  : BYTE
    P_HOLDOFF  DS.B  1        HOLDOFF REQUEST           : BYTE
    P_RIC      DS.W  1        RIC REQUEST               : WORD
    P_RIST     DS.W  1        RIST REQUEST              : WORD
    P_RAC      DS.W  1        RAC REQUEST               : WORD
    P_RACCHK   DS.B  1        RAC CHECK REQUEST         : BYTE
    P_XBURST   DS.B  1        EXACT BURST REQUEST       : BYTE
    P_NOEIO    DS.W  1        NO EIO BUFFER LONG        : WORD
    P_ACTLEN   DS.W  1        ACTUAL TRANSFER LENGTH    : WORD
    P_XFRBUF   DS.W  1        TRANSFER BUFFER           : WORD
    P_XFRLEN   DS.W  1        TRANSFER LENGTH           : WORD
    P_SKIPX    DS.B  1        SKIP CHECKSUM REQUEST     : BOOLEAN
    P_STATE    DS.B  1        VALID STATE               : BOOLEAN
    P_STBUF    DS.L  1        STATE BUFFER ADDRESS      : LONG

*
*   PPC DRIVER CONTROL BLOCK EQUATES (HIDDEN)
*
    DCBHID     EQU   *
    P_PPCADR   DS.L  1        PPC BASE ADDRESS          : LONG
    P_PORT_NO  DS.B  1        PORT NO                   : BYTE
    P_DVR_ST   DS.B  1        DRIVER STATE              : BYTE
    P_FHEAD    DS.L  1        FREE EIO QUEUE HEAD       : LONG
    P_FTAIL    DS.L  1        FREE EIO QUEUE TAIL       : LONG
    P_EHEAD    DS.L  1        EIO QUEUE HEAD            : LONG
    P_ETAIL    DS.L  1        EIO QUEUE TAIL            : LONG
    P_OUTDIR   DS.B  1        OUT FROM CONTROLLER       : BOOLEAN
    P_BURSTC   DS.B  1        BURST REQUEST COPY        : BYTE
    P_XFRBUFC  DS.W  1        TRANSFER BUFFER COPY      : WORD
    P_XFRLENC  DS.W  1        TRANSFER LENGTH COPY      : WORD
    P_SKIPXC   DS.W  1        SKIP CHECKSUM REQUEST COPY : BOOLEAN
    P_LSTBUF   DS.W  1        LAST BURST BUFFER ADDRESS : WORD
    DCBLEN     EQU   *

*  PPC STATE STRUCTURE

OFFSET 0
    PST_DVR_ST      DS.B  1   DRIVER STATE              : BYTE
    PST_FILLER      DS.B  1   FILLER                    : BYTE

PST_PPC_RAC     DS.W  1   PPC RAC                   : WORD
    PST_PPC_RIC     DS.W  1   PPC RIC                   : WORD
    PST_PPC_RIST    DS.W  1   PPC RIST                  : WORD
    PST_PPC_LAC     DS.W  1   PPC LAC                   : WORD
    PST_PPC_LPRM    DS.W  1   PPC LPRM                  : WORD
    PST_PPC_STATUS1 DS.W  1   PPC STATUS1               : WORD
    PST_PPC_STATUS2 DS.W  1   PPC STATUS2               : WORD
    PST_PPC_STATUS3 DS.W  1   PPC STATUS3               : WORD

PST_DMB_STATUS   DS.W  1  DMB STATUS                : WORD
    PST_DMB_MASTER   DS.W  1  DMB MASTER CONTROL        : WORD
    PST_DMB_CONTROL0 DS.W  1  DMB CONTROL0              : WORD
    PST_DMB_END0     DS.W  1  DMB END0                  : WORD
    PST_DMB_CHAIN0   DS.W  1  DMB CHAIN0                : WORD
    PST_DMB_START0   DS.W  1  DMB START0                : WORD
```

```
100     PST_DMB_CHAIN1   DS.W   1    DMB CHAIN1                              ; WORD
101     PST_DMB_START1   DS.W   1    DMB START1                              ; WORD
102
103     PST_BERS         DS.W   1    BOARD ERROR STATUS                      ; WORD
104
105     * DCB CONFIGURATION RECORD
106
107                      OFFSET 0
108     DCR_LEN          DS.W   1    LENGTH OF DCB CONFIGURATION RECORD      ; WORD
109     DCR_TNAME        DS.L   1    I/O TASK NAME                           ; LONG
110     DCR_PORT_NO      DS.B   1    PORT NO                                 ; BYTE
111     DCR_FILLER       DS.B   1    FILLER                                  ; BYTE
112     DCRSIZE          EQU    *

113
114     * VARIOUS MAXIMUM CONSTANTS
115
116     PMREQ     EQU   7          MAXIMUM PPC REQUEST CODE
117     DEFBURST  EQU   16         DEFAULT BURST LENGTH IN WORDS
118     MBURST    EQU   128        MAXIMUM BURST LENGTH IN WORDS
119     MHOLDOFF  EQU   100        MAXIMUM HOLDOFF REQUEST IN uS
120     MXLEN     EQU   $8080      MAXIMUM SKIP CHECKSUM TRANSFER LENGTH (32 KB)
121     SCTDTLEN  EQU   512        SECTOR DATA LENGTH IN BYTES            **19
121.1   SCTLEN    EQU   514        SECTOR LENGTH INCLUDING XSUM IN BYTES  **19
122
123     * PPC INTERRUPT HANDLER SIGNAL BITS
124
125     EV_EIO0   EQU   0001       PPC0 EIO RECEIVED
126     EV_EIO1   EQU   0002       PPC1 EIO RECEIVED, MUST BE ONE BELOW EV_EIO0
127     EV_XEND   EQU   0004       TRANSFER COMPLETED
128
129     * PPC DRIVER AND INTERRUPT HANDLER IREPLY CODE
130     * DRIVER REPLY CODE IS NEGATIVE
131
132     PDR_NOERR        EQU   $00    NO ERROR
133     PDR_BUFERR       EQU   $01    NO BUFFER OR BAD COUNT ERROR
134     PDR_BOGUS        EQU   $02    ILLEGAL COMMAND OR MODIFIER
135     PDR_STERR        EQU   $03    STATE ERROR
136     PDR_IRQ_NDONE    EQU   $05    PREVIOUS IRQ NOT DONE
137
138     PDR_OWN_RST      EQU   $10    TAKE OWNERSHIP RESET
139     PDR_CHNL_RST     EQU   $11    CHANNEL RESET
140     PDR_KILLED       EQU   $12    PORT KILLED
141     PDR_NOWN         EQU   $13    NOT OWNED
142
143     PDR_OUT_PERR     EQU   $14    OUT PARITY ERROR (READ)
144     PDR_ABORTED      EQU   $15    ABORTED
145     PDR_TBUS_SEQ     EQU   $16    T-BUS SEQUENCE ERROR
146     PDR_XFR_ERR      EQU   $17    TRANSFER ERROR
147     PDR_PPC_ERR      EQU   $18    PPC CHIP ERROR
148     PDR_DMB_ERR      EQU   $19    DB-DMA CHIP ERROR
149
150
151     * PPC DRIVER STATE EQUATES
152
153     * event               present state    next state
154     *    reconnect cmd    ok               reconnecting
155     *    transfer done    reconnecting     ok
156     *    configure cmd    not configured   ok
157     *
158     * other status kept in the PPC:
159     *    killed
160     *    aborted
161     *    channel reset
162     *    owned
163     *    hw error
164
165     ST_OK       EQU   $00              OK
166     ST_RCN      EQU   $01              RECONNECTING
167     ST_NCONF    EQU   $02              NOT CONFIGURED
168     ST_DOWNED   EQU   $03              HARDWARE ERROR
169
170
171     * EIO QUEUE ENTRY OFFSETS
172
173              OFFSET 0
174     PE_LINK    DS.L   1    FORWARD LINK
175     PE_PORT    DS.B   1    PORT NUMBER
176                DS.B   1
177     PE_LAC     DS.W   1    LAC REGISTER
178     PE_LPRM    DS.W   1    LPRM REGISTER
```

```
179
180     LUN_PPC0    EQU     0       LUN FOR PPC 0
181     LUN_PPC1    EQU     1       LUN FOR PPC 1
182
183     P1_FERR     EQU     (P1_OWN_RST+P1_EIO_RST+P1_CHNL_RST+P1_HW_ERR+P1_KILLED+P1_NOWN)
184
185             PAGE
186
187     *   EXTERN LONG FUNCTION INITPPCDCB (&INIT_REC)
188     *
189     *       DEF----INITPPCDCB IS TALON'S PPC DCB INITALIZER.
190     *
191     *       ENTRY--INIT_REC HAS THE FOLLOWING FORMAT:
192     *                   RECORD LENGTH              : WORD
193     *                   I/O TASK NAME              : LONG
194     *                   PORT NO                    : WORD
195     *
196     *       EXIT---D0=DCB ADDRESS (0 IF A DCB CAN'T BE OBTAINED)
197     *
198     *       CALL---IF (DCB=INITPPCDCB(&INIT_REC)==0) SOFTFAIL(PPC_ERR.NO_DCB);
199     *
200     *   REGISTER USAGE:
201     *       A0 = DCB ADDRESS
202     *       A1 = DCB TABLE ADDRESS
203     *       A2 = CONFIGURATION RECORD
204     *       D1 = PPC BASE ADDRESS
205     *       D2 = PORT NUMBER
206
207             SECTION 0
208             XDEF    INITPPCDCB
209     INITPPCDCB
210             MOVEM.L A0-A2/D1-D2,-(SP)
211             MOVEA.L 24(SP),A2              GET # CONFIGURATION RECORD
212     *
213     * CHECK PARAMETERS BEFORE GETTING BLOCK OF FREE MEMORY
214     *
215             CMPI.W  #DCRSIZE,DCR_LEN(A2)   CHECK RECORD LENGTH
216             BNE     INITFAIL
217             CMPI.B  #1,DCR_PORT_NO(A2)     CHECK PORT NO
218             BHI     INITFAIL
219
220     * INITIALIZE DEVICE CONTROL BLOCKS
221
222     * REGISTER USAGE:
223     *       A0 = DCB ADDRESS
224     *       A1 = DCB TABLE ADDRESS
225     *       A2 = DEVICE CONFIGURATION RECORD
226     *       A5 = GLOBAL MEMORY BASE
227
228     *       D0 = GENERAL PURPOSE
229     *       D1 = PORT NO
230     *       D2 = PORT BASE ADDRESS
231     *
232             MOVE.B  DCR_PORT_NO(A2),D1     GET PORT NO
233             IF      <EQ> THEN              IF PORT 0
234             LEA     (L3DCBTAB+LUN_PPC0*4)(A5),A1  GET PPC 0 DCB TABLE    **20
235             MOVE.L  #PPC0,D2               PPC 0 BASE ADDRESS
236             ELSE                           *ELSE
237             LEA     (L3DCBTAB+LUN_PPC1*4)(A5),A1  GET PPC 1 DCB TABLE    **20
238             MOVE.L  #PPC1,D2               PPC 1 BASE ADDRESS
239             ENDI                           *END IF PORT 0
240                                            GET DCB LENGTH IN BYTES
241             MOVE.L  #DCBLEN,D0             GET DCB FROM FREE MEMORY
242             BSR     GETSP
243             BEQ     INITFAIL               CLEAR DCB
244             BSR     ZROB1                  SAVE DCB #                   **20
245             MOVE.L  A0,(A1)                ADD NUMBER
246             ADDQ.W  #1,L3DCBNUM(A5)        INITIALIZE PPC BASE ADDRESS
247             MOVE.L  D2,P_PPCADR(A0)        STORE PORT NO
248             MOVE.B  D1,P_PORT_NO(A0)       SET STATE = NOT CONFIGURED
249             MOVE.B  #ST_NCONF,P_OVR_ST(A0) *** DESTROY A1
250             LEA     P_FHEAD(A0),A1         SET FREE EIO BUFFER Q EMPTY
251             MOVE.L  A1,P_FTAIL(A0)
252             LEA     P_EHEAD(A0),A1         SET EIO BUFFER Q EMPTY
253             MOVE.L  A1,P_ETAIL(A0)
254
255             LEA     PPC_RPT,A1             SET INTERRUPT HANDLER LEVEL 3 **20
256             MOVE.L  A1,RUPT27(A5)
257
258             BRA.S   INITPASS               SUCCESS
```

```
259     *
260     * FAILURE
261     *
262     INITFAIL
263         CLR.L   D0                      SET FAILURE
264         BRA.S   INITRETURN
265     *
266     * SUCCESS
267     *
268     INITPASS
269         MOVE.L  A0,D0                   SET SUCCESS
270     INITRETURN
271         MOVEM.L (SP)+,A0-A2/D1-D2
272         RTS
273
274     *
275     * EXTERN BOOLEAN PROCEDURE PPCDVR(DCB)
276     *
277     *       DEF----PPCDVR IS TALON'S PPC DRIVER
278     *
279     *       ENTRY--A0=ADDRESS OF DRIVER CONTROL BLOCK (DCB) WITH DCB[REQ]
280     *              =TO A VALID PPC DRIVER REQUEST CODE AS FOLLOWS:
281     *
282     *              0--RESET PPC AND DMA CHANNEL 0
283     *              1--CONFIGURE HOLDOFF
284     *              2--QUEUE AN EIO READ BUFFER
285     *              3--DEQUEUE AN EIO READ BUFFER
286     *              4--ENABLE EIO
287     *              5--INITIATE READ RECONNECT
288     *              6--INITIATE WRITE RECONNECT
289     *              7--INITIATE AN I/O INTERRUPT
290     *
291     *       EXIT---SUCCESS D0 = ONES CCZ=0 AND DCB[REPLY]=0 (NO ERROR)
292     *              FAILURE D0 = 0    CCZ=1 AND DCB[REPLY]=ERROR CODE
293
294     *
295     * SET SOME COMMON VARIABLES IN DCB CB & PARSE COMMAND
296     * REGISTER USAGE:   A0  PPC BASE ADDRESS
297     *                   A2  DCB ADDRESS
298     *
299
300         XDEF    PPCDVR
301     PPCDVR
302         MOVEM.L A0-A2/D1-D3,-(SP)
303         MOVEA.L 28(SP),A2               GET DCB ADDRESS
304
305     ****** CHECK STATE
306         BSR     FMYTID                  GET CALLING TASKS ID
307         BSR     GETCBA                  GET ADDRESS OF CALLING TASKS TCB
308         MOVE.L  A0,P_CURTCB(A2)         PUT IN CALLING TASK'S TCB ADDRESS
309
310         MOVE.B  #-PDR_NOERR,P_REPLY(A2) CLEAR ERROR REPLY
311         CLR.B   P_STATE(A2)             CLEAR STATE VALID FLAG
312
313     * VALIDITY CHECK AND PARSE REQUEST
314
315         MOVE.B  P_REQ(A2),D0            REQUEST < 0 ?
316         BLT     PDVR81                  INVALID COMMAND
317         CMPI.B  #PMREQ,D0               REQUEST > MAX ?
318         BGT     PDVR81                  INVALID COMMAND
319         EXT.W   D0                      NO, SIGN EXTEND
320         LSL.W   #2,D0                   FORM INDEX
321         MOVEA.L PDVR0(PC,D0.W),A1       GET PPC REQUEST TABLE ADDRESS
322         JMP     (A1)                    EXECUTE COMMAND
323     PDVR0 DC.L  RESET                   0 RESET
324         DC.L    CONFIGURE               1 CONFIGURE
325         DC.L    QUEUE_EIO               2 QUEUE EIO READ BUFFER
326         DC.L    DEQUEUE_EIO             3 DEQUEUE EIO
327         DC.L    PDVR81                  4 ENABLE EIO
328         DC.L    READ                    5 INITATE READ
329         DC.L    WRITE                   6 INITATE WRITE
330         DC.L    INTERRUPT               7 INITIATE CPU INTERRUPT
331         DC.L    READ_STATUS             8 READ DRIVER STATUS
332         PAGE
333     *
334     * RESET REQUEST
335     * REGISTER USAGE:
336     *       A0 = PPC BASE ADDRESS
337     *
338     RESET TRAP  #MTXON                  INTERRUPTS OFF
339         BSR     CLEAR_ERROR             CLEAR IF THERE IS ANY ERROR
340
341     * RESET DMA CHANNEL 0
```

```
342
343             MOVE.W    #DC_RESET,DMB_CONTROL0   RESET CHANNEL 0
344             MOVE.W    #0,DMB_CONTROL0                                  **4
345             MOVE.W    #0,DMB_START0                                    **4
346             MOVE.W    #0,DMB_END0                                      **4
347             MOVE.W    #0,DMB_CHAIN0                                    **4
348
349       * RESET PPC
350       * RAC MUST BE SET TO READ DIRECTION. IF WRITE TRANSFER WAS       **8
351       * INTERRUPTED, IT CAN REQUEST AN EXTRA WORD FROM THE DMA.        **8
352
353             MOVEA.L   P_PPCADR(A2),A0   GET PPC BASE ADDRESS           **8
354             MOVE.W    #PF_EIO,PPC_CLEAR(A0)                            **8
355             MOVE.W    #PF_RCI_EN,PPC_CLEAR(A0)                         **8
356             MOVE.W    #PR_READ,PPC_RAC(A0)    SET READ DIRECTION       **8
356.1           MOVE.W    #PF_CLEAR,PPC_CLEAR(A0)                          **8
358             MOVE.W    #PF_INTR,PPC_CLEAR(A0)                           **8
359             MOVE.W    #$FFFF,PPC_CLEAR(A0) CLEAR FLAGS
360   ******    MOVE.W    #(PF_LOADED+PF_RAC_DIS),PPC_FLAGS(A0) SET FLAGS
361             MOVE.W    #PF_LOADED,PPC_FLAGS(A0) SET FLAGS
362             MOVE.W    #(DEFBURST-1),PPC_BURST(A0)  SET DEFAULT BURST LENGTH
363             MOVE.W    #0,PPC_RAC(A0)     CLEAR RAC
364             MOVE.W    #0,PPC_RIC(A0)     CLEAR RIC
365             MOVE.W    #0,PPC_RIST(A0)    CLEAR RIST
366
367             MOVE.B    #ST_NCONF,P_DVR_ST(A2)  SET STATE = NOT CONFIGURED
368             BRA       PDVR96             FINISH UP
369        PAGE
370       *
371       *   CONFIGURE REQUEST
372       *
373       CONFIGURE
374             IF.B      P_DVR_ST(A2) <NE> #ST_NCONF AND.B P_DVR_ST(A2) <NE> #ST_OK THEN
375                                 *IF NOT (NOT CONFIGURED OR OK)
376             BRA       PDVR85             STATE ERROR
377             ENDI                         END IF NOT (NOT CONFIGURED OR OK)
378
379       * CHECK BURST
380
381             MOVE.B    P_BURST(A2),D0     GET BURST REQUEST
382             BEQ       PDVR81             INVALID PARAMETER
383             CMPI.B    #MBURST,D0         BURST > MAX?
384             BHI       PDVR81             INVALID PARAMETER
385
386       * CHECK HOLDOFF
387
388             MOVE.B    P_HOLDOFF(A2),D0   GET HOLDOFF REQUEST
389             CMPI.B    #MHOLDOFF,D0       HOLDOFF > MAX?
390             BHI       PDVR81             INVALID PARAMETER
391             TRAP      #MTXON             INTERRUPTS OFF 392
393             MOVE.B    P_BURST(A2),P_BURSTC(A2)  STORE BURST
394
395             CLR.L     D0
396             MOVE.B    P_HOLDOFF(A2),D0   GET HOLDOFF REQUEST
397             BSR       HLDOFF             SET HOLD OFF
398
399             MOVE.B    #ST_OK,P_DVR_ST(A2) SET STATE = OK
400             BRA       PDVR96             FINISH UP
401        PAGE
402       *
403       *   QUEUE EIO BUFFER ON THE FREE EIO BUFFER QUEUE
404       *   P_EIOBUF HAS THE BUFFER ADDRESS
405
406       QUEUE_EIO
407             TST.L     P_EIOBUF(A2)       VALID BUFFER ADDRESS?
408             BLE       PDVR87             NO BUFFER
409             TRAP      #MTXON             INTERRUPTS OFF
410             MOVEA.L   P_EIOBUF(A2),A1    GET ELEMENT ADDRESS
411             LEA       P_FHEAD(A2),A0     GET FREE BUFFER QUEUE ADDRESS
412             BSR       ADDQ               ADD BUFFER TO FREE BUFFER QUEUE
413             BRA       PDVR96             FINISH UP
414       *
415       *   DEQUEUE BUFFER FROM THE EIO BUFFER QUEUE
416       *   P_EIOBUF HAS THE BUFFER ADDRESS
417       *
418       DEQUEUE_EIO
419             TRAP      #MTXON             INTERRUPTS OFF
420             LEA       P_EHEAD(A2),A0     GET BUFFERS EIO QUEUE HEAD ADDRESS
421             BSR       REMQ               TRY TO REMOVE AN ELEMENT
422             BEQ       PDVR86             NO BUFFER
423             MOVE.L    A1,P_EIOBUF(A2)    GIVE THE BUFFER BACK
424             BRA       PDVR96             FINISH UP
```

```
425         PAGE
426
427     *
428     *   INITIATE WRITE
429     *     REGISTER USAGE:
430     *       A0 = PPC BASE ADDRESS
431     *       D3 = DMA CONTROL REG
432     *
433     WRITE
434             MOVE.B   #TRUE,P_OUTDIR(A2)         SET OUT DIRECTION
435             BRA      TRANSFER
436
437     *
438     *   INITIATE READ
439     *     REGISTER USAGE:
440     *       A0 = PPC BASE ADDRESS
441     *       D3 = DMA CONTROL REG
442     *
443     READ
444             CLR.B    P_OUTDIR(A2)
445
446     TRANSFER
447             CMP.B    #ST_OK,P_DVR_ST(A2)        IF NOT OK
448             BNE      POVR85                     STATE ERROR
449
450     * CHECK START AND LENGTH PARAMETERS
451
452             MOVE.W   P_XFRBUF(A2),D0            GET START ADDRESS
453             BTST     #0,D0                      ODD ADDRESS?
454             BNE      POVR87                     BAD BUFFER ADDRESS
455             ADD.W    P_XFRLEN(A2),D0            ADD TRANSFER LENGTH
456             IF       <CS> THEN                  IF END ADDRESS OVERFLOW    **7
457             BNE      POVR87                     BAD BUFFER ADDRESS         **4
458             ENDI                                END IF END ADDRESS OVERFLOW **7
459             MOVE.W   P_XFRLEN(A2),D1            ZERO LENGTH?
460             BEQ      POVR81                     INVALID PARAMETER
461             IF.B     P_SKIPX(A2) <NE> #0 THEN   IF SKIP CHECKSUM
462             IF.B     P_XBURST(A2) <NE> #0 OR.W D1 <HI> #MXLEN THEN EXACT BURST OR **20
463                                                *GREATER THAN MAX SKIPX LENGTH?
464             BRA      POVR81                     INVALID PARAMETER
465             ENDI                                END IF XBURST OR MORE THAN MXLEN
466             ENDI                                END IF SKIP CHECKSUM
467
468     * CHECK FOR HARDWARE ERRORS
469
470             TRAP     #MTXON                     INTERRUPTS OFF
471
472             MOVE.W   BRD_ERROR,D0               CHECK FOR BOARD ERROR
473             ANDI.W   #(BE_CHIP_ERR+BE_DBDMA_ERR+BE_PPC0_ERR+BE_PPC1_ERR),D0
474             BNE      POVR88                     HARDWARE ERROR
475
476             MOVEA.L  P_PPCADR(A2),A0            GET PPC BASE ADDRESS
477             MOVE.W   PPC_STATUS1(A0),D0         GET STATUS 1
478             ANDI.W   #P1_FERR,D0                CHECK FOR ERROR
479             BNE      POVR88                     HARDWARE ERROR
480
481             MOVE.W   PPC_STATUS2(A0),D0         GET STATUS 2
482             ANDI.W   #P2_ABORTED,D0             CHECK FOR ABORTED
483             BNE      POVR88                     HARDWARE ERROR
484
485             MOVE.W   DMB_STATUS,D0              GET DMB_STATUS
486             ANDI.W   #DS_MST_PERR+DS_ERR0,D0    CHECK FOR ERROR
487             BNE      POVR88                     HARDWARE ERROR
488
489     * COPY PARAMETERS
490
491             MOVE.W   P_XFRBUF(A2),P_XFRBUFC(A2) COPY START ADDRESS
492             MOVE.W   P_XFRLEN(A2),P_XFRLENC(A2) COPY REQUESTED LENGTH
493             MOVE.B   P_SKIPX(A2),P_SKIPXC(A2)   COPY SKIP CHECKSUM REQUEST
494
495     * RESET DMA AND SET UP RAC
496     * DMB REGISTERS DO NOT NEED TO BE CLEARED BECAUSE THEY WILL BE WRITTEN **4
497
498             MOVE.W   #DC_RESET,DMB_CONTROL0     RESET CHANNEL 0
499
500             MOVEA.L  P_PPCADR(A2),A0            GET PPC BASE ADDRESS
501             MOVE.W   P_RAC(A2),D0               GET RAC WORD
502             ANDI.W   #($FFFF-PR_SPECIAL),D0     CLEAR SPECIAL BIT
503     *****   IF.B     P_RACCHK(A2) <EQ> #0 THEN  IF NOT RAC CHECK
```

```
504     *****  MOVE.W   #PF_RAC_DIS,PPC_FLAGS(A0)    DISABLE RAC CHECK
505     *****  MOVE.W   #0,PPC_FLAGS(A0)             DISABLE RAC CHECK
506     *****  ANDI.W   #$00FF,D0                    CLEAR UPPER BYTE
507     *****  ELSE
508     *****  MOVE.W   #PF_RAC_DIS,PPC_CLEAR(A0)    ENABLE RAC CHECK
509     *****  ENDI                                  END IF RAC CHECK
510
511     * SET RAC READ WRITE BITS
512
513            ANDI.W   #-(PR_READ+PR_WRITE),D0      CLEAR READ WRITE BITS
514            IF.B     P_OUTDIR(A2) <NE> #0 THEN    IF OUT FROM CONTROLLER
515            ORI.W    #PR_READ,D0                  SET READ BIT
516            ELSE
517            ORI.W    #PR_WRITE,D0                 SET WRITE BIT
518            ENDI                                  END IF OUT FROM CONTROLLER
519            MOVE.W   D0,PPC_RAC(A0)               SET RAC WORD
520
521     * IF EXACT BURST SIZE REQUIRED, TRANSFER IN BURST MULTIPLE FIRST
522     * TRANSFER THE REST LATER
523     * BURST SIZE MUST BE POWER OF TWO. TWOS COMPLEMENT OF BURST SIZE TURNS
524     * ALL THE UPPER BITS ON
525
526     * PPC BURST REGISTER IS ALWAYS ONE LESS
527
528            CLR.W    D0
529            MOVE.B   P_BURSTC(A2),D0              GET DEFAULT BURST SIZE
530            SUBQ.B   #1,D0                        SUBTRACT BY ONE
531            MOVE.W   D0,PPC_BURST(A0)             SET BURST
532
533            CLR.W    P_LSTBUF(A2)                 ASSUME ONLY ONE TRANSFER
534
535            MOVE.W   P_XFRLEN(A2),D1              GET REQUESTED LENGTH
536            IF.B     P_XBURST(A2) <NE> #0 THEN    IF EXACT BURST
537            CLR.W    D0
538            MOVE.B   P_BURSTC(A2),D0              GET BURST SIZE
539            LSL.W    #1,D0                        MULTIPLY BY TWO TO BECOME BYTES
540
541            IF.W     D1 <GT> D0 THEN              IF MORE THAN ONE BURST
542            NEG.W    D0                           TURN ON ALL UPPER BITS
543                                                 *TURN OFF ALL LOWER BITS
544            AND.W    D0,D1                        TRANSFER IN BURST MULTIPLE FIRST
545
546            IF.W     D1 <NE> P_XFRLEN(A2) THEN    IF PARTIAL LAST BURST
547            MOVE.W   P_XFRBUF(A2),D0              GET ORIGINAL START ADDRESS
548            ADD.W    D1,D0                        ADD FIRST LENGTH
549            MOVE.W   D0,P_LSTBUF(A2)              STORE LAST BURST START ADDRESS
550            ENDI                                  END IF PARTIAL LAST BURST
551
552     * transformation from length to burst size:
553     *     round up length (for odd bytes)
554     *     divide by two (into words)
555     *     subtract by one (for PPC register)
556     * this instruction sequence below does just that:
557     *   requested length    burst size      PPC_Burst
558     *       xxx0                xxx           (xxx-1)
559     *       xxx1              (xxx+1)           xxx
560
561            ELSE                                 *LESS OR EQUAL TO ONE BURST
562            MOVE.W   D1,D0                        GET LENGTH
563            SUBQ.W   #1,D0                        SUBTRACT ONE
564            LSR.W    #1,D0                        DIVIDE BY TWO
565            MOVE.W   D0,PPC_BURST(A0)             SET BURST EXACTLY TO LENGTH
566
567            ENDI                                  END IF MORE THAN ONE BURST
568            ENDI                                  END IF EXACT BURST
569
570     * FORM DMA CONTROL REG AND SET PADI
571
572            MOVE.W   #DC_INCR,D3                  FORM DMA CONTROL REG
573            MOVE.W   #PF_PADI,PPC_CLEAR(A0)       PADI CLEAR
574
575            IF.B     P_OUTDIR(A2) <NE> #0  THEN
576            ORI.W    #DC_OUT,D3                   FORM DMA CONTROL REG TO OUT
577            BTST     #0,D1
578            IF       <NE> THEN                    IF ODD LENGTH
579            MOVE.W   #PF_PADI,PPC_FLAGS(A0)       SET PADI
580            ENDI                                  END IF ODD LENGTH
581            ENDI                                  END IF DIR = OUT
582
583     * ROUND UP ODD TRANSFER LENGTH
584     *    requested length   set up length
585     *        xx00                xx00
586     *        xx01                xx10
```

```
587     *
588
589           ADDQ.W    #1,D1                    ADD ONE
590           ANDI.W    #$FFFE,D1                ROUND DOWN
591
592     * REGULAR TRANSFER
593
594     * DMA START  = PHYSICAL ADDRESS - 2
595     * DMA END    = PHYSICAL ADDRESS + LENGTH - 2
596
597           IF.B     P_SKIPX(A2) <EQ> #0 THEN   IF REGULAR TRANSFER         **19
598
599           MOVE.W   P_XFRBUF(A2),D0           GET START ADDRESS
600           SUBQ.W   #2,D0                     SUBTRACT 2 FOR DMA PREINCREMENT
601           MOVE.W   D0,DMB_START0             SET DMA START ADDRESS
602           ADD.W    D1,D0                     ADD TRANSFER LENGTH
603           SUBQ.W   #2,D0                     SUBTRACT 2 FOR DMA PREINCREMENT
604           MOVE.W   D0,DMB_END0               SET DMA END ADDRESS
605           MOVE.W   #0,DMB_CHAIN0             CLEAR CHAIN                    **4
606           MOVE.W   D3,DMB_CONTROL0           SET CONTROL REG
607
608     *algorithm for skip checksum chaining
609     *
609.1   * the two byte checksum is at the end of the sector                    **19
610     * put the first sector parameters in the DMA registers
611     *
612     *     end address = start address + sector_data - 2 * assume full sector **19
613     *
614     *     DMA start = start address
615     *     DMA end = end address
616     *     DMA chain = chain address
617     *     DMA control = control
618     *
619     *     length = length - sector
620     *
621     * build chain blocks for the rest of the sectors
621.01  * added 2 to all chain offsets because D2 is predecremented by 2
622     *
623     *loop:
624     *     start address = end address + 4              * skip checksum
625     *     end address = start address + sector_data - 2 * assume full sector **19
626     *
627     *     chain control = control
628     *     chain start = start address
629     *     chain end = end address
630     *     chain address = chain address + chain block length
631     *     last chain chain = chain address
632     *
633     *     length = length - sector
634     *     if length > 0                                * continue until last sector
635     *       go to loop
636     *
637     * fix last chaining block
638     *
639     *     chain address = chain address - chain block length
640     *     control = control and not chain              * stop chaining
641     *     end address = end address + length           * fix end address
642     *
643     *     chain control = control
644     *     chain end = end address
645     *
646     * REGISTER USAGE
647     *     D0 = START ADDRESS
648     *     D1 = LENGTH
649     *     D2 = CHAIN DISPLACEMENT
650     *     D3 = CONTROL
651     *     A0 = PPC BASE ADDRESS
652     *     A1 = DMA BASE ADDRESS
653     *     A2 = DCB
654                                               * SKIP CHECKSUM TRANSFER
655           ELSE                                GET START ADDRESS
656           MOVE.W   P_XFRBUF(A2),D0           SUBTRACT 2 FOR DMA PREINCREMENT
657           SUBQ.W   #2,D0                     SET DMA START ADDRESS
658           MOVE.W   D0,DMB_START0             ASSUME FULL SECTOR              **19
659           ADD.W    #(SCTDTLEN-2),D0          SET DMA END ADDRESS
660           MOVE.W   D0,DMB_END0
661           MOVE.L   #(PCHBLK-DMBBUF-2),D2     SET UP CHAIN BLOCK ADDRESS      **20
662           MOVE.W   D2,DMB_CHAIN0             SET DMA CHAIN ADDRESS
663           ORI.W    #(DC_CHAIN_EN),D3         ENABLE CHAINING
664           MOVE.W   D3,DMB_CONTROL0           SET DMA CONTROL REG
665
```

```
666
667           LEA      DMBBUF,A1              LOAD DATA BUS BUFFER START ADDRESS
668           SUBI.W   #SCTLEN,D1             DECREMENT LENGTH
668.01
668.1         IF       <LE> THEN              IF THERE IS ONLY ONE SECTOR        **19
668.3         ANDI.W   #-OC_CHAIN_EN,DMB_CONTROLO STOP CHAINING                   **19
668.31
668.4         ADDI.W   #2,D1                  ADD BACK CHECKSUM LENGTH           **19
669           IF       <MI> THEN              IF PARTIAL SECTOR                  **19
670           ADD.W    D1,D0                  FIX END ADDRESS                    **19
670.1         MOVE.W   D0,DMB_ENDO            SET DMA END ADDRESS                **19
670.5         ENDI                            END IF PARTIAL SECTOR              **19
670.6
671     * BUILD CHAIN BLOCKS
672     * LONG INDEX REGISTER D2 IS USED BECAUSE IT IS A SIGNED VALUE             ***4
672.1   * ALL ARITHMETIC OPERATIONS TO IT MUST BE DONE IN LONG SIZE               **20
673
673.1         ELSE
674     CHAIN1
675           ADDQ.W   #4,D0                  SKIP CHECKSUM
676           MOVE.W   D0,DL_START+2(A1,D2.L) SET CHAIN START ADDRESS             ***4
677           ADD.W    #(SCTDTLEN-2),D0       ASSUME FULL SECTOR                  **19
678           MOVE.W   D0,DL_END+2(A1,D2.L)   SET CHAIN END ADDRESS               ***4
679           MOVE.W   D3,DL_CONTROL+2(A1,D2.L) SET CHAIN CONTROL                 ***4
680           ADDQ.L   #DL_LEN,D2             POINT TO THE NEXT CHAIN             **20
681           MOVE.W   D2,DL_CHAIN+2-DL_LEN(A1,D2.L) SET CHAIN CHAIN ADDRESS ***4
682           SUBI.W   #SCTLEN,D1             DECREMENT LENGTH
683           BGT      CHAIN1                 CONTINUE UNTIL LAST SECTOR
684
685     * FIX LAST CHAIN BLOCK
686
687.2         SUBQ.L   #DL_LEN,D2             POINT TO THE LAST CHAIN             **21
687.21        ANDI.W   #-DC_CHAIN_EN,DL_CONTROL+2(A1,D2.L) STOP CHAINING          **19
687.211
687.22        ADDI.W   #2,D1                  ADD BACK CHECKSUM LENGTH           **19
687.3         IF       <MI> THEN              IF PARTIAL SECTOR                  **19
688           ADD.W    D1,D0                  FIX END ADDRESS                    **19
689           MOVE.W   D0,DL_END+2(A1,D2.L)   SET CHAIN END ADDRESS              **19
689.1         ENDI                            END IF PARTIAL SECTOR              **19
692
693           ENDI                            END IF THERE IS ONLY ONE SECTOR   **19
693.1         ENDI                            END IF REGULAR TRANSFER
694
695     * START TRANSFER
696
697           MOVE.W   #PF_RCI_EN,PPC_FLAGS(A0)  ENABLE RCI
698           MOVE.B   #ST_RCN,P_DVR_ST(A2)   SET STATE = RECONNECTING
699
700           BRA      PDVR96                 FINISH UP
701
702         PAGE
703     *
704     *   CHANNEL INTERRUPT REQUEST
705     *   REGISTER USAGE:
706     *       A0 = PPC BASE ADDRESS
707     *
708     INTERRUPT
709           CMP.B    #ST_OK,P_DVR_ST(A2)    IF STATE NOT OK
710           BNE      PDVR85                 STATE ERROR
711
712     * CHECK FOR HARDWARE ERRORS
713
714           TRAP     #MTXON                 INTERRUPTS OFF
715
716           MOVE.W   BRD_ERROR,D0           CHECK FOR BOARD ERROR
717           ANDI.W   #(BE_CHIP_ERR+BE_OBDMA_ERR+BE_PPC0_ERR+BE_PPC1_ERR),D0
718           BNE      PDVR88                 HARDWARE ERROR
719     *
720           MOVEA.L  P_PPCADR(A2),A0        GET PPC BASE ADDRESS
721           MOVE.W   PPC_STATUS1(A0),D0     GET STATUS 1
722           ANDI.W   #P1_FERR,D0            CHECK FOR ERROR
723           BNE      PDVR88                 HARDWARE ERROR
724     *
725           MOVE.W   PPC_STATUS2(A0),D0
726           ANDI.W   #P2_IRQ_EN,D0          CHECK FOR PREVIOUS REQUEST
727           BNE      IRQ_NDONE              BAD STATE
728     *
729           MOVEA.L  P_PPCADR(A2),A0        GET PPC BASE ADDRESS
730           MOVE.W   P_RIC(A2),PPC_RIC(A0)  SET RIC WORD
731           MOVE.W   P_RIST(A2),D0
```

```
732            ANDI.W    #($FFFF-PI_FLAGS),D0    CLEAR FLAG BITS
733            MOVE.W    D0,PPC_RIST(A0)         SET RIST WORD
734            MOVE.W    #PF_IRQ_EN,PPC_FLAGS(A0) ENABLE IRQ
735            BRA       PDVR96                  FINISH UP
736
737     * PREVIOUS INTERRUPT REQUEST IS NOT DONE
738
739     IRQ_NDONE
740            TRAP      #MTXOFF                 INTERRUPTS ON
741            MOVE.B    #-PDR_IRQ_NDONE,P_REPLY(A2)  SET FAILURE CODE = IRQ NOT DONE
742            BRA       PDVR95                  FAILURE RETURN
743
744        PAGE
745     *
746     *  READ DRIVER STATUS
747     *  REGISTER USAGE:
748     *     A0 = PPC BASE ADDRESS
749     *
750     READ_STATUS
751            TST.L     P_STBUF(A2)             IF NO BUFFER PROVIDED
752            BEQ       PDVR87                  BAD BUFFER ADDRESS
753
754            TRAP      #MTXON                  INTERRUPTS OFF
755            BSR       SAVE_STATE              SAVE STATUS
756            BSR       CODE_ERROR
757            NEG.B     D0                      NEGATE DRIVER REPLY
758            MOVE.B    D0,P_REPLY(A2)          SET REPLY CODE
759            BNE       PDVR94                  FAILURE RETURN
760            BRA       PDVR96                  SUCCESS RETURN
761
762        PAGE
763     *
764     *  BOGUS COMMAND OR PARAMETER
765     *
766     PDVR80 TRAP      #MTXOFF                 INTERRUPTS ON
767     PDVR81 MOVE.B    #-PDR_BOGUS,P_REPLY(A2) SET FAILURE CODE = INVALID COMMAND OR
768            BRA       PDVR95                                   PARAMETER
769     *
770     *  BAD PPC STATE
771     *PDVR84 TRAP     #MTXOFF                 INTERRUPTS ON
772     PDVR85 MOVE.B    #-PDR_STERR,P_REPLY(A2) SET FAILURE CODE = STATE ERROR
773            BRA       PDVR95
774     *
775     *  NO BUFFER OR BAD COUNT
776     *
777     PDVR86 TRAP      #MTXOFF                 INTERRUPTS ON
778     PDVR87 MOVE.B    #-PDR_BUFERR,P_REPLY(A2) SET FAILURE CODE = BUFFER ERROR OR
779            BRA       PDVR95                                    BAD COUNT
780     *
781     PDVR89
782            TRAP      #MTXON                  INTERRUPTS OFF
783     PDVR88
784            BSR       PPC_ERROR               SAVE STATUS AND DECODE ERROR CODE
785            TRAP      #MTXOFF                 INTERRUPTS ON
786            NEG.B     D0
787            MOVE.B    D0,P_REPLY(A2)          SET FAILURE CODE = HARDWARE ERROR
788            BRA       PDVR95
789     *
790     *  COMMAND PARAMETER FAILURE SET ERROR INDICATOR
791     *
792     PDVR94 TRAP      #MTXOFF                 INTERRUPTS ON
793     PDVR95 OR.B      #SETZ,CCR               SET FAILURE          FAILURE CC
794            BRA       PDVR99
795     *
796     *  SUCCESSFUL COMMAND COMPLETION RETURN
797     *
798     PDVR96 TRAP      #MTXOFF                 INTERRUPTS ON
799     PDVR97 AND.B     #-SETZ,CCR              SET SUCCESS          SUCCESS CC
800     PDVR99 MOVEM.L   (SP)+,A0-A2/D1-D3
801            SNE       D0
802            RTS
803
804        TTL 'PPC INTERRUPT HANDLER'
805        PAGE
806     *
807     *  PPC_RPT (PPC INTERRUPT HANDLER)
808     *
809     *     DEFFERED COMPLETIONS ARE ACCOMPLISHED BY THE INTERRUPT
810     *     HANDLER BY USING THE FOLLOWING BITS IN THE CALLING
811     *     TASK'S TCB[EVENT^MASK] AND THE DCB[IREPLY] AS FOLLOWS:
812     *        TCB[EVENT^MASK].<BIT>           DCB[REPLY]
813     *         <7>--                          0-NO ERROR
```

```
814    *           <6>--                           1-SHORT TRANSFER
815    *           <5>--PPC0 EIO RECEIVED         2-TRANSFER ERROR
816    *           <4>--PPC1 EIO RECEIVED         3-TRANSFER COMPLETE IN ERROR
817    *           <3>--TRANSFER COMPLETED        4-
818    *           <2>--                           5-SPURRIOUS RUPT
819    *           <1>--                           6-
820    *           <0>--                           7-
821    *
822
823    *
824    * INTERRUPT DECODER
825    *
826    * REGISTER USAGE
827    *     A0 = PPC BASE ADDRESS
828    *     A5 = GLOBAL MEMORY BASE
829
830            XDEF    PPC_RPT
831    PPC_RPT
832            MOVEM.L  A0-A3/D0-D3,-(SP)
833
834    * CHECK PPC'S INTERRUPTS
835
836    P1_INTR EQU  P1_OWN_RST+P1_EIO_RST+P1_CHNL_RST+P1_EIO+P1_XFR_ERR+P1_XFR_END
837
838            MOVE.W   BRD_ERROR,D0
839            ANDI.W   #(BE_CHIP_ERR+BE_DBDMA_ERR+BE_PPC0_ERR+BE_PPC1_ERR),D0
840            IF       <NE> THEN            IF CHIP ERROR
841            BRA      CHIP_ERROR
842            ENDI                          END IF CHIP ERROR
843
844            MOVE.W   PPC0+PPC_STATUS1,D0
845            ANDI.W   #P1_INTR,D0
846            IF       <NE> THEN            IF PPC 0 INTERRUPTS
847            MOVEA.L  (L3DCBTAB+LUN_PPC0*4)(A5),A2  POINT TO THE DCB ADDRESS **20
848            BRA      PPC_INTR             PROCESS
849            ENDI                          END IF PPC 0 INTERRUPTS
850
851            MOVE.W   PPC1+PPC_STATUS1,D0
852            ANDI.W   #P1_INTR,D0
853            IF       <NE> THEN            IF PPC 1 INTERRUPTS
854            MOVEA.L  (L3DCBTAB+LUN_PPC1*4)(A5),A2  POINT TO THE DCB ADDRESS **20
855            BRA      PPC_INTR             PROCESS
856            ENDI                          END IF PPC 1 INTERRUPTS
857
858    ***** CHECK FOR SPURIOUS INTERRUPT
859
860            BRA      INTR_DONE
861
862    *
863    *  INTERRUPT PROCESSING
864    *     A0 = PPC BASE ADDRESS
865    *     A2 = DCB ADDRESS
866    *     D0 = PPC STATUS1 REGISTER INTERRUPT BITS
867    *
868
869    PPC_INTR
870            MOVEA.L  P_PPCADR(A2),A0          GET PPC BASE ADDRESS
871            MOVE.W   PPC_STATUS1(A0),D0       GET STATUS1 REG            **7
872            MOVE.W   D0,D1                    SAVE STATUS1               **7
873            ANDI.W   #(P1_FERR),D0            CHECK FOR CHANNEL ERROR
874            BNE      CHANNEL_ERROR
875
876            MOVE.W   D1,D0                    RESTORE STATUS1            **7
877            ANDI.W   #P1_EIO,D0                                          **7
878            IF       <NE> THEN                IF EIO INTERRUPT
879            BSR      EIO_RCV                  PROCESS EIO, RETURN TO PROCESS XFR DONE
880            ENDI                              END IF EIO INTERRUPT 881
882            MOVE.W   PPC_STATUS1(A0),D0       GET STATUS1 REG            **7
883            ANDI.W   #(P1_XFR_ERR+P1_XFR_END),D0  CHECK FOR XFR DONE     **7
884            IF       <NE> THEN                IF TRANSFER DONE
885            BSR      XFR_END
886            ENDI                              END IF TRANSFER DONE
887
888            MOVE.W   #PF_INTR,PPC_CLEAR(A0)   CLEAR INTERRUPT
889
890    INTR_DONE
891            MOVEM.L  (SP)+,A0-A3/D0-D3        RESTORE STATES
892            RTE                               RETURN
893
894    *****************************************************************
```

```
895
896     * CHIP ERROR
897     ****** WE MUST FIND OUT WHO IS ACTIVE AT THE TIME
898     ****** WE MUST FIGURE OUT THE INTERFACE ERROR
899     ****** RIGHT NOW DMA ERROR = PPC0 ERROR
900     ****** HOW DO WE HANDLE A MULTI OCB ERROR?
901     *      ONLY DMA CHIP ERROR CAN CAUSE A MULTI OCB ERROR
902
903
904     CHIP_ERROR
905             MOVE.W   BRD_ERROR,D0
906             ANDI.W   #(BE_DBDMA_ERR+BE_PPC0_ERR),D0
907             IF       <NE> THEN              IF PPC 0 CHIP ERROR
908             MOVEA.L  (L3DCBTAB+LUN_PPC0*4)(A5),A2  POINT TO THE OCB ADDRESS **20
909             BRA      CHANNEL_ERROR
910             ENDI                            END IF PPC 0 CHIP ERROR
911
912             MOVE.W   BRD_ERROR,D0
913             ANDI.W   #(BE_PPC1_ERR),D0
914             IF       <NE> THEN              IF PPC 1 CHIP ERROR
915             MOVEA.L  (L3DCBTAB+LUN_PPC1*4)(A5),A2  POINT TO THE OCB ADDRESS **20
916             BRA      CHANNEL_ERROR
917             ENDI                            END IF PPC 1 CHIP ERROR
918
919     * INTERFACE ERROR
920
921             MOVE.W   #0,BRD_ERROR           ******* JUST CLEAR ERROR FOR NOW        **4
922             BRA      INTR_DONE
923
924     ************************************************************************
925
926     * CHANNEL ERROR
927
928     CHANNEL_ERROR
929             IF.B     P_DVR_ST(A2) <EQ> #ST_RCN THEN   IF RECONNECTING
930             BSR      XFR_ERR                TREAT AS TRANSFER ERROR
931             ELSE                            *IF NOT RECONNECTING
932             BSR      CLEAR_ERROR            JUST CLEAR ERROR
933             ENDI                            END IF RECONNECTING
934
935             BRA      INTR_DONE
936
937     ************************************************************************
938
939     * EIO RECEIVE
940     * REGISTER USAGE:
941     *    A0 = PPC BASE ADDRESS
942     *    A1 = EIO BUFFER ADDRESS
943     *    A2 = OCB ADDRESS
944
945     EIO_RCV
946             MOVE.L   A0,A3                  SAVE BASE ADDR OF PORT
947             LEA      P_FHEAD(A2),A0         get @ of free eio list
948             BSR      REMQ                   get an element from that list
949             IF       <NE> THEN              IF THERE IS ANOTHER ELEMENT
950
951             MOVE.L   A3,A0                  RESTORE PPC BASE ADDRESS
952             MOVE.B   P_PORT_NO(A2),PE_PORT(A1)   save PORT NO in EIO Receive Block
953             MOVE.W   PPC_LAC(A0),PE_LAC(A1)      save LAC in EIO Receive Block
954             MOVE.W   PPC_LPRM(A0),PE_LPRM(A1)    save LPRM in EIO Receive Block
955
956             LEA      P_EHEAD(A2),A0         get @ of eio list
957             BSR      ADDQ                   add element to list
958
959             * SIGNAL TASK
960
961             IF.B     P_PORT_NO(A2) <EQ> #0 THEN  IF PORT 0
962             MOVE.W   #EV_EIO0,D0            SET EVENT FOR PORT 0
963             ELSE                            *ELSE
964             MOVE.W   #EV_EIO1,D0            SET EVENT FOR PORT 1
965             ENDI                            END IF PORT 0
966             BSR      SIGNAL_TASK            SIGNAL TASK
967
968             ELSE                            *THERE IS NO FREE EIO BUFFER **8
969                                             *FATAL ERROR
970                                             *THROW AWAY EIO
971             ADDQ.W   #1,P_NOEIO(A2)         INCREMENT NO EIO BUFFER COUNT **8A
972             ENDI                            END IF THERE ANOTHER ELEMENT
973
974             MOVE.L   A3,A0                  RESTORE PPC BASE ADDRESS **8
975             MOVE.W   #PF_EIO,PPC_CLEAR(A0)  ENABLE FOR THE NEXT EIO
976     *                                       PPC EIO FLAG AND INTERRUPT
```

```
977    •                                           MUST BE CLEARED IN
978    •                                           SEPARATE INSTRUCTIONS
979            RTS
980
981    * TRANSFER DONE
982    * REGISTER USAGE:
983    *     A0 = PPC BASE ADDRESS
984    *     A2 = DCB ADDRESS
985    *     D0 = PPC STATUS REG INTERRUPT BITS
986
987    XFR_END
988            MOVE.W   PPC_STATUS1(A0),D0                                      **4
989            ANDI.W   #P1_XFR_ERR,D0       CHECK FOR TRANSFER ERROR
990            BNE      XFR_ERR
991            MOVE.W   PPC_STATUS2(A0),D0                                      **8
992            ANDI.W   #(P2_XFR_CMP_ERR),D0                                    **8
993            IF       <NE> THEN            IF XFR COMPLETION ERROR            **8
994            MOVE.W   PPC_STATUS1(A0),D0                                      **8
995            ANDI.W   #(PT_COUNT),D0                                          **8
996            BEQ      XFR_ERR              IF NO COUNT THEN ERROR             **8
997            ENDI                          END IF XFR CMP ERROR               **8
998
999    * CHECK DMA ERROR
000
001            MOVE.W   DMB_STATUS,D0
002            ANDI.W   #DS_ERR0,D0          CHECK FOR DMA ERROR
003            BNE      XFR_ERR
004
005    * CHECK IF WE NEED TO TRANSFER THE LAST BURST
006
007            IF.W     P_LSTBUF(A2) <NE> #0 THEN   IF LAST BURST REQUIRED •
008            MOVE.W   PPC_STATUS1(A0),D0
009            ANDI.W   #(P1_DMA_END+P1_COUNT),D0
010            IF.W     D0 <EQ> #P1_DMA_END THEN    IF DMA END
011            BRA      LAST_BURST           TRANSFER THE LAST EXACT BURST
012            ENDI                          END IF DMA END
013            ENDI                          END IF LAST BURST
014
015    * CALCULATE ACTUAL LENGTH
016
017            BSR      CALC_ACT_LEN
018
019    * SIGNAL TASK
020
021            MOVE.B   #PDR_NOERR,P_IREPLY(A2)   SET IREPLY CODE = NO ERROR
022            MOVE.W   #EV_XEND,D0               TRANSFER END EVENT BIT
023            BSR      SIGNAL_TASK
024
025    •                                           PPC RCI, CHANNEL CLEAR AND
026    •                                           INTERRUPT MUST BE CLEARED IN
027    •                                           SEPARATE INSTRUCTIONS
028
029            MOVE.W   #DC_RESET,DMB_CONTROL0    MUST RESET DMA BEFORE RESET PPC
030            MOVE.W   #0,DMB_CONTROL0                                         **4
031            MOVE.W   #0,DMB_START0                                           **4
032            MOVE.W   #0,DMB_END0                                             **4
033            MOVE.W   #0,DMB_CHAIN0                                           **4
034            MOVE.W   #PF_RCI_EN,PPC_CLEAR(A0)  CLEAR RECONNECT
035            MOVE.W   #PF_CLEAR,PPC_CLEAR(A0)   CLEAR FLAGS
036
037
038            MOVE.B   #ST_OK,P_DVR_ST(A2)       SET STATE = OK
039            RTS
040
041    * SUBROUTINE CALC_ACT_LEN
042
043    * CALCULATE ACTUAL TRANSFER LENGTH BASED ON PPC_STATUS1, PPC_STATUS2
044    * AND DMA START0, AND STORE THE ACTUAL LENGTH IN P_ACTLEN
045
046    * REGISTER USAGE:
047    * INPUT : A0 = PPC BASE ADDRESS
048    *         A2 = DCB ADDRESS
049    * OUTPUT: P_ACTLEN(A2) = ACTUAL LENGTH
050    * USES  : D0,D1 = GENERAL REGISTERS
051
052    * algorithm to actual calculate length
053    *
054    * if dma end
055    *    actual length = request length
056    * else
057    *    calculate actual length from dma register:
```

```
1058   *          actual end = dma start + 2
1059   *          actual length = actual end - start address
1060   *       if skip checksum
1061   *    if pad out or pad in
1062   *       if not odd actual length
1063   *          actual length = actual length - 1
1064   *
1065
1066   * IF DMA END, ZERO BUFFER COUNT AND THERE IS NO MORE BURST TO TRANSFER,
1067   * ACTUAL LENGTH = REQUEST LENGTH
1068
1069         CALC_ACT_LEN
1070             MOVE.W   PPC_STATUS1(A0),D0          GET PPC STATUS 1
1071             ANDI.W   #(P1_DMA_END+P1_COUNT),D0
1072             IF.W     D0 <EQ> #P1_DMA_END AND.W P_LSTBUF(A2) <EQ> #0 THEN
1072.1
1073             IF.B     P_SKIPXC(A2) <NE> #0 THEN   IF SKIP CHECKSUM       **19
1073.11          MOVE.W   PPC_STATUS2(A0),D1                                 **19
1073.13          ANDI.W   #P2_PADOUT,D1                                      **19
1073.131         IF       <NE> THEN                  IF ODD BYTE TRANSFER    **19
1073.14          BRA.S    CALC1                      CALCULATE FROM REGISTERS **19
1073.15          ENDI                                END IF ODD BYTE TRANSFER **19
1073.16          ENDI                                END IF SKIP CHECKSUM    **19
1073.2
1074             MOVE.W   P_XFRLENC(A2),D0            ACTUAL LENGTH = REQUEST LENGTH
1075
1076   * IF NOT DMA END, CALCULATE ACTUAL LENGTH FROM DMA REGISTER
1077
1078             ELSE                                 *IF NOT DMA END
1078.1       CALC1                                                           **19
1079             MOVE.W   DMB_START0,D0               GET DMA START ADDRESS
1080             ADDQ.W   #2,D0                       ADD 2 FOR DMA PREINCREMENT
1081             SUB.W    P_XFRBUFC(A2),D0            SUBTRACT START ADDRESS
1082
1083   * SUBTRACT WORDS IN PPC FIFO
1084
1085             MOVE.W   PPC_STATUS1(A0),D1
1086             ANDI.W   #P1_COUNT,D1                GET PPC BUFFER COUNT
1087             LSR.B    #(P1B_COUNT-1),D1           MULTIPLY BY 2
1088             SUB.W    D1,D0                       SUBTRACT FROM ACTUAL LENGTH
1089
1100             ENDI                                 END IF DMA END
1101
1102   * FIX LENGTH FOR ODD BYTE TRANSFER
1103   *    PADI ALWAYS AT DMA END AND THE REQUESTED LENGTH IS ACTUAL LENGTH
1104   *    set up length         actual length
1105   *       xxx0               (xxx-1)1
1108             MOVE.W   PPC_STATUS2(A0),D1
1109             ANDI.W   #P2_PADOUT,D1
1110             IF       <NE> THEN                   IF PAD OUT
1111             SUBQ.W   #1,D0                       SUBTRACT ONE
1112             ORI.W    #1,D0                       MAKE SURE IT IS ODD
1113             ENDI                                 END IF PAD OUT
1114
1115             MOVE.W   D0,P_ACTLEN(A2)             STORE ACTUAL LENGTH
1116             RTS
1117
1118   * SUBROUTINE LAST_BURST
1119
1120   * IF EXACT BURST, TRANSFER IS DONE IN TWO PARTS.  THE LENGTH OF THE
1121   * FIRST PART IS IN MULTIPLE OF DEFAULT BURST SIZE.  THE LENGTH OF THE
1122   * SECOND PART IS PARTIAL OF DEFAULT BURST SIZE.  THE PPC BURST SIZE
1123   * IS CHANGED TO BE EQUAL TO THE LENGTH OF THE SECOND PART
1124
1125   * dma start address = last burst buffer address - 2
1126   * dma end address = start address + total length - 4
1127   * length of the last address = dma end address - dma start address + 2
1128   * ppc burst = (length of the last address / 2) - 1
1129   *           = (length of the last address - 2) / 2
1130   *           = (dma end address - dma start address) / 2
1131   * RAC stays the same
1132
1133         LAST_BURST
1134             MOVE.W   #DC_RESET,DMB_CONTROL0      MUST RESET DMA BEFORE RESET PPC
1135             MOVE.W   #0,DMB_CHAIN0                                       **4
1136
1137             IF.B     P_OUTDIR(A2) <NE> #0 THEN   IF DIR = OUT            **17
1138             MOVE.W   #(DC_INCR+DC_OUT),DMB_CONTROL0 FORM DMA CONTROL REG TO OUT **17
1139             ELSE                                                         **17
1140             MOVE.W   #(DC_INCR),DMB_CONTROL0     FORM DMA CONTROL REG TO OUT **17
1141             ENDI                                 END IF DIR = OUT        **17
```

```
1142
1143            MOVE.W    #PF_RCI_EN,PPC_CLEAR(A0)     CLEAR RECONNECT ENABLE
1144            MOVE.W    #PF_CLEAR,PPC_CLEAR(A0)      CLEAR FLAGS
1145            MOVE.W    #PF_INTR,PPC_CLEAR(A0)       CLEAR INTERRUPT
1146
1147            MOVE.W    P_LSTBUF(A2),D0              GET LAST BURST START ADDRESS
1148            SUBQ.W    #2,D0                        SUBTRACT TWO FOR DMA PREINCREMENT
1149            MOVE.W    D0,DMB_START0                SET DMA START ADDRESS
1150            CLR.W     P_LSTBUF(A2)                 CLEAR LAST BURST START ADDRESS
1151
1152            MOVE.W    P_XFRBUFC(A2),D1             GET ORIGINAL START ADDRESS
1153            ADD.W     P_XFRLENC(A2),D1             ADD TOTAL LENGTH
1154            SUBQ.W    #3,D1                        ADD ONE FOR ODD ADDRESS
1155                                                   *SUBTRACT FOUR FOR DMA PREINCREMENT
1156            ANDI.W    #$FFFE,D1                    MAKE IT EVEN
1157            MOVE.W    D1,DMB_END0                  SET DMA END ADDRESS
1158
1159            SUB.W     D0,D1                        CALCULATE LENGTH OF LAST TRANSFER
1160            LSR.W     #1,D1                        DIVIDE BY TWO TO BECOME WORDS
1161            MOVE.W    D1,PPC_BURST(A0)             SET PPC BURST
1162
1163            IF.B      P_OUTDIR(A2) <NE> #0  THEN   IF DIR = OUT
1164            BTST.B    #0,P_XFRLENC(A2)
1165            IF        <NE> THEN                    IF ODD LENGTH
1166            MOVE.W    #PF_PADI,PPC_FLAGS(A0)       SET PADI
1167            ENDI                                   END IF ODD LENGTH
1168            ENDI                                   END IF DIR = OUT
1169
1170   * START LAST TRANSFER
1171
1172            MOVE.W    #PF_RCI_EN,PPC_FLAGS(A0)     ENABLE RCI
1173            RTS                                    RETURN
1174
1175   *
1176   * TRANSFER ERROR
1177   *
1178
1179   XFR_ERR
1180            BSR       CALC_ACT_LEN                 CALCULATE ACTUAL LENGTH
1181
1182            BSR       PPC_ERROR                    SET STATUS AND CODE ERROR
1183            MOVE.B    D0,P_IREPLY(A2)              SET IREPLY CODE
1184
1185            MOVE.W    #EV_XEND,D0                  TRANSFER END EVENT
1186            BSR       SIGNAL_TASK                  SIGNAL TASK
1187
1188            MOVE.B    #ST_OK,P_DVR_ST(A2)          SET STATUS = OK AGAIN
1189            CLR.W     P_LSTBUF(A2)                 CLEAR LAST BURST
1190            RTS
1191
1192   * SUBROUTINE SIGNAL TASK
1193   * INPUT : D0 = EVENT BIT
1194   *         A2 = DCB ADDRESS
1195   * USES  : A1,D1
1196
1197   SIGNAL_TASK
1198            MOVEA.L   P_CURTCB(A2),A1              GET CALLING TASK'S TCB ADDRESS
1199            MOVE      SR,D1                        SAVE PRESENT SR
1200            ORI       #DISABL,SR                   INTERRUPTS OFF
1201            OR.W      D0,TEVNT(A1)                 SET EVENT BIT
1202            MOVE      D1,SR                        RESTORE SR
1203            RTS
1204
1205   * SUBROUTINES TO SAVE STATE
1206
1207   SAVE_PPC_REGS
1208            MOVEA.L   P_STBUF(A2),A1               GET STATE BUFFER ADDRESS
1209            MOVEA.L   P_PPCADR(A2),A0              GET PPC BASE ADDRESS
1210            MOVE.W    PPC_RAC(A0),PST_PPC_RAC(A1)
1211            MOVE.W    PPC_RIC(A0),PST_PPC_RIC(A1)
1212            MOVE.W    PPC_RIST(A0),PST_PPC_RIST(A1)
1213            MOVE.W    PPC_LAC(A0),PST_PPC_LAC(A1)
1214            MOVE.W    PPC_LPRM(A0),PST_PPC_LPRM(A1)
1215            MOVE.W    PPC_STATUS1(A0),PST_PPC_STATUS1(A1)
1216            MOVE.W    PPC_STATUS2(A0),PST_PPC_STATUS2(A1)
1217            MOVE.W    PPC_STATUS3(A0),PST_PPC_STATUS3(A1)  SAVE REGISTERS
1218            RTS
1219
1220   SAVE_DMB_REGS
1221            MOVEA.L   P_STBUF(A2),A1               GET STATE BUFFER ADDRESS
1222            MOVE.W    DMB_STATUS,PST_DMB_STATUS(A1)
```

```
1223            MOVE.W   DMB_MASTER,PST_DMB_MASTER(A1)
1224            MOVE.W   DMB_CONTROL0,PST_DMB_CONTROL0(A1)
1225            MOVE.W   DMB_END0,PST_DMB_END0(A1)
1226            MOVE.W   DMB_CHAIN0,PST_DMB_CHAIN0(A1)
1227            MOVE.W   DMB_START0,PST_DMB_START0(A1)
1228            MOVE.W   DMB_CONTROL1,PST_DMB_CONTROL1(A1)
1229            MOVE.W   DMB_END1,PST_DMB_END1(A1)
1230            MOVE.W   DMB_CHAIN1,PST_DMB_CHAIN1(A1)
1231            MOVE.W   DMB_START1,PST_DMB_START1(A1)   SAVE REGISTERS
1232            RTS
1233
1234    SAVE_STATE
1235            TST.L    P_STBUF(A2)
1236            IF       <NE> AND.B P_STATE(A2) <EQ> #0 THEN   IF STATE BUFFER PROVIDED
1237                                             *AND IT IS NOT USED
1238            BTST.B   #0,P_STBUF+3(A2)
1239            IF       <EQ> THEN              IF BUFFER ADDRESS EVEN
1240            MOVE.B   #$FF,P_STATE(A2)       SET STATE VALID
1241            MOVEA.L  P_STBUF(A2),A1         GET STATE BUFFER ADDRESS
1242            MOVE.B   P_OVR_ST(A2),PST_DVR_ST(A1)  SAVE DRIVER STATE
1243            MOVE.B   #0,PST_FILLER(A1)      CLEAR FILLER
1244            BSR      SAVE_PPC_REGS          SAVE PPC REGISTERS
1245            BSR      SAVE_DMB_REGS          SAVE DMB REGISTERS
1246            MOVE.W   BRD_ERROR,PST_BERS(A1) SAVE BOARD ERROR STATUS
1247            ENDI                            END IF BUFFER ADDRESS EVEN
1248            ENDI                            END IF STATE BUFFER PROVIDED
1249            RTS
1250
1251    * SUBROUTINE CODE_ERROR
1252    * CODE ERROR FROM PPC_STATUS1, PPC_STATUS2 AND DMB_STATUS TO BECOME
1253    * ONE BYTE IREPLY CODE
1254    * CONDITIONS ARE TESTED IN ORDER TO GIVE AS SPECIFIC REPLY CODE AS POSSIBLE
1255    * INPUT   : A2 = DCB ADDRESS
1256    * USES    : A0 = PPC BASE ADDRESS
1257    * RETURN  : D0 = IREPLY CODE (BYTE)
1258    *               DRIVER REPLY CODE IS THE NEGATIVE OF IREPLY CODE
1259    *         CHANGE PORT STATUS
1260
1261    CODE_ERROR
1262
1263    * CODE FATAL ERRORS
1264
1265            MOVEA.L  P_PPCADR(A2),A0         GET PPC BASE ADDRESS
1266            MOVE.W   PPC_STATUS1(A0),D0      GET STATUS 1
1267    *
1268            BTST.L   #P1B_KILLED,D0
1269            IF       <NE> THEN              IF KILLED
1270            MOVE.B   #PDR_KILLED,D0         SET CODE = KILLED
1271            BRA      CODE_ERROR1
1272            ENDI                            END IF KILLED
1273    *
1274            BTST.L   #P1B_OWN_RST,D0
1275            IF       <NE> THEN              IF TAKE OWN RESET
1276            MOVE.B   #PDR_OWN_RST,D0        SET CODE = TAKEOWN
1277            BRA      CODE_ERROR1
1278            ENDI                            END IF TAKEOWN RESET
1279    *
1280            BTST.L   #P1B_CHNL_RST,D0
1281            IF       <NE> THEN              IF CHANNEL RESET
1282            MOVE.B   #PDR_CHNL_RST,D0       SET CODE = CHANNEL RESET
1283            BRA      CODE_ERROR1
1284            ENDI                            END IF CHANNEL RESET
1285    *
1286            BTST.L   #P1B_NOWN,D0
1287            IF       <NE> THEN              IF NOT OWN
1288            MOVE.B   #PDR_NOWN,D0           SET CODE = NOT OWNED
1289            BRA      CODE_ERROR1
1290            ENDI                            END IF NOT OWNED
1291
1292    * CODE DMB ERROR
1293
1294            MOVE.W   DMB_STATUS,D0           GET DMB_STATUS
1295
1296            ANDI.W   #DS_ERR0,D0
1297            IF       <NE> THEN              IF DMB ERROR
1298            MOVE.B   #PDR_DMB_ERR,D0        SET CODE = DMB ERROR
1299            BRA      CODE_ERROR1
1300            ENDI                            END IF DMB ERROR
1301
1302            MOVE.W   BRD_ERROR,D0
1303            ANDI.W   #BE_DBDMA_ERR,D0
```

```
1304            IF       <NE> THEN                    IF DMB CHIP ERROR
1305            MOVE.B   #PDR_DMB_ERR,D0              SET CODE = DMB ERROR
1306            BRA      CODE_ERROR1
1307            ENDI                                  END IF DMB CHIP ERROR
1308
1309    * logic to decode PPC error and transfer error:
1310
1311    * if tbus_seq_err then tbus_seq_err
1312    *
1313    * if hw_err or
1314    *    chip_err then     ppc error
1315    *
1316    * if out_perr then     out parity err
1317    *
1318    * if xfr_cmp_err then transfer error
1319    *
1320    * if aborted then      aborted
1321    *
1322    * if xfr_err then      transfer error
1323    *
1324    * note:
1325    *    the sequence of checking is very important
1326    *    in parity error is included in the chip_err
1327    *    out parity error and aborted can be isolated from transfer error
1328    *    aborted is reported only when there is no out_perr, xfr_cmp_err nor
1329    *       tbus_seq
1330    *    xfr_cmp_err is reported as ppc error
1331
1332    * CODE HARDWARE ERROR
1333
1334            MOVE.W   PPC_STATUS2(A0),D0
1335            BTST.L   #P2B_TBUS_SEQ,D0
1336            IF       <NE> THEN                    IF T-BUS SEQUENCE ERROR
1337            MOVE.B   #PDR_TBUS_SEQ,D0             SET CODE = T-BUS SEQ ERROR
1338            BRA      CODE_ERROR1
1339            ENDI                                  END T-BUS SEQUENCE ERROR
1340
1341            MOVE.W   PPC_STATUS1(A0),D0           GET STATUS 1
1342            BTST.L   #P1B_HW_ERR,D0
1343            IF       <NE> THEN                    IF HARDWARE ERROR
1344            MOVE.B   #PDR_PPC_ERR,D0              SET CODE = PPC ERROR
1345            BRA      CODE_ERROR1
1346            ENDI                                  END IF HARDWARE ERROR
1347
1348            MOVE.W   BRD_ERROR,D0
1349            TST.B    P_PORT_NO(A2)
1350            IF       <EQ> THEN                    IF PPC 0
1351            ANDI.W   #BE_PPC0_ERR,D0
1352            ELSE                                  *IF PPC 1
1353            ANDI.W   #BE_PPC1_ERR,D0
1354            ENDI                                  END IF PPC 0
1355            IF       <NE> THEN                    IF PPC CHIP ERROR
1356            MOVE.B   #PDR_PPC_ERR,D0              SET CODE = PPC ERROR
1357            BRA      CODE_ERROR1
1358            ENDI                                  END IF PPC CHIP ERROR
1359
1360    * CODE TRANSFER ERROR
1361
1362            MOVE.W   PPC_STATUS2(A0),D0
1363            BTST.L   #P2B_OUT_PERR,D0
1364            IF       <NE> THEN                    IF OUT PARITY ERROR
1365            MOVE.B   #PDR_OUT_PERR,D0             SET CODE = OUT PARITY ERROR
1366            BRA      CODE_ERROR1
1367            ENDI                                  END OUT PARITY ERROR
1368
1369
1370            MOVE.W   PPC_STATUS2(A0),D0
1371            ANDI.W   #(P2_OUT_PERR+P2_XFR_CMP_ERR+P2_TBUS_SEQ),D0
1372            IF       <EQ> THEN                    IF THERE IS NO OTHER ERROR
1373
1374            MOVE.W   PPC_STATUS2(A0),D0
1375            BTST.L   #P2B_ABORTED,D0
1376            IF       <NE> THEN                    IF ABORTED
1377            MOVE.B   #PDR_ABORTED,D0              SET CODE = ABORTED
1378            BRA      CODE_ERROR1
1379            ENDI                                  END IF ABORTED
1380
1381            ENDI                                  END IF THERE IS NO OTHER ERROR
1382
1383    * IF WE CANNOT PIN POINT A MORE SPECIFIC CAUSE FOR TRANSFER ERROR
1384    * USE A MORE GENERAL TRANSFER ERROR STATUS
1385
```

```
1386            MOVE.W    PPC_STATUS1(A0),D0        GET STATUS 1
1387            BTST.L    #P1S_XFR_ERR,D0
1388            IF        <NE> THEN                 IF TRANSFER ERROR
1389            MOVE.B    #PDR_XFR_ERR,D0           SET CODE = TRANSFER ERROR
1390            BRA       CODE_ERROR1
1391            ENDI                                END IF TRANSFER ERROR
1392
1393
1394    CODE_ERROR1
1395            RTS
1396
1397    * SUBROUTINE CLEAR ERROR
1398    * CLEAR DMA AND PPC ERROR
1399    ****** DMA AND PPC MIGHT HAVE TO BE RECONFIGURED
1400    * ERROR ARE CLEARED ONLY AS NECESSARY
1401    * INPUT:  A2 = OCB ADDRESS
1402    * USES:   A0 = PPC BASE ADDRESS
1403    *         D0 = GENERAL REGISTER
1404
1405    CLEAR_ERROR
1406
1407    * CLEAR DMA BEFORE PPC
1408
1409            MOVE.W    BRD_ERROR,D0
1410            ANDI.W    #BE_DBDMA_ERR,D0
1411            IF        <NE> THEN                 IF DMA CHIP ERROR
1412            MOVE.W    #DM_RESET,DMB_MASTER      MASTER RESET DMA
1413            MOVE.W    #DC_RESET,DMB_CONTROL0    RESET DMA CHANNEL 0
1414            MOVE.W    #0,DMB_CONTROL0                                      **4
1415            MOVE.W    #0,DMB_START0                                        **4
1416            MOVE.W    #0,DMB_END0                                          **4
1417            MOVE.W    #0,DMB_CHAIN0                                        **4
1418            MOVE.W    #0,DMB_CONTROL1                                      **4
1419            MOVE.W    #0,DMB_START1                                        **4
1420            MOVE.W    #0,DMB_END1                                          **4
1421            MOVE.W    #0,DMB_CHAIN1                                        **4
1422            ENDI                                END IF DMA CHIP ERROR
1423
1424            MOVE.W    DMB_STATUS,D0             GET DMB_STATUS
1425            ANDI.W    #DS_ERR0,D0
1426            IF        <NE> THEN                 DMA ERROR
1427            MOVE.W    #DC_RESET,DMB_CONTROL0    RESET DMA CHANNEL 0
1428            MOVE.W    #0,DMB_CONTROL0                                      **4
1429            MOVE.W    #0,DMB_START0                                        **4
1430            MOVE.W    #0,DMB_END0                                          **4
1431            MOVE.W    #0,DMB_CHAIN0                                        **4
1432            ENDI                                END IF DMA ERROR
1433
1434    * CLEAR BOARD ERROR
1435
1436            MOVE.W    BRD_ERROR,D0
1437            ANDI.W    #(BE_CHIP_ERR+BE_DBDMA_ERR+BE_PPC0_ERR+BE_PPC1_ERR),D0
1438            IF        <NE> THEN                 IF PPC CHIP ERROR
1439            MOVE.W    #0,PPC_ERR_CLR            CLEAR PPC CHIP ERROR
1440            MOVE.W    #0,BRD_ERROR              CLEAR BOARD ERROR
1441            ENDI                                END IF PPC CHIP ERROR
1442
1443    * CLEAR PPC ERROR
1444
1445            MOVEA.L   P_PPCADR(A2),A0           GET PPC BASE ADDRESS
1446            MOVE.W    PPC_STATUS1(A0),D0        GET STATUS1 REG
1447            ANDI.W    #(P1_FERR+P1_XFR_ERR),D0                             **4
1448
1449            IF        <NE> THEN                 IF PPC ERROR
1450
1451    * DO NOT CLEAR DMA UNLESS WE ARE RECONNECTING                          **8
1452    * IT MIGHT BE USED BY THE OTHER PORT                                  **8
1453
1454            IF.B      P_DVR_ST(A2) <EQ> #ST_RCN THEN   IF RECONNECTING     **8
1455            MOVE.W    #DC_RESET,DMB_CONTROL0    RESET DMA CHANNEL 0
1456            MOVE.W    #0,DMB_CONTROL0                                      **4
1457            MOVE.W    #0,DMB_START0                                        **4
1458            MOVE.W    #0,DMB_END0                                          **4
1459            MOVE.W    #0,DMB_CHAIN0                                        **4
1460            ENDI                                END IF RECONNECTING        **8
1461
1462    * IF KILLED OR NOT OWNED, CLEAR EIO                                    **22
1462.01 * SO WE DO NOT LOOP FOREVER                                            **22
1462.02 * OTHERWISE KEEP EIO BECAUSE IT MIGHT COME AFTER THE EVENT             **22
1462.03
1462.04         MOVE.W    PPC_STATUS1(A0),D0        GET STATUS1 REG            **22
```

```
1462.05           ANDI.W    #(PT_KILLED+P1_NOWN),D0                              **22
1462.06           IF        <NE> THEN                   IF KILLED OR NOT OWNED   **22
1462.07           MOVE.W    #(PF_EIO),PPC_CLEAR(A0)     CLEAR EIO                **22
1462.08           ENDI                                  END IF KILLED OR NOT OWNED
1462.09
1462.1            MOVE.W    #(PF_IRQ_EN+PF_RCI_EN),PPC_CLEAR(A0) CLEAR ENABLES
1463              MOVE.W    #(PF_CLEAR),PPC_CLEAR(A0)   CLEAR CHANNEL FLAGS
1464              MOVE.W    #(PF_INTR),PPC_CLEAR(A0)    CLEAR INTERRUPT
1465              MOVE.W    #PF_LOADED,PPC_FLAGS(A0)    SET LOADED BIT           ***4
1466              MOVE.W    #0,PPC_INT_CLR              CLEAR CHANNEL INTERRUPT
1467              ENDI                                  END IF PPC ERROR
1468
1469              RTS
1470
1471    * SUBROUTINE PPC ERROR HANDLER
1472    * THERE SHOULD BE AN ERROR BEFORE CALLING THIS SUBROUTINE
1473    * CODE ERROR FROM PPC_STATUS1, PPC_STATUS2 AND DMB_STATUS TO BECOME
1474    * ONE BYTE IREPLY CODE, AND SAVE STATUS
1475    * TEST CONDITIONS ARE TESTED IN ORDER OF SEVERITY
1476    * CODE ERROR BEFORE SAVE STATUS IN CASE SAVE STATUS CREATES MORE ERROR
1477    * INPUT  : A2 = DCB ADDRESS
1478    * USES   : A0 = PPC BASE ADDRESS
1479    *          D1 = GENERAL REGISTER
1480    * RETURN : D0 = IREPLY CODE (BYTE)
1481    *          DRIVER REPLY CODE IS THE NEGATIVE OF IREPLY CODE
1482
1483    PPC_ERROR
1484              BSR       CODE_ERROR
1485              MOVE.B    D0,D1                       SAVE IREPLY CODE
1486              BSR       SAVE_STATE
1487              BSR       CLEAR_ERROR
1488              MOVE.B    D1,D0                       RESTORE IREPLY CODE
1489              RTS
1490
1491    * CHECK PPC ERROR
1492    * QUICK CHECK FOR ERROR FROM PPC_STATUS1, PPC_STATUS2 AND DMB STATUS
1493    * INPUT  : A2 = DCB ADDRESS
1494    * USES   : A0 = PPC BASE ADDRESS
1495    *          D0 = GENERAL REGISTER
1496    * RETURN : CC =  Z IF NO ERROR
1497    *               NZ IF ERROR
1498
1499    CHECK_ERROR
1500              MOVEA.L   P_PPCADR(A2),A0             GET PPC BASE ADDRESS
1501              MOVE.W    PPC_STATUS1(A0),D0          GET STATUS 1
1502              ANDI.W    #(PT_FERR),D0               CHECK FOR ERROR
1503              BNE       CHECK_ERROR1
1504
1505              MOVE.W    PPC_STATUS2(A0),D0          GET STATUS 2
1506              ANDI.W    #P2_ABORTED,D0              CHECK FOR ABORTED
1507              BNE       CHECK_ERROR1
1508
1509              MOVE.W    DMB_STATUS,D0               GET DMB_STATUS
1510              ANDI.W    #DS_MST_PERR+DS_ERRO,D0     CHECK FOR ERROR
1511              BNE       CHECK_ERROR1
1512
1513    CHECK_ERROR1
1514              RTS
```

```
1      /*+------------------------------------------------------------+*/
2      /*|                       TALON                                |*/
3      /*|                     PORT TASK                              |*/
4      /*|                                                            |*/
5      /*+------------------------------------------------------------+*/
6
7      #include "krnldf.c"
8      #include "portdf.c"
9      #include "ppcdf.c"
10
10.001 /* change history                                                */
10.01  /* 22 -  3/9/87 JI                                               */
10.02  /*      add delay and retry for interrupt request                */
10.1
11
12     char PORT_VERS[] = ("TALON PORT -09MAR87");
13     /*                   1         2         3           */
14     /*         012345678901234567890123456789012345678901 */
15     #define Version_Length 19
16
17     typedef struct {
18         ADDRESS     Fwd_Link;
```

```
19        MCB          Msg;
20    ) *Msg_Buf_Ptr;
21
22    #define  MCB_Size         8
23    #define  Link_Size        4        /* Queue Link Size */
24    #define  Msg_Buf_Size     (MCB_Size + Link_Size)
25
26    #define  NUM_EIO_CB       50       /* Number Of EIO Buffers */       /*8*/
27    #define  Num_Msg_Buffers  50       /* Number Of Msg Buffers */       /*8*/
28    #define  Max_Addr         32       /* number of Port Address */
29                                       /* must be power of two */
30    #define  DMA_Mem          0x00210000 /* DMA Memory Address upper bits */
31
32
33    #define  Idle_State       0
34    #define  Busy_State       1
35
36    #define  Def_Burst        0x40     /* Default Burst Size in words */
37    #define  Def_Holdoff      15       /* Default Holdoff Time in us */
38
39    #define  Timeout_Event              0x0800                            /*8*/
40
41    /* PPC Control Block */
42    /* the size is made to power of two bytes, so the compiler does not */
43    /* call a multiplier routine */
44
45    static struct {
46        PPC_DCB_Ptr  PPC_DCB;
47        BYTE         State;
48        BYTE         filler[3];
49    } PPC[2];
50
51    /* Controller Address Table     */
52    /* the size is made to power of two bytes, so the compiler does not */
53    /* call a multiplier routine */
54
55    /* Port Configuration structure */
56
57    typedef struct {                                                     /*7*/
58        BYTE         Addr;                                               /*7*/
59        BYTE         filler;                                             /*7*/
60        long         Task_Name;                                          /*7*/
61    } Port_Conf_Struct, *Port_Conf_Ptr;                                  /*7*/
62
63    extern  Port_Conf_Struct   PORT_CONF;                                /*7*/
64
65    /* Port Table structure */
66
67    static struct {
68        long         Task_Name;
69        BYTE         Task_ID;
70        BYTE         filler[3];
71    } CADD [Max_Addr];
72
73    /* variables */
74
75    static long       My_Name;              /* This Task's Name */
76    static BYTE       My_ID;                /* This Task's ID   */
77
78    static ADDRESS    Free_MsgQ;
79    static ADDRESS    Free_MsgQ_Tail;       /* must follow Free_MsgQ */
80
81    static ADDRESS    MsgQ;
82    static ADDRESS    MsgQ_Tail;            /* must follow MsgQ       */
83    static BOOLEAN    MsgQ_Flag;                                         /*8*/
84
85    /*+----------------------------------------------------------------+*/
86    /*|                                                                |*/
87    /*|                         DO_EIO                                 |*/
88    /*| dequeue EIO from PPC driver, find out which task to send it to,|*/
89    /*| send a message to the task                                     |*/
90    /*+----------------------------------------------------------------+*/
91
92    static Do_EIO (Port_No)
93    BYTE     Port_No;
94    {
95    PPC_DCB_Ptr  PPC_DCB;
96    EIO_CB_Ptr   EIO;
97    MCB          EIO_Msg;
98    BYTE         Addr;
99
```

```
100         PPC_DCB = PPC[Port_No].PPC_DCB;
101
102         /* dequeue EIO */
103
104         PPC_DCB->Req = PPC_Dr_Dequeue;
105         PPC_DCB->Reqmod = 0;
106
107         /* get all EIO's */
108
109         while (PPCDVR (PPC_DCB)) {                                      /*8*/
110
111            EIO = (EIO_CB_Ptr) PPC_DCB->EIO_Buffer;
112
113            /* get Controller Address */
114
115            Addr = EIO->LAC & 0x001F;
116
117            /* send message if there is a task waiting */
118
119            if ((Addr < Max_Addr) && (CADD [Addr].Task_ID != 0xFF)) {   /*7*/
120               EIO_Msg.Msg_Type = MT_EIO_Req;
121               EIO_Msg.Msg_Value = (ADDRESS) EIO;
122               if (!SEND (CADD[Addr].Task_ID, &EIO_Msg))
123                  SOFTFAIL ();
124            }
125            else {                                                       /*8*/
126                                                                         /*8*/
127               /* queue back EIO buffer */                                /*8*/
128                                                                         /*8*/
129               PPC_DCB->Req = PPC_Dr_Queue;                               /*8*/
130               PPC_DCB->EIO_Buffer = (ADDRESS) EIO;                       /*8*/
131               if (!PPCDVR (PPC_DCB))                                     /*8*/
132                  SOFTFAIL ();                                            /*8*/
133               PPC_DCB->Req = PPC_Dr_Dequeue;                             /*8*/
134            }                                                            /*8*/
135         }                                                               /*8*/
136
137      } /* Do_EIO */
138
139   /*+------------------------------------------------------------------+*/
140   /*|                           Receive_Msg                            |*/
141   /*|                                                                  |*/
142   /*+------------------------------------------------------------------+*/
143
144   /* It gets a buffer from the free queue, receive a message and adds  */
145   /* to the message queue.  It repeats until there is no more message. */
146   /******** for optimization there should be a queue for each port.    */
147   /******** add abort logic   */
148
149   static Queue_Msg (Msg)                                                /*8*/
150   MCB_Ptr     Msg;                                                      /*8*/
151   {                                                                     /*8*/
152      Msg_Buf_Ptr  Msg_Buf;                                              /*8*/
153                                                                         /*8*/
154      if (!QREM (&Free_MsgQ, &Msg_Buf))                                  /*8*/
155         SOFTFAIL ();                                                    /*8*/
156         /****** reply too many message */                               /*8*/
157      MOVEB (Msg, &Msg_Buf->Msg, sizeof (*Msg));                         /*8*/
158      QADD (&MsgQ, Msg_Buf);                                             /*8*/
159      MsgQ_Flag = TRUE;                                                  /*8*/
160                                                                         /*8*/
161   } /* Queue_Msg */
162                                                                         /*8*/
163   static BOOLEAN Dequeue_Msg (Msg)                                      /*8*/
164   MCB_Ptr     Msg;                                                      /*8*/
165   {                                                                     /*8*/
166      Msg_Buf_Ptr  Msg_Buf;                                              /*8*/
167                                                                         /*8*/
168      if (!QREM (&MsgQ, &Msg_Buf))                                       /*8*/
169         return (FALSE);                                                 /*8*/
170      MOVEB (&Msg_Buf->Msg, Msg, sizeof (*Msg));                         /*8*/
171      QADD (&Free_MsgQ, Msg_Buf);                                        /*8*/
172                                                                         /*8*/
173   } /* Dequeue_Msg */
174                                                                         /*8*/
175   /* subroutine Receive_Msg                                        */   /*8*/
176                                                                         /*8*/
177   static SHORT Receive_Msg (Wait_Mask, Msg)                             /*8*/
178   SHORT       Wait_Mask;                                                /*8*/
179   MCB_Ptr     Msg;                                                      /*8*/
180   {                                                                     /*8*/
```

```
181        MCB           Cur_Msg;                                         /*8*/
182                                                                       /*8*/
183        if ((Wait_Mask == Msg_Event) && Msg)
184           RECEIVE (Msg);                                              /*8*/
185                                                                       /*8*/
186        while (RECEIVE (&Cur_Msg))                                     /*8*/
187           Queue_Msg (&Cur_Msg);                                       /*8*/
188        return (0);                                                    /*8*/
189                                                                       /*8*/
190     } /* Receive_Msg */                                               /*8*/
191
192     /*+-------------------------------------------------------------+*/
193     /*|                     Wait_Event                              |*/
194     /*|                                                             |*/
195     /*+-------------------------------------------------------------+*/
196
197     /* function Wait_Event                                          */
198     /* for wait for for an event while continue receiving EIO       */
199     /* and messages                                                 */
200
201     static SHORT Wait_Event (Event, Msg)                              /*8*/
202     SHORT          Event;                                             /*8*/
203     MCB_Ptr        Msg;                                               /*8*/
204     {                                                                 /*8*/
205        SHORT          Event_Mask;                                     /*8*/
206        SHORT          Wait_Mask;                                      /*8*/
207                                                                       /*8*/
208        Wait_Mask = Msg_Event | EIO_Event0 | EIO_Event1 | Event;       /*8*/
209        do {
210           Event_Mask = WAIT(Wait_Mask);
211
212           if (Event_Mask & EIO_Event0)
213              Do_EIO (0);
214
215           if (Event_Mask & EIO_Event1)
216              Do_EIO (1);
217
218           if (Event_Mask & Msg_Event)
219              Event_Mask = Event_Mask | Receive_Msg (Event, Msg);      /*8*/
220
221        } while (!(Event_Mask & Event));                               /*8*/
222
223        Event_Mask = Event_Mask & Event;                               /*8*/
224        return (Event_Mask);                                           /*8*/
225
226     } /* Wait_Event */
227
228     /*+-------------------------------------------------------------+*/
229     /*|                     EIO_Response                            |*/
230     /*|                                                             |*/
231     /*+-------------------------------------------------------------+*/
232
233     static EIO_Response (Msg)                                         /*8*/
234     MCB_Ptr        Msg;                                               /*8*/
235     {
236        PPC_DCB_Ptr    PPC_DCB;
237        EIO_CB_Ptr     EIO;
238
239        EIO = (EIO_CB_Ptr) Msg->Msg_Value;
240
241        PPC_DCB = PPC[EIO->Port_No].PPC_DCB;
242
243        /* queue back EIO buffer */
244
245        PPC_DCB->Req = PPC_Dr_Queue;
246        PPC_DCB->Reqmod = 0;
247        PPC_DCB->EIO_Buffer = (ADDRESS) EIO;
248        if (!PPCDVR (PPC_DCB))
249           SOFTFAIL ();
250
251     } /* EIO_Response */

252
253     /*+-------------------------------------------------------------+*/
254     /*|                     Reconnect                               |*/
255     /*|                                                             |*/
256     /*| dma memory allocation:                                      |*/
257     /*|    disc and tape are done by the device tasks               |*/
258     /*|    comm and rmi  are done by the port task                  |*/
259     /*+-------------------------------------------------------------+*/
260
261     static BYTE Reconnect (Msg)                                       /*8*/
```

```
262     MCB_Ptr         Msg;                                                    /*8*/
263     {
264         PPC_DCB_Ptr     PPC_DCB;
265         RCN_CB_Ptr      RCN;
266         ADDRESS         Data_Buffer;                                        /*8*/
267         BOOLEAN         Main_Mem_Flag;                                      /*8*/
268         BYTE            Reply;                                              /*8*/
269
270         RCN = (RCN_CB_Ptr) Msg->Msg_Value;
271         RCN->State_Valid = FALSE;                                           /*8*/
272         RCN->Actual_Count = 0;                                              /*8*/
273
274         /* if necessary move data from main memory */                       /*7*/
275                                                                             /*7*/
276         Main_Mem_Flag = FALSE;                                              /*7*/
277         Data_Buffer = RCN->Buffer;                                          /*7*/
278         if ((RCN->Buffer & 0xFFFF0000) != DMA_Mem) {                        /*7*/
279                                                                             /*7*/
280             /* get buffer */                                                /*7*/
281                                                                             /*7*/
282             if (!XGETSPACE (RCN->Count, &Data_Buffer))                      /*7*/
283                 return (Port_No_Buffer);                                    /*7*/
284                                                                             /*7*/
285             /* move data */                                                 /*7*/
286                                                                             /*7*/
287             Main_Mem_Flag = TRUE;                                           /*7*/
288             if (RCN->Direction == (BOOLEAN) RCN_Write_Dir)                  /*7*/
289                 MOVEB (RCN->Buffer, Data_Buffer, RCN->Count);               /*7*/
290         }                                                                   /*7*/
291
292         PPC_DCB = PPC[RCN->Port_No].PPC_DCB;
293
294         /* set up PPC_DCB */
295
296         if (RCN->Direction == (BOOLEAN) RCN_Read_Dir)
297             PPC_DCB->Req = PPC_Dr_Read_Recon;
298         else
299             PPC_DCB->Req = PPC_Dr_Write_Recon;
300
301         PPC_DCB->Reqmod = 0;
302
303         /* calculate starting address */
304
305         PPC_DCB->Transfer_Buffer = Data_Buffer & 0x0000FFFF;                 /*7*/
306         PPC_DCB->Transfer_Count  = RCN->Count;
307
308         PPC_DCB->RAC = RCN->RAC;
309
310         /* set request modifiers */
311
312         PPC_DCB->Exact_Burst = FALSE;
313         PPC_DCB->Skip_Xsum = FALSE;
314         PPC_DCB->RAC_Check = FALSE;
315
316         if (RCN->Reqmod & RCN_Exact_Burst)
317             PPC_DCB->Exact_Burst = TRUE;
318
319         if (RCN->Reqmod & RCN_Skip_Xsum)
320             PPC_DCB->Skip_Xsum = TRUE;
321
322         if (RCN->Reqmod & RCN_RAC_Check)
323             PPC_DCB->RAC_Check = TRUE;
324
325         PPC_DCB->State_Buffer = RCN->State_Buffer;
326
327         /* call PPC interface */
328
329         if(!PPCDVR (PPC_DCB)) {
330             RCN->State_Valid = PPC_DCB->State_Valid;                        /*8*/
331             Reply = - PPC_DCB->Reply;                                       /*8*/
332             goto Reconnect_End;                                             /*8*/
333         }
334
335         Wait_Event (Xfer_Cmpl_Event | Timeout_Event, 0);                    /*8*/
336
337         RCN->Actual_Count = PPC_DCB->Actual_Count;
338         RCN->State_Valid = PPC_DCB->State_Valid;
339         if ((Main_Mem_Flag) & (RCN->Direction == (BOOLEAN) RCN_Read_Dir))   /*8*/
340             MOVEB (Data_Buffer, RCN->Buffer, RCN->Actual_Count);            /*7*/
341         Reply = PPC_DCB->Reply;                                             /*8*/
```

```
342
343      Reconnect_End:
344         if (Main_Mem_Flag)                                              /*8*/
345            XPUTSPACE (Data_Buffer);                                     /*8*/
346         return (Reply);                                                 /*8*/
347
348      ) /* Reconnect */
349
350      /*+------------------------------------------------------------+*/
351      /*|                      Interrupt                             |*/
352      /*|                                                            |*/
353      /*+------------------------------------------------------------+*/
354      static BYTE Interrupt (Msg)                                        /*8*/
355      MCB_Ptr       Msg;                                                 /*8*/
356      {
357         PPC_DCB_Ptr  PPC_DCB;
358         IRQ_CB_Ptr   IRQ;
359         BYTE         Reply;
359.1       INTEGER      Retry_Count;                                       /*22*/
359.2    #define Max_Retry_Count       20                                   /*22*/
360
361         IRQ = (IRQ_CB_Ptr) Msg->Msg_Value;
362
363         PPC_DCB = PPC[IRQ->Port_No].PPC_DCB;
364
365         /* set up PPC_DCB */
366
367         PPC_DCB->Req = PPC_Dr_Interrupt;
368         PPC_DCB->Reqmod = 0;
369         PPC_DCB->RIC = IRQ->RIC;
370         PPC_DCB->RIST = IRQ->RIST;
371         PPC_DCB->State_Buffer = IRQ->State_Buffer;
372
373         /* call PPC driver */
374
374.1       Retry_Count = 0;                                                /*22*/
375         while ((!PPCDVR (PPC_DCB)) && (Retry_Count <= Max_Retry_Count)) { /*22*/
375.01         DELAY (1);       /* wait 10 ms */                            /*22*/
375.1         Retry_Count = Retry_Count + 1;                                /*22*/
375.2       }
378
379         IRQ->State_Valid = PPC_DCB->State_Valid;
380         Reply = - PPC_DCB->Reply;
381         return (Reply);
382                                                                         /*8*/
383      } /* Interrupt */
384

385      /*+------------------------------------------------------------+*/
386      /*|                      Configure                             |*/
387      /*|                                                            |*/
388      /*+------------------------------------------------------------+*/
389      static BYTE Configure (Msg)                                        /*8*/
390      MCB_Ptr       Msg;                                                 /*8*/
391      {                                                                  /*7*/
392         PPC_DCB_Ptr  PPC_DCB;                                           /*7*/
393         PCS_CB_Ptr   PCS;                                               /*7*/
394         BYTE         Reply;                                             /*8*/
395                                                                         /*7*/
396         PCS = (PCS_CB_Ptr) Msg->Msg_Value;                              /*7*/
397                                                                         /*7*/
398         PPC_DCB = PPC[PCS->Port_No].PPC_DCB;                            /*7*/
399                                                                         /*7*/
400         /* set up PPC_DCB */                                            /*7*/
401                                                                         /*7*/
402         PPC_DCB->Req = PPC_Dr_Config;                                   /*7*/
403         PPC_DCB->Reqmod = 0;                                            /*7*/
404         PPC_DCB->Burst = PCS->Burst;                                    /*7*/
405         PPC_DCB->Holdoff = PCS->Holdoff;                                /*7*/
406         PPC_DCB->State_Buffer = PCS->State_Buffer;                      /*7*/
407                                                                         /*7*/
408         /* call PPC driver */                                           /*7*/
409                                                                         /*7*/
410         PPCDVR (PPC_DCB);                                               /*7*/
411                                                                         /*7*/
412         PCS->State_Valid = PPC_DCB->State_Valid;                        /*7*/
413         Reply = - PPC_DCB->Reply;                                       /*8*/
414         return (Reply);                                                 /*8*/
415                                                                         /*7*/
416      } /* Configure */                                                  /*7*/
417
```

```
418   /*+-----------------------------------------------------------------*/
419   /*|                        Read_Status                              |*/
420   /*|                                                                 |*/
421   /*+-----------------------------------------------------------------*/
422   static BYTE Read_Status (Msg)                                      /*8*/
423   MCB_Ptr       Msg;                                                 /*8*/
424   {                                                                  /*7*/
425      PPC_DCB_Ptr   PPC_DCB;                                          /*7*/
426      PCS_CB_Ptr    PCS;                                              /*7*/
427      BYTE          Reply;                                            /*8*/
428                                                                     /*7*/
429      PCS = (PCS_CB_Ptr) Msg->Msg_Value;                              /*7*/
430                                                                     /*7*/
431      PPC_DCB = PPC[PCS->Port_No].PPC_DCB;                            /*7*/
432                                                                     /*7*/
433      /* set up PPC_DCB */                                            /*7*/
434                                                                     /*7*/
435      PPC_DCB->Req = PPC_Or_Read_Status;                              /*7*/
436      PPC_DCB->Reqmod = 0;                                            /*7*/
437      PPC_DCB->State_Buffer = PCS->State_Buffer;                      /*7*/
438                                                                     /*7*/
439      /* call PPC driver */                                           /*7*/
440                                                                     /*7*/
441       PPCDVR (PPC_DCB);                                              /*7*/
442                                                                     /*7*/
443      /********** check for interrupt done */                         /*7*/
444                                                                     /*7*/
445      /* reply to task */                                             /*7*/
446                                                                     /*7*/
447      PCS->State_Valid = PPC_DCB->State_Valid;                        /*7*/
448      PCS->Burst = PPC_DCB->Burst;                                    /*7*/
449      PCS->Holdoff = PPC_DCB->Holdoff;                                /*7*/
450      Reply = - PPC_DCB->Reply;                                       /*8*/
451      return (Reply);                                                 /*8*/
452                                                                     /*7*/
453   } /* Read_Status */                                                /*7*/
454
455   /*+-----------------------------------------------------------------*/
456   /*|                          Do_Msg                                 |*/
457   /*|                                                                 |*/
458   /*+-----------------------------------------------------------------*/
459
460   /* It processes one message */
461
462   static Do_Msg (Msg)                                                /*8*/
463   MCB_Ptr       Msg;                                                 /*8*/
464   {
465      BOOLEAN       Reply_Flag;                                       /*8*/
466      BYTE          Task_ID;                                          /*8*/
467      BYTE          Reply;                                            /*8*/
468
469      Reply_Flag = FALSE;                                             /*8*/
470      switch (Msg->Msg_Type)                                          /*8*/
471      {
472         case MT_EIO_Resp:
473            EIO_Response (Msg);
474            Reply_Flag = FALSE;
475            break;
476         case MT_Reconnect_Req:
477            Reply = Reconnect (Msg);                                  /*8*/
478            Reply_Flag = TRUE;                                        /*8*/
479            break;
480         case MT_Interrupt_Req:
481            Reply = Interrupt (Msg);                                  /*8*/
482            Reply_Flag = TRUE;                                        /*8*/
483            break;
484         case MT_Port_Config_Req:
485            Reply = Configure (Msg);                                  /*8*/
486            Reply_Flag = TRUE;                                        /*8*/
487            break;
488         case MT_Port_Status_Req:
489            Reply = Read_Status (Msg);                                /*8*/
490            Reply_Flag = TRUE;                                        /*8*/
491            break;
492      } /* end switch (Msg_Type) */
493
494      /********** check for invalid message */
495
496      /* reply to task */                                             /*8*/
```

```
497                                                                              /*8*/
498         if (Reply_Flag) {
499            Task_ID = Msg->Msg_Taskid;                                         /*8*/
500            Msg->Msg_Taskid = My_ID;                                           /*8*/
501            Msg->Msg_Type = Msg->Msg_Type + 1;                                 /*8*/
502            Msg->Msg_Tag = Reply;                                              /*8*/
503            SEND (Task_ID, Msg);                                               /*8*/
504         }
505
506     } /* Do_Message */
507
508     /*+----------------------------------------------------------------+*/
509     /*|                         PPC_Init                               |*/
510     /*|                                                                |*/
511     /*+----------------------------------------------------------------+*/
512
513     static PPC_Init (Msg)
514     MCB_Ptr   Msg;
515     {
516     PPC_DCB_Ptr   PPC_DCB;
517     PPC_DCR_Ptr   PPC_DCR;
518     EIO_CB_Ptr    EIO_Buf;
519     INTEGER       I;
520
521        PPC_DCR = (PPC_DCR_Ptr) Msg->Msg_Value;
522        if (!(PPC_DCB = INITPPCDCB (PPC_DCR)))
523           SOFTFAIL ();
524
525        PPC [PPC_DCR->Port_No].PPC_DCB = PPC_DCB;
526
527        /* reset port */
528
529        PPC_DCB->Req = PPC_Dr_Reset;
530        PPC_DCB->Reqmod = 0;
531        if (!PPCDVR (PPC_DCB))
532           SOFTFAIL ();
533
534        /* configure port */
535
536        PPC_DCB->Req = PPC_Dr_Config;
537        PPC_DCB->Reqmod = 0;
538        PPC_DCB->Burst = Def_Burst;
539        PPC_DCB->Holdoff = Def_Holdoff;
540        if (!PPCDVR (PPC_DCB))
541           SOFTFAIL ();
542
543        /* allocate and queue EIO buffers */
544
545        PPC_DCB->Req = PPC_Dr_Queue;
546        PPC_DCB->Reqmod = 0;
547        if (!GETSPACE ( NUM_EIO_CB*EIO_CB_Size, &EIO_Buf))
548           SOFTFAIL ();
549        ZBUFB(EIO_Buf, NUM_EIO_CB*EIO_CB_Size);       /* Zero Buffer */
550        for (I = 0; I < NUM_EIO_CB; I++) {
551           EIO_Buf->Fwd_Link = 0xFFFFFFFF;
552           PPC_DCB->EIO_Buffer = (ADDRESS) EIO_Buf++;
553           if (!PPCDVR (PPC_DCB))
554              SOFTFAIL ();
555        } /* LOOP queue EIO buffers */
556
557     } /* PPC_Init */
558
559     /*+----------------------------------------------------------------+*/
560     /*|                        PORT TASK                               |*/
561     /*|                        INTIALIZATION                           |*/
562     /*|                                                                |*/
563     /*+----------------------------------------------------------------+*/
564
565     static Init ()
566     {
567        MCB            Msg;
568        int            I;
569        Msg_Buf_Ptr    Msg_Buf;
570        Port_Conf_Ptr  PConf;                                                  /*7*/
571
572        /* find out ID and name */
573
574        FINDMYID (&My_ID);
575
576        /* allocate and queue Msg buffers */
577
```

```
578         GETSPACE ( Num_Msg_Buffers*Msg_Buf_Size, &Msg_Buf);
579         ZBUFB(Msg_Buf, Num_Msg_Buffers*Msg_Buf_Size);        /* Zero Buffer */
580
581         QINIT( &Free_MsgQ, 0, 0);
582         QINIT( &MsgQ, 0, 0);
583         for (I = 0; I < Num_Msg_Buffers; I++) {
584            QINIT (&Free_MsgQ, Msg_Buf++, TRUE);
585         } /* LOOP queue Msg buffer */
586
587         /* initialize ports */
588
589         WAIT(Msg_Event);
590         while (RECEIVE (&Msg)) {
591            PPC_Init (&Msg);
592            /********* check message type */
593         } /* LOOP initialize port */
594
595         /* initialize address table */
596
597         for (I = 0; I < Max_Addr; I++) {                              /*7*/
598            CADD[I].Task_Name = 0;                                    /*7*/
599            CADD[I].Task_ID = 0xFF;                                   /*8*/
600         }                                                             /*7*/
601
602         /*  find out Task ID */
603
604         PConf = &PORT_CONF;                                           /*7*/
605         while (PConf->Addr != 0xFF) {                                 /*8*/
606            I = PConf->Addr;                                          /*7*/
607            CADD[I].Task_Name = PConf->Task_Name;                     /*7*/
608            if (!FINDID (&CADD[I].Task_Name, &CADD[I].Task_ID))       /*7*/
609               CADD[I].Task_ID = 0xFF;                                /*8*/
610            PConf++;                                                  /*7*/
611         }
612                                                                       /*8*/
613      } /* Init */
614
615   /*+-----------------------------------------------------------------+*/
616   /*|                                                                 |*/
617   /*|                        Main Loop                                |*/
618   /*|                                                                 |*/
619   /*+-----------------------------------------------------------------+*/
620      PORT_MAIN ()
621      {                                                                 /*8*/
622         MCB              Msg;                                          /*8*/
623
624         Init ();                                                       /*8*/
625         MsgQ_Flag = FALSE;                                             /*8*/
626         while (TRUE) {                                                 /*8*/
627                                                                        /*8*/
628            /* wait for new message */                                  /*8*/
629                                                                        /*8*/
630            Wait_Event (Msg_Event, &Msg);                               /*8*/
631            Do_Msg (&Msg);                                              /*8*/
632                                                                        /*8*/
633            /* check internal message queue */                          /*8*/
634                                                                        /*8*/
635            if (MsgQ_Flag) {                                            /*8*/
636               while (Dequeue_Msg (&Msg))                               /*8*/
637                  Do_Msg (&Msg);                                        /*8*/
638               MsgQ_Flag = FALSE;                                       /*8*/
639            }                                                           /*8*/
640         } /* loop forever */
641
642      } /* PORT_MAIN */

1
  2   /*+-----------------------------------------------------------------+*/
  3   /*|                        DISC TASK                                |*/
  4   /*|                        DECLARATION                              |*/
  5   /*|                                                                 |*/
  6   /*+-----------------------------------------------------------------+*/
  7
  8   /* Downloadable uCode Ver */                                        /*7*/
  9
 10   #define uCode_Prod_No_Len    5                                      /*7*/
 11   #define uCode_Ver_Len        3                                      /*7*/
 12   #define uCode_Date_Len       8                                      /*7*/
 13   #define uCode_Change_Len     2                                      /*7*/
 14
 15   typedef struct {                                                    /*7*/
```

```
16        char    Prod_No [uCode_Prod_No_Len];                            /*7*/
17        char    Ver [uCode_Ver_Len];                                    /*7*/
18        char    Date [uCode_Date_Len];                                  /*7*/
19        char    Change [uCode_Change_Len];                              /*7*/
20      } uCode_Ver_Struct, *uCode_Ver_Ptr;                               /*7*/
21
22      /* various constants */
23
24      #define Boot_ID                 1
25
26      #define Msg_No                  20          /* Number Of Msg Buffers */ /*8*/
27      #define Min_Cmd_Pkt_Len         14
28      #define Max_Sector_Count        64
29      #define Max_Sector_Addr         0x00045A80
30      #define Sector_Len              514
31      #define Sector_Data_Len         512                                /*19*/
31.1    #define Cold_Load_Sector_Count  8           /* 4096 bytes    */    /*7*/
32      #define Max_Retry_Count         4           /* don't get too long */ /*17*/
33      #define Max_Rsp_Len             512         /* must be even */
34      #define Max_Cmd_Len             256         /* must be even */
35      #define Max_Defect_Sectors      500                                /*7*/
36      #define Max_Mem_Data            8000        /* must be even */     /*7*/
37      #define Max_Sense_Len           32          /* must be even */     /*7*/
38      #define Req_Port_No             2           /* RMI Port No */      /*18*/
39
40      /* disc EIO code definition */
41
42      #define Cold_Load_Cmd       0x08    /* Cold Load           */
43      #define Boot_ID_Cmd         0x30    /* Return_Boot_ID      */
44      #define Extended_Cmd        0x7C    /* Extended Command    */
45      #define Reset_Unit_Cmd      0xCD    /* Reset Unit          */
46
47      /* RIC status */
48
49      #define RIC_Controller_PON          0x8000
50      #define RIC_Unsuccessful            0x4000
51      #define RIC_Drive_Attention         0x0100
52      #define RIC_Conditional_Success     0x0200
53      #define RIC_Pending_Status          0x0300
54      #define RIC_Cmd_Except              0x0400
55      #define RIC_Chn_Except              0x0500
56      #define RIC_Ctr_Except              0x0600
57      #define RIC_Dev_Except              0x0700
58      #define RIC_Dr_Except               0x0800
59      #define RIC_ECC_Except              0x0900
60      #define RIC_Not_Ready               0x0D00
61      #define RIC_Select_Err              0x0E00
62      #define RIC_No_Respond              0x0F00
63
64      typedef struct
65      {
66          SHORT   Pkt_Len;
67          BYTE    Reserved;
68          BYTE    Data_IOC;
69          BYTE    Opcode;
70          BYTE    Modifier;
71          BYTE    Parm;
72      } *Cmd_Pkt_Header_Ptr;
73
74      /* extended EIO Opcode definition */
75
76      #define Attributes_Op       0x02
77      #define Read_Op             0x10
78      #define Write_Op            0x20
79      #define Format_Op           0x28
80      #define Compare_Op          0x32
81      #define Spare_Op            0x33
82      #define Read_Mem_Op         0x52
83      #define Write_Mem_Op        0x62
84      #define Test_Op             0x80
85      #define Read_Defect_Op      0x82
86
87      #define Read_Full_Op        0x1C    /* not supported */
88      #define Write_Full_Op       0x2C    /* not supported */
89
90      /* opcode modifier definition */
91
92      #define Read_Xsum_Mod               0x08    /* response checksum array */
93      #define Read_No_Xfer_Mod            0x04    /* no channel data transfer */
94      #define Write_Full_Buf_Mod          0x08    /* fully buffered */
95      #define Write_Block_Xsum_Mod        0x04    /* insert block checksum */
```

```
 96     #define Format_Defect_List_Mod        0x02    /* Defect List               */
 97     #define Format_Init_Added_Mod         0x04    /* Init Added Defect List*/
 98     #define Read_Defect_Added_Mod         0x08    /* Init Added Defect List*/ /*8*/
 99     #define Write_Mem_Boot_Mod            0x08    /* Write to EEPROM           */
100     #define Spare_Force                   0x08    /* Force Inclusion           */ /*10*/
101
102     /* parameter id definition */
103     /* ordered by ID code      */
104
105     #define NOP_PID                       0x01
106     #define Cmd_Except_PID                0x14
107     #define Chn_Except_PID                0x15
108     #define Ctr_Except_PID                0x16
109     #define Dev_Except_PID                0x17
110     #define Dr_Except_PID                 0x18
111     #define ECC_Except_PID                0x19
112     #define Cmd_Lgc_Ext_PID               0x31
113     #define Rsp_Lgc_Ext_PID               0x32
114     #define Cmd_Phy_Ext_PID               0x35
115     #define Rsp_Phy_Ext_PID               0x36
116     #define Invalid_Parm_PID              0x38
117     #define Missing_Parm_PID              0x39
118     #define Request_Parm_PID              0x3A
119     #define Checksum_Array_PID            0x3B
120     #define Ctrl_Mem_Ext_PID              0x50
121     #define Chnl_Attr_PID                 0x51
122     #define Ctrl_ID_PID                   0x52
123     #define Ctrl_Ser_No_PID               0x53
124     #define Ctrl_Rev_PID                  0x54
125     #define Drive_ID_PID                  0x55
126     #define uCode_Ver_PID                 0x58
127     #define Test_PID                      0x59
128     #define PPC0_State_PID                0x63
129     #define PPC1_State_PID                0x64
130     #define DBDMA_State_PID               0x65
131     #define MCP_State_PID                 0x69
132     #define SPC_State_PID                 0x6A
133     #define SCSI_Ext_Sense_PID            0x6B
134     #define Cmd_End_PID                   0xFC
135     #define Rsp_Overflow_PID              0xFD
136     #define Rsp_End_PID                   0xFE
137
138     /* main sources of substatus                  */
139     /*                                            */
140     /* Source              Substatus             */
141     /*                                            */
142     /* Command Package     Command               */
143     /* Port Status         Channel Interface     */
144     /* Port Status         Controller            */
145     /* SPC Driver Reply    Device Interface      */
146     /* Drive Sense         Drive                 */
147     /* Drive Sense         ECC                   */
148
149     #define Ss_State                      0x80000000 /*  0 */
150     #define Ss_Unsuccessful               0x40000000 /*  1 */
151
152     /* Command Exception Substatus */
153
154     #define CmdSs_Mem_Checksum_Err        0x20000000 /*  2 */
155     #define CmdSs_Invalid_Reserved_Value  0x10000000 /*  3 */
156     #define CmdSs_Invalid_Data_IOC        0x08000000 /*  4 */
157     #define CmdSs_Invalid_Opcode          0x04000000 /*  5 */
158     #define CmdSs_Invalid_Common_Mod      0x02000000 /*  6 */
159     #define CmdSs_Invalid_Opcode_Mod      0x01000000 /*  7 */
160     #define CmdSs_Invalid_Ext             0x00800000 /*  8 */
161     #define CmdSs_Invalid_Parm            0x00400000 /*  9 */
162     #define CmdSs_Missing_Parm            0x00200000 /* 10 */
163     #define CmdSs_Invalid_Parm_Combo      0x00100000 /* 11 */
164     #define CmdSs_Cmd_End_Not_Last        0x00080000 /* 12 */
165
166     /* Channel Interface Exception Substatus */
167
168     #define ChnSs_Transfer_Err            0x20000000 /*  2 */
169     #define ChnSs_TBus_Seq_Err            0x10000000 /*  3 */
170     #define ChnSs_TimeOut                 0x08000000 /*  4 */
171     #define ChnSs_Checksum_Err            0x04000000 /*  5 */
172     #define ChnSs_Data_Truncation         0x00010000 /* 15 */
173
174     #define ChnSs_Oth_Transfer_Err        0x00002000 /*  2 */
175     #define ChnSs_Oth_TBus_Seq_Err        0x00001000 /*  3 */
176     #define ChnSs_Oth_TimeOut             0x00000800 /*  4 */
177     #define ChnSs_Oth_Checksum_Err        0x00000400 /*  5 */
```

```
178     #define ChnSs_Oth_Port_Killed        0x00000001 /* 15 */
179
180     /* Controller Exception Substatus */
181
182     #define CtrSs_uP_error               0x20000000 /*  2 */
183     #define CtrSs_Watchdog_Timer         0x10000000 /*  3 */
184     #define CtrSs_Timer_Err              0x08000000 /*  4 */
185     #define CtrSs_Controller_ID_Err      0x04000000 /*  5 */
186     #define CtrSs_Bootstrap_Memory_Err   0x02000000 /*  6 */
187     #define CtrSs_Locs_Address_Err       0x01000000 /*  7 */
188     #define CtrSs_Locs_Parity_Err        0x00800000 /*  8 */
189     #define CtrSs_Data_Buff_Address_Err  0x00400000 /*  9 */
190     #define CtrSs_Data_Buff_Parity_Err   0x00200000 /* 10 */
191     #define CtrSs_Sector_Checksum_Err    0x00100000 /* 11 */
192     #define CtrSs_uCode_Err              0x00080000 /* 12 */
193     #define CtrSs_Data_Miscompare        0x00040000 /* 13 */ /*7*/
194     #define CtrSs_PPC_Chip_Err           0x00010000 /* 15 */
195
196     #define CtrSs_No_Buffer              0x00008000 /*  1 */ /*7*/ /* new */
197     #define CtrSs_SPC_Chip_Err           0x00000020 /* 10 */
198     #define CtrSs_OBDMA_Chip_Err         0x00000002 /* 14 */
199     #define CtrSs_Oth_PPC_Chip_Err       0x08000001 /* 15 */
200
201     /* Device Interface Exception Substatus */
202
203     #define DevSs_Ctr_Parity_Err         0x20000000 /*  2 */
204     #define DevSs_Dr_Parity_Err          0x10000000 /*  3 */
205     #define DevSs_Ctr_Prot_Err           0x08000000 /*  4 */
206     #define DevSs_Dr_Prot_Err            0x04000000 /*  5 */
207     #define DevSs_Cmd_Except             0x02000000 /*  6 */
208     #define DevSs_Stat_Except            0x01000000 /*  7 */
209     #define DevSs_TimeOut                0x00800000 /*  8 */
210     #define DevSs_Select_Err             0x00400000 /*  9 */
211     #define DevSs_No_Respond             0x00200000 /* 10 */
212     #define DevSs_Unexp_Intr             0x00100000 /* 11 */
213     #define DevSs_Data_Overrun           0x00080000 /* 12 */
214     #define DevSs_Stuck_Bus              0x00040000 /* 13 */
215
216     /* Drive Exception Substatus */
217
218     #define DrSs_Ownership_Err           0x20000000 /*  2 */
219     #define DrSs_Write_Protect           0x10000000 /*  3 */
220     #define DrSs_Not_Ready               0x08000000 /*  4 */
221     #define DrSs_Spinup                  0x04000000 /*  5 */
222     #define DrSs_Spindown                0x02000000 /*  6 */
223     #define DrSs_Ctr_Seek_Err            0x01000000 /*  7 */
224     #define DrSs_Dr_Seek_Err             0x00800000 /*  8 */
225     #define DrSs_Sector_Addr_Err         0x00400000 /*  9 */
226     #define DrSs_Drive_Reset             0x00200000 /* 10 */
227     #define DrSs_Hw_Err                  0x00100000 /* 11 */
228     #define DrSs_Volt_Err                0x00080000 /* 12 */
229     #define DrSs_Logic_Temp_Err          0x00040000 /* 13 */
230     #define DrSs_Act_Temp_Err            0x00020000 /* 14 */
231     #define DrSs_Ext_Spare               0x00010000 /* 15 */
232
233     #define DrSs_No_Spare                0x00008000 /*  0 */
234     #define DrSs_Spare_Not_Done          0x00004000 /*  1 */
235     #define DrSs_No_Add_Def_Map          0x00002000 /*  2 */
236     #define DrSs_Ready_Transition        0x00001000 /*  3 */
237     #define DrSs_Busy                    0x00000800 /*  4 */ /***** new */
238     #define DrSs_Drive_ID_Err            0x00000400 /*  5 */ /* tentative */ /*8*/
239
240     /* ECC Exception Substatus */
241
242     #define ECCSs_Uncor_Header           0x20000000 /*  2 */
243     #define ECCSs_Cor_Header             0x10000000 /*  3 */
244     #define ECCSs_Uncor_Data             0x08000000 /*  4 */
245     #define ECCSs_Cor_Data               0x04000000 /*  5 */
246     #define ECCSs_Early_Strobe           0x02000000 /*  6 */
247     #define ECCSs_Late_Strobe            0x01000000 /*  7 */
248     #define ECCSs_Off                    0x00800000 /*  8 */
249     #define ECCSs_Off_Step1              0x00400000 /*  9 */
250     #define ECCSs_Off_Step2              0x00200000 /* 10 */
251     #define ECCSs_Off_Step3              0x00100000 /* 11 */
252     #define ECCSs_Manuf_Def_Map          0x00080000 /* 12 */
253     #define ECCSs_Add_Def_Map            0x00040000 /* 13 */
254
255     /* command parameter structures */
256
257     typedef struct
258     {
```

```
259         BYTE    Len;
260         BYTE    PID;
261         SHORT   Lgc_Sector_Count;
262         LONG    Lgc_Sector_Addr;
263     } *Cmd_Lgc_Ext_Ptr;
264
265     typedef struct
266     {
267         BYTE    Len;
268         BYTE    PID;
269         SHORT   Phy_Sector_Count;
270         LONG    Phy_Sector_Addr;
271     } *Cmd_Phy_Ext_Ptr;
272
273     typedef struct
274     {
275         BYTE    Len;
276         BYTE    PID;
277         LONG    Mem_Addr;
278         SHORT   Reserved;
279         SHORT   Mem_Byte_Count;
280     } *Ctrl_Mem_Ext_Ptr;
281
282     typedef struct {                                                /*7*/
283         LONG    Addr;                                               /*7*/
284         SHORT   filler;                                             /*7*/
285         SHORT   Byte_Count;                                         /*7*/
286     } Mem_Data_Header_Type;                                         /*20*/
287
288     typedef struct {                                                /*7*/
289         Mem_Data_Header_Type  Header;                               /*20*/
290         SHORT   Data [Max_Mem_Data / 2];    /* variable */          /*7*/
291         SHORT   Checksum;                                           /*7*/
292     } *Mem_Data_Ptr;                                                /*7*/
293
294     /* response parameter structures */
295
296     typedef struct
297     {
298         BYTE    Len;
299         BYTE    PID;
300         BYTE    Data;                       /* variable */
301     } *Parm_Header_Ptr;
302
303     typedef struct
304     {
305         BYTE    Len;
306         BYTE    PID;
307         INTEGER Parm_Displace;
308         INTEGER Field_Displace;
309         BYTE    Data;                       /* variable */
310     } *Invalid_Parm_Ptr;
311     #define Invalid_Parm_Header_Len     06
312
313     typedef struct
314     {
315         BYTE    Len;
316         BYTE    PID;
317         BYTE    Parm_PID;
318     } *Missing_Parm_Ptr;
319
320     /* Command and Channel Exception Substatus Parameter */
321
322     typedef struct
323     {
324         BYTE    Len;
325         BYTE    PID;
326         LONG    Substatus;
327     } *Chn_Except_Ptr;
328
329     /* Controller, Device Interface, Drive, ECC Exception Substatus Parameter */
330
331     typedef struct
332     {
333         BYTE    Len;
334         BYTE    PID;
335         LONG    Substatus;
```

```
336        BYTE       Retry_Count;
337        BYTE       filler;
338        LONG       Lgc_Sector_Addr;
339     } *Dev_Except_Ptr;
340
341     /* Channel Attributes */                                                    /*7*/
342
343     typedef struct {                                                            /*7*/
344        BYTE       Len;                                                          /*7*/
345        BYTE       PID;                                                          /*7*/
346        BYTE       Burst;                                                        /*7*/
347        BYTE       Holdoff;                                                      /*7*/
348        SHORT      Mode;                                                         /*7*/
349     } *Chnl_Attr_Ptr;
350
351     #define Rsp_End_Len           01
352     #define Rsp_Overflow_Len      01
352.01  #define Read_Pkt_Len          0x0E  /* Cmd_Pkt_Header + Cmd_Lgc_Ext */ /*19*/
352.02  #define Write_Pkt_Len         0x0E  /* Cmd_Pkt_Header + Cmd_Lgc_Ext */ /*19*/
352.03                                     /* Checksum to be added          */ /*19*/
353
354     /* sector Format */
355
356     typedef struct
357     {
358
359        SHORT      Data [Sector_Data_Len / 2];                                   /*19*/
360        SHORT      Checksum;                                                     /*19*/
360.1   } *Sector_Ptr;
361
362     /* drive status */
363
364     #define Dstat_Idle      00
365     #define Dstat_Seek      01
366     #define Dstat_Transfer  02
367     #define Dstat_Format    03
368
369     /* SCSI disc operation code definition */
370
371     #define SDOp_Req_Sense         0x03
372     #define SDOp_Format_Unit       0x04
373     #define SDOp_Reassign_Blocks   0x07
374     #define SDOp_Read              0x08
375     #define SDOp_Write             0x0A
376     #define SDOp_Inquiry           0x12
377     #define SDOp_Mode_Select       0x15
377.1   #define SDOp_Mode_Sense        0x1A
378     #define SDOp_Verify            0x2F                                          /*7*/
379     #define SDOp_Read_Defect       0x37                                          /*7*/
380
381     /* SCSI command type definition */
382
383     typedef struct
384     {
385        BYTE   Op_Code;
386        BYTE   Byte1;
387        BYTE   Byte2;
388        BYTE   Byte3;
389        BYTE   Byte4;
390        BYTE   Vendor_Unique;
391     } *SCSI_Cmd_Ptr;
392     #define SCSI_Cmd_Len    6
393
394     typedef struct {                                                            /*7*/
395        BYTE   Op_Code;          /* 0      */                                    /*7*/
396        BYTE   Defect_List;      /* 1      */                                    /*7*/
397        BYTE   Pattern;          /* 2      */                                    /*7*/
398        BYTE   Interleave [2];   /* 3 - 4  */                                    /*7*/
399        BYTE   Link;             /* 5      */                                    /*7*/
400     } *Format_Cmd_Ptr;                                                          /*7*/
401
402     #define Format1_Data            0x10   /* Format Data       */ /*7*/
403     #define Format1_Complete        0x08   /* Complete List     */ /*7*/
404     #define Format1_Block_Format    0x00   /* Block List Format */ /*7*/
405
406     typedef struct {                                                            /*7*/
407        BYTE   Op_Code;          /* 0      */                                    /*7*/
408        BYTE   Byte_Check;       /* 1      */                                    /*7*/
409        LONG   Lgc_Block_Addr;   /* 2 - 5  */                                    /*7*/
410        BYTE   Zero;             /* 6      */                                    /*7*/
411        BYTE   Len[2];           /* 7 - 8  */                                    /*7*/
412        BYTE   Link;             /* 9      */                                    /*7*/
413     } *Verify_Cmd_Ptr;                                                          /*7*/
```

```
define Verify_Byte_Check      0x02    /* Disc compared with data */ /*7*/ typedef struct {                                                      /*7*/
    BYTE    Op_Code;           /* 0     */                            /*7*/
    BYTE    LUN;               /* 1     */                            /*7*/
    BYTE    Defect_List;       /* 2     */                            /*7*/
    BYTE    Zero[4];           /* 3 - 6 */                            /*7*/
    BYTE    Len[2];            /* 7 - 8 */                            /*7*/
    BYTE    Link;              /* 9     */                            /*7*/
} *Read_Defect_Cmd_Ptr;                                               /*7*/ define Read_Defect2_Manuf        0x10  /* Manufactures List */ /*7*/
define Read_Defect2_Grown        0x08  /* Grown List        */ /*7*/
define Read_Defect2_Block_Format 0x00  /* Block List Format */ /*7*/ typedef struct {                                                      /*7*/
    SHORT   Zero;                                                     /*7*/
    SHORT   Len;                                                      /*7*/
} Defect_List_Header_Type;                                            /*20*/ typedef struct {                                                      /*7*/
    Defect_List_Header_Type    Header;                                /*20*/
    LONG    Block_Addr[Max_Defect_Sectors];                           /*7*/
} Defect_List_Type, *Defect_List_Ptr;                                 /*7*/

/* SCSI Drive Status Definition */ define SCSI_Status_Check      0x02
define SCSI_Status_Busy       0x08
define SCSI_Status_Bits       0x1F /* extended sense */ typedef struct {                                                      
    BYTE    Error;             /* 0  Error Code            */ /*8*/
    BYTE    Segment;           /* 1  Segment Number        */ /*8*/
    BYTE    Sense_Key;         /* 2  Sense Key             */ /*8*/
    BYTE    Info [4];          /* 3-6 Information Bytes    */ /*8*/
    BYTE    Add_Sense_Len;     /* 7 Length of add sense    */ /*8*/
    BYTE    CInfo [4];         /* 8-11 Compare Info Bytes  */ /*8*/
    BYTE    Add_Sense_Code;    /* 12 Additional Sense Code */ /*8*/
    BYTE    Filler;            /* 13                       */ /*8*/
    BYTE    FRU;               /* 14 FRU Code              */ /*8*/
    BYTE    Bit_Pointer;       /* 15 Bit Pointer           */ /*8*/
    BYTE    Field_Pointer [2]; /* 16-17 Field Pointer      */ /*8*/
} Sense_Struct, *Sense_Ptr;                                    /*8*/

/* Extended Sense Bits */ define Sense0_Valid           0x80    /* Valid sense code */ /*8*/
define Sense0_Class           0x70    /* Ext error class  */ /*8*/
define Sense0_Code            0x0F    /* Ext error code   */ /*8*/ define Sense2_Sense_Key       0x0F    /* Sense key        */ /*8*/

/* Sense Key definition */ define Sense_OK          0x00  /* No sense          */
define Sense_Recovered   0x01  /* Recovered Error   */
#define Sense_Not_Ready   0x02  /* Not Ready         */
#define Sense_Medium_Err  0x03  /* Medium Error      */
#define Sense_HW_Err      0x04  /* Hardware Error    */
#define Sense_Ill_Req     0x05  /* Illegal Request   */
#define Sense_Unit_Atn    0x06  /* Unit Attention    */
#define Sense_Data_Prot   0x07  /* Data Protect      */
#define Sense_Aborted     0x08  /* Aborted Command   */
#define Sense_Overflow    0x0D  /* Volume Overflow   */
define Sense_Miscompare  0x0E  /* Data Miscompare   */        /*7*/ define Inq_Vendor_ID_Len  8                                   /*8*/
define Inq_Prod_ID_Len    8  /*********** drive bug */        /*8*/
define Inq_Rev_Len        4                                   /*8*/ typedef struct {                                               /*8*/
    BYTE       Dev_Type;           /* 00  00 */                /*8*/
    BYTE       Dev_Type_Qual;      /* 01  00 */                /*8*/
    BYTE       Vers;               /* 02  01 */                /*8*/
    BYTE       Format;             /* 03  01 */                /*8*/
    BYTE       Add_Len;            /* 04  0C */                /*8*/
    BYTE       Sense_Len;          /* 05  01 */                /*8*/
```

```
495        BYTE            filler;                    /* 06  00 */        /*8*/
496        BYTE            filler1;                   /* 07  00 */        /*8*/
497        BYTE            Vendor_ID [Inq_Vendor_ID_Len];  /* 08-15 */    /*8*/
498        BYTE            Prod_ID   [Inq_Prod_ID_Len];   /* 16-31 */    /*8*/
499        BYTE            Rev       [Inq_Rev_Len];       /* 32-35 */    /*20*/
500     } Inq_Type, *Inq_Ptr;                                              /*8*/
501                                                                        /*8*/
502     typedef struct {                                                   /*8*/
503        BYTE            filler;                                         /*8*/
504        BYTE            Medium;                                         /*8*/
505        BYTE            filler1;                                        /*8*/
506        BYTE            Block_Desc_Len;                                 /*8*/
507     } *Mode_List_Header_Ptr;                                           /*8*/
508                                                                        /*8*/
509     typedef struct {                                                   /*8*/
510        BYTE            Density;                                        /*8*/
511        BYTE            Block_No [3];                                   /*8*/
512        BYTE            filler;                                         /*8*/
513        BYTE            Block_Len [3];                                  /*8*/
514     } *Mode_Block_Desc_Ptr;                                            /*8*/
515                                                                        /*8*/
516     typedef struct {                                                   /*8*/
517        BYTE            Code;                                           /*8*/
518        BYTE            Len;                                            /*8*/
519     } *Mode_Page_Header_Ptr;                                           /*8*/
520                                                                        /*8*/
521     /* Pages are not guaranteed to be on word boundary */              /*8*/
522                                                                        /*8*/
523     typedef struct {                                                   /*8*/
524        BYTE            Code;                      /* 00  83 */        /*8*/
525        BYTE            Len;                       /* 01  16 */        /*8*/
526        BYTE            Tracks_Per_Zone [2];       /* 02  01 */        /*8*/
527        BYTE            Alt_Sectors_Per_Zone [2];  /* 04  01 */        /*8*/
528        BYTE            Alt_Tracks_Per_Zone [2];   /* 06  00 */        /*8*/
529        BYTE            Alt_Tracks_Per_Volume [2]; /* 08  03 */        /*8*/
530        BYTE            Sectors_Per_Track [2];     /* 0A    */        /*8*/
531        BYTE            Bytes_Per_Sector [2];      /* 0C    */        /*8*/
532        BYTE            Interleave [2];            /* 0E    */        /*8*/
533        BYTE            Track_Skew [2];            /* 10  00 */        /*8*/
534        BYTE            Cyl_Skew [2];              /* 12  00 */        /*8*/
535        BYTE            Byte20;                    /* 14  40 */        /*8*/
536        BYTE            filler [3];                /* 15-23 */         /*8*/
537     } *Mode_Dev_Format_Ptr;                                            /*8*/
538                                                                        /*8*/
539     typedef struct {                                                   /*8*/
540        BYTE            Code;                      /* 00  84 */        /*8*/
541        BYTE            Len;                       /* 01  12 */        /*8*/
542        BYTE            Cyl_No [3];                /* 02    */         /*8*/
543        BYTE            Head_No;                   /* 05    */         /*8*/
544        BYTE            Write_Precomp_Cyl[3];      /* 06  00 */        /*8*/
545        BYTE            Reduce_Cur_Cyl [3];        /* 09  00 */        /*8*/
546        BYTE            Step_Rate [2];             /* 0C  00 */        /*8*/
547        BYTE            Land_Zone_Cyl [3];         /* 0E  00 */        /*8*/
548        BYTE            filler [3];                /* 11  00 */        /*8*/
549     } *Mode_Drive_Geo_Ptr;                                             /*8*/
550                                                                        /*8*/
551     #define Mode_Page_Code         0x3F                                /*8A*/
552     #define Mode_Page_Current      0x00                                /*8*/
553     #define Mode_Page_Dev_Format   0x03                                /*8*/
554     #define Mode_Page_Drive_Geo    0x04                                /*8*/
555     #define Mode_Page_All          0x3F                                /*8*/
556     #define Max_Mode_Len           0x80                                /*8*/
557                                                                        /*8*/
558     /* Drive Identification */                                         /*5*/
559                                                                        /*5*/
560     #define Dr_Prod_No_Len     8                                       /*5*/
561     #define Dr_Rev_Len         4                                       /*5*/
562     #define Drive_ID_Len       0x20 /* length for Drive_ID parameter */ /*8*/
563                                                                        /*8*/
564     /* only the top have of the Drive ID is sent to the CPU */        /*8*/
565     /* the rest is for task information only               */         /*8*/
566                                                                        /*5*/
567     typedef struct {                                                   /*5*/
568        LONG            Last_Lgc_Sector_Addr;                           /*5*/
569        LONG            Last_CE_Lgc_Sector_Addr;                        /*5*/
570        SHORT           Lgc_Sectors_Per_Phy_Sector;                     /*5*/
571        SHORT           Phy_Sectors_Per_Track;                          /*5*/
572        SHORT           Spare_Phy_Sectors_Per_Cyl;                      /*5*/
573        SHORT           Heads_Per_Cyl;                                  /*5*/
574        LONG            Cyls;                                           /*5*/
575        char            Prod_No [Dr_Prod_No_Len];                       /*5*/
```

```
576         char        Rev       [Dr_Rev_Len];                    /*5*/
577         char        Vendor_ID [Inq_Vendor_ID_Len];              /*8*/
578         char        Prod_ID   [Inq_Prod_ID_Len];                /*8*/
579         SHORT       Block_Len;                                  /*8*/
579.1       BYTE        Prod_Index;                                 /*19*/
580     } Drive_ID_Struct, *Drive_ID_Ptr;                           /*8*/
581
582     typedef struct {                                            /*8*/
583         ADDRESS     Link;                                       /*8*/
584         MCB         Msg;                                        /*8*/
585     } Msg_Buf_Type, *Msg_Buf_Ptr;                               /*20*/
586
587     #define Port_Reply_Event         0x0001                     /*8*/
588     #define Timeout_Event            0x0800                     /*8*/
589
590     /* exception control block */
591
592     typedef struct {
593         BYTE        Retry_Status;
594         BYTE        PID;
595         LONG        Substatus;                                   /*4*/
596         BYTE        Retry_Count;
597         LONG        Lgc_Sector_Addr;
598         ADDRESS     Parm_Ptr;
599     } EXC, *EXC_Ptr;
600
601     /* Error Recovery Status */
602     /* The value must be in increasing severity */
603
604     #define ER_OK               0x00  /* No Error */
605     #define ER_Warn             0x01  /* Warning */
606     #define ER_Retry            0x02  /* Retriable */
607     #define ER_Recov            0x03  /* Recovered */
608     #define ER_Not_Recov        0x04  /* Not Recovered */
609
610     /* Extended Command Data Structure */
611
612     typedef struct {
613         BYTE        Cmd_Rsp_IOC;
614         BYTE        Data_IOC;
615         BYTE        Opcode;
616         BYTE        Common_Mod;
617         BYTE        Opcode_Mod;
618
619         SPC_DCB_Ptr SPC_DCB;
620         ADDRESS     Cmd_Buffer;
621         ADDRESS     Rsp_Buffer;
622         ADDRESS     Data_Buffer;
623         ADDRESS     Req_Buffer;                                  /*18*/
624         ADDRESS     Sense_Buffer;
625         SHORT       *Cur_Checksum_Array;
626
627         /* parameters */
628
629         SHORT       Lgc_Sector_Count;
630         LONG        Lgc_Sector_Addr;
631         LONG        Mem_Addr;
632         SHORT       Mem_Byte_Count;                              /*7*/
633         BYTE        Burst;                                       /*7*/
634         BYTE        Holdoff;                                     /*7*/
635         SHORT       Chnl_Mode;                                   /*7*/
636         BYTE        Ctrl_Rev [Ctrl_Rev_Len];                     /*7*/
637         BYTE        Ctrl_Ser_No [Ctrl_Ser_No_Len];               /*7*/
638
639         /* parameter flags */
640
641         BOOLEAN     Cmd_Lgc_Ext_Rcv;
642         BOOLEAN     Cmd_Phy_Ext_Rcv;
643         BOOLEAN     Checksum_Array_Rcv;
644         BOOLEAN     Ctrl_Mem_Ext_Rcv;
645         BOOLEAN     Chnl_Attr_Rcv;                               /*7*/
646         BOOLEAN     Ctrl_Ser_No_Rcv;
647         BOOLEAN     Ctrl_Rev_Rcv;
648         BOOLEAN     Test_Rcv;
649         BOOLEAN     Cmd_End_Rcv;
650
651         BOOLEAN     Req_Chnl_Attr;                               /*7*/
652         BOOLEAN     Req_Ctrl_ID;                                 /*7*/
653         BOOLEAN     Req_Drive_ID;                                /*7*/
654         BOOLEAN     Req_uCode_Ver;                               /*7*/
655
```

```
656         BOOLEAN     Rsp_Overflow;
657         INTEGER     Rsp_Len;                                        /*8A*/
658     } EXD_Struct, *EXD_Ptr;
659
660     typedef struct {
661         ADDRESS             MsgQ;                                   /*8*/
662         ADDRESS             MsgQ_Tail;                              /*8*/
663         ADDRESS             Free_MsgQ;                              /*8*/
664         ADDRESS             Free_MsgQ_Tail;                         /*8*/
665         BOOLEAN             MsgQ_Flag;                              /*8*/
666
667         BYTE                My_ID;
668         BYTE                EIO_Task_ID;
669         BYTE                Port_No;
670         BYTE                Cmd;
671         BYTE                Ctrl_Unit_Addr;
672         SHORT               LPRM;
673         SHORT               RIC;
674
675         SPC_DCB_Ptr         SPC_DCB;
676         ADDRESS             Cmd_Buffer;
677         ADDRESS             Rsp_Buffer;
678         EXD_Ptr             EXD;
679
680         BOOLEAN             Unit_Atn;
681         BOOLEAN             Port_Down [2];
682         BOOLEAN             Drive_ID_Valid;                         /*8*/
683         Drive_ID_Ptr        Drive_ID;                               /*8*/
684         Drive_ID_Struct     Drive_ID_Data;                          /*8*/
685
686     } GLB_Struct, *GLB_Ptr;
687
688     extern Ctrl_ID_Ptr      CTRL_ID_PTR;                            /*8*/
689     #define Ctrl_ID         CTRL_ID_PTR                             /*8*/
690
691     /* Product Number Table                                     */  /*8*/
692                                                                     /*8*/
693.1   /* add 1 to lengths to allow for null char */                   /*20*/
694                                                                     /*8*/
695     typedef struct {                                                /*8*/
696         BYTE        Vendor_ID [Inq_Vendor_ID_Len + 1];               /*20*/
697         BYTE        Prod_ID   [Inq_Prod_ID_Len   + 1];               /*20*/
698         BYTE        Prod_No   [Dr_Prod_No_Len    + 1];               /*20*/
699     } Prod_No_Entry_Type, *Prod_No_Entry_Ptr;                        /*8A*/

1      /*|------------------------------------------------------+*/
 2      /*|                                                      |*/
 3      /*|                      DISC TASK                       |*/
 4      /*|                         Main                         |*/
 5      /*+------------------------------------------------------+*/
 6
 7      /* Includes */
 8
 9      #include "krnldf.c"         /* Kernel definition           */
10      #include "portdf.c"         /* Port Task definition        */
11      #include "discrq.c"         /* Disc Request definition     */   /*18*/
12      #include "spcdf.c"          /* SPC driver definition       */
13      #include "ciddf.c"          /* Controller ID definition    */
14      #include "discdt.c"         /* Disc Data definition        */   /*18*/
15
16      /* external functions */
17
18      /* PROCEDURE WRITEE(Dbuf   : <BYTE by reference>;    Dest address  */
19      /*                  Data   : <BYTE by value> );      Data          */
20      /* write one byte to EEPROM. It does not wait.                     */
21
22      extern WRITEE ();                                               /*7*/
23
24      extern SHORT        Disc_Do_Wait ();
25      extern              Disc_Queue_Msg ();
26      extern BOOLEAN      Disc_Dequeue_Msg ();
27      extern SHORT        Disc_Receive_Msg ();
28      extern SHORT        Disc_Wait_Event ();
29      extern BOOLEAN      Disc_Get_Buffer ();
30      extern SHORT        Disc_RIC_Except ();
31      extern              Disc_Set_RIC ();
32      extern ADDRESS      Disc_Get_Rsp ();
33      extern              Disc_Log_Cmd_Except ();
34      extern              Disc_Log_Invalid_Parm ();                   /*8*/
35      extern              Disc_Log_Missing_Parm ();
36      extern              Disc_Log_Chnl_Attr ();
```

```
 37    extern                    Disc_Log_Ctrl_ID ();
 38    extern                    Disc_Log_Drive_ID ();
 39    extern                    Disc_Log_uCode_Ver ();
 40    extern                    Disc_Put_Rsp_End_Len();
 41    extern                    Disc_Log_Port_Except ();
 42    extern                    Disc_Log_Dr_Except ();
 43    extern                    Disc_Log_Except ();
 44    extern                    Disc_Log_Retry ();
 45    extern                    Disc_Log_Except_Parm ();
 46    extern                    Disc_Log_Sense ();                              /*8*/
 47    extern                    Disc_Log_PPC_State ();
 48    extern                    Disc_Log_DBDMA_State ();
 49    extern                    Disc_Log_SPC_State ();
 50    extern                    Disc_Code_Port_Reply ();
 51    extern BOOLEAN            Disc_PortIO ();
 52    extern                    Disc_Code_Driver_IReply ();
 53    extern BOOLEAN            Disc_Retry_IReply ();
 54    extern BOOLEAN            Disc_Do_Driver ();
 55    extern                    Disc_Code_Sense ();
 56    extern BOOLEAN            Disc_Request_Sense ();
 57    extern BOOLEAN            Disc_Retry_Sense ();
 58    extern BOOLEAN            Disc_DevIO ();
 59
 60    char DISC_VERS[] = ("T9999X00 05MAY86 0");
 61    /*                   1         2         3         */
 62    /*         012345678901234567890123456789012345678901    */
 63
 64    #define Prod_No_Table_Entry    1                                          /*20*/
 65    static Prod_No_Entry_Type  Prod_No_Table [Prod_No_Table_Entry] =          /*8A*/
 66
 67    /*          12345678   12345678901234567   12345678 */                    /*8A*/
 68    /*        (("MICROP  ", "1370            ", "4210    "));                 /*8A*/
 69          (("MICROP  ", "1375            ", "4210    "));                     /*21*/
 70                                                                              /*8*/
 71    GLB_Ptr       Disc_GLB;
 72
 73    /*+------------------------------------------------------------+*/
 74    /*|                      Cold_Load                             |*/
 75    /*|                                                            |*/
 76    /*|                                                            |*/
 77    /*+------------------------------------------------------------+*/
 78
 79    static BOOLEAN Cold_Load ()                                                /*8*/
 80    {                                                                          /*8*/
 81      EXD_Struct            EXD_Data;                                          /*8*/
 82      EXD_Ptr               EXD;                                               /*8*/
 83      RCN_CB                RCN;                                               /*8*/
 84      SPC_DCB_Ptr           SPC_DCB;                                           /*8*/
 85      SCSI_Cmd_Ptr          SCSI_Cmd;                                          /*7*/
 86      INTEGER               Data_Len;                                          /*8*/
 87      BOOLEAN               Return_Value;                                      /*8*/
 88                                                                               /*8*/
 89      /* check drive status */                                                 /*8*/
 90                                                                               /*8*/
 91      EXD = &EXD_Data;                                                         /*8*/
 92      Disc_GLB->EXD = EXD;                                                     /*8*/
 93      ZBUF8 (EXD, sizeof (*EXD));   /* init all var to zero */                 /*8*/
 94                                                                               /*8*/
 95      EXD->Cmd_Rsp_IOC = 0;         /* for RIC */                              /*8*/
 96      EXD->SPC_DCB = Disc_GLB->SPC_DCB;                                        /*8*/
 97      EXD->Rsp_Buffer = Disc_GLB->Rsp_Buffer; /* for errors */                 /*8*/
 98      EXD->Rsp_Len = 0;                                                        /*8*/
 99                                                                               /*8*/
100      /* get buffer space */                                                   /*8*/
101                                                                               /*8*/
102      Data_Len = Cold_Load_Sector_Count * Sector_Len;                          /*8*/
103      if (!Disc_Get_Buffer (Data_Len, &EXD->Data_Buffer))                      /*8*/
104         return (FALSE);                                                       /*8*/
105                                                                               /*8*/
106      /* form SCSI command */                                                  /*8*/
107                                                                               /*8*/
108      SPC_DCB = EXD->SPC_DCB;                                                  /*8*/
109      SCSI_Cmd = (SCSI_Cmd_Ptr) SPC_DCB->Command;                              /*8*/
110      SCSI_Cmd->Op_Code = SDOp_Read;                                           /*8*/
111      SCSI_Cmd->Byte1 = 0;                                                     /*8*/
112      SCSI_Cmd->Byte2 = 0;                                                     /*8*/
113      SCSI_Cmd->Byte3 = 0;                                                     /*8*/
114      SCSI_Cmd->Byte4 = Cold_Load_Sector_Count;                                /*8*/
115      SCSI_Cmd->Vendor_Unique = 0;                                             /*8*/
116      SPC_DCB->Cmd_Count = SCSI_Cmd_Len;                                       /*8*/
117                                                                               /*8*/
```

```
118     /* form SCSI SPC_DCB */                                              /*8*/
119                                                                         /*8*/
120       SPC_DCB->Req = SPC_Dr_Read;                                       /*8*/
121       SPC_DCB->Reqmod = 0;                                              /*8*/
122       SPC_DCB->Transfer_Buffer = EXD->Data_Buffer & 0x0000FFFF;         /*8*/
123       SPC_DCB->Transfer_Count = Data_Len;                               /*8*/
124                                                                         /*8*/
125     /* execute SCSI command */                                          /*8*/
126                                                                         /*8*/
127       if (!Disc_DevIO (SPC_DCB)) {                                      /*8*/
128          Return_Value = FALSE;                                          /*8*/
129          goto Cold_Load_End;                                            /*8*/
130       }                                                                 /*8*/
131                                                                         /*8*/
132     /********** verify checksum */                                      /*8*/
133                                                                         /*8*/
134     /* write data to Port */                                            /*8*/
135                                                                         /*8*/
136       RCN.RAC = Disc_GLB->Ctrl_Unit_Addr;                               /*8*/
137       RCN.Direction = RCN_Write_Dir;                                    /*8*/
138       RCN.Buffer = EXD->Data_Buffer;                                    /*8*/
139       RCN.Count = Data_Len;                                             /*8*/
140       RCN.Reqmod = RCN_Skip_Xsum;                                       /*19*/
141                                                                         /*8*/
142       if (!Disc_PortIO (MT_Reconnect_Req, &RCN)) {                      /*8*/
143          Return_Value = FALSE;                                          /*8*/
144          goto Cold_Load_End;                                            /*8*/
145       }                                                                 /*8*/
146                                                                         /*8*/
147       Return_Value = TRUE;                                              /*8*/
148                                                                         /*8*/
149     Cold_Load_End:                                                      /*8*/
150       XPUTSPACE (EXD->Data_Buffer);                                     /*8*/
151       return (Return_Value);                                            /*8*/
152                                                                         /*8*/
153     } /* Cold_Load */                                                   /*8*/
154
155     /*+-----------------------------------------------------+*/
156     /*|                    Do_Boot_ID                       |*/
157     /*|                                                     |*/
158     /*|                                                     |*/
159     /*+-----------------------------------------------------+*/
160
161     static Do_Boot_ID ()                                                /*5*/
162     {                                                                   /*5*/
163       Disc_GLB->RIC = Boot_ID;                                          /*5*/
164     } /* Do_Boot_ID */                                                  /*5*/
165
166     /*+-----------------------------------------------------+*/
167     /*|                  RESET_UNIT_PROC                    |*/
168     /*|                                                     |*/
169     /*|                                                     |*/
170     /*+-----------------------------------------------------+*/
171
172     static Do_Reset_Unit ()
173     {
174     /* check drive status */
175     } /* Do_Reset_Unit */
176
177     /*+-----------------------------------------------------+*/
178     /*|                   Cmd_Parm_Proc                     |*/
179     /*|                                                     |*/
180     /*|                                                     |*/
181     /*+-----------------------------------------------------+*/
182
183     /* for performance read and write parameter are treated       */ /*19*/
184     /* separately.  A FALSE does not necessarily mean error.      */ /*19*/
185     /* It just mean that it must be handled by the more general   */ /*19*/
186     /* Cmd_Parm_Proc.                                             */ /*19*/
187
188     static BOOLEAN Read_Parm_Proc (EXD)                                /*19*/
189     EXD_Ptr        EXD;                                                /*19*/
190     {                                                                  /*19*/
191       Cmd_Pkt_Header_Ptr Cmd_Pkt_Header;                               /*19*/
192       Cmd_Lgc_Ext_Ptr    Cmd_Lgc_Ext;                                  /*19*/
193                                                                        /*19*/
194       Cmd_Pkt_Header = (Cmd_Pkt_Header_Ptr) EXD->Cmd_Buffer;           /*19*/
195       if (Cmd_Pkt_Header->Pkt_Len != Read_Pkt_Len)                     /*19*/
196          return (FALSE);                                               /*19*/
197       Cmd_Lgc_Ext = (Cmd_Lgc_Ext_Ptr) &Cmd_Pkt_Header->Parm;           /*19*/
198       if (Cmd_Lgc_Ext->PID != Cmd_Lgc_Ext_PID)                         /*19*/
```

```
199             return (FALSE);                                                  /*19*/
200                                                                              /*19*/
201         EXD->Cmd_Lgc_Ext_Rcv = TRUE;                                         /*19*/
202         EXD->Lgc_Sector_Count = Cmd_Lgc_Ext->Lgc_Sector_Count;               /*19*/
203         if (EXD->Lgc_Sector_Count > Max_Sector_Count)                        /*19*/
204             return (FALSE);                                                  /*19*/
205         EXD->Lgc_Sector_Addr = Cmd_Lgc_Ext->Lgc_Sector_Addr;                 /*19*/
205.001
205.01      /********** check end address */
205.1
206         if (EXD->Lgc_Sector_Addr > Max_Sector_Addr)                          /*19*/
207             return (FALSE);                                                  /*19*/
208                                                                              /*19*/
209         return (TRUE);                                                       /*19*/
210     } /* Read_Parm_Proc */                                                   /*19*/
211                                                                              /*19*/
212     static BOOLEAN Write_Parm_Proc (EXD)                                     /*19*/
213     EXD_Ptr     EXD;                                                         /*19*/
214     {                                                                        /*19*/
215         Cmd_Pkt_Header_Ptr Cmd_Pkt_Header;                                   /*19*/
216         Cmd_Lgc_Ext_Ptr    Cmd_Lgc_Ext;                                      /*19*/
217         Parm_Header_Ptr    Checksum_Parm;                                    /*19*/
218                                                                              /*19*/
219         Cmd_Pkt_Header = (Cmd_Pkt_Header_Ptr) EXD->Cmd_Buffer;               /*19*/
220         Cmd_Lgc_Ext = (Cmd_Lgc_Ext_Ptr) &Cmd_Pkt_Header->Parm;               /*19*/
221         if (Cmd_Lgc_Ext->PID != Cmd_Lgc_Ext_PID)                             /*19*/
222             return (FALSE);                                                  /*19*/
223                                                                              /*19*/
224         EXD->Cmd_Lgc_Ext_Rcv = TRUE;                                         /*19*/
225         EXD->Lgc_Sector_Count = Cmd_Lgc_Ext->Lgc_Sector_Count;               /*19*/
226         if (EXD->Lgc_Sector_Count > Max_Sector_Count)                        /*19*/
227             return (FALSE);                                                  /*19*/
227.01
227.1       /********** check end address */
227.2
228         EXD->Lgc_Sector_Addr = Cmd_Lgc_Ext->Lgc_Sector_Addr;                 /*19*/
229         if (EXD->Lgc_Sector_Addr > Max_Sector_Addr)                          /*19*/
230             return (FALSE);                                                  /*19*/
231                                                                              /*19*/
232         Checksum_Parm = (Parm_Header_Ptr) ++Cmd_Lgc_Ext;                     /*19*/
233         if (Checksum_Parm->PID != Checksum_Array_PID)                        /*19*/
234             return (FALSE);                                                  /*19*/
235         if (Checksum_Parm->Len != ((EXD->Lgc_Sector_Count * 2) + 1))         /*19*/
236             return (FALSE);                                                  /*19*/
237         EXD->Cur_Checksum_Array = (SHORT *) &Checksum_Parm->Data;            /*19*/
238                                                                              /*19*/
239         if (Cmd_Pkt_Header->Pkt_Len != (Write_Pkt_Len + Checksum_Parm->Len + 1))
240             return (FALSE);                                                  /*19*/
241                                                                              /*19*/
242         return (TRUE);                                                       /*19*/
243     } /* Write_Parm_Proc */                                                  /*19*/
244
245     static Cmd_Parm_Proc (EXD)
246     EXD_Ptr     EXD;
247
248     /* scan parameters, checking for validity of length, id code, and content. */
249     /* if valid parameter received, load the appropriate parameter and variable. */
250     /* all flags are initialize to zero or FALSE                               */
251
252     {
253         Cmd_Pkt_Header_Ptr Cmd_Pkt_Header;                                   /*7*/
254         BYTE               *Cur_Cmd_Parm;
255         BYTE               Cur_Parm_Len;
256         BYTE               Cur_Parm_ID;
257         BYTE               Req_Parm_No;                                      /*7*/
258         BYTE               *Req_Parm;                                        /*7*/
259         Cmd_Lgc_Ext_Ptr    Cmd_Lgc_Ext;
260         Ctrl_Mem_Ext_Ptr   Ctrl_Mem_Ext;
261         Chnl_Attr_Ptr      Chnl_Attr;
262         Parm_Header_Ptr    Parm;
263         BYTE               *Cmd_Pkt_End;
264         INTEGER            I;
265
266         Cmd_Pkt_Header = (Cmd_Pkt_Header_Ptr) EXD->Cmd_Buffer;
267         Cur_Cmd_Parm = &Cmd_Pkt_Header->Parm;
268         Cmd_Pkt_End = ((BYTE *) Cmd_Pkt_Header) + Cmd_Pkt_Header->Pkt_Len + 2;
269
270         while (Cur_Cmd_Parm < Cmd_Pkt_End) {
271
272             Cur_Parm_Len = *Cur_Cmd_Parm;
273             if (Cur_Parm_Len != 0) {
274                 Cur_Parm_ID = *(Cur_Cmd_Parm + 1);
```

```
275             switch (Cur_Parm_ID) {
276
277                 case NOP_PID:
278                     break;
279                 case Cmd_Lgc_Ext_PID:
280                     EXD->Cmd_Lgc_Ext_Rcv = TRUE;
281                     Cmd_Lgc_Ext = (Cmd_Lgc_Ext_Ptr) Cur_Cmd_Parm;
282                     EXD->Lgc_Sector_Count = Cmd_Lgc_Ext->Lgc_Sector_Count;
283                     if (EXD->Lgc_Sector_Count > Max_Sector_Count) {     /*8A*/
284                         Disc_Log_Cmd_Except (CmdSa_Invalid_Ext);        /*8*/
285                         Disc_Log_Invalid_Parm (Cmd_Pkt_Header,          /*8*/
286                                     Cmd_Lgc_Ext,
287                                     &Cmd_Lgc_Ext->Lgc_Sector_Count,
288                                     sizeof (Cmd_Lgc_Ext->Lgc_Sector_Count));
289                     }                                                   /*8A*/
290                     EXD->Lgc_Sector_Addr = Cmd_Lgc_Ext->Lgc_Sector_Addr;
291
291.1                   /*********** check end address */
291.2
291.3                   if (EXD->Lgc_Sector_Addr > Max_Sector_Addr) {
292                         Disc_Log_Cmd_Except (CmdSa_Invalid_Ext);        /*8*/
293                         Disc_Log_Invalid_Parm (Cmd_Pkt_Header,          /*8*/
294                                     Cmd_Lgc_Ext,
295                                     &Cmd_Lgc_Ext->Lgc_Sector_Addr,
296                                     sizeof (Cmd_Lgc_Ext->Lgc_Sector_Addr));
297                     }
298                     /********** check parameters */
299                     break;
300                 case Request_Parm_PID:
301                     Parm = (Parm_Header_Ptr) Cur_Cmd_Parm;              /*8*/
302                     Req_Parm_No = Parm->Len - 1;                        /*8*/
303                     if (Req_Parm_No) {                                  /*7*/
304                         Req_Parm = &Parm->Data;                         /*7*/
305                         for (I = 0; I < Req_Parm_No; I++) {             /*7*/
306                             switch (*Req_Parm) {                        /*7*/
307                                 case Chnl_Attr_PID:                     /*7*/
308                                     EXD->Req_Chnl_Attr = TRUE;          /*7*/
309                                     break;                              /*7*/
310                                 case Ctrl_ID_PID:                       /*7*/
311                                     EXD->Req_Ctrl_ID = TRUE;            /*7*/
312                                     break;                              /*7*/
313                                 case Drive_ID_PID:                      /*7*/
314                                     EXD->Req_Drive_ID = TRUE;           /*7*/
315                                     break;                              /*7*/
316                                 case uCode_Ver_PID:                     /*7*/
317                                     EXD->Req_uCode_Ver = TRUE;          /*7*/
318                                     break;                              /*7*/
319                                 default:                                /*8*/
320                                     Disc_Log_Invalid_Parm (Cmd_Pkt_Header, /*8*/
321                                                 Parm,                   /*8*/
322                                                 Req_Parm,               /*8*/
323                                                 1);                     /*8*/
324                                     break;                              /*8*/
325                             } /* end switch (Req_Parm) */               /*7*/
326                             Req_Parm++;                                 /*8*/
327                         } /* end for Req_Parm_No loop */                /*7*/
328                     }                                                   /*7*/
329                     else {                                              /*7*/
330                         EXD->Req_Chnl_Attr = TRUE;                      /*7*/
331                         EXD->Req_Ctrl_ID = TRUE;                        /*7*/
332                         EXD->Req_Drive_ID = TRUE;                       /*7*/
333                         EXD->Req_uCode_Ver = TRUE;                      /*7*/
334                     }                                                   /*7*/
335                     /********** check parameters */
336                     break;
337                 case Checksum_Array_PID:
338                     EXD->Checksum_Array_Rcv = TRUE;
339                     Parm = (Parm_Header_Ptr) Cur_Cmd_Parm;              /*19*/
340                     if (Parm->Len != ((EXD->Lgc_Sector_Count * 2) + 1)) /*19*/
341                         Disc_Log_Invalid_Parm (Cmd_Pkt_Header,          /*19*/
342                                     Parm,                               /*19*/
343                                     Parm);                              /*19*/
344                     EXD->Cur_Checksum_Array = (SHORT *) &Parm->Data;    /*19*/
345                     break;
346                 case Ctrl_Mem_Ext_PID:
347                     EXD->Ctrl_Mem_Ext_Rcv = TRUE;
348                     Ctrl_Mem_Ext = (Ctrl_Mem_Ext_Ptr) Cur_Cmd_Parm;     /*8*/
349                     EXD->Mem_Addr = Ctrl_Mem_Ext->Mem_Addr;
350                     EXD->Mem_Byte_Count = Ctrl_Mem_Ext->Mem_Byte_Count;
351                     /********** check parameters */
352                     break;
```

```
353                    case Chnl_Attr_PID:
354                        EXD->Chnl_Attr_Rcv = TRUE;
355                        Chnl_Attr = (Chnl_Attr_Ptr) Cur_Cmd_Parm;            /*8*/
356                        EXD->Burst = Chnl_Attr->Burst;                       /*7*/
357                        EXD->Holdoff = Chnl_Attr->Holdoff;                   /*7*/
358                        EXD->Chnl_Mode = Chnl_Attr->Mode;                    /*7*/
359                        /*********** check parameters */
360                        break;
361                    case Ctrl_Ser_No_PID:
362                        EXD->Ctrl_Ser_No_Rcv = TRUE;
363                        Parm = (Parm_Header_Ptr) Cur_Cmd_Parm;               /*8*/
364                        MOVEB (&Parm->Data, &EXD->Ctrl_Ser_No, Ctrl_Ser_No_Len); /*7*/
365                        /*********** check parameters */
366                        break;
367                    case Ctrl_Rev_PID:
368                        EXD->Ctrl_Rev_Rcv = TRUE;
369                        Parm = (Parm_Header_Ptr) Cur_Cmd_Parm;               /*8*/
370                        MOVEB (&Parm->Data, &EXD->Ctrl_Rev, Ctrl_Rev_Len); /*7*/
371                        break;
372                    case Test_PID:
373                        EXD->Test_Rcv = TRUE;
374                        /*********** check parameters */
375                        break;
376                    case Cmd_End_PID:
377                        EXD->Cmd_End_Rcv = TRUE;
378                        if ((Cur_Cmd_Parm + Cur_Parm_Len + 1) != Cmd_Pkt_End)
379                            Disc_Log_Cmd_Except (CmdSs_Cmd_End_Not_L  1);
380                        break;
381                    case Cmd_Phy_Ext_PID:
382                    default:
383                        Disc_Log_Invalid_Parm (Cmd_Pkt_Header,               /*8*/
384                                               Cur_Cmd_Parm,
385                                               Cur_Cmd_Parm,
386                                               8);
387                        break;
388
389            } /* End switch (Cur_Parm_ID) */
390
391         } /* end if Len != 0 */
392
393         /* move pointer */                                                  /*7*/
394
395         Cur_Cmd_Parm = Cur_Cmd_Parm + Cur_Parm_Len + 1;                     /*7*/
396
397     } /* end while (Cur_Cmd_Parm < Cmd_Pkt_End) */
398
399
400     /* check for Command End parameter */
401
402     if (!EXD->Cmd_End_Rcv)
403         Disc_Log_Missing_Parm (Cmd_End_PID);
404
405 } /* Cmd_Parm_Proc */
406
407 static BOOLEAN Write_EEPROM (Data, EEPROM, Count)                           /*7*/
408 BYTE        *Data;                                                          /*7*/
409 BYTE        *EEPROM;                                                        /*7*/
410 int         Count;                                                          /*7*/
411 {                                                                           /*7*/
412     INTEGER     I;                                                          /*7*/
413                                                                             /*7*/
414     for (I = 0; I < Count; I++) {                                           /*7*/
415        WRITEE (EEPROM, *Data);                                              /*7*/
416        while (*EEPROM != *Data) {};   /*********** loop */                  /*7*/
417                                       /*********** insert delay */         /*7*/
418        EEPROM++;                                                            /*7*/
419        Data++;                                                              /*7*/
420     }                                                                       /*7*/
421     return (TRUE);                                                          /*7*/
422 } /* Write_EEPROM */                                                        /*7*/
423
424 /*+-----------------------------------------------------------+*/
425 /*|                        Write_Mem                          |*/
426 /*|                                                           |*/
427 /*|                                                           |*/
428 /*+-----------------------------------------------------------+*/
429
430 static BOOLEAN Write_Mem (EXD)
431 EXD_Ptr     EXD;
432 {                                                                           /*7*/
433     RCN_CB          RCN;                                                    /*7*/
```

```
434         Mem_Data_Ptr    Mem_Data;                                      /*7*/
435         SHORT           Data_Len;                                      /*7*/
436         BOOLEAN         Return_Value;                                  /*7*/
437         SHORT           *Checksum_Ptr;                                 /*7*/
438         SHORT           Calc_Checksum;                                 /*7*/
439                                                                        /*7*/
440      /* check parameter */                                             /*7*/
441                                                                        /*7*/
442         if (!EXD->Ctrl_Mem_Ext_Rcv) {                                  /*7*/
443             Disc_Log_Missing_Parm (Ctrl_Mem_Ext_PID);                  /*7*/
444             return (FALSE);                                            /*7*/
445         }                                                              /*7*/
446                                                                        /*7*/
447      /*********** check modifier */                                    /*7*/
448      /* get space */                                                   /*7*/
449                                                                        /*7*/
451         Data_Len = EXD->Mem_Byte_Count + sizeof (Mem_Data_Header_Type) + 2;/*20*/
452         if (!Disc_Get_Buffer (Data_Len, &EXD->Data_Buffer))            /*7*/
453             return (FALSE);                                            /*7*/
454         Mem_Data = (Mem_Data_Ptr) EXD->Data_Buffer;                    /*7*/
455                                                                        /*7*/
456      /* read data from Port */                                         /*7*/
457                                                                        /*7*/
458         RCN.RAC = EXD->Data_IOC;                                       /*7*/
459         RCN.Direction = RCN_Read_Dir;                                  /*7*/
460         RCN.Buffer = EXD->Data_Buffer;                                 /*7*/
461         RCN.Count = Data_Len;                                          /*7*/
462         RCN.Reqmod = 0;                                                /*7*/
463                                                                        /*7*/
464         if (!Disc_PortIO (MT_Reconnect_Req, &RCN)) {                   /*7*/
465             Return_Value = FALSE;                                      /*7*/
466             goto Write_Mem_End;                                        /*7*/
467         }                                                              /*7*/
468                                                                        /*7*/
469      /* calculate checksum */                                          /*7*/
470                                                                        /*7*/
471         Checksum_Ptr = (SHORT *) EXD->Data_Buffer;                     /*7*/
472         Calc_Checksum = CHECKSUM (Data_Len - 2, &Checksum_Ptr);        /*7*/
473         if (*Checksum_Ptr != Calc_Checksum) {                          /*7*/
474             Disc_Log_Cmd_Except (CmdSs_Mem_Checksum_Err);              /*7*/
475             Return_Value = FALSE;                                      /*7*/
476             goto Write_Mem_End;                                        /*7*/
477         }                                                              /*7*/
478                                                                        /*7*/
479      /********* check Actual_Count */                                  /*7*/
480                                                                        /*7*/
481         if (!(EXD->Opcode_Mod & Write_Mem_Boot_Mod))                   /*7*/
482             MOVEW (&Mem_Data->Data[0], EXD->Mem_Addr,                  /*7*/
483                                       EXD->Mem_Byte_Count / 2);        /*7*/
484      /************** put EEROM checksum */                             /*7*/
485         else                                                           /*7*/
486             Write_EEPROM (&Mem_Data->Data[0], EXD->Mem_Addr,           /*7*/
487                                       EXD->Mem_Byte_Count);            /*7*/
488         Return_Value = TRUE;                                           /*7*/
489                                                                        /*7*/
490     Write_Mem_End:                                                     /*7*/
491         XPUTSPACE (EXD->Data_Buffer);                                  /*7*/
492         return (Return_Value);                                         /*7*/
493                                                                        /*7*/
494     } /* Write_Mem */                                                  /*7*/
495
496     /*+----------------------------------------------------------+*/
497     /*|                      Read_Mem                            |*/
498     /*|                                                          |*/
499     /*|                                                          |*/
500     /*+----------------------------------------------------------+*/
501
502     static BOOLEAN Read_Mem (EXD)                                      /*7*/
503     EXD_Ptr    EXD;                                                    /*7*/
504     {                                                                  /*7*/
505         RCN_CB          RCN;                                           /*7*/
506         Mem_Data_Ptr    Mem_Data;                                      /*7*/
507         BOOLEAN         Return_Value;                                  /*7*/
508         SHORT           *Checksum_Ptr;                                 /*7*/
509         SHORT           Calc_Checksum;                                 /*7*/
510         INTEGER         Data_Len;                                      /*7*/
511                                                                        /*7*/
512      /* check parameter */                                             /*7*/
513                                                                        /*7*/
514         if (!EXD->Ctrl_Mem_Ext_Rcv) {                                  /*7*/
515             Disc_Log_Missing_Parm (Ctrl_Mem_Ext_PID);                  /*7*/
516             return (FALSE);                                            /*7*/
```

```
517        }                                                              /*7*/
518                                                                       /*7*/
519        /* check modifier */                                            /*7*/
520                                                                       /*7*/
521        if (EXD->Opcode_Mod) {                                          /*7*/
522            Disc_Log_Cmd_Except (CmdSs_Invalid_Opcode_Mod);             /*7*/
523            return (FALSE);                                             /*7*/
524        }                                                               /*7*/
525                                                                        /*7*/
526        /* get space */                                                 /*7*/
527                                                                        /*7*/
528        Data_Len = EXD->Mem_Byte_Count + sizeof (Mem_Data_Header_Type) + 2;/*20*/
529        if (!Disc_Get_Buffer (Data_Len, &EXD->Data_Buffer))             /*7*/
530            return (FALSE);                                             /*7*/
531        Mem_Data = (Mem_Data_Ptr) EXD->Data_Buffer;                     /*7*/
532                                                                        /*7*/
533        /* form Mem_Data_Header */                                      /*7*/
534                                                                        /*7*/
535        Mem_Data->Header.Addr = EXD->Mem_Addr;                          /*7*/
536        Mem_Data->Header.filler = 0;                                    /*7*/
537        Mem_Data->Header.Byte_Count = EXD->Mem_Byte_Count;              /*7*/
538                                                                        /*7*/
539        /* move data */                                                 /*7*/
540                                                                        /*7*/
541        MOVEW (EXD->Mem_Addr, &Mem_Data->Data[0], EXD->Mem_Byte_Count / 2);/*7*/
542                                                                        /*7*/
543        /* calculate checksum in the main memory */                     /*7*/
544                                                                        /*7*/
545        Checksum_Ptr = (SHORT *) EXD->Data_Buffer;                      /*7*/
546        Calc_Checksum = CHECKSUM (Data_Len - 2, &Checksum_Ptr);         /*7*/
547        *Checksum_Ptr = Calc_Checksum;                                  /*7*/
548                                                                        /*7*/
549        /* read write data to Port */                                   /*7*/
550                                                                        /*7*/
551        RCN.RAC = EXD->Data_IOC;                                        /*7*/
552        RCN.Direction = RCN_Write_Dir;                                  /*7*/
553        RCN.Buffer = EXD->Data_Buffer;                                  /*7*/
554        RCN.Count = Data_Len;                                           /*7*/
555        RCN.Reqmod = 0;                                                 /*7*/
556                                                                        /*7*/
557        Return_Value = Disc_PortIO (MT_Reconnect_Req, &RCN);            /*7*/
558                                                                        /*7*/
559    /********* check Actual_Count */                                    /*7*/
560                                                                        /*7*/
561    Read_Mem_End:                                                       /*7*/
562        XPUTSPACE (EXD->Data_Buffer);                                   /*7*/
563        return (Return_Value);                                          /*7*/
564                                                                        /*7*/
565    } /* Read_Mem */                                                    /*7*/
566
567    static BOOLEAN Inquiry (EXD)                                        /*8*/
568    EXD_Ptr      EXD;                                                   /*8*/
569    {                                                                   /*8*/
570        SPC_DCB_Ptr        SPC_DCB;                                     /*8*/
571        SCSI_Cmd_Ptr       SCSI_Cmd;                                    /*8*/
572        Drive_ID_Ptr       Drive_ID;                                    /*8*/
573        Inq_Ptr            Inq;                                         /*8*/
574        Prod_No_Entry_Ptr  Prod_No_Entry;                               /*8A*/
575        ADDRESS            Data_Buffer;                                 /*8*/
576        BOOLEAN            Return_Value;                                /*8*/
577        BOOLEAN            Prod_No_Valid;                               /*8*/
578        INTEGER            I;                                           /*8*/
579                                                                        /*8*/
580        /* fill Drive_ID with defaults */                               /*8*/
581                                                                        /*8*/
582        Drive_ID = Disc_GLB->Drive_ID;                                  /*8*/
583        for (I= 0; I < Dr_Prod_No_Len ; I++)                            /*8*/
584            Drive_ID->Prod_No [I] = 0xFF;                               /*8*/
585        for (I= 0; I < Dr_Rev_Len ; I++)                                /*8*/
586            Drive_ID->Rev [I] = 0xFF;                                   /*8*/
587        for (I= 0; I < Inq_Vendor_ID_Len ; I++)                         /*8*/
588            Drive_ID->Vendor_ID [I] = ' ';                              /*8*/
589        for (I= 0; I < Inq_Prod_ID_Len ; I++)                           /*8*/
590            Drive_ID->Prod_ID [I] = ' ';                                /*8*/
591                                                                        /*8*/
592        /* get buffer space */                                          /*8*/
593        /* store in EXD for trace */                                    /*8*/
594                                                                        /*8*/
595        if (!Disc_Get_Buffer (sizeof (Inq_Type), &Data_Buffer))         /*20*/
596            return (FALSE);                                             /*8*/
597        EXD->Data_Buffer = Data_Buffer;                                 /*8*/
```

```
598         Inq = (Inq_Ptr) Data_Buffer;                                      /*8A*/
599                                                                           /*8*/
600     /* form SCSI command */                                               /*8*/
601                                                                           /*8*/
602         SPC_DCB = EXD->SPC_DCB;                                           /*8*/
603         SCSI_Cmd = (SCSI_Cmd_Ptr) SPC_DCB->Command;                       /*8*/
604         SCSI_Cmd->Op_Code = SDOp_Inquiry;                                 /*8*/
605         SCSI_Cmd->Byte1   = 0;                                            /*8*/
606         SCSI_Cmd->Byte2   = 0;                                            /*8*/
607         SCSI_Cmd->Byte3   = 0;                                            /*8*/
608         SCSI_Cmd->Byte4   = sizeof (*Inq);                                /*8*/
609         SCSI_Cmd->Vendor_Unique = 0;                                      /*8*/
610         SPC_DCB->Cmd_Count = sizeof (*SCSI_Cmd);                          /*8*/
611                                                                           /*8*/
612     /* form SCSI SPC_DCB */                                               /*8*/
613                                                                           /*8*/
614         SPC_DCB->Req = SPC_Dr_Read;                                       /*8*/
615         SPC_DCB->Reqmod = 0;                                              /*8*/
616         SPC_DCB->Transfer_Buffer = Data_Buffer & 0x0000FFFF;              /*8*/
617         SPC_DCB->Transfer_Count = sizeof (*Inq);                          /*8*/
618                                                                           /*8*/
619     /* execute SCSI command */                                            /*8*/
620                                                                           /*8*/
621         if (!Disc_Do_Driver (SPC_DCB, TRUE)) {                            /*8*/
622             Return_Value = FALSE;                                         /*8*/
623             goto Inquiry_End;                                             /*8*/
624         }                                                                 /*8*/
625                                                                           /*8*/
626     /********** check Actual_Count */                                     /*8*/
627                                                                           /*8*/
628     /* look up Product Number from Table */                               /*8*/
629                                                                           /*8*/
630         Prod_No_Valid = FALSE;                                            /*8*/
631         Prod_No_Entry = &Prod_No_Table [0];                               /*8A*/
632         for (I= 0; I < Prod_No_Table_Entry ; I++) {                       /*8*/
633             if (COMPB (&Inq->Vendor_ID, &Prod_No_Entry->Vendor_ID,        /*8A*/
634                                        Inq_Vendor_ID_Len) &&              /*8*/
635                 COMPB (&Inq->Prod_ID, &Prod_No_Entry->Prod_ID,            /*8A*/
636                                      Inq_Prod_ID_Len)) {                  /*8*/
637                 Prod_No_Valid = TRUE;                                     /*8*/
638                 Drive_ID->Prod_Index = I;                                 /*19*/
639                 MOVEB (&Prod_No_Entry->Prod_No, &Drive_ID->Prod_No,       /*8*/
640                                                Dr_Prod_No_Len);           /*8*/
641             }                                                             /*8*/
642             Prod_No_Entry++;                                              /*8A*/
643         }                                                                 /*8A*/
644                                                                           /*8*/
645         MOVEB (&Inq->Vendor_ID, &Drive_ID->Vendor_ID, Inq_Vendor_ID_Len);
646         MOVEB (&Inq->Prod_ID, &Drive_ID->Prod_ID, Inq_Prod_ID_Len);       /*8*/
647         MOVEB (&Inq->Rev, &Drive_ID->Rev, Dr_Rev_Len);                    /*8*/
648         Return_Value = Prod_No_Valid;                                     /*8*/
649                                                                           /*8*/
650     Inquiry_End:                                                          /*8*/
651         XPUTSPACE (Data_Buffer);                                          /*8*/
652         return (Return_Value);                                            /*8*/
653                                                                           /*8*/
654     } /* Inquiry */                                                       /*8*/
655                                                                           /*8*/
656     static BOOLEAN Mode_Sense (EXD)                                       /*8*/
657     EXD_Ptr         EXD;                                                  /*8*/
658     {                                                                     /*8*/
659         SPC_DCB_Ptr         SPC_DCB;                                      /*8*/
660         SCSI_Cmd_Ptr        SCSI_Cmd;                                     /*8*/
661         ADDRESS             Data_Buffer;                                  /*8*/
662         ADDRESS             Cur_Ptr;                                      /*8*/
663         ADDRESS             End_Ptr;                                      /*8A*/
664         Drive_ID_Ptr        Drive_ID;                                     /*8*/
665         BOOLEAN             Return_Value;                                 /*8*/
666         BOOLEAN             Block_Desc_Rcvd;                              /*8*/
667         BOOLEAN             Dev_Format_Rcvd;                              /*8*/
668         BOOLEAN             Drive_Geo_Rcvd;                               /*8*/
669         Mode_List_Header_Ptr List_Header;                                 /*8*/
670         Mode_Block_Desc_Ptr  Block_Desc;                                  /*8*/
671         Mode_Page_Header_Ptr Page_Header;                                 /*8*/
672         Mode_Dev_Format_Ptr  Dev_Format;                                  /*8*/
673         Mode_Drive_Geo_Ptr   Drive_Geo;                                   /*8*/
674         SHORT               Tracks_Per_Zone;                              /*8*/
675         SHORT               Alt_Sectors_Per_Zone;                         /*8*/
676                                                                           /*8*/
677     /* fill Drive_ID with defaults */                                     /*8*/
678                                                                           /*8*/
```

```
679       Drive_ID = Disc_GLB->Drive_ID;                                      /*8*/
680       Drive_ID->Last_Lgc_Sector_Addr = -1;                                /*8*/
681       Drive_ID->Last_CE_Lgc_Sector_Addr = -1;                             /*8*/
682       Drive_ID->Lgc_Sectors_Per_Phy_Sector = -1;                          /*8*/
683       Drive_ID->Phy_Sectors_Per_Track = -1;                               /*8*/
684       Drive_ID->Spare_Phy_Sectors_Per_Cyl = -1;                           /*8*/
685       Drive_ID->Heads_Per_Cyl = -1;                                       /*8*/
686       Drive_ID->Cyls = -1;                                                /*8*/
687       Tracks_Per_Zone = 0;                                                /*8*/
688       Alt_Sectors_Per_Zone = 0;                                           /*8*/
689                                                                           /*8*/
690       /* form SCSI command */                                             /*8*/
691                                                                           /*8*/
692       SPC_DCB = EXD->SPC_DCB;                                             /*8*/
693       SCSI_Cmd = (SCSI_Cmd_Ptr) SPC_DCB->Command;                         /*8*/
694       SCSI_Cmd->Op_Code = SOp_Mode_Sense;                                 /*8*/
695       SCSI_Cmd->Byte1   = 0;                                              /*8*/
696       SCSI_Cmd->Byte2   = Mode_Page_Current + Mode_Page_All;              /*8*/
697       SCSI_Cmd->Byte3   = 0;                                              /*8*/
698       SCSI_Cmd->Byte4   = Max_Mode_Len;                                   /*8*/
699       SCSI_Cmd->Vendor_Unique = 0;                                        /*8*/
700       SPC_DCB->Cmd_Count = sizeof (*SCSI_Cmd);                            /*8*/
701                                                                           /*8*/
702       /* get buffer space */                                              /*8*/
703       /* store in EXD for trace */                                        /*8*/
704                                                                           /*8*/
705       if (!Disc_Get_Buffer (Max_Mode_Len, &Data_Buffer))                  /*8*/
706          return (FALSE);                                                  /*8*/
707       EXD->Data_Buffer = Data_Buffer;                                     /*8*/
708                                                                           /*8*/
709       /* form SCSI SPC_DCB */                                             /*8*/
710                                                                           /*8*/
711       SPC_DCB->Req = SPC_Dr_Read;                                         /*8*/
712       SPC_DCB->Reqmod = 0;                                                /*8*/
713       SPC_DCB->Transfer_Buffer = Data_Buffer & 0x0000FFFF;                /*8*/
714       SPC_DCB->Transfer_Count = Max_Mode_Len;                             /*8*/
715                                                                           /*8*/
716       /* execute SCSI command */                                          /*8*/
717                                                                           /*8*/
718       if (!Disc_Do_Driver (SPC_DCB, TRUE)) {                              /*8*/
719          Return_Value = FALSE;                                            /*8*/
720          goto Mode_Sense_End;                                             /*8*/
721       }                                                                   /*8*/
722                                                                           /*8*/
723       /********** check Actual_Count */                                   /*8*/
724                                                                           /*8*/
725       Cur_Ptr = Data_Buffer;                                              /*8*/
726       List_Header = (Mode_List_Header_Ptr) Cur_Ptr;                       /*8*/
727       Cur_Ptr = Cur_Ptr + sizeof (*List_Header);                          /*18*/
728                                                                           /*8*/
729       Block_Desc_Rcvd = FALSE;                                            /*8*/
730       if (List_Header->Block_Desc_Len == 8) {                             /*8*/
731          Block_Desc_Rcvd = TRUE;                                          /*8*/
732          Block_Desc = (Mode_Block_Desc_Ptr) Cur_Ptr;                      /*8*/
733          Drive_ID->Last_CE_Lgc_Sector_Addr = (Block_Desc->Block_No[0] << 16) +
734                                              (Block_Desc->Block_No[1] <<  8) +
735                                               Block_Desc->Block_No[2];
736          Drive_ID->Block_Len = (Block_Desc->Block_Len[1] <<  8) +         /*8*/
737                                 Block_Desc->Block_Len[2];                 /*8*/
738          Drive_ID->Lgc_Sectors_Per_Phy_Sector = 1;                        /*8*/
739       }                                                                   /*8*/
740       Cur_Ptr = Cur_Ptr + List_Header->Block_Desc_Len;                    /*8*/
741                                                                           /*8*/
742       Dev_Format_Rcvd = FALSE;                                            /*8*/
743       Drive_Geo_Rcvd = FALSE;                                             /*8*/
744                                                                           /*8*/
745       End_Ptr = Cur_Ptr + SPC_DCB->Actual_Count;                          /*8A*/
746       while (Cur_Ptr < End_Ptr) {                                         /*8*/
747          Page_Header = (Mode_Page_Header_Ptr) Cur_Ptr;                    /*8*/
748          switch (Page_Header->Code & Mode_Page_Code) {                   /*8*/
749                                                                           /*8*/
750             /* decode Device Format */                                    /*8*/
751                                                                           /*8*/
752             case (Mode_Page_Dev_Format):                                  /*8*/
753                Dev_Format_Rcvd = TRUE;                                    /*8*/
754                Dev_Format = (Mode_Dev_Format_Ptr) Page_Header;            /*8*/
755                Drive_ID->Phy_Sectors_Per_Track =                          /*8*/
756                   (Dev_Format->Sectors_Per_Track [0] <<  8) +             /*8*/
757                    Dev_Format->Sectors_Per_Track [1];                     /*8*/
758                Tracks_Per_Zone = (Dev_Format->Tracks_Per_Zone [0] <<  8) +
759                                  (Dev_Format->Tracks_Per_Zone [1]); /*8*/
```

```
760              if ((!Dev_Format->Alt_Tracks_Per_Zone [0]) &&                  /*8*/
761                  (!Dev_Format->Alt_Tracks_Per_Zone [1]))                   /*8*/
762                 Alt_Sectors_Per_Zone =                                     /*8*/
763                    (Dev_Format->Alt_Sectors_Per_Zone[0] << 8) +            /*8*/
764                     Dev_Format->Alt_Sectors_Per_Zone[1];                   /*8*/
765              break;                                                        /*8*/
766                                                                            /*8*/
767           /* decode Drive Geometry */                                      /*8*/
768                                                                            /*8*/
769            case (Mode_Page_Drive_Geo):                                     /*8*/
770              Drive_Geo_Rcvd = TRUE;                                        /*8*/
771              Drive_Geo = (Mode_Drive_Geo_Ptr) Page_Header;                 /*8*/
772              Drive_ID->Heads_Per_Cyl = Drive_Geo->Head_No;                 /*8*/
773              Drive_ID->Cyls = (Drive_Geo->Cyl_No[0] << 16) +               /*8*/
774                              (Drive_Geo->Cyl_No[1] <<  8) +                /*8*/
775                               Drive_Geo->Cyl_No[2];                        /*8*/
776              break;                                                        /*8*/
777           }                                                                /*8*/
778           Cur_Ptr = Cur_Ptr + Page_Header->Len + 2;                        /*8A*/
779        }                                                                   /*8*/
780                                                                            /*8*/
781     /* spares/cyl = spares/zone * zone/tracks * tracks/cyl       */        /*8A*/
782                                                                            /*8A*/
783     if (Alt_Sectors_Per_Zone)                                              /*8*/
784        if (Tracks_Per_Zone == 1)                                           /*8A*/
785           Drive_ID->Spare_Phy_Sectors_Per_Cyl =                            /*8*/
786              Alt_Sectors_Per_Zone * Drive_ID->Heads_Per_Cyl;               /*8A*/
787        else if (Tracks_Per_Zone == Drive_ID->Heads_Per_Cyl)                /*8A*/
788           Drive_ID->Spare_Phy_Sectors_Per_Cyl =                            /*8*/
789              Alt_Sectors_Per_Zone;                                         /*8A*/
790                                                                            /*8*/
791     /* SHORT * SHORT do not call a library routine */                      /*8*/
792                                                                            /*8*/
793     if (Block_Desc_Rcvd && (Dev_Format_Rcvd && Drive_Geo_Rcvd)) {          /*8*/
794        Drive_ID->Last_Lgc_Sector_Addr = Drive_ID->Last_CE_Lgc_Sector_Addr -
795           ((Drive_ID->Phy_Sectors_Per_Track * Drive_ID->Heads_Per_Cyl) -
796            (Drive_ID->Spare_Phy_Sectors_Per_Cyl));                         /*20*/
797        Return_Value = TRUE;                                                /*8*/
798     }                                                                      /*8*/
799     else                                                                   /*8*/
800        Return_Value = FALSE;                                               /*8*/
801                                                                            /*8*/
802  Mode_Sense_End:                                                           /*8*/
803     xPUTSPACE (Data_Buffer);                                               /*8*/
804     return (Return_Value);                                                 /*8*/
805                                                                            /*8*/
806  } /* Mode_Sense */                                                        /*8*/
807
808  static BOOLEAN Get_Drive_ID (EXD)                                         /*8*/
809  EXD_Ptr       EXD;                                                        /*8*/
810  {                                                                         /*8*/
811     EXC           Except;                                                  /*8*/
812     BOOLEAN       Inq_Valid;                                               /*8*/
813                                                                            /*8*/
814     /* try mode sense even when inquiry is invalid */                      /*8*/
815                                                                            /*8*/
816     Inq_Valid = Inquiry (EXD);                                             /*8*/
817     if (!(Mode_Sense (EXD) && Inq_Valid)) {                                /*8*/
818        Disc_GLB->Drive_ID_Valid = FALSE;                                   /*8*/
819                                                                            /*8*/
820        Except.Retry_Status = ER_Not_Recov;                                 /*8*/
821        Except.PID = Dr_Except_PID;                                         /*8*/
822        Except.Substatus = DrSs_Drive_ID_Err;                               /*8*/
823        Except.Retry_Count = -1;                                            /*8*/
824        Except.Lgc_Sector_Addr = -1;                                        /*8*/
825        Disc_Log_Except (&Except);                                          /*8*/
826                                                                            /*8*/
827        return (FALSE);                                                     /*8*/
828     }                                                                      /*8*/
829                                                                            /*8*/
830     Disc_GLB->Drive_ID_Valid = TRUE;                                       /*8*/
831     return (TRUE);                                                         /*8*/
832                                                                            /*8*/
833  } /* Get_Drive_ID */                                                      /*8*/
834
835  /*+----------------------------------------------------------------+*/
836  /*|                        Attributes                              |*/
837  /*|                                                                |*/
838  /*|                                                                |*/
839  /*+----------------------------------------------------------------+*/
840
```

```
841  static BOOLEAN Attributes (EXD)
842  EXD_Ptr    EXD;
843  {
844      PCS_CB           PCS;                                                    /*7*/
845                                                                               /*7*/
846      /* set burst and holdoff */                                              /*7*/
847                                                                               /*7*/
848      if (EXD->Chnl_Attr_Rcv) {                                                /*7*/
849          PCS.Burst = EXD->Burst;                                              /*7*/
850          PCS.Holdoff = EXD->Holdoff;                                          /*7*/
851                                                                               /*7*/
852          if (!Disc_PortIO (MT_Port_Config_Req, &PCS))                         /*7*/
853              return (FALSE);                                                  /*7*/
854      }                                                                        /*7*/
855                                                                               /*7*/
856      /* set controller serial number              */                          /*7*/
857                                                                               /*7*/
858      if (EXD->Ctrl_Ser_No_Rcv) {                                              /*7*/
859                                                                               /*7*/
860          /* check if there is Revision number */                              /*7*/
861                                                                               /*7*/
862          if (EXD->Ctrl_Rev_Rcv) {                                             /*7*/
863              if (!COMPB (&EXD->Ctrl_Ser_No, &Ctrl_ID->Ser_No, Ctrl_Ser_No_Len)) {
864                  Disc_Log_Invalid_Parm (0,              /* unknown */ /*8*/
865                                  0,                     /* unknown */  /*7*/
866                                  &EXD->Ctrl_Ser_No,                    /*7*/
867                                  sizeof (EXD->Ctrl_Ser_No));           /*7*/
868                  return (FALSE);                                       /*7*/
869              } /* if Ctrl_Ser_No miscompare */                         /*7*/
870          } /* end if Ctrl_Rev_Rcv */                                   /*7*/
871                                                                       /*7*/
872          /* write if there is no Revision number */                    /*7*/
873                                                                       /*7*/
874          else
875              Write_EEPROM (&EXD->Ctrl_Ser_No, &Ctrl_ID->Ser_No, Ctrl_Ser_No_Len);
876      } /* end if Ctrl_Ser_No_Rcv */                                    /*7*/
877                                                                       /*7*/
878      /* set controller revision */                                     /*7*/
879      /* check serial number       */                                   /*7*/
880                                                                       /*7*/
881      if (EXD->Ctrl_Rev_Rcv) {                                          /*7*/
882          if (!EXD->Ctrl_Ser_No_Rcv)                                    /*7*/
883              Disc_Log_Missing_Parm (Ctrl_Ser_No_PID);                  /*7*/
884          else
885              Write_EEPROM (&EXD->Ctrl_Rev, &Ctrl_ID->Rev, Ctrl_Rev_Len); /*7*/
886      }                                                                 /*7*/
887                                                                       /*7*/
888      /* request parm */                                                /*7*/
889                                                                       /*7*/
890      if (EXD->Req_Chnl_Attr)                                           /*7*/
891          /******** get real status */                                  /*7*/
892          Disc_Log_Chnl_Attr (EXD);                                     /*7*/
893      if (EXD->Req_Ctrl_ID)                                             /*7*/
894          Disc_Log_Ctrl_ID ();                                          /*7*/
895      if (EXD->Req_uCode_Ver)                                           /*7*/
896          Disc_Log_uCode_Ver ();                                        /*7*/
897      if (EXD->Req_Drive_ID) {                                          /*8*/
898          if (!Disc_GLB->Drive_ID_Valid)                                /*8*/
899              Get_Drive_ID (EXD);                                       /*8*/
900
901          /* sense drive id even when it is invalid */                  /*8*/
902
903          Disc_Log_Drive_ID ();                                         /*7*/
904      }                                                                 /*8*/
905
906  } /* Attributes */

/*+---------------------------------------------------------------+*/
/*|                             Test                              |*/
/*|                                                               |*/
/*|                                                               |*/
/*+---------------------------------------------------------------+*/

914  static BOOLEAN Test (EXD)
915  EXD_Ptr    EXD;
916  {
917      return (FALSE);
918  } /* Test */
919
```

```
/*+----------------------------------------------------------*/  /*19*/
/*|                      Mode_Select                         |*/  /*19*/
/*|                                                          |*/  /*19*/
/*|                                                          |*/  /*19*/
/*+----------------------------------------------------------*/  /*19*/
                                                                 /*19*/
    static BOOLEAN Mode_Select (EXD)                             /*19*/
    EXD_Ptr         EXD;                                         /*19*/
    {                                                            /*19*/
      SPC_DCB_Ptr         SPC_DCB;                               /*19*/
      SCSI_Cmd_Ptr        SCSI_Cmd;                              /*19*/
      ADDRESS             Data_Buffer;                           /*19*/
      ADDRESS             Cur_Ptr;                               /*19*/
      BOOLEAN             Return_Value;                          /*19*/
      Mode_List_Header_Ptr  List_Header;                         /*19*/
      Mode_Block_Desc_Ptr   Block_Desc;                          /*19*/
      Mode_Dev_Format_Ptr   Dev_Format;                          /*19*/
      INTEGER             Mode_Len;                              /*19*/

/* get buffer space */                                       /*19*/
    /* store in EXD for trace */                                 /*19*/
                                                                 /*19*/
      if (!Disc_Get_Buffer (Max_Mode_Len, &Data_Buffer))          /*19*/
         return (FALSE);                                         /*19*/
      ZBUFB (Data_Buffer, Max_Mode_Len);                         /*19*/
      EXD->Data_Buffer = Data_Buffer;                            /*19*/
                                                                 /*19*/
      Cur_Ptr = Data_Buffer;                                     /*19*/
      List_Header = (Mode_List_Header_Ptr) Cur_Ptr;              /*19*/
      Cur_Ptr = Cur_Ptr + sizeof (*List_Header);                 /*19*/
      Block_Desc = (Mode_Block_Desc_Ptr) Cur_Ptr;                /*19*/
      List_Header->Block_Desc_Len = sizeof (*Block_Desc);        /*19*/
      Block_Desc->Block_Len[1] = (Sector_Len >> 8) & 0x000000FF; /*19*/
      Block_Desc->Block_Len[2] = Sector_Len & 0x000000FF;        /*19*/
      Cur_Ptr = Cur_Ptr + sizeof (*Block_Desc);                  /*19*/
                                                                 /*19*/
      Dev_Format = (Mode_Dev_Format_Ptr) Cur_Ptr;                /*19*/
      Dev_Format->Code = Mode_Page_Dev_Format;                   /*19*/
      Dev_Format->Len = sizeof (*Dev_Format) - 2;                /*20*/
      Dev_Format->Tracks_Per_Zone [1] = 1;                       /*19*/
      Dev_Format->Alt_Sectors_Per_Zone[1] = 1;                   /*19*/
      Dev_Format->Alt_Tracks_Per_Volume [1] = 3;                 /*19*/
      Dev_Format->Sectors_Per_Track [1] = 36;                    /*19*/
      Dev_Format->Bytes_Per_Sector [0] = (Sector_Len >> 8) & 0x000000FF; /*19*/
      Dev_Format->Bytes_Per_Sector [1] = Sector_Len & 0x000000FF. /*19*/
                                                                 /*19*/
      Mode_Len = sizeof (*List_Header) +                         /*20*/
                 sizeof (*Block_Desc) +                          /*20*/
                 sizeof (*Dev_Format);                           /*20*/
                                                                 /*19*/
    /* form SCSI command */                                      /*19*/
                                                                 /*19*/
      SPC_DCB = EXD->SPC_DCB;                                    /*19*/
      SCSI_Cmd = (SCSI_Cmd_Ptr) SPC_DCB->Command;                /*19*/
      SCSI_Cmd->Op_Code = SOp_Mode_Select;                       /*19*/
      SCSI_Cmd->Byte1   = 0;                                     /*19*/
      SCSI_Cmd->Byte2   = 0;                                     /*19*/
      SCSI_Cmd->Byte3   = 0;                                     /*19*/
      SCSI_Cmd->Byte4   = Mode_Len;                              /*19*/
      SCSI_Cmd->Vendor_Unique = 0;                               /*19*/
      SPC_DCB->Cmd_Count = sizeof (*SCSI_Cmd);                   /*19*/
                                                                 /*19*/
    /* form SCSI SPC_DCB */                                      /*19*/
                                                                 /*19*/
      SPC_DCB->Req = SPC_Dr_Write;                               /*19*/
      SPC_DCB->Reqmod = 0;                                       /*19*/
      SPC_DCB->Transfer_Buffer = Data_Buffer & 0x0000FFFF;       /*19*/
      SPC_DCB->Transfer_Count = Mode_Len;                        /*19*/
                                                                 /*19*/
    /* execute SCSI command */                                   /*19*/
                                                                 /*19*/
      if (!Disc_Do_Driver (SPC_DCB, TRUE)) {                     /*19*/
         Return_Value = FALSE;                                   /*19*/
         goto Mode_Select_End;                                   /*19*/
      }                                                          /*19*/
      Return_Value = TRUE;                                       /*19*/
                                                                 /*19*/
    Mode_Select_End:                                             /*19*/
      XPUTSPACE (Data_Buffer);                                   /*19*/
      return (Return_Value);                                     /*19*/
```

```
1001                                                                             /*19*/
1002    ) /* Mode_Select */                                                       /*19*/
1003
1004    /*+---------------------------------------------------------------+*/
1005    /*|                          Format                               |*/
1006    /*|                                                               |*/
1007    /*|                                                               |*/
1008    /*+---------------------------------------------------------------+*/
1009
1010    static BOOLEAN Format (EXD)
1011    EXD_Ptr        EXD;
1012    {
1013       SPC_DCB_Ptr        SPC_DCB;                                             /*7*/
1014       RCN_CB             RCN;                                                 /*7*/
1015       BOOLEAN            List_Flag;                                           /*7*/
1016       INTEGER            Data_Len;                                            /*7*/
1017       Defect_List_Ptr    Defect_List;                                         /*7*/
1018       BOOLEAN            Return_Value;                                        /*7*/
1019       Format_Cmd_Ptr     Format_Cmd;                                          /*7*/
1020
1021       SPC_DCB = EXD->SPC_DCB;
1022
1023       /* check drive status */
1024
1025       if (!Disc_GLB->Drive_ID_Valid) {                                        /*19*/
1026          Get_Drive_ID (EXD);                                                  /*19*/
1027          if (!Disc_GLB->Drive_ID_Valid)                                       /*19*/
1028             return (FALSE);                                                   /*19*/
1029       }                                                                       /*19*/
1030                                                                               /*19*/
1031       /* mode select */                                                       /*19*/
1032                                                                               /*19*/
1033       Mode_Select (EXD);                                                      /*19*/
1034
1035       /* check modifier */                                                    /*7*/
1036                                                                               /*7*/
1037       List_Flag = FALSE;                                                      /*7*/
1038       if (EXD->Opcode_Mod & Format_Defect_List_Mod)                           /*7*/
1039          List_Flag = TRUE;                                                    /*7*/
1040                                                                               /*7*/
1041    /*   Opcode Mod           Format   Complete   Defect   */                  /*7*/
1042    /*   Init    List          Data     List      Length  */                  /*7*/
1043    /*    0      0              1        0         0       */                 /*7*/
1044    /*    0      1              1        0         n       */                 /*7*/
1045    /*    1      0              1        1         0       */                 /*7*/
1046    /*    1      1              1        1         n       */                 /*7*/
1047                                                                               /*7*/
1048       /* with Defect List */                                                  /*7*/
1049                                                                               /*7*/
1050       if (List_Flag) {                                                        /*7*/
1051          Data_Len = sizeof (Defect_List_Type);                                /*20*/
1052          if (!Disc_Get_Buffer (Data_Len, &EXD->Data_Buffer))                  /*7*/
1053             return (FALSE);                                                   /*7*/
1054                                                                               /*7*/
1055          Defect_List = (Defect_List_Ptr) EXD->Data_Buffer;                    /*7*/
1056          Defect_List->Header.Zero = 0;                                        /*7*/
1057                                                                               /*7*/
1058          /* read data from Port */                                            /*7*/
1059                                                                               /*7*/
1060          RCN.RAC = EXD->Data_IOC;                                             /*7*/
1061          RCN.Direction = RCN_Read_Dir;                                        /*7*/
1062          RCN.Buffer = (ADDRESS) &Defect_List->Header.Len;                     /*7*/
1063          RCN.Count = Data_Len;                                                /*7*/
1064          RCN.Reqmod = 0;                                                      /*7*/
1065                                                                               /*7*/
1066          if (!Disc_PortIO (MT_Reconnect_Req, &RCN)) {                         /*7*/
1067             Return_Value = FALSE;                                             /*7*/
1068             goto Format_End;                                                  /*7*/
1069          }                                                                    /*7*/
1070                                                                               /*7*/
1071       /****** check actual length */                                          /*8*/
1072                                                                               /*7*/
1073          Data_Len = Defect_List->Header.Len + 4;                              /*8*/
1074                                                                               /*7*/
1075       /********* check Actual_Count */                                        /*7*/
1076       }                                                                       /*7*/
1077                                                                               /*7*/
1078       /* without Defect List */                                               /*7*/
1079                                                                               /*7*/
1080       else {                                                                  /*7*/
1081          Data_Len = sizeof (Defect_List_Header_Type);                         /*20*/
```

```
1082        if (!Disc_Get_Buffer (Data_Len, &EXD->Data_Buffer))      /*7*/
1083            return (FALSE);                                       /*7*/
1084                                                                  /*7*/
1085        Defect_List = (Defect_List_Ptr) EXD->Data_Buffer;         /*7*/
1086        Defect_List->Header.Zero = 0;                             /*7*/
1087        Defect_List->Header.Len = 0;                              /*7*/
1088     }                                                            /*7*/
1089                                                                  /*7*/
1090     /* form SCSI command */                                      /*7*/
1091                                                                  /*7*/
1092     Format_Cmd = (Format_Cmd_Ptr) SPC_DCB->Command;              /*7*/
1093     ZBUFB (Format_Cmd, sizeof (*Format_Cmd));                    /*7*/
1094     Format_Cmd->Op_Code = SDOp_Format_Unit;                      /*7*/
1095     Format_Cmd->Defect_List = Format1_Data | Format1_Block_Format; /*7*/
1096     if (EXD->Opcode_Mod & Format_Init_Added_Mod)
1097         Format_Cmd->Defect_List = Format_Cmd->Defect_List | Format1_Complete;
1098                                                                  /*7*/
1099     SPC_DCB->Cmd_Count = sizeof (*Format_Cmd);                   /*7*/
1100                                                                  /*7*/
1101     /* form SCSI SPC_DCB */                                      /*7*/
1102                                                                  /*7*/
1103     SPC_DCB->Req = SPC_Or_Write;                                 /*7*/
1104     SPC_DCB->Reqmod = 0;                                         /*7*/
1105     SPC_DCB->Transfer_Buffer = EXD->Data_Buffer & 0x0000FFFF;    /*7*/
1106     SPC_DCB->Transfer_Count = Data_Len;                          /*7*/
1107                                                                  /*7*/
1108  /* execute SCSI command */                                      /*7*/
1109                                                                  /*7*/
1110     Return_Value = Disc_DevIO (SPC_DCB);                         /*7*/
1111                                                                  /*7*/
1112  Format_End:                                                     /*7*/
1113     if (List_Flag)                                               /*7*/
1114         XPUTSPACE (EXD->Data_Buffer);                            /*7*/
1115     return (Return_Value);                                       /*7*/
1116                                                                  
1117  ) /* Format */                                                  
1118                                                                  
1119  /*+--------------------------------------------------------+*/
1120  /*|                      Read_Defect                       |*/
1121  /*|                                                        |*/
1122  /*|                                                        |*/
1123  /*+--------------------------------------------------------+*/
1124                                                                  
1125  static BOOLEAN Read_Defect (EXD)                                /*7*/
1126  EXD_Ptr    EXD;                                                 /*7*/
1127  (                                                               /*7*/
1128     SPC_DCB_Ptr     SPC_DCB;                                     /*7*/
1129     RCN_CB          RCN;                                         /*7*/
1130     INTEGER         Data_Len;                                    /*7*/
1131     Defect_List_Ptr Defect_List;                                 /*7*/
1132     Read_Defect_Cmd_Ptr Read_Defect_Cmd;                         /*7*/
1133     BOOLEAN         Return_Value;                                /*7*/
1134                                                                  /*7*/
1135     SPC_DCB = EXD->SPC_DCB;                                      /*7*/
1136                                                                  /*7*/
1137  /* check drive status */                                        /*7*/
1138                                                                  /*7*/
1139  /*********** check modifier */                                  /*7*/
1140                                                                  /*7*/
1141     /* get data buffer */                                        /*7*/
1142                                                                  /*7*/
1143     Data_Len = sizeof (Defect_List_Type);                        /*20*/
1144     if (!Disc_Get_Buffer (Data_Len, &EXD->Data_Buffer))          /*7*/
1145         return (FALSE);                                          /*7*/
1146     Defect_List = (Defect_List_Ptr) EXD->Data_Buffer;            /*7*/
1147                                                                  /*7*/
1148     /* form SCSI command */                                      /*7*/
1149                                                                  /*7*/
1150     Read_Defect_Cmd = (Read_Defect_Cmd_Ptr) SPC_DCB->Command;    /*7*/
1151     ZBUFB (Read_Defect_Cmd, sizeof (*Read_Defect_Cmd));          /*7*/
1152     Read_Defect_Cmd->Op_Code = SDOp_Read_Defect;                 /*7*/
1153     if (EXD->Opcode_Mod & Read_Defect_Added_Mod)                 /*7*/
1154         Read_Defect_Cmd->Defect_List = Read_Defect2_Block_Format /*7*/
1155                                      | Read_Defect2_Grown;       /*7*/
1156     else                                                         /*7*/
1157         Read_Defect_Cmd->Defect_List = Read_Defect2_Block_Format /*7*/
1158                                      | Read_Defect2_Manuf;       /*7*/
1159     Read_Defect_Cmd->Len [0] = (Data_Len >> 8) & 0x000000FF;     /*8*/
1160     Read_Defect_Cmd->Len [1] = Data_Len & 0x000000FF;            /*8*/
1161                                                                  /*7*/
1162     SPC_DCB->Cmd_Count = sizeof (*Read_Defect_Cmd);              /*7*/
```

```
1163                                                                                /*7*/
1164         /* form SCSI SPC_DCB */                                                /*7*/
1165                                                                                /*7*/
1166          SPC_DCB->Req = SPC_Dr_Read;                                           /*7*/
1167          SPC_DCB->Reqmod = 0;                                                  /*7*/
1168          SPC_DCB->Transfer_Buffer = EXD->Data_Buffer & 0x0000FFFF;             /*7*/
1169          SPC_DCB->Transfer_Count = Data_Len;                                   /*7*/
1170                                                                                /*7*/
1171         /* execute SCSI command */                                             /*7*/
1172                                                                                /*7*/
1173          if (!Disc_DevIO (SPC_DCB)) {                                          /*7*/
1174             Return_Value = FALSE;                                              /*7*/
1175             goto Read_Defect_End;                                              /*7*/
1176          }                                                                     /*7*/
1177                                                                                /*7*/
1178         /********* check Actual_Count */                                       /*7*/
1179                                                                                /*7*/
1180         /* write data to Port */                                               /*7*/
1181                                                                                /*7*/
1182          RCN.RAC = EXD->Data_IOC;                                              /*7*/
1183          RCN.Direction = RCN_Write_Dir;                                        /*7*/
1184          RCN.Buffer = (ADDRESS) &Defect_List->Header.Len;                      /*7*/
1185          RCN.Count = SPC_DCB->Actual_Count - 2;                                /*7*/
1186          RCN.Reqmod = 0;                                                       /*7*/
1187                                                                                /*7*/
1188          Return_Value = Disc_PortIO (MT_Reconnect_Req, &RCN);                  /*7*/
1189                                                                                /*7*/
1190      Read_Defect_End:                                                          /*7*/
1191          XPUTSPACE (EXD->Data_Buffer);                                         /*7*/
1192          return (Return_Value);                                                /*7*/
1193                                                                                /*7*/
1194      } /* Read_Defect */
1195
1196      /*+----------------------------------------------------------------+*/
1197      /*|                          Read                                  |*/
1198      /*|                                                                |*/
1199      /*|                                                                |*/
1200      /*+----------------------------------------------------------------+*/
1201
1202      static BOOLEAN Read (EXD)
1203      EXD_Ptr        EXD;
1204      {
1205          RCN_CB              RCN;
1206          SPC_DCB_Ptr         SPC_DCB;
1207          INTEGER             Data_Len;
1208          BOOLEAN             Return_Value;
1209          SCSI_Cmd_Ptr        SCSI_Cmd;                                          /*7*/
1210
1211          SPC_DCB = EXD->SPC_DCB;
1212          SCSI_Cmd = (SCSI_Cmd_Ptr) SPC_DCB->Command;
1213
1214         /* check parameter */
1215
1216          if (!EXD->Cmd_Lgc_Ext_Rcv) {
1217              Disc_Log_Missing_Parm (Cmd_Lgc_Ext_PID);
1218              return (FALSE);
1219          }
1220
1221         /* check modifier */
1222
1223          if (!(EXD->Opcode_Mod & Read_Xsum_Mod)) {                              /*7*/
1224              Disc_Log_Cmd_Except (CmdSs_Invalid_Opcode_Mod);
1225              return (FALSE);
1226          }
1227
1228         /*************** check drive status */
1229
1230         /* get buffer space */
1231
1232          Data_Len = EXD->Lgc_Sector_Count * Sector_Len;                         /*7*/
1233          if (!Disc_Get_Buffer (Data_Len, &EXD->Data_Buffer))                    /*7*/
1234              return (FALSE);                                                    /*7*/
1235
1236         /* form SCSI command */
1237
1238          SCSI_Cmd->Op_Code = SDOp_Read;
1239          SCSI_Cmd->Byte1  = (EXD->Lgc_Sector_Addr >> 16) & 0x0000001F;
1240          SCSI_Cmd->Byte2  = (EXD->Lgc_Sector_Addr >> 8) & 0x000000FF;
1241          SCSI_Cmd->Byte3  = EXD->Lgc_Sector_Addr & 0x000000FF;
1242          SCSI_Cmd->Byte4  = EXD->Lgc_Sector_Count;
1243          SCSI_Cmd->Vendor_Unique = 0;
```

```
1244            SPC_DCB->Cmd_Count = SCSI_Cmd_Len;
1245
1246            /* form SCSI SPC_DCB */
1247
1248            SPC_DCB->Req = SPC_Or_Read;
1249            SPC_DCB->Reqmod = 0;
1250            SPC_DCB->Transfer_Buffer = EXD->Data_Buffer & 0x0000FFFF;
1251            SPC_DCB->Transfer_Count = Data_Len;
1252
1253            /* execute SCSI command */
1254
1255            if (!Disc_DevIO (SPC_DCB)) {
1256                Return_Value = FALSE;
1257                goto Read_End;
1258            }
1259
1260            if (!(EXD->Opcode_Mod & Read_No_Xfer_Mod)) {
1261
1262                if (Disc_GLB->Port_No != Req_Port_No) {                    /*18*/
1263
1264                    /* write data to Port       */
1265
1266                    RCN.RAC = EXD->Data_IOC;
1267                    RCN.Direction = RCN_Write_Dir;
1268                    RCN.Buffer = EXD->Data_Buffer;
1269                    RCN.Count = Data_Len;
1270                    RCN.Reqmod = RCN_Skip_Xsum;                            /*19*/
1271
1272                    if (!Disc_PortIO (MT_Reconnect_Req, &RCN)) {
1273                        Return_Value = FALSE;
1274                        goto Read_End;
1275                    }
1276                }
1277                else {                                                     /*18*/
1278                    Move_Sectors_Check_Checksum (EXD->Data_Buffer,         /*18*/
1279                                                 EXD->Req_Buffer,          /*18*/
1280                                                 EXD->Lgc_Sector_Count);   /*18*/
1281                }
1282
1283                /* collect checksum array    */
1284
1285                Get_Sector_Checksum (EXD->Data_Buffer,
1286                                     EXD->Lgc_Sector_Count);
1287            }
1288
1289            Return_Value = TRUE;
1290
1291        Read_End:
1292            XPUTSPACE (EXD->Data_Buffer);
1293            return (Return_Value);
1294
1295        } /* Read */
1296
1297        /*+----------------------------------------------------------------*/
1298        /*|                             Write                             |*/
1299        /*|                                                               |*/
1300        /*|                                                               |*/
1301        /*+----------------------------------------------------------------*/
1302
1303        static BOOLEAN Write (EXD)
1304        EXD_Ptr    EXD;
1305        {
1306            RCN_CB            RCN;
1307            SPC_DCB_Ptr       SPC_DCB;
1308            BOOLEAN           Return_Value;
1309            INTEGER           Data_Len;
1310            SCSI_Cmd_Ptr      SCSI_Cmd;                                    /*7*/
1311
1312            SPC_DCB = EXD->SPC_DCB;
1313            SCSI_Cmd = (SCSI_Cmd_Ptr) SPC_DCB->Command;
1314
1315            /* check parameter */
1316
1317            if (!EXD->Cmd_Lgc_Ext_Rcv) {
1318                Disc_Log_Missing_Parm (Cmd_Lgc_Ext_PID);
1319                return (FALSE);
1320            }
1321
1322            /* check modifier */
1323
1324            if (EXD->Opcode_Mod & Write_Block_Xsum_Mod) {                  /*7*/
```

```
1325            Disc_Log_Cmd_Except (CmdSs_Invalid_Opcode_Mod);         /*7*/
1326            return (FALSE);                                         /*7*/
1327         }
1328
1329         /***************** check drive status */
1330
1331         /* get buffer space */
1332
1333         Data_Len = EXD->Lgc_Sector_Count * Sector_Len;
1334         if (!Disc_Get_Buffer (Data_Len, &EXD->Data_Buffer))          /*7*/
1335            return (FALSE);                                           /*7*/
1336
1337         if (Disc_GLB->Port_No != Req_Port_No) {                      /*18*/
1338
1339            /* read data from Port */
1340
1341            RCN.RAC = EXD->Data_IOC;
1342            RCN.Direction = RCN_Read_Dir;
1343            RCN.Buffer = EXD->Data_Buffer;
1344            RCN.Count = Data_Len;
1345            RCN.Reqmod = RCN_Skip_Xsum;                               /*19*/
1346
1347            if (!Disc_PortIO (MT_Reconnect_Req, &RCN)) {
1348               Return_Value = FALSE;
1349               goto Write_End;
1350            }
1351
1352            /********* check Actual_Count */
1353
1354            /* if short transfer, zero the rest of the buffer */      /*19*/
1355                                                                       /*19*/
1356            if (RCN.Actual_Count < Data_Len) {                        /*19*/
1357               ZBUFB (EXD->Data_Buffer + RCN.Actual_Count,            /*19*/
1358                      Data_Len - RCN.Actual_Count);                   /*19*/
1359            }                                                         /*19*/
1360
1361            /* put sector checksum into data buffer */                /*19*/
1362
1363            Put_Sector_Checksum (EXD->Data_Buffer,                    /*19*/
1364                                 EXD->Cur_Checksum_Array,             /*19*/
1365                                 EXD->Lgc_Sector_Count);              /*19*/
1366
1367         }
1368         else {                                                       /*18*/
1369            Move_Sectors_Put_Checksum (EXD->Req_Buffer,               /*18*/
1370                                        EXD->Data_Buffer,             /*18*/
1371                                        EXD->Lgc_Sector_Count);       /*18*/
1372         }
1373
1374         /* form SCSI command */
1375
1376         SCSI_Cmd->Op_Code = SDOp_Write;
1377         SCSI_Cmd->Byte1 = (EXD->Lgc_Sector_Addr >> 16) & 0x0000001F;
1378         SCSI_Cmd->Byte2 = (EXD->Lgc_Sector_Addr >> 8) & 0x000000FF;
1379         SCSI_Cmd->Byte3 = EXD->Lgc_Sector_Addr & 0x000000FF;
1380         SCSI_Cmd->Byte4 = EXD->Lgc_Sector_Count;
1381         SCSI_Cmd->Vendor_Unique = 0;
1382         SPC_DCB->Cmd_Count = SCSI_Cmd_Len;
1383
1384         /* form SCSI SPC_DCB */
1385
1386         SPC_DCB->Req = SPC_Dr_Write;
1387         SPC_DCB->Reqmod = 0;
1388         SPC_DCB->Transfer_Buffer = EXD->Data_Buffer & 0x0000FFFF;
1389         SPC_DCB->Transfer_Count = Data_Len;
1390
1391         /* execute SCSI command */
1392
1393         if (!Disc_DevIO (SPC_DCB)) {
1394            SPC_DCB->Pad = FALSE;
1395            Return_Value = FALSE;
1396            goto Write_End;
1397         }
1398
1399         SPC_DCB->Pad = FALSE;
1400         Return_Value = TRUE;
1401
1402      Write_End:
1403         XPUTSPACE (EXD->Data_Buffer);
1404         return (Return_Value);
```

```
1405
1406    ) /* Write */
1407
1408    /*+------------------------------------------------------------+*/
1409    /*|                         Compare                            |*/
1410    /*|                                                            |*/
1411    /*|                                                            |*/
1412    /*+------------------------------------------------------------+*/
1413
1414    static BOOLEAN Compare (EXD)                                        /*7*/
1415    EXD_Ptr      EXD;                                                   /*7*/
1416    {                                                                   /*7*/
1417       RCN_CB              RCN;                                         /*7*/
1418       SPC_DCB_Ptr         SPC_DCB;                                     /*7*/
1419       Verify_Cmd_Ptr      Verify_Cmd;                                  /*7*/
1420       BOOLEAN             Return_Value;                                /*7*/
1421       INTEGER             Data_Len;                                    /*7*/
1422                                                                       /*7*/
1423                                                                       /*7*/
1424       /* check parameter */                                            /*7*/
1425                                                                       /*7*/
1426       if (!EXD->Cmd_Lgc_Ext_Rcv) {                                     /*7*/
1427          Disc_Log_Missing_Parm (Cmd_Lgc_Ext_PID);                      /*7*/
1428          return (FALSE);                                               /*7*/
1429       }                                                                /*7*/
1430                                                                       /*7*/
1431       /* check modifier */                                             /*7*/
1432                                                                       /*7*/
1433       if (EXD->Opcode_Mod & Write_Block_Xsum_Mod) {                    /*7*/
1434          Disc_Log_Cmd_Except (CmdSs_Invalid_Opcode_Mod);               /*7*/
1435          return (FALSE);                                               /*7*/
1436       }                                                                /*7*/
1437                                                                       /*7*/
1438    /*************** check drive status */                              /*7*/
1439                                                                       /*7*/
1440       /* get buffer space */                                           /*7*/
1441                                                                       /*7*/
1442       Data_Len = EXD->Lgc_Sector_Count * Sector_Len;                   /*7*/
1443       if (!Disc_Get_Buffer (Data_Len, &EXD->Data_Buffer))              /*7*/
1444          return (FALSE);                                               /*7*/
1445                                                                       /*7*/
1446       /* read data from Port */                                        /*7*/
1447                                                                       /*7*/
1448       RCN.RAC = EXD->Data_IOC;                                         /*7*/
1449       RCN.Direction = RCN_Read_Dir;                                    /*7*/
1450       RCN.Buffer = EXD->Data_Buffer;                                   /*7*/
1451       RCN.Count = Data_Len;                                            /*7*/
1452       RCN.Reqmod = RCN_Skip_Xsum;                                      /*19*/
1453                                                                       /*7*/
1454       if (!Disc_PortIO (MT_Reconnect_Req, &RCN)) {                     /*7*/
1455          Return_Value = FALSE;                                         /*7*/
1456          goto Compare_End;                                             /*7*/
1457       }                                                                /*7*/
1458                                                                       /*7*/
1459    /********* check Actual_Count */                                    /*7*/
1460                                                                       /*7*/
1461       /* if short transfer, zero the rest of the buffer */             /*19*/
1462                                                                       /*19*/
1463       if (RCN.Actual_Count < Data_Len) {                               /*19*/
1464          ZBUFB (EXD->Data_Buffer + RCN.Actual_Count,                   /*19*/
1465                 Data_Len - RCN.Actual_Count);                          /*19*/
1466       }                                                                /*19*/
1467
1468       /* put sector checksum into data buffer */                       /*19*/
1469                                                                       /*19*/
1470       Put_Sector_Checksum (EXD->Data_Buffer,                           /*19*/
1471                            EXD->Cur_Checksum_Array,                   /*19*/
1472                            EXD->Lgc_Sector_Count);                    /*19*/
1473                                                                       /*7*/
1474       /* form SCSI command */                                          /*7*/
1475                                                                       /*7*/
1476       SPC_DCB = EXD->SPC_DCB;                                          /*7*/
1477       Verify_Cmd = (Verify_Cmd_Ptr) SPC_DCB->Command;                  /*7*/
1478       ZBUFB (Verify_Cmd, sizeof (*Verify_Cmd));                        /*7*/
1479       Verify_Cmd->Op_Code = SDOp_Verify;                               /*7*/
1480       Verify_Cmd->Byte_Check = Verify_Byte_Check;                      /*7*/
1481       Verify_Cmd->Lgc_Block_Addr = EXD->Lgc_Sector_Addr;               /*7*/
1482       Verify_Cmd->Len[0] = EXD->Lgc_Sector_Count >> 8;                 /*7*/
1483       Verify_Cmd->Len[1] = EXD->Lgc_Sector_Count;                      /*7*/
1484       SPC_DCB->Cmd_Count = sizeof (*Verify_Cmd);                       /*7*/
1485                                                                       /*7*/
```

```
1486        /* form SCSI SPC_DCB */                                          /*7*/
1487                                                                         /*7*/
1488          SPC_DCB->Req = SPC_Dr_Write;                                   /*7*/
1489          SPC_DCB->Reqmod = 0;                                            /*7*/
1490          SPC_DCB->Transfer_Buffer = EXD->Data_Buffer & 0x0000FFFF;       /*7*/
1491          SPC_DCB->Transfer_Count = Data_Len;                             /*19*/
1492                                                                         /*7*/
1493        /* execute SCSI command */                                       /*7*/
1494                                                                         /*7*/
1495          Return_Value = Disc_DevIO (SPC_DCB);                           /*7*/
1496                                                                         /*7*/
1497      Compare_End:                                                       /*7*/
1498          SPC_DCB->Pad = FALSE;                                          /*7*/
1499          XPUTSPACE (EXD->Data_Buffer);                                  /*7*/
1500          return (Return_Value);                                         /*7*/
1501                                                                         /*7*/
1502      } /* Compare */                                                    /*7*/
1503
1504      /*+----------------------------------------------------------+*/
1505      /*|                      Spare                               |*/
1506      /*|                                                          |*/
1507      /*|                                                          |*/
1508      /*+----------------------------------------------------------+*/
1509
1510      static BOOLEAN Spare (EXD)                                         /*7*/
1511      EXD_Ptr     EXD;                                                   /*7*/
1512      {                                                                  /*7*/
1513          SPC_DCB_Ptr      SPC_DCB;                                      /*7*/
1514          BOOLEAN          Return_Value;                                 /*7*/
1515          SCSI_Cmd_Ptr     SCSI_Cmd;                                     /*7*/
1516          Defect_List_Ptr  Defect_List;                                  /*7*/
1517          INTEGER          Data_Len;                                     /*7*/
1518                                                                         /*7*/
1519          SPC_DCB = EXD->SPC_DCB;                                        /*7*/
1520                                                                         /*7*/
1521      /*********** check drive status */                                 /*7*/
1522                                                                         /*7*/
1523        /* check parameter */                                            /*7*/
1524                                                                         /*7*/
1525          if (!EXD->Cmd_Lgc_Ext_Rcv) {                                   /*7*/
1526              Disc_Log_Missing_Parm (Cmd_Lgc_Ext_PID);                   /*7*/
1527              return (FALSE);                                            /*7*/
1528          }                                                              /*7*/
1529                                                                         /*7*/
1530        /* check modifier */                                             /*7*/
1531                                                                         /*7*/
1532          if (EXD->Opcode_Mod & -Spare_Force) {                          /*10*/
1533              Disc_Log_Cmd_Except (CmdSs_Invalid_Opcode_Mod);            /*7*/
1534              return (FALSE);                                            /*7*/
1535          }                                                              /*7*/
1536                                                                         /*7*/
1537        /* check drive status */                                         /*7*/
1538                                                                         /*7*/
1539        /* form Defect List for one defect block address */              /*7*/
1540      /*********** check Lgc_Sector_Count */                             /*7*/
1541                                                                         /*7*/
1542          Data_Len = sizeof (Defect_List_Header_Type) + 4;               /*20*/
1543          if (!Disc_Get_Buffer (Data_Len, &EXD->Data_Buffer))            /*7*/
1544              return (FALSE);                                            /*7*/
1545                                                                         /*7*/
1546          Defect_List = (Defect_List_Ptr) EXD->Data_Buffer;              /*7*/
1547          Defect_List->Header.Zero = 0;                                  /*7*/
1548          Defect_List->Header.Len = 4;                                   /*7*/
1549          Defect_List->Block_Addr[0] = EXD->Lgc_Sector_Addr;             /*7*/
1550                                                                         /*7*/
1551        /* form SCSI command */                                          /*7*/
1552                                                                         /*7*/
1553          SCSI_Cmd = (SCSI_Cmd_Ptr) SPC_DCB->Command;                    /*7*/
1554          ZBUFB (SCSI_Cmd, sizeof (*SCSI_Cmd));                          /*7*/
1555          SCSI_Cmd->Op_Code = SOOp_Reassign_Blocks;                      /*7*/
1556          SPC_DCB->Cmd_Count = sizeof (*SCSI_Cmd);                       /*7*/
1557                                                                         /*7*/
1558        /* form SCSI SPC_DCB */                                          /*7*/
1559                                                                         /*7*/
1560          SPC_DCB->Req = SPC_Dr_Write;                                   /*7*/
1561          SPC_DCB->Reqmod = 0;                                            /*7*/
1562          SPC_DCB->Transfer_Buffer = EXD->Data_Buffer & 0x0000FFFF;      /*7*/
1563          SPC_DCB->Transfer_Count = Data_Len;                             /*7*/
1564                                                                         /*7*/
1565        /* execute SCSI command */                                      /*7*/
1566                                                                         /*7*/
```

```
1567         Return_Value = Disc_DevIO (SPC_DCB);                          /*7*/
1568         XPUTSPACE (EXD->Data_Buffer);                                 /*7*/
1569         if (Return_Value)                                             /*7*/
1570            return (Write (EXD));                    /* rewrite data */ /*7*/
1571         else
1572            return (Return_Value);                                    /*7*/
1573      } /* Spare */                                                    /*7*/
1574
1575   /*+----------------------------------------------------------------+*/
1576   /*|                    Checksum_Utilities                          |*/
1577   /*+----------------------------------------------------------------+*/
1578
1579   static Put_Sector_Checksum (Sector,
1580                               Checksum,
1581                               Sector_Count)
1582   Sector_Ptr     Sector;
1583   SHORT          *Checksum;
1584   INTEGER        Sector_Count;
1585   {
1586      INTEGER     I;
1587
1588      for (I = 0; I < Sector_Count; I++)                                /*20*/
1589         Sector++->Checksum = *Checksum++;                              /*19*/
1590   } /* Put_Sector_Checksum */
1591
1592   static Get_Sector_Checksum (Sector,
1593                               Sector_Count)
1594   Sector_Ptr     Sector;
1595   int            Sector_Count;
1596   {
1597      Parm_Header_Ptr   Parm;
1598      SHORT             *Checksum;
1599      INTEGER           I;
1600
1601      if (Parm = (Parm_Header_Ptr) Disc_Get_Rsp ((Sector_Count * 2) + 2)) {
1602         Parm->Len = (Sector_Count * 2) + 1;                            /*20*/
1603         Parm->PID = Checksum_Array_PID;
1604
1605         Checksum = (SHORT *) &(Parm->Data);
1606         for (I = 0; I < Sector_Count; I++)                             /*20*/
1607            *Checksum++ = Sector++->Checksum;                           /*19*/
1608      }
1609   } /* Get_Sector_Checksum */
1610
1611   static Move_Sectors_Check_Checksum (Source,                          /*18*/
1612                                       Destination,                    /*18*/
1613                                       Sector_Count)                    /*18*/
1614   Sector_Ptr     Source;                                               /*18*/
1615   ADDRESS        Destination;                                          /*18*/
1616   SHORT          Sector_Count;                                         /*18*/
1617   {                                                                    /*18*/
1618      INTEGER     I;                                                    /*19*/
1619                                                                        /*18*/
1620      for (I = 0; I < Sector_Count; I++) {                              /*20*/
1621         MOVEW (Source++->Data, Destination, (Sector_Data_Len / 2));    /*19*/
1622         Destination = Destination + Sector_Data_Len;                  /*19*/
1623      }                                                                 /*18*/
1624                                                                        /*18*/
1625   /* MOVEW (Source, Destination,(Sector_Count * Sector_Data_Len / 2));*/ /*19*/
1626   } /* Move_Sectors_Check_Checksum */                                  /*18*/
1627
1628   static Move_Sectors_Put_Checksum (Source,                            /*18*/
1629                                     Destination,                      /*18*/
1630                                     Sector_Count)                      /*18*/
1631   ADDRESS        Source;                                               /*18*/
1632   Sector_Ptr     Destination;                                          /*18*/
1633   SHORT          Sector_Count;                                         /*18*/
1634   {                                                                    /*18*/
1635      INTEGER     I;                                                    /*19*/
1636                                                                        /*18*/
1637      for (I = 0; I < Sector_Count; I++) {                              /*20*/
1638         MOVEW (Source, Destination++->Data, (Sector_Data_Len / 2));    /*19*/
1639         Source = Source + Sector_Data_Len;                            /*19*/
1640      }                                                                 /*19*/
1641                                                                        /*18*/
1642   /* MOVEW (Source, Destination,(Sector_Count * Sector_Data_Len / 2));*/ /*19*/
1643   } /* Move_Sectors_Put_Checksum */                                    /*18*/
1644
1645   /*+----------------------------------------------------------------  */
1646   /*|                    Extended                                    |*/
1647   /*|                                                                |*/
1648   /*|                                                                |*/
1649   /*+----------------------------------------------------------------+*/
```

```
1650
1651    static Extended ()
1652    {
1653       RCN_CB               RCN;
1654       Cmd_Pkt_Header_Ptr   Cmd_Pkt_Header;
1655       EXD_Struct           EXD_Data;
1656       EXD_Ptr              EXD;
1657
1658       EXD = &EXD_Data;
1659       Disc_GLB->EXD = EXD;
1660       ZBUFB (EXD, sizeof (*EXD)); /* init all variables to zero */   /*8*/
1661
1662       EXD->Cmd_Rsp_IOC = Disc_GLB->LPRM & 0x00FF;
1663       EXD->SPC_DCB = Disc_GLB->SPC_DCB;
1664       EXD->Cmd_Buffer = Disc_GLB->Cmd_Buffer;
1665       EXD->Rsp_Buffer = Disc_GLB->Rsp_Buffer;
1666       EXD->Rsp_Len = 0;
1667
1668       /* allocate command packet */
1669       /* reconnect command packet */
1670
1671       RCN.RAC = EXD->Cmd_Rsp_IOC;
1672       RCN.Direction = RCN_Read_Dir;
1673       RCN.Buffer = EXD->Cmd_Buffer;
1674       RCN.Count = Min_Cmd_Pkt_Len + 2;
1675       RCN.Reqmod = RCN_Exact_Burst;
1676
1677       if (!Disc_PortIO (MT_Reconnect_Req, &RCN))                     /*5*/
1678          return (0);                                                 /*5*/
1679
1680       /***** check actual received */
1681
1682       /* reconnect the rest of command packet */
1683       /* receive first before check Opcode    */
1684
1685       Cmd_Pkt_Header = (Cmd_Pkt_Header_Ptr) EXD->Cmd_Buffer;
1686       if (Cmd_Pkt_Header->Pkt_Len > Min_Cmd_Pkt_Len) {
1687
1688          RCN.RAC = EXD->Cmd_Rsp_IOC;
1689          RCN.Direction = RCN_Read_Dir;
1690          RCN.Buffer = EXD->Cmd_Buffer + Min_Cmd_Pkt_Len + 2;
1691          RCN.Count = Cmd_Pkt_Header->Pkt_Len - Min_Cmd_Pkt_Len;
1692          RCN.Reqmod = RCN_Exact_Burst;
1693
1694          if (!Disc_PortIO (MT_Reconnect_Req, &RCN))                  /*5*/
1695             return (0);                                              /*5*/
1696
1697          /***** check actual received */
1698
1699       } /* If Pkt_Len > Min_Cmd_Pkt_Len */
1700
1701       /* process Command Packet Header */
1702
1703       EXD->Data_IOC = Cmd_Pkt_Header->Data_IOC;
1704       EXD->Opcode = Cmd_Pkt_Header->Opcode;
1705       EXD->Common_Mod = Cmd_Pkt_Header->Modifier >> 4;
1706       EXD->Opcode_Mod = Cmd_Pkt_Header->Modifier & 0x0F;
1707
1708       /* check common modifier */
1709
1710       if (EXD->Common_Mod)
1711          Disc_Log_Cmd_Except (CmdSs_Invalid_Common_Mod);
1712
1713       /* process command parameters */
1714       /* for performance, treat Read and Write Op separately */      /*19*/
1715
1716       if ((EXD->Opcode == Read_Op) &&                                /*19*/
1717          Read_Parm_Proc(EXD)) {}                                     /*19*/
1718       else if ((EXD->Opcode == Write_Op) &&                          /*19*/
1719          Write_Parm_Proc(EXD)) {}                                    /*19*/
1720       else                                                           /*19*/
1721          Cmd_Parm_Proc(EXD);
1722
1723       /* process Opcode */
1724       /* these case statements are evaluated from the top down */    /*19*/
1725
1726       if (!EXD->Rsp_Len)
1727          switch (EXD->Opcode) {
1728          case Read_Op:       /* put this case on the top for performance */
1729             Read (EXD);
1730             break;
```

```
1731              case Write_Op;        /* put this case on the top for performance */
1732                  Write (EXD);
1733                  break;
1734              case Attributes_Op:
1735                  Attributes (EXD);
1736                  break;
1737              case Format_Op:
1738                  Format (EXD);
1739                  break;
1740              case Write_Mem_Op:
1741                  Write_Mem (EXD);
1742                  break;
1743              case Read_Mem_Op:
1744                  Read_Mem (EXD);
1745                  break;
1746       /*    case Test_Op:                     */
1747       /*        Test (EXD);                   */
1748       /*        break;                        */
1749              case Spare_Op:
1750                  Spare (EXD);
1751                  break;
1752              case Compare_Op:
1753                  Compare (EXD);
1754                  break;
1755              case Read_Defect_Op:
1756                  Read_Defect (EXD);
1757                  break;
1758              default:
1759                  Disc_Log_Cmd_Except (CmdSs_Invalid_Opcode);
1760                  break;
1761          } /* switch (Opcode) */
1762
1763          /* send response */
1764
1765          if (EXD->Rsp_Len) {
1766
1767              Disc_Put_Rsp_End_Len(EXD);
1768
1769              RCN.RAC = EXD->Cmd_Rsp_IOC;
1770              RCN.Direction = RCN_Write_Dir;
1771              RCN.Buffer = EXD->Rsp_Buffer;
1772              RCN.Count = EXD->Rsp_Len;
1773              RCN.Reqmod = 0;
1774
1775              Disc_PortIO (MT_Reconnect_Req, &RCN);                              /*5*/
1776
1777              Disc_Set_RIC (RIC_Conditional_Success);
1778          }
1779
1780      } /* Extended */
1781
1782      /*+------------------------------------------------------------*/
1783      /*|                        Do_EIO                             |*/
1784      /*|                                                           |*/
1785      /*+------------------------------------------------------------*/
1786
1787      static Do_EIO (Msg)
1788      MCB_Ptr        Msg;
1789      {
1790          EIO_CB_Ptr Cur_EIO;
1791          IRQ_CB     IRQ;
1792          BOOLEAN    Intr_Flag;
1793
1794          Disc_GLB->EIO_Task_ID = Msg->Msg_Taskid;                                /*8*/
1795          Cur_EIO = (EIO_CB_Ptr) Msg->Msg_Value;
1796          Disc_GLB->Port_No = Cur_EIO->Port_No;
1797          Disc_GLB->Cmd = Cur_EIO->LAC >> 8;                   /* LAC upper byte */
1798          Disc_GLB->Ctrl_Unit_Addr = Cur_EIO->LAC & 0x00FF;    /* LAC lower byte */
1799          Disc_GLB->LPRM = Cur_EIO->LPRM;
1800
1801          Disc_GLB->RIC = 0;                                                      /*5*/
1802          Intr_Flag = FALSE;                                                      /*5*/
1803          Disc_GLB->Unit_Atn = FALSE;
1804          Disc_GLB->Port_Down [Disc_GLB->Port_No] = FALSE;
1805
1806          /* decode EIO */
1807          /* these case statements are evaluated from the bottom up              /*19*/
1808
1809          switch (Disc_GLB->Cmd) {                                                /*8*/
1810              case Cold_Load_Cmd:                                                 /*8*/
1811                  Cold_Load ();                                                   /*8*/
1812                  Intr_Flag = TRUE;                                               /*8*/
1813                  break;                                                          /*8*/
1814              case Boot_IO_Cmd :                                                  /*5*/
```

```
1815                Do_Boot_ID ();                                           /*5*/
1816                Intr_Flag = TRUE;                                        /*5*/
1817                break;                                                   /*5*/
1818     /*     case Reset_Unit_Cmd :    */
1819     /*          Reset_Unit_Proc;    */
1820     /*          break;              */
1821            case Extended_Cmd : /* put this case on the bottom for performance */
1822                Extended ();
1823                Intr_Flag = TRUE;                                        /*5*/
1824                break;
1825            default:
1826                Disc_GLB->RIC = RIC_Unsuccessful | RIC_Cmd_Except.       /*5*/
1827                Intr_Flag = TRUE;                                        /*5*/
1828                break;
1829        } /* switch */
1830
1831        /* interrupt CPU */
1832
1833        IRQ.Port_No = Disc_GLB->Port_No;                                  /*5*/
1834        IRQ.RIC  = Disc_GLB->RIC;                                         /*5*/
1835        IRQ.RIST = Disc_GLB->Ctrl_Unit_Addr;                              /*5*/
1836
1837        Disc_PortIO (MT_Interrupt_Req, &IRQ);                             /*5*/
1838
1839        /* reply message */                                               /*8*/
1840                                                                          /*8*/
1841        Msg->Msg_Type = MT_EIO_Resp;                                      /*8*/
1842        Msg->Msg_Tag = 0;                                                 /*8*/
1843        SEND (Disc_GLB->EIO_Task_ID, Msg);                                /*8A*/
1844
1845        if (Disc_GLB->Unit_Atn)                                           /*8*/
1846            Disc_GLB->Drive_ID_Valid = FALSE;                             /*8*/
1847
1848    } /* Do_EIO */
1849
1850    /*+-----------------------------------------------------------+*/
1851    /*|                          Do_Req                           |*/
1852    /*|                                                           |*/
1853    /*+-----------------------------------------------------------+*/
1854
1855    static Do_Req (Msg)                                               /*18*/
1856    MCB_Ptr      Msg;                                                 /*18*/
1857    {                                                                 /*18*/
1858       DRQ_CB_Ptr    DRQ;                                             /*18*/
1859       EXD_Struct    EXD_Data;                                        /*18*/
1860       EXD_Ptr       EXD;                                             /*18*/
1861                                                                      /*18*/
1862       Disc_GLB->EIO_Task_ID = Msg->Msg_TaskId;                       /*18*/
1863       DRQ = (DRQ_CB_Ptr) Msg->Msg_Value;                             /*18*/
1864       Disc_GLB->Port_No = Req_Port_No;                               /*18*/
1865       Disc_GLB->Cmd = DRQ->Command;                                  /*18*/
1866                                                                      /*18*/
1867       Disc_GLB->RIC = 0;                                             /*18*/
1868       Disc_GLB->Unit_Atn = FALSE;                                    /*18*/
1869                                                                      /*18*/
1870       EXD = &EXD_Data;                                               /*18*/
1871       Disc_GLB->EXD = EXD;                                           /*18*/
1872       ZBUF8 (EXD, sizeof (*EXD)); /* init all variables to zero */   /*18*/
1873                                                                      /*18*/
1874       EXD->Cmd_Rsp_IOC = 0;        /* for RIC */                     /*18*/
1875       EXD->Opcode_Mod = 0;                                           /*18*/
1876       EXD->SPC_DCB = Disc_GLB->SPC_DCB;                              /*18*/
1877
1878       /* if the caller provides a response buffer, use it */         /*18*/
1879       /* else use our own                                */          /*18*/
1880
1881       if (DRQ->Resp_Buffer)                                          /*18*/
1882           EXD->Rsp_Buffer = DRQ->Resp_Buffer; /* for errors */       /*18*/
1883       else                                                           /*18*/
1884           EXD->Rsp_Buffer = Disc_GLB->Rsp_Buffer; /* for errors */   /*18*/
1885       EXD->Rsp_Len = 0;                                              /*18*/
1886                                                                      /*18*/
1887       /* check parameter */                                          /*18*/
1888                                                                      /*18*/
1889       if ((Disc_GLB->Cmd == DiscCmd_Read) || (Disc_GLB->Cmd == DiscCmd_Write)) {  /*18*/
1890           if (((!DRQ->Data_Buffer) ||                                /*18*/
1891               ((!DRQ->Sector_Count) ||                               /*18*/
1892               ((DRQ->Sector_Count > Max_Sector_Count) ||             /*18*/
1893                (DRQ->Sector_Addr > Max_Sector_Addr)))) {             /*18*/
1894               Disc_GLB->RIC = RIC_Unsuccessful | RIC_Cmd_Except;     /*18*/
1895               goto Req_End;                                          /*18*/
1896           }                                                          /*18*/
```

```
1897              EXD->Req_Buffer = DRQ->Data_Buffer;                          /*18*/
1898              EXD->Lgc_Sector_Count = DRQ->Sector_Count;                   /*18*/
1899              EXD->Lgc_Sector_Addr = DRQ->Sector_Addr;                     /*18*/
1900              EXD->Cmd_Lgc_Ext_Rcv = TRUE;                                 /*18*/
1901           )                                                                /*18*/
1902                                                                           /*18*/
1903       /* decode EIO */                                                    /*18*/
1904                                                                           /*18*/
1905       switch (Disc_GLB->Cmd) {                                            /*18*/
1906          case DiscCmd_Read:                                               /*18*/
1907              EXD->Opcode_Mod = Read_Xsum_Mod;                             /*18*/
1908              Read (EXD);                                                  /*18*/
1909              break;                                                       /*18*/
1910          case DiscCmd_Write:                                              /*18*/
1911              Write (EXD);                                                 /*18*/
1912              break;                                                       /*18*/
1913          case DiscCmd_Format:                                             /*18*/
1914              Format (EXD);                                                /*18*/
1915              break;                                                       /*18*/
1916          default:                                                         /*18*/
1917              Disc_GLB->RIC = RIC_Unsuccessful | RIC_Cmd_Except;           /*18*/
1918              break;                                                       /*18*/
1919       } /* switch */                                                      /*18*/
1920                                                                           /*18*/
1921       if (EXD->Rsp_Len)                                                   /*18*/
1922          Disc_Set_RIC (RIC_Conditional_Success);                          /*18*/
1923                                                                           /*18*/
1924       /* reply message */                                                 /*18*/
1925                                                                           /*18*/
1926    Req_End:                                                               /*18*/
1927       DRQ->RIC = Disc_GLB->RIC;                                           /*18*/
1928       if (DRQ->RIC & RIC_Unsuccessful)                                    /*18*/
1929          DRQ->Error = TRUE;                                               /*18*/
1930       else                                                                /*18*/
1931          DRQ->Error = FALSE;                                              /*18*/
1932       Msg->Msg_Type = MT_Disc_Resp;                                       /*18*/
1933       Msg->Msg_Tag = 0;                                                   /*18*/
1934       SEND (Disc_GLB->EIO_Task_ID, Msg);                                  /*18*/
1935                                                                           /*18*/
1936       if (Disc_GLB->Unit_Atn)                                             /*18*/
1937          Disc_GLB->Drive_ID_Valid = FALSE;                                /*18*/
1938                                                                           /*18*/
1939    } /* Do_Req */                                                         /*18*/
1940
1941    /*+----------------------------------------------------------+*/
1942    /*|                       Do_Msg                             |*/
1943    /*|                                                          |*/
1944    /*+----------------------------------------------------------+*/
1945    static Do_Msg (Msg)
1946    MCB_Ptr       Msg;
1947    {
1948
1949       switch (Msg->Msg_Type)
1950       {
1951          case MT_EIO_Req:
1952              Do_EIO(Msg);
1953              break;
1954          case MT_Disc_Req:                                                 /*18*/
1955              Do_Req(Msg);                                                  /*18*/
1956              break;                                                        /*18*/
1957       } /* end switch */
1958
1959    } /* Do_Msg */
1960
1961    /*+----------------------------------------------------------+*/
1962    /*|                    DISC TASK                             |*/
1963    /*|                  INTIALIZATION                           |*/
1964    /*|                                                          |*/
1965    /*+----------------------------------------------------------+*/
1966    static Init ()                                                          /*8*/
1967    {
1968       Msg_Buf_Ptr   Msg_Buf;                                               /*8*/
1969       MCB           Msg;
1970       SPC_DCB_Ptr   SPC_DCB;
1971       SPC_DCR_Ptr   DCR;
1972       INTEGER       I;                                                     /*8*/
1973
1974       /* get space for global data */
1975
1976       GETSPACE (sizeof (*Disc_GLB), &Disc_GLB);                            /*8*/
1977       ZBUFB (Disc_GLB, sizeof (*Disc_GLB));                                /*8*/
```

```
/* initialize variables and pointers */

/* find out ID */

FINDMYID (&Disc_GLB->My_ID);

/* allocate and queue Msg buffers */

GETSPACE (Msg_No * sizeof (Msg_Buf_Type), &Msg_Buf);          /*8*/
ZBUFB (Msg_Buf, Msg_No * sizeof (Msg_Buf_Type));              /*8*/

QINIT( &Disc_GLB->Free_MsgQ, 0, 0);                           /*8*/
QINIT( &Disc_GLB->MsgQ, 0, 0);                                /*8*/
for (I = 0; I < Msg_No; I++) {                                /*8*/
   QINIT (&Disc_GLB->Free_MsgQ, Msg_Buf++, TRUE);             /*8*/
} /* LOOP queue Msg buffer */                                 /*8*/

/* initialize SPC_DCB */

Disc_Do_Wait (Msg_Event);
RECEIVE (&Msg);
DCR = (SPC_DCR_Ptr) Msg.Msg_Value;
if (!(Disc_GLB->SPC_DCB = (SPC_DCB_Ptr) INITSPCDCB (DCR)))
   SOFTFAIL();

/* if first device, reset SPC */ if ((!DCR->Bus_No) && (!DCR->Dev_No)) {
   SPC_DCB = Disc_GLB->SPC_DCB;
   SPC_DCB->Req = SPC_Dr_Reset;
   SPC_DCB->Reqmod = 0;
   if (!SPCDVR (SPC_DCB))
      SOFTFAIL();
}

/* get space for command and response package */

GETSPACE (Max_Cmd_Len, &Disc_GLB->Cmd_Buffer);
GETSPACE (Max_Rsp_Len, &Disc_GLB->Rsp_Buffer);

/* find out controller address */
/* Build Read_Rac_Check and Write_Rac_Check */

Disc_GLB->Unit_Atn = FALSE;
Disc_GLB->Port_Down [0] = FALSE;
Disc_GLB->Port_Down [1] = FALSE;

Disc_GLB->Drive_ID = &Disc_GLB->Drive_ID_Data;                /*8*/
Disc_GLB->Drive_ID_Valid = FALSE;                             /*8*/

} /* Init */

/*+------------------------------------------------------------+*/
/*|                       Main Loop                            |*/
/*|                                                            |*/
/*+------------------------------------------------------------+*/

DISC_MAIN ()                                                  /*8*/
{                                                             /*8*/
   MCB        Msg;                                            /*8*/
                                                              /*8*/
   Init ();                                                   /*8*/
                                                              /*8*/
   Disc_GLB->MsgQ_Flag = FALSE;                               /*8*/
                                                              /*8*/
   while (TRUE) {                                             /*8*/
                                                              /*8*/
      /* wait for new message */                              /*8*/
                                                              /*8*/
      Disc_Wait_Event (Msg_Event, &Msg);                      /*8*/
      Do_Msg (&Msg);                                          /*8*/
                                                              /*8*/
      /* check internal message queue */                      /*8*/
                                                              /*8*/
      if (Disc_GLB->MsgQ_Flag) {                              /*8*/
         while (Disc_Dequeue_Msg (&Msg))                      /*8*/
            Do_Msg (&Msg);                                    /*8*/
         Disc_GLB->MsgQ_Flag = FALSE;                         /*8*/
      }                                                       /*8*/
   }                                                          /*8*/
```

```
2059                                                                          /*8*/
2060     ) /* DISC_MAIN */                                                    /*8*/
  1    /*|-----------------------------------------------------------------*|*/
  2    /*|                         Disc Task                               |*/
  3    /*|                         Utility                                 |*/
  4    /*|                                                                 |*/
  5    /*+-----------------------------------------------------------------*|*/
  6
  7    /* includes */
  8
  9    #include "krnldf.c"        /* Kernel definition        */
 10    #include "portdf.c"        /* Port Task definition     */
 11    #include "spcdf.c"         /* SPC driver definition    */
 12    #include "ciddf.c"         /* Controller ID definition */
 13    #include "discdt.c"        /* Disc Data definition     */       /*18*/
 14
 15    extern GLB_Ptr       Disc_GLB;
 16    extern char          DISC_VERS[];
 17
 18    /*+-----------------------------------------------------------------*|*/
 19    /*|                         Disc_Do_Wait                            |*/
 20    /*|                                                                 |*/
 21    /*+-----------------------------------------------------------------*|*/
 22
 23    /* function Disc_Do_Wait                                              */
 24    /* call kernel WAIT with saving the global variable pointer           */
 25
 26    SHORT Disc_Do_Wait (Wait_Mask)                                      /*7*/
 27    SHORT         Wait_Mask;                                            /*7*/
 28    {                                                                   /*7*/
 29       GLB_Ptr       My_GLB;                                            /*7*/
 30       SHORT         Event_Mask;                                        /*7*/
 31                                                                        /*7*/
 32       My_GLB = Disc_GLB;         /* save global variables pointer */
 33       Event_Mask = WAIT (Wait_Mask);                                   /*7*/
 34       Disc_GLB = My_GLB;         /* restore global variables pointer */
 35       return (Event_Mask);                                             /*7*/
 36                                                                        /*7*/
 37    ) /* Disc_Do_Wait */                                                /*7*/
 38
 39    Disc_Queue_Msg (Msg)                                                /*8*/
 40    MCB_Ptr       Msg;                                                  /*8*/
 41    {                                                                   /*8*/
 42       Msg_Buf_Ptr   Msg_Buf;                                           /*8*/
 43                                                                        /*8*/
 44       if (!QREM (&Disc_GLB->Free_MsgQ, &Msg_Buf))                      /*8*/
 45          SOFTFAIL ();                                                  /*8*/
 46       MOVEB (Msg, &Msg_Buf->Msg, sizeof (*Msg));                       /*8*/
 47       QADD (&Disc_GLB->MsgQ, Msg_Buf);                                 /*8*/
 48       Disc_GLB->MsgQ_Flag = TRUE;                                      /*8*/
 49                                                                        /*8*/
 50    ) /* Disc_Queue_Msg */                                              /*8*/
 51
 52    BOOLEAN Disc_Dequeue_Msg (Msg)                                      /*8*/
 53    MCB_Ptr       Msg;                                                  /*8*/
 54    {                                                                   /*8*/
 55       Msg_Buf_Ptr   Msg_Buf;                                           /*8*/
 56                                                                        /*8*/
 57       if (!QREM (&Disc_GLB->MsgQ, &Msg_Buf))                           /*8*/
 58          return (FALSE);                                               /*8*/
 59       MOVEB (&Msg_Buf->Msg, Msg, sizeof (*Msg));                       /*8*/
 60       QADD (&Disc_GLB->Free_MsgQ, Msg_Buf);                            /*8*/
 61                                                                        /*8*/
 62    ) /* Disc_Dequeue_Msg */                                            /*8*/
 63
 64    SHORT Disc_Receive_Msg (Wait_Mask, Msg)                             /*8*/
 65    SHORT         Wait_Mask;                                            /*8*/
 66    MCB_Ptr       Msg;                                                  /*8*/
 67    {                                                                   /*8*/
 68       MCB           Cur_Msg;                                           /*8*/
 69       SHORT         Event;                                             /*8*/
 70                                                                        /*8*/
 71       Event = 0;                                                       /*8*/
 72       if ((Wait_Mask == Msg_Event) && Msg)                             /*8*/
 73          RECEIVE (Msg);                                                /*8*/
 74                                                                        /*8*/
 75       while (RECEIVE (&Cur_Msg)) {                                     /*8*/
 76          if (Cur_Msg.Msg_Type == MT_EIO_Req)                           /*8*/
 77             Disc_Queue_Msg (&Cur_Msg);                                 /*8*/
 78          else {                                                        /*8*/
 79             MOVEB (&Cur_Msg, Msg, sizeof (*Msg));                      /*8*/
 80             Event = Event | Port_Reply_Event;                          /*8*/
```

```
 81         }                                                                    /*6*/
 82     }                                                                        /*8*/
 83     return (Event);                                                          /*8*/
 84
 85 } /* Disc_Receive_Msg */
 86
 87 /* function Disc_Wait_Event                                              */  /*8*/
 88 /* for wait for for an event while continue receiving messag...          */  /*8*/
 89
 90 SHORT Disc_Wait_Event (Event, Msg)                                           /*8*/
 91 SHORT         Event;                                                         /*8*/
 92 MCB_Ptr       Msg;                                                           /*8*/
 93 {                                                                            /*8*/
 94     SHORT        Event_Mask;                                                 /*8*/
 95     SHORT        Wait_Mask;                                                  /*8*/
 96                                                                              /*8*/
 97     Wait_Mask = Msg_Event | Event;                                           /*8*/
 98     do {                                                                     /*8*/
 99         Event_Mask = Disc_Do_Wait (Wait_Mask);                                   /*8*/
100                                                                              /*8*/
101         if (Event_Mask & Msg_Event)                                          /*8*/
102             Event_Mask = Event_Mask | Disc_Receive_Msg (Event, Msg);             /*8*/
103                                                                              /*8*/
104     } while (!(Event_Mask & Event));                                         /*8*/
105                                                                              /*8*/
106     Event_Mask = Event_Mask & Event;                                         /*8*/
107     return (Event_Mask);                                                     /*8*/
108                                                                              /*8*/
109 } /* Disc_Wait_Event */                                                          /*8*/
110
111 BOOLEAN Disc_Get_Buffer (Count, Buffer)                                      /*7*/
112 ADDRESS   *Buffer;                                                           /*7*/
113 int       Count;                                                             /*7*/
114 {                                                                            /*7*/
115     EXC        Except;                                                       /*7*/
116                                                                              /*7*/
117     if (!XGETSPACE (Count, Buffer)) {                                        /*7*/
118         Except.Retry_Status = ER_Not_Recov;                                  /*7*/
119         Except.PID = Ctr_Except_PID;                                         /*7*/
120         Except.Substatus = CtrSs_No_Buffer;                                  /*7*/
121         Except.Retry_Count = -1;                                             /*7*/
122         Except.Lgc_Sector_Addr = -1;                                         /*7*/
123                                                                              /*7*/
124         Disc_Log_Except (&Except);                                               /*7*/
125         return (FALSE);                                                      /*7*/
126     }                                                                        /*7*/
127     return (TRUE);                                                           /*7*/
128                                                                              /*7*/
129 } /* Disc_Get_Buffer */                                                          /*7*/
130
131 /* function RIC_Except Code RIC status for Exception                     */
132 /*                                                                       */
133 /* code RIC status based mainly on Except->PID and, in some              */
134 /* device and drive status, also on Except->Substatus                    */
135
136 SHORT RIC_Except (Except)
137 EXC_Ptr   Except;
138 {
139     switch (Except->PID) {
140         case Cmd_Except_PID:
141             return (RIC_Cmd_Except);
142             break;
143         case Chn_Except_PID:
144             return (RIC_Chn_Except);
145             break;
146         case Ctr_Except_PID:
147             return (RIC_Ctr_Except);
148             break;
149         case Dev_Except_PID:
150             if (Except->Substatus & DevSs_Select_Err)                            /*5*/
151                 return (RIC_Select_Err);
152             else if (Except->Substatus & DevSs_No_Respond)                       /*5*/
153                 return (RIC_No_Respond);
154             else
155                 return (RIC_Dev_Except);
156             break;
157         case Dr_Except_PID:
158             if (Except->Substatus & DrSs_Not_Ready)                              /*5*/
159                 return (RIC_Not_Ready);
160             else if (Except->Substatus & DrSs_Ready_Transition)                  /*5*/
```

```
161                    return (RIC_Drive_Attention);                              /*4*/
162                else
163                    return (RIC_Dr_Except);
164                break;
165            case ECC_Except_PID:
166                return (RIC_ECC_Except);
167                break;
168            default:
169                return (0);
170                break;
171        } /* switch (Except_PID) */
172    } /* RIC_Except */
173
174    /* function Disc_Set_RIC Set RIC word for extended command         */
175    /*                                                                 */
176    /* change RIC word unless it is already unsuccessful               */
177
178    Disc_Set_RIC (Cur_RIC)
179    SHORT     Cur_RIC;
180    {
181        if (!(Disc_GLB->RIC & RIC_Unsuccessful))
182            Disc_GLB->RIC = Cur_RIC | Disc_GLB->EXD->Cmd_Rsp_IOC;        /*7*/
183
184    } /* Disc_Set_RIC */
185
186    /*+----------------------------------------------------------------+*/
187    /*|                         Log Utilities                          |*/
188    /*|                                                                |*/
189    /*+----------------------------------------------------------------+*/
190
191    ADDRESS Disc_Get_Rsp (Parm_Len)
192    INTEGER        Parm_Len;
193    {
194        EXD_Ptr          EXD;
195        BYTE             *Parm;
196
197        EXD = Disc_GLB->EXD;
198
199        /* leave room for packet length */
200
201        if (!EXD->Rsp_Len)
202            EXD->Rsp_Len = 2;
203
204        /* make sure we leave enough room for Response Overflow and Response End */
205
206        if ((EXD->Rsp_Len + Parm_Len) > (Max_Rsp_Len -
207            (Rsp_Overflow_Len + 1 + Rsp_End_Len + 1))) {
208            EXD->Rsp_Overflow = TRUE;
209            return (0);
210        }
211
212        Parm = (BYTE *) EXD->Rsp_Buffer + EXD->Rsp_Len;
213        EXD->Rsp_Len = EXD->Rsp_Len + Parm_Len;
214
215        /* pad if odd parameter */
216
217        if (Parm_Len & 0x0001) {
218            *(Parm + Parm_Len) = 0;
219            EXD->Rsp_Len++;
220        }
221
222        return ( (ADDRESS) Parm);
223    } /* Disc_Get_Rsp */
224
225    Disc_Log_Cmd_Except (Substatus)
226    LONG           Substatus;
227    {
228        EXC            Except;
229
230        Except.Retry_Status = ER_Not_Recov;
231        Except.PID = Cmd_Except_PID;
232        Except.Substatus = Substatus;
233        Disc_Log_Except (&Except);
234
235    } /* Disc_Log_Cmd_Except */
236
237    /* procedure Disc_Log_Invalid_Parm                                  */
238    /* if Pkt_Header = 0, parameter and field displacements are not known*/
239
240    Disc_Log_Invalid_Parm (Pkt_Header,                                   /*8*/
241                           Parm_Ptr,
242                           Field_Ptr,
243                           Field_Len)
```

```
244         BYTE    *Pkt_Header;
245         BYTE    *Parm_Ptr;
246         BYTE    *Field_Ptr;
247         int     Field_Len;
248         {
249            Invalid_Parm_Ptr  Invalid_Parm;
250            BYTE              Len;
251
252            Disc_Log_Cmd_Except (CmdSs_Invalid_Parm);                              /*8*/
253            if (Pkt_Header)
254               Parm_Ptr = Field_Ptr;
255            Len = Field_Ptr + Field_Len - Parm_Ptr;
256
257            if (Invalid_Parm = (Invalid_Parm_Ptr)
258                              Disc_Get_Rsp (Invalid_Parm_Header_Len - Len)) {
259               Invalid_Parm->Len = Invalid_Parm_Header_Len + Len - 1;
260               Invalid_Parm->PID = Invalid_Parm_PID;
261               if (Pkt_Header) {
262                  Invalid_Parm->Parm_Displace = Parm_Ptr - Pkt_Header;
263                  Invalid_Parm->Field_Displace = Field_Ptr - Parm_Ptr;
264               }
265               else {
266                  Invalid_Parm->Parm_Displace = -1;
267                  Invalid_Parm->Field_Displace = -1;
268               }
269               MOVEB (Parm_Ptr, &Invalid_Parm->Data, Len);
270            }
271
272         } /* Disc_Log_Invalid_Parm */
273
274         Disc_Log_Missing_Parm (Parm_PID)
275         BYTE    Parm_PID;
276         {
277         Missing_Parm_Ptr  Missing_Parm;
278
279            Disc_Log_Cmd_Except (CmdSs_Missing_Parm);
280
280.1          Missing_Parm = 0;             /* to avoid compiler warning 94 */    /*20*/
281            if (Missing_Parm = (Missing_Parm_Ptr)                                 /*7*/
282                              Disc_Get_Rsp (sizeof (*Missing_Parm))) {            /*7*/
283               Missing_Parm->Len = sizeof (*Missing_Parm) - 1;
284               Missing_Parm->PID = Missing_Parm_PID;
285               Missing_Parm->Parm_PID = Parm_PID;
286            }
287
288         } /* Disc_Log_Missing_Parm */
289
290         Disc_Log_Chnl_Attr (EXD)
291         EXD_Ptr       EXD;
292         {
293            Chnl_Attr_Ptr     Chnl_Attr;
294
295            Chnl_Attr = 0;                /* to avoid compiler warning 94 */    /*20*/
295.1          if (Chnl_Attr = (Chnl_Attr_Ptr)                                      /*7*/
296                              Disc_Get_Rsp (sizeof (*Chnl_Attr))) {              /*7*/
297               Chnl_Attr->Len = sizeof (*Chnl_Attr) - 1;                         /*7*/
298               Chnl_Attr->PID = Chnl_Attr_PID;                                   /*7*/
299               Chnl_Attr->Burst = EXD->Burst;                                    /*7*/
300               Chnl_Attr->Holdoff = EXD->Holdoff;                                /*7*/
301               Chnl_Attr->Mode = EXD->Chnl_Mode;
302            }
303
304         } /* Disc_Log_Chnl_Attr */
305
306         Disc_Log_Ctrl_ID ()
307         {
308            Parm_Header_Ptr   Parm;
309
310            if (Parm = (Parm_Header_Ptr) Disc_Get_Rsp (sizeof (*Ctrl_ID) + 2)){ /*8*/
311               Parm->Len = sizeof (*Ctrl_ID) + 1;                                /*8*/
312               Parm->PID = Ctrl_ID_PID;                                          /*7*/
313               MOVEB (Ctrl_ID, &Parm->Data, sizeof (*Ctrl_ID));                  /*8*/
314            }                                                                    /*7*/
315
316         } /* Disc_Log_Ctrl_ID */
317
318         Disc_Log_Drive_ID ()
319         {
320            Drive_ID_Ptr      Drive_ID;                                          /*8*/
321            BOOLEAN           Fake;                                              /*8*/
322            Parm_Header_Ptr   Parm;
323                                                                                 /*8*/
324            Drive_ID = Disc_GLB->Drive_ID;                                       /*8A*/
325            Fake = FALSE;
```

```
326         if (Fake) {      /*************************** remove */   /*8*/
327             Drive_ID->Last_Lgc_Sector_Addr = 0x44491;              /*5*/
328             Drive_ID->Last_CE_Lgc_Sector_Addr = 0x44795;           /*5*/
329             Drive_ID->Lgc_Sectors_Per_Phy_Sector = 1;              /*5*/
330             Drive_ID->Phy_Sectors_Per_Track = 38;                  /*5*/
331             Drive_ID->Spare_Phy_Sectors_Per_Cyl = 24;              /*5*/
332             Drive_ID->Heads_Per_Cyl = 8;                           /*5*/
333             Drive_ID->Cyls = 1016;                                 /*5*/
334         }
335         if (Parm = (Parm_Header_Ptr) Disc_Get_Rsp (Drive_ID_Len + 2)) {   /*8*/
336             Parm->Len = Drive_ID_Len + 1;                          /*8*/
337             Parm->PID = Drive_ID_PID;                              /*8*/
338             MOVEB (Drive_ID, &Parm->Data, Drive_ID_Len);           /*8*/
339         }                                                          /*8*/
340     } /* Disc_Log_Drive_ID */
341
342     Disc_Log_uCode_Ver ()
343     {
344         Parm_Header_Ptr    Parm;
345
346         if (Parm = (Parm_Header_Ptr)                               /*7*/
347             Disc_Get_Rsp (sizeof (uCode_Ver_Struct) + 2)) {        /*7*/
348             Parm->Len = sizeof (uCode_Ver_Struct) + 1;             /*7*/
349             Parm->PID = uCode_Ver_PID;                             /*7*/
350             MOVEB (&DISC_VERS, &Parm->Data, sizeof (uCode_Ver_Struct));  /*7*/
351         }                                                          /*7*/
352     } /* Disc_Log_uCode_Ver */
353
354     Disc_Put_Rsp_End_Len(EXD)
355     EXD_Ptr       EXD;
356
357     {
358         Parm_Header_Ptr    Parm;
359
360         /* put response overflow parameter if required */
361
362         if (EXD->Rsp_Overflow) {                                   /*7*/
363             Parm = (Parm_Header_Ptr) (EXD->Rsp_Buffer + EXD->Rsp_Len);  /*7*/
364             Parm->Len = Rsp_Overflow_Len;                          /*7*/
365             Parm->PID = Rsp_Overflow_PID;                          /*7*/
366             EXD->Rsp_Len = EXD->Rsp_Len + Rsp_Overflow_Len + 1;    /*7*/
367         }                                                          /*7*/
368
369         /* put response end parameter */
370
371         Parm = (Parm_Header_Ptr) (EXD->Rsp_Buffer + EXD->Rsp_Len);
372         Parm->Len = Rsp_End_Len;
373         Parm->PID = Rsp_End_PID;
374         EXD->Rsp_Len = EXD->Rsp_Len + Rsp_End_Len + 1;
375
376
377         /* put packet length */
378
379         *(INTEGER *) EXD->Rsp_Buffer = EXD->Rsp_Len - 2;
380
381     } /* Disc_Put_Rsp_End_Len */
382
383     /* function Disc_Log_Port_Except  Log Port exception           */
384     /*                                                             */
385     /* logs substatus, if state valid logs port state and sets RID */
386     /* drive state is logged after the substatus                   */
387     /* it only sets and not resets Unsuccessful status             */
388
389     Disc_Log_Port_Except (Except, CB)
390     EXC_Ptr        Except;
391     Port_CB_Ptr    CB;
392     {
393         if (CB->State_Valid)
394             Except->Substatus = Except->Substatus | Ss_State;      /*5*/
395         Disc_Log_Except (Except);
396         if (CB->State_Valid) {
397             Disc_Log_PPC_State (&(CB->State_Buffer->PPC), CB->Port_No);
398             Disc_Log_DBDMA_State (&(CB->State_Buffer->DBDMA));
399         }
400
401     } /* Disc_Log_Port_Except */
402
403     /* function Disc_Log_Dr_Except  Log driver exception           */
404     /*                                                             */
405     /* logs substatus, if state valid logs drive state and sets RID*/
406     /* drive state is logged after the substatus                   */
407     /* it only sets and not resets Unsuccessful status             */
```

```
407
408     Disc_Log_Or_Except (Except, State_Valid, State)
409     EXC_Ptr         Except;
410     BOOLEAN         State_Valid;
411     SPC_State_Ptr   State;
412     {
413         if (State_Valid)
414             Except->Substatus = Except->Substatus | Ss_State;              /*5*/
415         Disc_Log_Except (Except);
416         if (State_Valid) {
417             Disc_Log_SPC_State (&State->SPC);
418             Disc_Log_DBDMA_State (&State->DBDMA);
419         }
420
421     } /* Disc_Log_Or_Except */
422
423     /* function Disc_Log_Except  Log exception                              */
424     /*                                                                     */
425     /* logs substatus and sets RIC                                         */
426     /* it only sets and not resets Unsuccessful status                     */
427
428     Disc_Log_Except (Except)
429     EXC_Ptr         Except;
430     {
431         SHORT       Cur_RIC;
432
433         if (Except->Retry_Status == ER_Not_Recov) {
434             Except->Substatus = Except->Substatus | Ss_Unsuccessful;  /*5*/
435             Cur_RIC = RIC_Unsuccessful | RIC_Except (Except);
436         }
437         else
438             Cur_RIC = RIC_Conditional_Success;
439
440         Disc_Log_Except_Parm (Except);
441         Disc_Set_RIC (Cur_RIC);
442
443     } /* Disc_Log_Except */
444
445     /* function Disc_Log_Retry  Log Retry Result                           */
446     /*                                                                     */
447     /* fix exception parameter Unsuccessful bit of the substatus           */
448     /* and the retry count and sets RIC                                    */
449     /* Except->Parm_Ptr must point to the exception parameter              */
450     /* if it is zero means there is no more room in the response           */
451     /* package                                                             */
452
453     Disc_Log_Retry (Except)
454     EXC_Ptr         Except;
455     {
456         Dev_Except_Ptr      Cur_Except;
457
458         /* fix exception parameter */
459
460         if (Except->Parm_Ptr) {
461             Cur_Except = (Dev_Except_Ptr) Except->Parm_Ptr;
462             if (Except->Retry_Status == ER_Not_Recov)
463                 Cur_Except->Substatus = Cur_Except->Substatus | Ss_Unsuccessful;
464             Cur_Except->Retry_Count = Except->Retry_Count;
465         }
466
467         /* set RIC */
468
469         if (Except->Retry_Status == ER_Not_Recov)
470             Disc_Set_RIC (RIC_Unsuccessful | RIC_Except (Except));
471         else
472             Disc_Set_RIC (RIC_Conditional_Success);
473
474     } /* Disc_Log_Retry */
475
476     /* function Disc_Log_Except_Parm  Log Exception                        */
477     /* it returns the parameter pointer in the Except->Parm_Ptr            */
478     /* if there is no room in the response package Parm_Ptr is             */
479     /* zero                                                                */
480
481     Disc_Log_Except_Parm (Except)
482     EXC_Ptr     Except;
483     {
484         Chn_Except_Ptr      Chn_Except;
485         Dev_Except_Ptr      Dev_Except;
486
487         Except->Parm_Ptr = 0;                                           /*7*/
488
```

```
489        if ((Except->PID == Cmd_Except_PID) ||
490            (Except->PID == Chn_Except_PID)) {
491
492            Chn_Except = 0;          /* to avoid compiler warning 94 */    /*20*/
492.1          if (Chn_Except = (Chn_Except_Ptr)                              /*7*/
493                             Disc_Get_Rsp (sizeof (*Chn_Except))) {        /*7*/
494                Chn_Except->Len = sizeof (*Chn_Except) - 1;                /*7*/
495                Chn_Except->PID = Except->PID;                             /*7*/
496                Chn_Except->Substatus = Except->Substatus;
497                Except->Parm_Ptr = (ADDRESS) Chn_Except;                   /*7*/
498            }
499        } /* if Chn_Except_PID */
500
501        /* Controller, Device Interface, Drive and ECC exceptions has */
502        /* more information */
503
504        else {
505            Dev_Except = 0;          /* to avoid compiler warning 94 */    /*20*/
505.1          if (Dev_Except = (Dev_Except_Ptr)                              /*7*/
506                             Disc_Get_Rsp (sizeof (*Dev_Except))) {        /*7*/
507                Dev_Except->Len = sizeof (*Dev_Except) - 1;                /*7*/
508                Dev_Except->PID = Except->PID;                             /*7*/
509                Dev_Except->Substatus = Except->Substatus;                 /*7*/
510                Dev_Except->Retry_Count = Except->Retry_Count;             /*7*/
511                Dev_Except->filler = 0;                                    /*7*/
512                Dev_Except->Lgc_Sector_Addr = Except->Lgc_Sector_Addr;     /*7*/
513                Except->Parm_Ptr = (ADDRESS) Dev_Except;                   /*7*/
514            }
515        } /* if Dev_Except_PID */                                          /*7*/
516                                                                           /*7*/
517    } /* Disc_Log_Except_Parm */
518
519    Disc_Log_Sense (Sense)
520    Sense_Ptr   Sense;                                                     /*8*/
521    {                                                                      /*8*/
522        Parm_Header_Ptr   Parm;
523
524        if (Parm = (Parm_Header_Ptr) Disc_Get_Rsp (sizeof (*Sense) + 2)) {  /*8*/
525            Parm->Len = sizeof (*Sense) + 1;
526            Parm->PID = SCSI_Ext_Sense_PID;                                /*8*/
527            MOVEB (Sense, &Parm->Data, sizeof (*Sense));                   /*8*/
528        }
529    } /* Disc_Log_Sense */
530
531    Disc_Log_PPC_State (PPC_State, Port_No)
532    PPC_Regs_Ptr    PPC_State;
533    BYTE            Port_No;
534    {
535        Parm_Header_Ptr   Parm;
536
537        if (Parm = (Parm_Header_Ptr) Disc_Get_Rsp (sizeof (*PPC_State) + 2)) {
538            Parm->Len = sizeof (*PPC_State) + 1;
539            if (Port_No)
540                Parm->PID = PPC1_State_PID;
541            else
542                Parm->PID = PPC0_State_PID;
543            MOVEB (PPC_State, &Parm->Data, sizeof (*PPC_State));
544        }
545    } /* Disc_Log_PPC_State */
546
547    Disc_Log_DBDMA_State (DBDMA_State)
548    DBDMA_Regs_Ptr    DBDMA_State;
549    {
550        Parm_Header_Ptr   Parm;
551
552        if (Parm = (Parm_Header_Ptr) Disc_Get_Rsp (sizeof(*DBDMA_State) + 2)) {
553            Parm->Len = sizeof (*DBDMA_State) + 1;
554            Parm->PID = DBDMA_State_PID;
555            MOVEB (DBDMA_State, &Parm->Data, sizeof (*DBDMA_State));
556        }
557    } /* Disc_Log_DBDMA_State */
558
559    Disc_Log_SPC_State (SPC_State)
560    SPC_Regs_Ptr    SPC_State;
561    {
562        Parm_Header_Ptr   Parm;
563
564        if (Parm = (Parm_Header_Ptr) Disc_Get_Rsp (sizeof (*SPC_State) + 2)) {
565            Parm->Len = sizeof (*SPC_State) + 1;
566            Parm->PID = SPC_State_PID;
567            MOVEB (SPC_State, &Parm->Data, sizeof (*SPC_State));
568        }
569    } /* Disc_Log_SPC_State */
570
```

```
/*+--------------------------------------------------------------------------+*/
/*|                           I/O Utilities                                  |*/
/*|                                                                          |*/
/*+--------------------------------------------------------------------------+*/

/* function Disc_Code_Port_Reply  Code Port Reply for Exception           */
/* Port_ChnReset, Port_Killed and Port_NotOwned should be                 */
/* handled separately                                                     */

Disc_Code_Port_Reply (Reply, Except)
BYTE        Reply;
EXC_Ptr     Except;
{
    switch (Reply) {
        case Port_TakeownEIO:
        case Port_ReadPErr:
        case Port_Aborted:
        case Port_TransErr:
            Except->PID = Chn_Except_PID;
            Except->Substatus = ChnSs_Transfer_Err;
            break;
        case Port_TBusSeqErr:
            Except->PID = Chn_Except_PID;
            Except->Substatus = ChnSs_TBus_Seq_Err;
            break;
        case Port_PPCErr:
            Except->PID = Ctr_Except_PID;
            Except->Substatus = CtrSs_PPC_Chip_Err;
            break;
        case Port_DBDMAErr:
            Except->PID = Ctr_Except_PID;
            Except->Substatus = CtrSs_DBDMA_Chip_Err;
            break;
        default:
            Except->PID = Ctr_Except_PID;
            Except->Substatus = CtrSs_uCode_Err;
            break;
    } /* switch (Reply) */

} /* Disc_Code_Port_Reply */

/* function PortIO  Port I/O                                              */
/* it sends a message to the task that sends the EIO and                  */
/* waits for the response message.  It does not retry.                    */
/*                                                                        */
/* it returns:                                                            */
/*     TRUE if no error                                                   */
/*     FALSE if error                                                     */
/* when channel reset, port killed or no ownership:                       */
/*     port is marked down                                                */
/* when error encountered:                                                */
/*     substatus and port state are logged                                */
/*     RIC status is set                                                  */

BOOLEAN Disc_PortIO (Msg_Type, CB)
BYTE         Msg_Type;
Port_CB_Ptr  CB;
{
    MCB         Send_Msg;
    MCB         Resp_Msg;

EXC         Except_Data;
    EXC_Ptr     Except;
    Port_State  Port_State;

/* check port status */ if (Disc_GLB->Port_Down [Disc_GLB->Port_No])
        return (FALSE);

/* build message */

CB->Port_No = Disc_GLB->Port_No;
    CB->State_Valid = FALSE;
    CB->State_Buffer = &Port_State;

Send_Msg.Msg_Type = Msg_Type;
    Send_Msg.Msg_Value = (ADDRESS) CB;

if (!SEND (Disc_GLB->EIO_Task_ID, &Send_Msg))
        SOFTFAIL ();

/* wait for response */
```

```
           Disc_Wait_Event (Port_Reply_Event | Timeout_Event, &Resp_Msg);        /*8*/ if (!(Resp_Msg.Msg_Tag))
           return (TRUE);
        else {
           if ((Resp_Msg.Msg_Tag == Port_ChnReset) ||
               (Resp_Msg.Msg_Tag == Port_Killed) ||
               (Resp_Msg.Msg_Tag == Port_NotOwned)) {
              Disc_GLB->Port_Down [Disc_GLB->Port_No] = TRUE;
              return (FALSE);
           }
           else {
              Except = &Except_Data;
              Except->Retry_Count = 0;

Except->Lgc_Sector_Addr = -1;

Except->Retry_Status = ER_Not_Recov;                               /*4*/
              Disc_Code_Port_Reply (Resp_Msg.Msg_Tag, Except);
              Disc_Log_Port_Except (Except, CB);
              return (FALSE);
           }
        }
    } /* Disc_PortIO */

/* function Disc_Code_Driver_IReply Code Driver IReply for          */
    /* Exception                                                        */

Disc_Code_Driver_IReply (IReply, Except)
    BYTE       IReply;
    EXC_Ptr    Except;
    {

/****** need status for Bus Reset and Device Busy */ switch (IReply)
       {
          case SPC_DrReply_Write_PErr:
          case SPC_DrReply_Read_PErr:
             Except->PID = Dev_Except_PID;
             Except->Substatus = DevSs_Ctr_Parity_Err;
             break;
          case SPC_DrReply_Prot_Err:
             Except->PID = Dev_Except_PID;
             Except->Substatus = DevSs_Ctr_Prot_Err;
             break;
          case SPC_DrReply_Bus_Reset:
             Except->PID = Dev_Except_PID;
             Except->Substatus = DevSs_Stuck_Bus;
             break;
          case SPC_DrReply_Sel_Time:
             Except->PID = Dev_Except_PID;
             Except->Substatus = DevSs_No_Respond;
             break;
          case SPC_DrReply_Unexp_Int:
             Except->PID = Dev_Except_PID;
             Except->Substatus = DevSs_Unexp_Intr;
             break;
          case SPC_DrReply_Data_Overrun:
             Except->PID = Dev_Except_PID;
             Except->Substatus = DevSs_Data_Overrun;
             break;
          case SPC_DrReply_SPC_Err:
             Except->PID = Ctr_Except_PID;
             Except->Substatus = CtrSs_SPC_Chip_Err;
             break;
          case SPC_DrReply_DMB_Err:
             Except->PID = Ctr_Except_PID;
             Except->Substatus = CtrSs_DBDMA_Chip_Err;
             break;
          default:
             Except->PID = Ctr_Except_PID;
             Except->Substatus = CtrSs_uCode_Err;
             break;
       } /* switch (IReply) */

} /* Disc_Code_Driver_IReply */

/* function Disc_Retry_IReply  Retry Driver IReply error            */
    /*                                                                  */
    /* it returns:                                                      */
                                                                        */
```

```
735        /*     TRUE if recovered                                           */
736        /*     FALSE if Max_Retry_Count exceeded or a new error            */
737        /*                                                                 */
738        /* driver call error is not retried                                */
739        /* interrupt handler error is retried until Max_Retry_Count        */
740        /*    or another error encountered                                 */
741        /*                                                                 */
742        /* the previous retry count and success status is logged           */
743        /* in the previous substatus parm                                  */
744        /* if a new error encountered:                                     */
745        /*     substatus and driver state are logged                       */
746        /*     RIC status is set                                           */
747
748        BOOLEAN Disc_Retry_IReply (SPC_DCB, Error_IReply, Except)     /*7*/
749        SPC_DCB_Ptr   SPC_DCB;                                        /*7*/
750        BYTE          Error_IReply;
751        EXC_Ptr       Except;
752        {
753           EXC         New_Except_Data;
754           EXC_Ptr     New_Except;
755           SPC_State_Struct Dr_State;
756
757           SPC_DCB->State_Valid = FALSE;
758           SPC_DCB->State_Buffer = &Dr_State;
759
760           New_Except = &New_Except_Data;
761           New_Except->Retry_Count = 0;
762           New_Except->Lgc_Sector_Addr = -1;
763
764           do {
765
766              ++(Except->Retry_Count);
767
768              /* call driver */
769
770              if (!(SPCDVR (SPC_DCB))) {
771                 Disc_Log_Retry (Except);
772                 New_Except->Retry_Status = ER_Not_Recov;
773                 New_Except->PID = Ctr_Except_PID;
774                 New_Except->Substatus = CtrSs_uCode_Err;
775           Disc_Log_Dr_Except (New_Except, SPC_DCB->State_Valid, SPC_DCB->State_Buffer);
776                 return (FALSE);
777              }
778
779              /* wait for interrupt signal */
780
781              Disc_Wait_Event (SPC_Cmp_Event | Timeout_Event, 0);          /*8*/
782
783              /* check replies */
784
785              if (!SPC_DCB->IReply) {
786
787                 /* recovered */
788
789                 Except->Retry_Status = ER_Recov;
790                 Disc_Log_Retry (Except);
791                 return (TRUE);
792              }
793
794              /* different error */
795
796              else if (SPC_DCB->IReply != Error_IReply) {
797                 Except->Retry_Status = ER_Not_Recov;
798                 Disc_Log_Retry (Except);
799                 Disc_Code_Driver_IReply (SPC_DCB->IReply, New_Except);
           Disc_Log_Dr_Except (New_Except, SPC_DCB->State_Valid, SPC_DCB->State_Buffer);
801                 return (FALSE);
802              }
803
804
805
806           } while (Except->Retry_Count < Max_Retry_Count);                /*8*/
807
808           /* Max_Retry_Count exceeded */
809
810           Except->Retry_Status = ER_Not_Recov;
811           Disc_Log_Retry (Except);
812           return (FALSE);
813
814        } /* Disc_Retry_IReply */
815
816        /* function Disc_Do_Driver   SPC driver call with retry              */
817        /*                                                                   */
```

```
818        /* if waited than it waits for interrupt handler signal      */
819        /* else it returns after driver call                          */
820        /*                                                            */
821        /* it returns:                                                */
822        /*    TRUE if no error or recovered                           */
823        /*    FALSE if not recovered                                  */
824        /*                                                            */
825        /* driver call error is not retried                           */
826        /* interrupt handler error is retried until Max_Retry_Count   */
827        /*    or another error encountered                            */
828        /*                                                            */
829        /* when error encountered:                                    */
830        /*    substatus and driver state are logged                   */
831        /*    RIC status is set                                       */
832        /*                                                            */
833        BOOLEAN Disc_Do_Driver (SPC_DCB, Waited)
834        SPC_DCB_Ptr  SPC_DCB;                                          /*7*/
835        BOOLEAN      Waited;                                           /*7*/
836        {
837           EXC              Except_Data;
838           EXC_Ptr          Except;
839           SPC_State_Struct Dr_State;
840
841           SPC_DCB->State_Valid = FALSE;
842           SPC_DCB->State_Buffer = &Dr_State;
843
844           Except = &Except_Data;
845           Except->Retry_Count = 0;
846           Except->Lgc_Sector_Addr = -1;
847
848           /* call driver */
849
850           if (!SPCDVR (SPC_DCB)) {
851              Except->Retry_Status = ER_Not_Recov;
852              Except->PID = Ctr_Except_PID;
853              Except->Substatus = CtrSs_uCode_Err;
854              Disc_Log_Dr_Except (Except, SPC_DCB->State_Valid, SPC_DCB->State_Buffer);
855              return (FALSE);
856           }
857           else if (!Waited)
858              return (TRUE);
859
860           /* wait for driver reply */
861
862           Disc_Wait_Event (SPC_Cmp_Event | Timeout_Event, 0);          /*8*/
863
864           /* check replies */
865
866           if (!SPC_DCB->IReply)
867              return (TRUE);
868           else {
869              Except->Retry_Status = ER_Retry;
870              Disc_Code_Driver_IReply (SPC_DCB->IReply, Except);
871              Disc_Log_Dr_Except (Except, SPC_DCB->State_Valid, SPC_DCB->State_Buffer);
872              return (Disc_Retry_IReply (SPC_DCB, SPC_DCB->IReply, Except));  /*8*/
873           }
874
875        } /* Disc_Do_Driver */
876
877        /* function Disc_Code_Sense Code Ext Sense for Exception       */  /*8*/
878
879        Disc_Code_Sense (Sense, Except)                                    /*8*/
880        Sense_Ptr    Sense;                                                /*8*/
881        EXC_Ptr      Except;
882        {
883           BYTE         Sense_Key;                                         /*8*/
884
885           Sense_Key = Sense->Sense_Key & Sense2_Sense_Key;                /*8*/
886           switch (Sense_Key) {                                            /*8*/
887              case Sense_Recovered:
888                 Except->Retry_Status = ER_Recov;                         /*8*/
889                 Except->PID = ECC_Except_PID;
890                 Except->Substatus = ECCSs_Cor_Data;
891                 break;
892              case Sense_Not_Ready:
893                 Except->Retry_Status = ER_Not_Recov;
894                 Except->PID = Dr_Except_PID;
895                 Except->Substatus = DrSs_Not_Ready;
896                 break;
897              case Sense_Medium_Err:
898                 Except->Retry_Status = ER_Retry;                         /*8*/
899                 Except->PID = ECC_Except_PID;
900                 Except->Substatus = ECCSs_Uncor_Data;
```

```
901                 break;
902             case Sense_HW_Err:
903                 Except->Retry_Status = ER_Retry;                    /*8*/
904                 Except->PID = Dr_Except_PID;
905                 Except->Substatus = DrSs_Hw_Err;
906                 break;
907             case Sense_Ill_Req:
908                 Except->Retry_Status = ER_Not_Recov;                /*8*/
909                 Except->PID = Dev_Except_PID;
910                 Except->Substatus = DevSs_Cmd_Except;
911                 break;
912             case Sense_Unit_Atn:
913                 Except->Retry_Status = ER_Not_Recov;                /*8*/
914                 Except->PID = Dr_Except_PID;
915                 Except->Substatus = DrSs_Ready_Transition;
916                 Disc_GLB->Unit_Atn = TRUE;                          /*8*/
917                 break;
918             case Sense_Data_Prot:
919                 Except->Retry_Status = ER_Not_Recov;                /*8*/
920                 Except->PID = Dr_Except_PID;
921                 Except->Substatus = DrSs_Write_Protect;
922                 break;
923             case Sense_Aborted:
924                 Except->Retry_Status = ER_Not_Recov;                /*8*/
925                 Except->PID = Dev_Except_PID;
926                 Except->Substatus = DevSs_Stat_Except;
927                 break;
928             case Sense_Overflow:
929                 Except->Retry_Status = ER_Not_Recov;                /*8*/
930                 Except->PID = Dr_Except_PID;
931                 Except->Substatus = DrSs_Sector_Addr_Err;
932                 break;
933             case Sense_Miscompare:                                  /*7*/
934                 Except->Retry_Status = ER_Retry;                    /*8*/
935                 Except->PID = Ctr_Except_PID;                       /*7*/
936                 Except->Substatus = CtrSs_Data_Miscompare;          /*7*/
937                 break;                                              /*7*/
938             default:
939                 Except->Retry_Status = ER_Not_Recov;                /*8*/
940                 Except->PID = Dev_Except_PID;
941                 Except->Substatus = DevSs_Stat_Except;
942                 break;
943         } /* switch (Sense_Key) */
944
945         if (Sense->Error & Sense0_Valid)                            /*8*/
946             Except->Lgc_Sector_Addr = (Sense->Info[0] << 24) +      /*8*/
947                                      (Sense->Info[1] << 16) +      /*8*/
948                                      (Sense->Info[2] <<  8) +      /*8*/
949                                       Sense->Info[3];              /*8*/
950
951     } /* Disc_Code_Sense */
952
953     /* function Disc_Request_Sense    Request Sense from Device      */
954     /*                                                               */
955     /* it returns:                                                   */
956     /*    TRUE if Sense received                                     */
957     /*    FALSE if error                                             */
958     /* Sense is the Sense Key from the device                        */
959     /* if Log is TRUE then the whole sense data is logged at the     */
960     /* response package                                              */
961     /* sense must be in extended sense format                        */
962     /* SPC_DCB must be preserved for retry                           */
963
964     BOOLEAN Disc_Request_Sense (SPC_DCB, Sense)                     /*8*/
965     SPC_DCB_Ptr     SPC_DCB;                                        /*7*/
966     Sense_Ptr       Sense;                                          /*8*/
967     {
968         SPC_DCB_Struct   Copy_DCB;
969         SCSI_Cmd_Ptr     SCSI_Cmd;                                  /*7*/
970         ADDRESS          Sense_Buffer;
971         BOOLEAN          Return_Value;
972
973         /* save original SPC_DCB */
974
975         MOVEB (SPC_DCB, &Copy_DCB, sizeof (*SPC_DCB));
976
977         /* form SCSI command */
978
979         SCSI_Cmd = (SCSI_Cmd_Ptr) SPC_DCB->Command;                 /*7*/
980         SCSI_Cmd->Op_Code = SDOp_Req_Sense;
981         SCSI_Cmd->Byte1   = 0;
982         SCSI_Cmd->Byte2   = 0;
983         SCSI_Cmd->Byte3   = 0;
```

```
984         SCSI_Cmd->Byte4     = sizeof (*Sense);
985         SCSI_Cmd->Vendor_Unique = 0;
986         SPC_DCB->Cmd_Count = sizeof (*SCSI_Cmd);
987
988         /* get buffer space */
989         /* store in EXD for trace */
990
991         if (!Disc_Get_Buffer (sizeof (*Sense), &Sense_Buffer))        /*7*/
992             return (FALSE);                                           /*7*/
993         Disc_GLB->EXD->Sense_Buffer = Sense_Buffer;                   /*7*/
994
995         /* form SCSI SPC_DCB */
996
997         SPC_DCB->Req = SPC_Dr_Read;
998         SPC_DCB->Reqmod = 0;
999         SPC_DCB->Transfer_Buffer = Sense_Buffer & 0x0000FFFF;         /*7*/
1000        SPC_DCB->Transfer_Count = sizeof (*Sense);                    /*7*/
1001
1002        /* execute SCSI command */
1003
1004        if (!Disc_Do_Driver (SPC_DCB, TRUE)) {
1005            Return_Value = FALSE;
1006            goto Disc_Request_Sense_End;                              /*7*/
1007        }
1008
1009        /*********** check Actual_Count */
1010
1011        /* move Sense data */                                          /*8*/
1012
1013        MOVEB (Sense_Buffer, Sense, sizeof (*Sense));                  /*8*/
1014        Return_Value = TRUE;
1015
1016    Disc_Request_Sense_End:
1017
1018        /* restore original SPC_DCB */
1019
1020        MOVEB (&Copy_DCB, SPC_DCB, sizeof(*SPC_DCB));
1021        XPUTSPACE (Sense_Buffer);                                     /*7*/
1022        return (Return_Value);
1023
1024    } /* Disc_Request_Sense */
1025
1026    /* function Disc_Retry_Sense   Retry Device Sense Error            */
1027    /*                                                                 */
1028    /* it returns:                                                     */
1029    /*     TRUE if recovered                                           */
1030    /*     FALSE if Max_Retry_Count reached                            */
1031    /*                                                                 */
1032    /* the previous retry count and success status is logged           */
1033    /* in the previous substatus parm                                  */
1034    /* if a new error encountered:                                     */
1035    /*     substatus and driver state are logged                       */
1036    /*     RIC status is set                                           */
1037
1038    BOOLEAN Disc_Retry_Sense (SPC_DCB, Except)                        /*7*/
1039    SPC_DCB_Ptr    SPC_DCB;                                           /*7*/
1040    EXC_Ptr        Except;
1041    {
1042        EXC            New_Except_Data;
1043        EXC_Ptr        New_Except;
1044        Sense_Struct   Sense;
1045
1046        New_Except = &New_Except_Data;
1047        New_Except->Retry_Count = 0;
1048        New_Except->Lgc_Sector_Addr = -1;
1049
1050        do {
1051
1052            ++(Except->Retry_Count);
1053
1054            /* call driver */
1055
1056            if (!Disc_Do_Driver (SPC_DCB, TRUE)) {
1057                Except->Retry_Status = ER_Not_Recov;
1058                Disc_Log_Retry (Except);
1059                return (FALSE);
1060            }
1061
1062            if (SPC_DCB->SCSI_Status)
1063                switch (SPC_DCB->SCSI_Status & SCSI_Status_Bits) {
1064                    case (SCSI_Status_Busy):
1065                        Except->Retry_Status = ER_Not_Recov;
1066                        Disc_Log_Retry (Except);
```

```
1067                        New_Except->PID = Dr_Except_PID;
1068                        New_Except->Substatus = DrSs_Ownership_Err;
1069                        Disc_Log_Except (New_Except);
1070                        return (FALSE);
1071                        break;
1072                     case (SCSI_Status_Check):
1073                        if (!Disc_Request_Sense (SPC_DCB, &Sense)) {
1074                           Except->Retry_Status = ER_Not_Recov;
1075                           Disc_Log_Retry (Except);
1076                           New_Except->PID = Dev_Except_PID;
1077                           New_Except->Substatus = DevSs_Stat_Except;
1078                           Disc_Log_Except (New_Except);
1079                           return (FALSE);
1080                        }
1081                        else {
1082                           Disc_Code_Sense (&Sense, New_Except);          /*8*/
1083                           switch (New_Except->Retry_Status) {
1084                              case (ER_Recov):                             /*8*/
1085                                 Except->Retry_Status = ER_Recov;          /*8*/
1086                                 Disc_Log_Retry (Except);                  /*8*/
1087                                 return (TRUE);                            /*8*/
1088                                 break;                                    /*8*/
1089                              case (ER_Not_Recov):                         /*8*/
1090                                 Except->Retry_Status = ER_Not_Recov;      /*8*/
1091                                 Disc_Log_Retry (Except);                  /*8*/
1092                                 Disc_Log_Except (New_Except);             /*8*/
1093                                 Disc_Log_Sense (&Sense);                  /*8*/
1094                                 return (FALSE);                           /*8*/
1095                                 break;                                    /*8*/
1096                           }
1097                        }
1098                        break;
1099                     default:
1100                        Except->Retry_Status = ER_Not_Recov;
1101                        Disc_Log_Retry (Except);
1102                        New_Except->PID = Dev_Except_PID;
1103                        New_Except->Substatus = DevSs_Stat_Except;
1104                        Disc_Log_Except (New_Except);
1105                        return (FALSE);
1106                        break;
1107                  } /* switch (SPC_DCB->SCSI_Status) */
1108
1109         } while (Except->Retry_Count < Max_Retry_Count);                  /*8*/
1110
1111         Except->Retry_Status = ER_Not_Recov;
1112         Disc_Log_Retry (Except);
1113         return (FALSE);
1114
1115      } /* Retry_Sense */
1116
1117      /* function DevIO  Deferred Device I/O with retry                  */
1118      /* SPC_DCB must already set up.  Driver call must be deferred.     */
1119      /* it returns:                                                     */
1120      /*    TRUE if no error or recovered                                */
1121      /*    FALSE if not recovered                                       */
1122      /*                                                                 */
1123      /* Sense error is retried until Max_Retry_Count                    */
1124      /*    or another error encountered                                 */
1125      /*                                                                 */
1126      /* when error encountered:                                         */
1127      /*    substatus and driver state are logged                        */
1128      /*    RIC status is set                                            */
1129
1130      BOOLEAN Disc_DevIO (SPC_DCB)                                        /*7*/
1131      SPC_DCB_Ptr     SPC_DCB;                                            /*7*/
1132      {
1133         EXC            Except_Data;
1134         EXC_Ptr        Except;
1135         Sense_Struct   Sense;                                            /*7*/
1136
1137         Except = &Except_Data;
1138         Except->Retry_Count = 0;
1139         Except->Lgc_Sector_Addr = -1;
1140
1141         /* call driver */
1142
1143         if (!Disc_Do_Driver (SPC_DCB, TRUE))
1144            return (FALSE);
1145
1146         /* check status */
1147
```

```
1148        if (SPC_DCB->SCSI_Status)
1149           switch (SPC_DCB->SCSI_Status & SCSI_Status_Bits) {
1150              case (SCSI_Status_Busy):
1151                 Except->Retry_Status = ER_Not_Recov;
1152                 Except->PID = Dr_Except_PID;
1153                 Except->Substatus = DrSs_Busy;
1154                 Disc_Log_Except (Except);
1155                 return (FALSE);
1156                 break;
1157              case (SCSI_Status_Check):
1158                 if (!Disc_Request_Sense (SPC_DCB, &Sense, TRUE)) .
1159                    Except->Retry_Status = ER_Not_Recov;
1160                    Except->PID = Dev_Except_PID;
1161                    Except->Substatus = DevSs_Stat_Except;
1162                    Disc_Log_Except (Except);
1163                    return (FALSE);
1164                 }
1165                 else {
1166                    Disc_Code_Sense (&Sense, Except);                      /*8*/
1167                    Disc_Log_Except (Except);                              /*8*/
1168                    Disc_Log_Sense (&Sense);                               /*8*/
1169                    switch (Except->Retry_Status) {                        /*8*/
1170                       case (ER_Recov):                                    /*8*/
1171                          return (TRUE);                                   /*8*/
1172                          break;                                           /*8*/

1173                       case (ER_Not_Recov):                                /*8*/
1174                          return (FALSE);                                  /*8*/
1175                          break;                                           /*8*/
1176                       default:                                            /*8*/
1177                          return (Disc_Retry_Sense (SPC_DCB, Except));     /*8*/
1178                          break;                                           /*8*/
1179                    } /* Switch (Except->Retry_Status) */                  /*8*/
1180                 }
1181                 break;
1182              default:
1183                 Except->Retry_Status = ER_Not_Recov;
1184                 Except->PID = Dev_Except_PID;
1185                 Except->Substatus = DevSs_Stat_Except;
1186                 Disc_Log_Except (Except);
1187                 return (FALSE);
1188                 break;
1189           } /* switch (SPC_DCB->SCSI_Status) */
1190        else
1191           return (TRUE);
1192
1193     } /* Disc_DevIO */
```

$CUERVO.T8121C00.SPCS   1987/4/1 14:23

```
 1      TTL 'TALON SPC DRIVER/INTERRUPT HANDLER BANNER/COPYRIGHT'
 2
 3      ************************************************************************
 4      *                                                                      *
 5      *                                                                      *
 6      *          TALON SPC DRIVER/INTERRUPT HANDLER                          *
 7      *                                                                      *
 8      *   SOURCE FILE --- T9330A00.SPCS                                      *
 9      *                                                                      *
10      *                                                                      *
11      ************************************************************************
12
13
14      ************************************************************************
15      *                                                                      *
16      *          Copyright (C)  Tandem Computers, Incorporated               *
17      *      1979, 1980, 1981, 1982, 1983, 1984, 1985                        *
18      *                                                                      *
19      * These computer program listings and specifications, herein, are the  *
20      * property of Tandem Computers, Inc. and shall not be reproduced or    *
21      * copied or used in whole or in part as the basis for manufacture or   *
22      * sale of items without written permission.                            *
23      *                                                                      *
24      *              Protected as an unpublished work.                       *
25      *                                                                      *
26      ************************************************************************
27
28      TTL 'SPC DRIVER'
29      PAGE
30      SECTION 0
31
32      *
33      * SCSI DRIVER CONTROL BLOCK EQUATES (VISIBLE)
34      *
35            OFFSET  0
```

```
36    S_REQ       DS.B    1       REQUEST CODE              : BYTE
37    S_REQMOD    DS.B    1       REQUEST CODE MODIFIER     : BYTE
38    S_REPLY     DS.B    1       DRIVER REPLY              : BYTE
39    S_IREPLY    DS.B    1       INTERRUPT HANDLER REPLY   : BYTE
40    S_CURTCB    DS.L    1       CALLING TASK'S TCB ADR    : LONG
41
42    S_STAT      DS.B    1       SCSI STATUS               : BYTE
43    S_CMDCNT    DS.B    1       SCSI COMMAND COUNT        : BYTE
44                DS.W    0       ALIGNMENT
45    S_CMD       DS.B    12      SCSI COMMAND              : 12 BYTE
46    S_ACTLEN    DS.W    1       ACTUAL TRANSFER LENGTH    : WORD
47    S_XFRBUF    DS.W    1       TRANSFER BUFFER           : WORD
48    S_XFRLEN    DS.W    1       TRANSFER LENGTH           : WORD
49    S_PAD       DS.B    1       PAD OUT                   : BOOLEAN
50    S_MSG       DS.B    1       SCSI MESSAGE REQUEST      : BYTE
51    S_FILLER    DS.B    1       FILLER                    : BYTE
52    S_STATE     DS.B    1       STATE VALID               : BYTES
53    S_STBUF     DS.L    1       STATE BUFFER              : LONG
54                DS.W    0       ALIGN WORD                              /*7*/
55
56    *
57    * SCSI DRIVER CONTROL BLOCK EQUATES (HIDDEN)
58    *
59    DCBHID      EQU     *
60    S_BUS_NO    DS.B    1       BUS NUMBER                : BYTE
61    S_DEV_NO    DS.B    1       DEVICE NUMBER             : BYTE
62    S_DVR_ST    DS.B    1       DRIVER STATE              : BYTE
63    S_PROT_ERR  DS.B    1       PROTOCOL ERROR            : BYTE
64    S_SELID     DS.B    1       SELECT ID(MYID OR TRGID)  : BYTE
65    S_OUTDIR    DS.B    1       OUT FROM CONTROLLER       : BYTE
66    S_CMDCNTC   DS.B    1       SCSI COMMAND COUNT COPY   : BYTE
67    S_CMDC      DS.B    12      SCSI COMMAND COPY         : 12 BYTES
68    S_XFRBUFC   DS.W    1       TRANSFER BUFFER COPY      : WORD
69    S_XFRLENC   DS.W    1       TRANSFER LENGTH COPY      : WORD
70    S_PADC      DS.B    1       PAD OUT COPY              : BOOLEAN
71
72    * POINTER SAVE AREAS
73
74                DS.W    0       ALIGN WORD
75    S_CUR_PTRS  EQU     *
76    S_START     DS.W    1       DMA START                 : WORD
77    S_END       DS.W    1       DMA END                   : WORD
78    S_CONTROL   DS.W    1       DMA CONTROL               : WORD
79
80    S_ASBD      DS.W    0       ASSEMBLY DATA             : WORD
81    S_ASBD_IN   DS.B    1       ASSEMBLY DATA IN DIR      : BYTE
82    S_ASBD_OUT  DS.B    1       ASSEMBLY DATA OUT DIR     : BYTE
83    S_ASBC      DS.B    1       ASSEMBLY CONTROL          : BYTE
84    S_CMDPTR    DS.B    1       COMMAND POINTER           : BYTE          **7
85
86                DS.W    0       ALIGN WORD
87    S_TC        DS.B    1       FILLER
88    S_TCH       DS.B    1       SPC TRANSFER COUNT HIGH   : BYTE
89    S_TCM       DS.B    1       SPC TRANSFER COUNT MID    : BYTE
90    S_TCL       DS.B    1       SPC TRANSFER COUNT LOW    : BYTE
91                DS.W    0       ALIGN WORD
92
93    PTRS_END    EQU     *
94    PTRS_LEN    EQU     PTRS_END-S_CUR_PTRS  POINTERS SAVE AREA LENGTH
95
96    S_SAV_PTRS  DS.B    PTRS_LEN
97    S_PCTL      DS.B    1       SPC PHASE CONTROL REG     : BYTE
98    S_SCMD      DS.B    1       SPC COMMAND REG           : BYTE
99    S_IDIN      DS.B    1       TARGET ID MESSAGE         : BYTE
100   S_MSGIN     DS.B    1       MESSAGE IN                : BYTE
101   S_BSEL      DS.B    1       BUS SELECT REG COPY       : BYTE
                  DS.W    0       WORD ALIGNMENT
103   DCBLEN      EQU     *
104
105   * SCSI BUS STATE (POINTED BY BCBADR(A5))
106
107               OFFSET  0
108   B_SPC_STATE DS.B    1       SPC STATE
109   B_CUR_BUS   DS.B    1       CURRENT BUS NO
110               DS.W    0       WORD ALIGNMENT
111   B_DEV_WAIT  DS.B    2       DEVICES WAITING FOR THE BUS
112   B_CUR_DEV   DS.B    2       CURRENT DEVICE NO
```

```
$CUERVO.T8121C00.SPCS   1987/4/1  14:23

113    B_MYID        DS.B  2         MY BUS ID
114    B_CUR_DCB     DS.L  1         CURRENT DCB
115    B_MDEVNO      DS.B  1         MAX DEVICE NO PER BUS
116    B_BUSA        DS.B  1         BUS A = BUS 0 OR 1                    **B
117                  DS.W  0         WORD ALIGNMENT
118    BCBLEN        EQU   *
119
120    * SPC STATE STRUCTURE
121
122                  OFFSET 0
123    SST_DVR_ST    DS.B  1         DRIVER STATE                : BYTE
124    SST_PROT_ERR  DS.B  1         FILLER                      : BYTE
125
126                  DS.W  0
127    SST_SPC_BDID  DS.B  1         BUS DEVICE ID               : BYTE
128    SST_SPC_SCTL  DS.B  1         SPC CONTROL                 : BYTE
129    SST_SPC_SCMD  DS.B  1         COMMAND                     : BYTE
130    SST_SPC_TMOD  DS.B  1         TRANSFER MODE               : BYTE
131    SST_SPC_INTS  DS.B  1         INTERRUPT SENSE             : BYTE
132    SST_SPC_PSNS  DS.B  1         PHASE SENSE                 : BYTE
133    SST_SPC_SSTS  DS.B  1         SPC STATUS                  : BYTE
134    SST_SPC_SERR  DS.B  1         SPC ERROR STATUS            : BYTE
135    SST_SPC_PCTL  DS.B  1         PHASE CONTROL               : BYTE
136    SST_SPC_MBC   DS.B  1         MODIFIED BYTE COUNTER       : BYTE
137    SST_SPC_DREG  DS.B  1         DATA REGISTER               : BYTE
138    SST_SPC_TEMP  DS.B  1         TEMPORARY REGISTER          : BYTE
139    SST_SPC_TCH   DS.B  1         TRANSFER COUNTER HIGH       : BYTE
140    SST_SPC_TCM   DS.B  1         TRANSFER COUNTER MIDDLE     : BYTE
141    SST_SPC_TCL   DS.B  1         TRANSFER COUNTER LOW        : BYTE
142    SST_SPC_EXBF  DS.B  1         EXTERNAL BUFFER (ZERO)      : BYTE
143
144    SST_BSEL      DS.B  1         SCSI BUS SELECT REG         : BYTE
145    SST_ASBC      DS.B  1         SCSI ASSEMBLY CONTROL REG:   BYTE
146    SST_ASBD      DS.W  0         SCSI ASSEMBLY DATA
147    SST_ASBD_IN   DS.B  1         SCSI ASSEMBLY DATA IN       : BYTE
148    SST_ASBD_OUT  DS.B  1         SCSI ASSEMBLY DATA OUT      : BYTE
149    SST_BINT      DS.B  1         SCSI BUS INTERRUPT REG      : BYTE
150    SST_FILLER    DS.B  1         FILLER (ZERO)               : BYTE
151
152    SST_DMB_STATUS    DS.W  1     DMB STATUS                  : WORD
153    SST_DMB_MASTER    DS.W  1     DMB MASTER CONTROL          : WORD
154    SST_DMB_CONTROL0  DS.W  1     DMB CONTROL0                : WORD
155    SST_DMB_END0      DS.W  1     DMB END0                    : WORD
156    SST_DMB_CHAIN0    DS.W  1     DMB CHAIN0                  : WORD
157    SST_DMB_START0    DS.W  1     DMB START0                  : WORD
158    SST_DMB_CONTROL1  DS.W  1     DMB CONTROL1                : WORD
159    SST_DMB_END1      DS.W  1     DMB END1                    : WORD
160    SST_DMB_CHAIN1    DS.W  1     DMB CHAIN1                  : WORD
161    SST_DMB_START1    DS.W  1     DMB START1                  : WORD
162
163    SST_BERS      DS.W  1         BOARD ERROR STATUS          : WORD
164
165    *
166    *   SPC DRIVER DCB CONFIGURATION RECORD DEFINITION
167    *
168                  OFFSET 0
169    DCR_LEN       DS.W  1         LENGTH OF DCB CONFIGURATION RECORD  : WORD
170    DCR_TNAME     DS.L  1         I/O TASK NAME                       : LONG
171    DCR_BUS_NO    DS.B  1         BUS NO                              : BYTE
172    DCR_DEV_NO    DS.B  1         DEV NO                              : BYTE
173    DCR_MDEVNO    DS.B  1         MAXIMUM DEV NO PER BUS              : BYTE
174    DCR_FILLER    DS.B  1         FILLER                              : BYTE
175    DCRSIZE       EQU   *
176
177    * SCSI MESSAGE CODES
178
179    SMSG_CMD_CMP     EQU  $00      COMMAND COMPLETE
180    SMSG_EXT         EQU  $01      EXTENDED MESSAGE
181    SMSG_SAVE        EQU  $02      SAVE DATA POINTER
182    SMSG_RESTORE     EQU  $03      RESTORE POINTERS
183    SMSG_DIS         EQU  $04      DISCONNECT
184    SMSG_INIT_ERR    EQU  $05      INTIATOR DETECTED ERROR
185    SMSG_ABORT       EQU  $06      ABORT
186    SMSG_REJ         EQU  $07      MESSAGE REJECT
187    SMSG_NOP         EQU  $08      NO OPERATION
188    SMSG_PERR        EQU  $09      MESSAGE PARITY ERROR
189    SMSG_DEV_RST     EQU  $0C      BUS DEVICE RESET
190    SMSG_ID          EQU  $80      IDENTIFY $80-$FF
```

```
191
192      * IDENTIFY MESSAGE
193
194      IDENTIFY          EQU      $C0               IDENTIFY MESSAGE
195                                                  *ALLOW DISCONNECTION
196
197      * SPC DRIVER REPLY CODE
198
199      SDR_NOERR         EQU      $00      NO ERROR
200      SDR_BUFERR        EQU      $01      NO BUFFER OR BAD COUNT ERROR
201      SDR_BOGUS         EQU      $02      ILLEGAL COMMAND OR MODIFIER
202      SDR_STATE_ERR     EQU      $03      STATE ERROR
203      SDR_WRITE_PERR    EQU      $10      WRITE PARITY ERROR
204      SDR_READ_PERR     EQU      $11      READ PARITY ERROR
205      SDR_PROT_ERR      EQU      $12      PROTOCOL ERROR
206      SDR_BUS_RST       EQU      $13      BUS RESET
207      SDR_SEL_TIME      EQU      $14      SELECTION TIME OUT
208      SDR_UNEXP_INT     EQU      $15      UNEXPECTED INTERRUPT
209      SDR_DATA_OVER     EQU      $16      DATA OVER/UNDER RUNS
210      SDR_SPC_ERR       EQU      $20      SPC ERROR
211      SDR_DMB_ERR       EQU      $21      DB-DMA ERROR
212
213      * SPC INTERRUPT HANDLER SIGNAL BITS
214
215      EVCMP             EQU      $0010    SCSI COMMAND COMPLETE
216
217      * SPC STATE
218
219      CS_OK             EQU      $00               NOT BUSY
220      CS_WAIT           EQU      $01               WAITING FOR CONNECTION
221      CS_CON            EQU      $02               CONNECTED
222      CS_RESEL          EQU      $03               BETWEEN BUS RESEL AND SPC RESEL INTR    **8
223      CS_NCONF          EQU      $04               NOT CONFIGURED
224
225      * SPC DRIVER STATE
226
227      ST_OK             EQU      $00      OK
228      ST_WAIT_ARB       EQU      $01      WAITING FOR ARBITRATION
229      ST_CNT            EQU      $02      CONNECTED
230      ST_DIS            EQU      $03      DISCONNECTED
231      ST_DOWNED         EQU      $04      HARDWARE ERROR
232      ST_RESET          EQU      $05      BUS RESET
233
234      SMREQ             EQU      5        MAXIMUM REQUEST CODE                            **4
235      MNCMDCNT          EQU      6        MINIMUM COMMAND COUNT                           **4
236      MXCMDCNT          EQU      12       MAXIMUM COMMAND COUNT                           **4
237
238      * Selection BSY response time out = 250 ms
239      *    (TCH TCM * 256 + 15) * 200 ns * 2
240      * Arbitration wait after bus free = 2,000 ns
241
242      TCH_TM            EQU      $09      ARBITRATION/SELECT TIME OUT                     **16
243      TCM_TM            EQU      $89      ARBITRATION/SELECT TIME OUT                     **16
244      TCL_TM            EQU      $03      ARBITRATION/SELECT TIME OUT                     **16
245
246      MYIDA             EQU      7         MY SCSI ID FOR BUS A
247      MYIDB             EQU      MYIDA-1   MY SCSI ID FOR BUS B
248
249      BCBADR            EQU      L2DCBTAB            BUS CONTROL BLOCK ADDRESS   **20
250      DCBTAB            EQU      L2DCBTAB+4          SCSI DCB TABLE              **20
251
252              PAGE
253
254      *   EXTERN LONG FUNCTION INITSPCDCB (&INIT_REC)
255      *
256      *       DEF----INITSPCDCB IS TALON'S SPC DCB INITALIZER.
257      *
258      *       ENTRY--INIT_REC HAS THE FOLLOWING FORMAT:
259      *                    RECORD LENGTH              : WORD
260      *                    I/O TASK NAME              : LONG
261      *                    CALL INITIALIZER           : BYTE
262      *                    BUS NO                     : BYTE
263      *                    DEV NO                     : BYTE
264      *                    MAX DEV NO PER BUS         : BYTE
265      *
266      *       EXIT---D0=DCB ADDRESS (0 IF A DCB CAN'T BE OBTAINED)
267      *
268      *       CALL---IF (DCB=INITSPCDCB(&INIT_REC)==0) SOFTFAIL(SPC_ERR,NO_DCB);
269      *
270      *       REGISTER USAGE:
271      *           A0 = DCB ADDRESS
272      *           A1 = DCB TABLE ADDRESS
273      *           A2 = CONFIGURATION RECORD
```

```
274  *          D1 = PPC BASE ADDRESS
275  *          D2 = PORT NUMBER
276
277  *     SCSI BUS    TARGET ID
278  *          A           0
279  *          .           .
280  *          .           .
281  *          A        (MDEVNO)
282  *
283  *          B           0
284  *          .           .
285  *          .           .
286  *          B        (MDEVNO)
287
288        SECTION 0
289        XDEF    INITSPCDCB
290
291  INITSPCDCB
292        MOVEM.L  A0-A2/D1-D2,-(SP)   SAVE REGISTERS
293        MOVEA.L  24(SP),A2           GET # CONFIGURATION RECORD
294  *
295  *     CHECK PARAMETERS BEFORE GETTING BLOCK OF FREE MEMORY
296  *
297        CMPI.W   #DCRSIZE,DCR_LEN(A2)
298        BNE      INITFAIL            FAIL, BAD CONFIGURATION RECORD LENGTH
299        CMPI.B   #1,DCR_BUS_NO(A2)   CHECK BUS NO
300        BHI      INITFAIL
301        CMPI.B   #5,DCR_MDEVNO(A2)   CHECK MAX DEV NO
302        BHI      INITFAIL                                                  **8
303        MOVE.B   DCR_MDEVNO(A2),D0   GET MAX DEV NO
304        CMP.B    DCR_DEV_NO(A2),D0   CHECK DEV NO
305        BCS      INITFAIL                                                  **8
306
307  * INITIALIZE BUS CONTROL BLOCK
308
309  * REGISTER USAGE:
310  *     A0 = BCB ADDRESS
311  *     A2 = DCR ADDRESS
312  *     A5 = GLOBAL MEMORY BASE
313
314        IF.L     BCBADR(A5) <EQ> #0 THEN  IF BCB IS NOT INITIALIZED
315        MOVE.L   #BCBLEN,D0              GET BCB LENGTH IN BYTES
316        BSR      GETSP                   GET BCB FROM FREE MEMORY
317        BEQ      INITFAIL
318        BSR      ZROB1                   CLEAR BCB
319        MOVE.L   A0,BCBADR(A5)           STORE BCB ENTRY ADDRESS
320        MOVE.B   #CS_NCONF,B_SPC_STATE(A0) SPC STATE = NOT CONFIGURED
321        MOVE.B   #0,B_CUR_DEV(A0)
322        MOVE.B   #0,B_CUR_DEV+1(A0)      INITIALIZE CURRENT DEVICE
323        MOVE.B   #MYIDA,B_MYID(A0)
324        MOVE.B   #MYIDB,B_MYID+1(A0)     INITIALIZE MY ID
325        MOVE.B   DCR_MDEVNO(A2),B_MDEVNO(A0)  STORE MAX DEVICE NUMBER
326        ADDQ.W   #1,L2DCBNUM(A5)         ADD NUMBER                        **20
327        MOVE.B   #0,B_BUSA(A0)           ASSUME BUS A = BUS 0              **8
328        MOVE.B   BRD_ADDR,D0             GET BOARD ADDRESS                 **8
329        ANDI.B   #$30,D0                                                   **12
330        IF       <NE> THEN               IF CERTAIN BITS ARE ON            **8
331        MOVE.B   #1,B_BUSA(A0)           BUS A = BUS 1                     **8
332        ENDI                             END IF CERTAIN BIS ARE ON         **8
333        ENDI                             END IF BCB IS NOT INITIALIZED
334
335  * INITIALIZE DEVICE CONTROL BLOCK                                         **8
336  * THE TASKS SEES BUS 0 OR 1.  TALON HARDWARE PROVIDES BUS A OR B.        **8
337  * THE TRANSLATION HAPPENS HERE.  IT IS DEPENDENT ON BOARD ADDRESS.       **8
338
339  * REGISTER USAGE:
340  *     A0 = DCB ADDRESS
341  *     A1 = DCB TABLE ADDRESS
342  *     A2 = CONFIGURATION RECORD
343  *     A5 = GLOBAL MEMORY BASE
344
345  *     D0 = GENERAL PURPOSE
346  *     D1 = BUS NO
347  *     D2 = GENERAL PURPOSE
348                                                                           **8
349        MOVE.B   DCR_DEV_NO(A2),D0       GET DEVICE NO
350        CLR.L    D1                                                        **4
351        MOVE.B   DCR_BUS_NO(A2),D1       GET DCR BUS NO                    **8
352        MOVEA.L  BCBADR(A5),A0           GET BCB ADDRESS                   **8
353        MOVE.B   B_BUSA(A0),D2           GET BUS A                         **8
354        EOR.B    D2,D1                   SWITCH IF BUS A = 1               **8
355        IF       <NE> THEN               IF BUS B                          **8
```

```
356          ADD.B      DCR_MDEVNO(A2),D0    ADD BUS A DEVICES
357          ADDQ.B     #1,D0
358          ENDI                            END IF BUS B
359          LSL.B      #2,D0                MULTIPLY BY 4
360          EXT.W      D0
361          LEA        DCBTAB(A5),A1        GET DCB TABLE BASE ADDRESS
362          ADDA.W     D0,A1                GET DEVICE DCB TABLE ADDRESS
363       *                                  *DESTINATION ADDR REG IS LONG
364          TST.L      (A1)                 MAKE SURE IT HAS NOT BEEN USED  **8
365          BNE        INITFAIL
366                                                                          **8
367          MOVE.L     #DCBLEN,D0           GET DCB LENGTH IN BYTES
368          BSR        GETSP                GET DCB FROM FREE MEMORY
369          BEQ        INITFAIL
370          BSR        ZROB1                CLEAR DCB
371          MOVE.L     A0,(A1)              SAVE DCB @
372          ADDQ.W     #1,L2DCBNUM(A5)      ADD NUMBER                      **20
373          MOVE.B     D1,S_BUS_NO(A0)      STORE BUS NO
374          MOVE.B     DCR_DEV_NO(A2),D0    GET DEVICE NO
375          MOVE.B     D0,S_DEV_NO(A0)      STORE DEVICE NO
376
377          BSET.B     D0,S_SELID(A0)       SET SELECT ID
378          MOVEA.L    BCBADR(A5),A1        GET BCB ADDRESS
379          MOVE.B     B_MYID(A1,D1.W),D1   GET MYID
380          BSET.B     D1,S_SELID(A0)       OR MY ID TO SELECT ID
381
382          LEA        SPC_RPT,A1
383          MOVE.L     A1,RUPT26(A5)        SET INTERRUPT HANDLER LEVEL 2   **20
384
385          BRA.S      INITPASS             SUCCESS
386       *
387       * FAILURE
388       *
389       INITFAIL
390          CLR.L      D0                   SET FAILURE
391          BRA.S      INITRETURN
392       *
393       * SUCCESS
394       *
395       INITPASS
396          MOVE.L     A0,D0                SET SUCCESS
397       INITRETURN
398          MOVEM.L    (SP)+,A0-A2/D1-D2
399          RTS
400
401       *
402       *   EXTERN BOOLEAN PROCEDURE SPCDVR (DCB)
403       *
404       *     DEF----SPCDVR IS THE FUJITSU MB87030-SPC SCSI PROTOCOL
405       *            CONTROLLER DRIVER FOR TALON
406       *
407       *     ENTRY--DCB POINTS TO DRIVER CONTROL BLOCK (DCB) WITH DCB[REQ]
408       *            =TO A VALID SPC DRIVER REQUEST CODE AS FOLLOWS:
409       *
410       *            0--RESET WITH DCB[REQMOD] = A VALID RESET CODE AS FOLLOWS:
411       *                0--RESET SPC AND DMA CHANNEL 1
412       *                1--RESET SPC AND DMA CHANNEL 1
413       *                   AND RESET SCSI BUS
414       *            2--EXECUTE A SCSI COMMAND WITHOUT DATA TRANSFER
415       *            3--EXECUTE A SCSI MESSAGE
416       *            4--EXECUTE A SCSI COMMAND WITH READ DATA TRANSFER
417       *            5--EXECUTE A SCSI COMMAND WITH WRITE DATA TRANSFER
418       *
419       *     EXIT---SUCCESS D0 = ONES CCZ=0 AND DCB[REPLY]=0 (NO ERROR)
420       *            FAILURE D0 = 0    CCZ=1 AND DCB[REPLY]=ERROR CODE
421       *
422       *
423       *   SET SOME COMMON VARIABLES IN DCB CB & PARSE COMMAND
424       *
425          XDEF       SPCDVR
426       SPCDVR
427          MOVEM.L    A0-A2/D1-D3,-(SP)
428          MOVEA.L    28(SP),A2            GET DCB ADDRESS
429
430       * GET CALLING TASK'S TCB
431
432       ****** CHECK STATE
433          BSR        FMYTID               GET CALLING TASKS ID
434          BSR        GETCBA               GET ADDRESS OF CALLING TASKS TCB
435          MOVE.L     A0,S_CURTCB(A2)      PUT IN CALLING TASK'S TCB ADDRESS
436          MOVE.B     #-SDR_NOERR,S_REPLY(A2)  CLEAR ERROR REPLY
437          CLR.B      S_STATE(A2)          CLEAR STATE VALID
```

```
438
439     *   VALIDITY CHECK AND PARSE REQUEST
440     *
441         CLR.L    D0
442         MOVE.B   S_REQ(A2),D0        GET REQUEST
443         BLT      SDVR81              REQUEST < 0 ?
444         CMPI.B   #SMREQ,D0           NO
445         BHI      SDVR81              REQUEST > MAX ?
446         LSL.W    #2,D0               FORM INDEX
447         MOVEA.L  SDVR0(PC,D0.W),A1   GET SPC REQUEST TABLE ADDRESS
448         JMP      (A1)                EXECUTE COMMAND
449 SDVR0   DC.L     RESET               0 RESET
450         DC.L     SDVR81              1 SPACE FOR CONFIGURE COMMAND
451         DC.L     COMMAND             2 SCSI COMMAND WITHOUT TRANSFER
452         DC.L     SDVR81              3 SCSI MESSAGE
453         DC.L     READ                4 SCSI COMMAND WITH READ  TRANSFER
454         DC.L     WRITE               5 SCSI COMMAND WITH WRITE TRANSFER
455
456     *
457     *   RESET
458     *
459 RESET   TRAP     #MTXON              INTERRUPTS OFF
460     *
461     * RESET SPC
462     * RESELECTION IS ONLY ENABLED AFTER BUS RESELECTION INTERRUPT      **8
463     *
464         MOVE.B   #0,SPC_BSEL         CLEAR BUS SELECT
465
466         MOVEA.L  BCBADR(A5),A0       GET BCB ADDRESS
467         CLR.L    D0
468         MOVE.B   B_CUR_BUS(A0),D0    GET CURRENT BUS
469         MOVE.B   B_MVID(A0,D0.W),SPC_BDID  PUT MY SCSI ID
470
471         MOVE.B   #(SL_RST+SL_CTRL_RST),SPC_SCTL  RESET & DISABLE, CTRL RESET
472         MOVE.B   #0,SPC_SCMD         CLEAR COMMAND
473         MOVE.B   #0,SPC_TMOD         CLEAR TMOD
474         MOVE.B   #0,SPC_SDGC         CLEAR DIAGNOSTIC CONTROL
475         MOVE.B   #0,SPC_PCTL         CLEAR PHASE CONTROL
476         MOVE.B   #0,SPC_TEMP         CLEAR TEMP
477         CLR.B    SPC_TCH
478         CLR.B    SPC_TCM
479         CLR.B    SPC_TCL             CLEAR TRANSFER COUNTERS
480         MOVE.B   #(SL_ARB_EN+SL_PAR_EN+SL_INTR_EN),SPC_SCTL            **8
481                                     * ENABLE ARBITRATION, PARITY & INTERRUPT **8
482
483         MOVE.B   #0,SPC_BSEL         CLEAR BUS SELECT
484         CLR.L    D1
485         BSET     D0,D1               TURN ON BUS SELECT BIT
486         MOVE.B   D1,SPC_BSEL         SET BUS SELECT REGISTER
487         MOVE.B   D1,S_BSEL(A2)       SAVE COPY BUS SELECT REGISTER
488
489     *
490     *   RESET DMA CHANNEL 1
491     *
492         MOVE.W   #DC_RESET,DMB_CONTROL1  RESET CHANNEL 1
493         MOVE.W   #0,DMB_CONTROL1                                       ***4
494         MOVE.W   #0,DMB_START1                                         ***4
495         MOVE.W   #0,DMB_END1                                           ***4
496         MOVE.W   #0,DMB_CHAIN1                                         ***4
497
498         MOVE.B   #CS_OK,B_SPC_STATE(A0)  SET SPC STATUS = OK
499         BSR      SET_INTR            SET INTERRUPT
500         BRA      SDVR96              FINISH UP
501 ************* RESET BUS
502
503 *******************************************************************************
504     PAGE
505     *
506     *   SCSI COMMAND REQUEST
507     *
508 COMMAND
509     *   CMPI.W   #PSCLR,PPCST(A2)    BUSY?
510     *   BNE      SDVR85              YES
511     *
512         CMPI.B   #MNCMDCNT,S_CMDCNT(A2)  CHECK COMMAND COUNT           ***4
513         BCS      SDVR81              INVALID PARAMETER                 ***4
514         CMPI.B   #MXCMDCNT,S_CMDCNT(A2)  CHECK COMMAND COUNT
515         BHI      SDVR81              INVALID PARAMETER
516         TRAP     #MTXON              INTERRUPTS OFF
517
518         CLR.L    S_TC(A2)            CLEAR TRANSFER COUNT
519         CLR.B    S_PADC(A2)          CLEAR PAD
520
```

```
521     * COPY COMMAND
522
523     COMMAND1
524         LEA     S_CMD(A2),A0
525         LEA     S_CMDC(A2),A1
526         CLR.W   D0
527         MOVE.B  S_CMDCNT(A2),D0
528         MOVE.B  D0,S_CMDCNTC(A2)    COPY COMMAND COUNT
529         BSR     MVB1                COPY COMMAND
530         CLR.B   S_CMDPTR(A2)        CLEAR COMMAND POINTER             **7
531
532     * command logic
533     * if the waited bus = current bus
534     *     if current bus free
535     *         arbitrate
536     *     else
537     *         set interrupt
538     * else
539     *     if the other bus is free
540     *         switch bus
541     *         arbitrate
542     *     else
543     *         set interrupt
544
545     * CHECK IF BUS IS FREE
546
547         MOVEA.L BCBADR(A5),A0       GET BUS CONTROL BLOCK ADDRESS
548         CLR.L   D0
549         MOVE.B  S_BUS_NO(A2),D0     GET WAITED BUS NO
550         MOVE.B  S_DEV_NO(A2),D1     GET DEVICE NO
551         BSET.B  D1,B_DEV_WAIT(A0,D0.W)  ADD TO WAITING DEVICES
552
553         IF.B    B_SPC_STATE(A0) <EQ> #CS_OK THEN  IF SPC IS NOT BUSY
554
555         IF.B    D0 <EQ> B_CUR_BUS(A0) THEN  IF CURRENT BUS WAITED
556         MOVE.B  SPC_PSNS,D0
557         ANDI.B  #(SB_SEL+SB_BSY),D0
558         IF      <EQ> THEN           IF CURRENT BUS FREE
559         BSR     ARBITRATE           ARBITRATE
560         ELSE                        *ELSE CURRENT BUS NOT FREE
561         BSR     SET_INTR            SET INTERRUPT
562         ENDI                        END IF CURRENT BUS FREE
563
564         ELSE                        *ELSE OTHER BUS WAITED
565         MOVE.B  #(BI_FREEA+BI_FREEB),SPC_BINT  SET BITS FOR BINT STATUS  **7
566         MOVE.B  SPC_BINT,D1         GET BUS INTERRUPT STATUS           **8
567         BSR     FIX_BINT                                               **8
568         ANDI.B  #BI_FREEB,D1                                           **8
569         IF      <NE> THEN           IF OTHER BUS FREE
570         BSR     SWITCH_BUS          SWITCH BUS
571         BSR     ARBITRATE           ARBITRATE
572         ELSE                        *ELSE OTHER BUS NOT FREE
573         BSR     SET_INTR            SET INTERRUPT
574         ENDI                        END IF OTHER BUS FREE
575
576         ENDI                        END IF CURRENT BUS WAITED
577         ENDI                        END IF SPC IS NOT BUSY
578
579         BRA     SDVR96              FINISH UP
580
581     * SUBROUTINE NEXT_DEV NEXT DEVICE
582
583     * FIND THE NEXT WAITING DEV FROM B_DEV_WAIT
584     * AT LEAST ONE DEVICE MUST BE WAITING
585     * THE SEARCH IS IN ROTATION FROM THE CURRENT DEVICE
586     * DEVICE STAYS IN WAITING LIST UNTIL SELECTION DONE
587
588     * REGISTER USAGE:
589     *     A0 = BUS STATUS ADDRESS
590     *     D0 = CURRENT BUS NO
591     *     D1 = WAITING DEVICE REGISTER
592     *     D2 = CURRENT DEV
593
594     NEXT_DEV
595         MOVEA.L BCBADR(A5),A0       GET BUS CONTROL BLOCK ADDRESS
596         CLR.L   D0
597         MOVE.B  B_CUR_BUS(A0),D0    GET CURRENT BUS NO
598         CLR.L   D1
599         MOVE.B  B_DEV_WAIT(A0,D0.W),D1  GET WAITING DEVICE LIST
600         IF      <EQ> THEN           IF NO DEVICE WAITING               **7
601         RTS                         RETURN (SO WE DO NOT LOOP)
602         ENDI                        END IF NO DEVICE WAITING
```

```
603             CLR.L      D2
604             MOVE.B     B_CUR_DEV(A0,D0.W),D2    GET CURRENT DEVICE
605
606     NEXT_DEV1
607             BTST       D2,D1                    CHECK IF THE DEVICE IS WAITING
608             DBNE       D2,NEXT_DEV1             CHECK THE NEXT DEVICE
609
610             IF         <EQ> THEN                IF DEV NO IS ZERO
611             CLR.L      D2
612             MOVE.B     B_MDEVNO(A0),D2          TRY THE MAX DEV NO
613             BRA        NEXT_DEV1
614             ENDI                                END IF DEV NO IS ZERO
615
616             MOVE.B     D2,B_CUR_DEV(A0,D0.W)    CHANGE CURRENT DEVICE
617
618     * GET DEVICE DCB
619
620             IF.B       B_CUR_BUS(A0) <NE> #0    THEN    IF BUS B
621             ADD.B      B_MDEVNO(A0),D2
622             ADDQ.B     #1,D2                    ADD BUS A DEVICES
623             ENDI                                END IF BUS B
624             LSL.B      #2,D2                    MULTIPLY BY 4
625             LEA        DCBTAB(A5),A1            GET DCB TABLE
626             MOVEA.L    0(A1,D2.W),A2            GET DEVICE DCB
627             BSR        ARBITRATE
628             RTS
629
630     * SUBROUTINE ARBITRATE
631     * SPC reselection must be disabled.  If SPC already responded to reselection
632     * the attention line will be asserted immediately.
633     * JUST IN CASE WE LOSE, BUS FREE AND RESELECTION INTERRUPT IS ENABLED.
634
635     ARBITRATE
636             MOVE.B     #0,SPC_PCTL              CLEAR PHASE CONTROL
637             MOVE.B     #SCM_SET_ATN,SPC_SCMD    SET ATN COMMAND
638             MOVE.B     S_SELID(A2),SPC_TEMP     PUT SELECTION ID
639             MOVE.B     #TCH_TM,SPC_TCH
640             MOVE.B     #TCM_TM,SPC_TCM
641             MOVE.B     #TCL_TM,SPC_TCL          PUT TIME VALUES
642             MOVE.B     #SCM_SEL,SPC_SCMD        SELECT COMMAND
643
644             MOVE.B     #SP_FREE_EN,SPC_PCTL     ENABLE BUS FREE INTERRUPT
645
646             MOVE.B     B_CUR_BUS(A0),D0         GET CURRENT BUS NO
647             MOVE.B     #(BI_RESELA+BI_MASTERA),D1  SET RESEL INTR
648             BSR        FIX_BINT
649             MOVE.B     D1,SPC_BINT              SET BUS INTR CONTROL REG
650
651             MOVE.L     A2,B_CUR_DCB(A0)         STORE CURRENT DCB
652             MOVE.B     #CS_WAIT,B_SPC_STATE(A0) SPC STATE = WAIT
653             RTS
654
655     * SUBROUTINE SET_INTR
656     * SET SPC CHIP BUS FREE INTERRUPT IF CURRENT BUS WAITED
657     * SET BUS INTERRUPT REGISTER IF OTHER BUS WAITED
658     * SPC CHIP MUST NOT BE IN USE
659
660     * Basically there are four kinds of events: arbitration, bus-switching,
661     * bus free and reselection. Arbitration and bus-switching are initiated
662     * by us.  Reselection is initiated by the target.  Reselection must not
663     * happen at the same time as arbitration and bus switching.
664     * SPC reselection is disabled until there is bus reselection interrupt.
665
666     * interrupt register logic
667     *
668     * current bus free uses the SPC chip interrupt
669     * current bus reselection and the other bus uses the bus interrupt register
670     *
671     *               other bus interrupt
672     *                  resel     free
673     * bus free
674     *    not waited      1         0
675     *    waited          1         1
676     * connected          0         0
677     *
678     * when SPC is connected the other bus interrupt is turned off because
679     * it cannot be serviced anyway.
680     * when bus free, reselect interrupt is turned on because if we do not
681     * service the other bus will hung up.
682
683     * REGISTER USAGE:
684     *    A0 = BUS STATUS ADDRESS
685     *    D0 = CURRENT BUS NO
686     *    D1 = BUS INTERRUPT REGISTER
```

```
687
688     SET_INTR
689         MOVEA.L   BCBADR(A5),A0              GET BUS CONTROL BLOCK ADDRESS
690         CLR.L     D0
691         MOVE.B    B_CUR_BUS(A0),D0           GET CURRENT BUS NO
692
693         CLR.B     SPC_PCTL                   CLEAR BUS FREE INTERRUPT
694         IF.B      B_DEV_WAIT(A0,D0.W) <NE> #0 THEN  IF CURRENT BUS WAITED
695         MOVE.B    #SP_FREE_EN,SPC_PCTL       ENABLE BUS FREE INTERRUPT
696         ENDI                                 END IF CURRENT BUS WAITED
697
698         EOR.B     #1,D0                      OTHER BUS
699         MOVE.B    #(BI_RESELA+BI_MASTERA+BI_RESELB+BI_MASTERB),D1        **8
700         IF.B      B_DEV_WAIT(A0,D0.W) <NE> #0 THEN  IF OTHER BUS WAITED
701         ORI.B     #(BI_FREEA),D1             SET BUS FREE INTERRUPT      **7
702         ENDI                                 END IF OTHER BUS WAITED
703         BSR       FIX_BINT                                               **8
704         MOVE.B    D1,SPC_BINT                SET BUS INTR CONTROL REG    **8
705
706         RTS                                  RETURN
707
708     * SUBROUTINE SWITCH_BUS
709     * SWITCHES SPC TO CONNECT TO THE OTHER BUS
710     * B_CUR_BUS IS MODIFIED TO CURRENT BUS NO
711     * SPC reselection must be disabled. If SPC already responded to reselection
712     * and we switch the bus, the device will wait and hung the bus.
713
714     * REGISTER USAGE:
715     * INPUT:  A2 = DCB ADDRESS
716     * USES:   A0 = BUS STATUS ADDRESS
717     *         D0 = CURRENT BUS NO
718     *         D1 = GENERAL REGISTER
719
720     SWITCH_BUS
721         MOVEA.L   BCBADR(A5),A0              GET BUS CONTROL BLOCK ADDRESS
722         CLR.L     D0
723         MOVE.B    B_CUR_BUS(A0),D0           GET CURRENT BUS NO
724         EORI.B    #$01,D0                    SWITCH BUS NO
725
726         MOVE.B    #0,SPC_BSEL                CLEAR BUS SELECT
727         CLR.L     D1
728         BSET      D0,D1                      TURN ON BUS SELECT BIT
729         MOVE.B    D1,SPC_BSEL                SET BUS SELECT REGISTER
730         MOVE.B    D1,S_BSEL(A2)              SAVE COPY BUS SELECT REGISTER
731
732         ORI.B     #(SL_RST),SPC_SCTL         RESET CHIP
733         MOVE.B    B_MYID(A0,D0.W),SPC_BDID   PUT MY SCSI ID
734         ANDI.B    #($FF-SL_RST),SPC_SCTL     RELEASE RESET
735         MOVE.B    D0,B_CUR_BUS(A0)           CHANGE BUS NO
736         RTS
737
738     *******************************************************************
739     *
740     *   INITIATE WRITE
741     *   THERE IS NO CHAINING YET
742     *
743     WRITE
744         MOVE.B    #TRUE,S_OUTDIR(A2)         SET OUT DIRECTION
745         BRA       TRANSFER
746
747     *   INITIATE READ
748     *   THERE IS NO CHAINING YET
749     *
750     READ
751     *   CMPI.W    #SSCLR,PPCST(A2)           CLEAR?
752     *   BGE       SDVR85                     NO
753         CLR.B     S_OUTDIR(A2)               CLEAR OUT DIRECTION
754
755     *   INITIATE TRANSFER
756
757     TRANSFER
758
759     * CHECK COMMAND COUNT
760
761         CMPI.B    #MNCMDCNT,S_CMDCNT(A2)  CHECK COMMAND COUNT           **4
762         BCS       SDVR81                     INVALID PARAMETER          **4
763         CMPI.B    #MXCMDCNT,S_CMDCNT(A2)  CHECK COMMAND COUNT           **4
764         BHI       SDVR81                     INVALID PARAMETER          **4
765
766     * CHECK START AND LENGTH PARAMETERS
767
```

```
768          MOVE.W    S_XFRBUF(A2),D0           GET START ADDRESS
769          BTST      #0,D0                     ODD ADDRESS?
770          BNE       SDVR87                    BAD BUFFER ADDRESS
771          ADD.W     S_XFRLEN(A2),D0           ADD TRANSFER LENGTH
772          IF        <CS> THEN                 IF END ADDRESS OVERFLOW    **7
773          BNE       SDVR87                    BAD BUFFER ADDRESS         **4
774          ENDI                                END IF END ADDRESS OVERFLOW **7
775          TST.W     S_XFRLEN(A2)              ZERO LENGTH?
776          BEQ       SDVR81                    INVALID PARAMETER
777          TRAP      #MTXON                    INTERRUPTS OFF
778
779     * SAVE PARAMETERS
780
781          MOVE.W    S_XFRBUF(A2),S_XFRBUFC(A2)  COPY START ADDRESS
782          MOVE.W    S_XFRLEN(A2),S_XFRLENC(A2)  COPY TRANSFER LENGTH
783          MOVE.W    S_PAD(A2),S_PADC(A2)        COPY PAD REQUEST
784
785     * ROUND UP ODD TRANSFER LENGTH
786
787          MOVE.W    S_XFRLEN(A2),D1           GET LENGTH
788          ADDQ.W    #1,D1                     ADD ONE
789          ANDI.W    #$FFFE,D1                 ROUND DOWN
790
791     * SET UP CURRENT DATA POINTER
792
793          MOVE.W    S_XFRBUF(A2),D0           GET BUFFER ADDRESS
794          SUBQ.W    #2,D0                     SUBTRACT 2 FOR DMA PREINCREMENT
795          MOVE.W    D0,S_START(A2)            STORE AS CURRENT START ADDRESS
796          ADD.W     D1,D0                     ADD TRANSFER LENGTH
797          SUBQ.W    #2,D0                     SUBTRACT 2 FOR DMA PREINCREMENT
798          MOVE.W    D0,S_END(A2)              STORE AS CURRENT END ADDRESS
799
800          MOVE.W    #DC_INCR,D0               FORM DMA CONTROL REG
801          MOVE.B    #SP_DATA_IN,S_PCTL(A2)
802          MOVE.B    #SA_IN,S_ASBC(A2)         ASSUME IN DIRECTION
803          IF.B      S_OUTDIR(A2) <NE> #0  THEN  IF OUT DIRECTION
804          ORI.W     #DC_OUT,D0                SET DMA CONTROL TO OUT
805          MOVE.B    #SP_DATA_OUT,S_PCTL(A2)   SET PHASE CONTROL TO OUT
806          CLR.B     S_ASBC(A2)                SET ASSEMBLY REG TO OUT
807          ENDI                                END IF OUT DIRECTION
808
809          MOVE.W    D0,S_CONTROL(A2)          STORE DMA REGS
810          CLR.W     S_ASBD(A2)                CLEAR ASSEMBLY DATA
811
812          CLR.L     S_TC(A2)                  CLEAR TRANSFER COUNT HIGH BYTES
813          MOVE.W    S_XFRLEN(A2),S_TCM(A2)    STORE TRANSFER COUNT
814
815     * SET UP SAVED DATA POINTER
816
817          LEA       S_CUR_PTRS(A2),A0
818          LEA       S_SAV_PTRS(A2),A1
819          MOVE.W    #PTRS_LEN,D0
820          BSR       MVB1                      MOVE POINTERS FROM CUR TO SAVED
821
822     * PREPARE TRANSFER COMMAND
823
824          MOVE.B    #SCM_XFR,S_SCMD(A2)  SET TRANSFER COMMAND
825          IF.B      S_PAD(A2) <NE> #0 THEN    IF PAD REQUEST
826          ORI.B     #SC_PAD,S_SCMD(A2)        SET PAD BIT
827          ENDI                                END IF PAD REQUEST
828
829     * START ARBITRATION
830
831          BRA       COMMAND1
832
833     *****************************************************************
834
835     *   BOGUS COMMAND OR PARAMETER
836
837     SDVR80 TRAP    #MTXOFF            INTERRUPTS ON
838     SDVR81 MOVE.B  #-SDR_BOGUS,S_REPLY(A2)   SET FAILURE CODE = INVALID COMMAND OR
839            BRA.S   SDVR95                                       PARAMETER
840     *
841     *  BAD SPC STATE
842     *
843     SDVR84 TRAP    #MTXOFF            INTERRUPTS ON
844     SDVR85 MOVE.B  #(-SDR_STATE_ERR),S_REPLY(A2)  SET FAILURE CODE = STATE ERROR
845            BRA.S   SDVR95
846     *
847     *  NO BUFFER OR BAD COUNT
848     *
```

```
349  SDVR86 TRAP     #MTXOFF               INTERRUPTS ON
350  SDVR87 MOVE.B   #-SDR_BUFERR,S_REPLY(A2)  SET FAILURE CODE = BUFFER ERROR OR
351         BRA.S    SDVR95                                    BAD COUNT
352  *
353  *   COMMAND PARAMETER FAILURE SET ERROR INDICATOR
354  *
355  SDVR94 TRAP     #MTXOFF               INTERRUPTS ON
356  SDVR95 OR.B     #SETZ,CCR             SET FAILURE
357         BRA.S    SDVR99
358  *
359  *   SUCCESSFUL COMMAND COMPLETION RETURN
360  *
361  SDVR96 TRAP     #MTXOFF               INTERRUPTS ON
362  SDVR97 AND.B    #-SETZ,CCR            SET SUCCESS
363  SDVR99 MOVEM.L  (SP)+,A0-A2/D1-D3
364         SNE      D0
365         RTS
366
367  ***************************************************************
368      PAGE
369  *
370  *   SRPT (SCSI INTERRUPT HANDLER)
371  *
372  *       DEFFERED COMPLETIONS ARE ACCOMPLISHED BY THE INTERRUPT
373  *       HANDLER BY USING BITS IN THE CALLING
374  *       TASK'S TCB[EVENT^MASK] AND THE DCB[IREPLY] AS FOLLOWS:
375
376  * PROCESS SPC INTERRUPTS
377  * INTERRUPT CAUSE ARE TESTED IN ORDER OF SEVERITY
378  * SPC INTERRUPT IS CHECKED AGAIN AT THE END OF THE INTERRUPT SERVICE
379  * ROUTINE TO MINIMIZE OVERHEAD OF SAVING AND RESTORING REGISTERS.
880  * THE TIME BETWEEN MOST INTERRUPTS ISVERY SHORT.
881
882  * REGISTER USAGE
883  *    A5 = GLOBAL MEMORY BASE
884
885         XDEF     SPC_RPT
886  SPC_RPT
887         MOVEM.L  A0-A2/D0-D2,-(SP)     SAVE REGISTERS
888         MOVEA.L  BCBADR(A5),A0         GET BCB ADDRESS
889         MOVEA.L  B_CUR_DCB(A0),A2      GET CURRENT DCB ADDRESS
890
891         REPEAT                         REPEAT UNTIL SPC INTERRUPT CLEAR   **8
892         MOVE.B   SPC_INTS,D0
893                                                                          **8
894         CMP.B    #SI_CMD_CMP,D0
895         BEQ      CMD_CMP_INTR          COMMAND_COMPLETE? (MOST COMMON)   **8
896
897         IF.B     D0 <NE> #0 THEN       IF SPC INTERRUPT                  **8
898         BTST     #SIB_RST,D0
899         BNE      RESET_INTR            RESET?
900         BTST     #SIB_HW_ERR,D0
901         BNE      HW_ERR_INTR           HARDWARE ERROR?
902         BTST     #SIB_TIME,D0
903         BNE      TIME_OUT_INTR         TIMEOUT?
904         BTST     #SIB_CMD_CMP,D0
905         BNE      CMD_CMP_INTR          COMMAND_COMPLETE? (BEFORE SERVICE REQUIRED)
906         BTST     #SIB_SERV,D0
907         BNE      SERV_REQ_INTR         SERVICE REQUIRED?
908         BTST     #SIB_DIS,D0
909         BNE      DIS_INTR              DISCONNECTED?
910         BRA      RESEL_INTR            RESELECTED
911                                        *CHECK FOR SELECTED
912         ENDI                           END IF SPC INTERRUPT
913
914         MOVE.B   SPC_BINT,D1           GET BUS INTR STATUS               **8
915         MOVE.B   D1,D0                                                   **8
916         ANDI.B   #(BI_RESELA+BI_RESELB),D0                               **8
917         BNE      BUS_RESEL_INTR        BUS RESELECTS?                    **8
918         MOVE.B   D1,D0                                                   **8
919         ANDI.B   #(BI_FREEA+BI_FREEB),D0                                 **8
920         BNE      BUS_FREE_INTR         BUS FREE?                         **8
921  ***** CHECK FOR WRONG INTERRUPT
922         CLR.B    SPC_BINT              CLEAR BUS INTRRUPT REG
923
924  * INTERRUPT DONE
925
926  INTR_DONE
927         UNTIL.B  SPC_INTS <EQ> #0      UNTIL SPC INTERRUPT CLEAR         **8
928
929         MOVEM.L  (SP)+,A0-A2/D0-D2     RESTORE STATE
930         RTE
931
```

```
932  ****************************************************************
933
934       * SIGNAL TASK
935       * INPUT:   A2 = OCB ADDRESS
936       * USES:    A0, D0
937
938       SIGNAL
939             MOVEA.L  S_CURTCB(A2),A0        GET CALLING TASK'S TCB ADDRESS
940             MOVE     SR,D0                  SAVE PRESENT SR
941             ORI      #DISABL,SR             INTERRUPTS OFF
942             ORI.W    #EVCMP,TEVNT(A0)       SET COMMAND COMPLETE EVENT BIT
943             MOVE     D0,SR                  RESTORE SR
944             RTS
945
946  ****************************************************************
947
948       * RESET INTERRUPT
949
950       RESET_INTR
951             MOVE.B   #SI_RST,SPC_INTS   RESET INTERRUPT
952       *     MOVE.B   #SDR_BUS_RST,S_IREPLY(A2)                        **21
953       *     BSR      SIGNAL                 SIGNAL TASK               **21
954             BRA      INTR_DONE
955
956  ****************************************************************
957
958       * HARDWARE ERROR INTERRUPT
959
960       HW_ERR_INTR
961             MOVE.B   #SI_HW_ERR,SPC_INTS  HARDWARE RESET INTERRUPT
962
963       HW_ERR
964             MOVE.B   SPC_SERR,D0            READ IT FOR DEBUGGING
965             MOVE.B   #SDR_SPC_ERR,S_IREPLY(A2)
966             BSR      SIGNAL                 SIGNAL TASK
967             BRA      INTR_DONE
968
969  ****************************************************************
970
971       * SERVICE REQUIRED INTERRUPT
972       *    SERVICE REQUIRED INTERRUPT SHOULD NOT BE RESET AT THIS POINT   **4
973       *    IF IT IS RESET THE DATA WILL BE LOST.                          **4
974       *    THE NEW TRANSFER WILL RESET THE INTERRUPT. IF NO NEW TRANSFER  **4
975       *    INITIATED, THE INTERRUPT MUST BE RESET EXPLICITLY.             **4
976
977       SERV_REQ_INTR
978
979             IF.B     SPC_SERR <NE> #0 THEN      IF SPC ERROR           **4
980             MOVE.B   #SDR_SPC_ERR,S_IREPLY(A2)  SET ERROR REPLY
981             ENDI                                END IF SPC ERROR       **4
982
983             MOVE.B   SPC_PCTL,D0
984             ANDI.B   #SB_PHASE,D0           GET PHASE CONTROL BITS
985
986             IF.B     D0 <LE> #SP_DATA_IN THEN   IF DATA PHASE          **7
987             MOVE.W   DMB_STATUS,D0
988             ANDI.W   #DS_ERR1,D0            CHECK FOR DMA ERROR
989             BNE      HW_ERR
990             BSR      SAVE_CUR_PTRS          SAVE CURRENT DATA POINTERS
991             ENDI                            END IF DATA PHASE          **7
992
993             IF.B     D0 <EQ> #SP_CMD THEN   IF COMMAND PHASE           **7
994             MOVE.B   SPC_TCL,D0             GET LEFT OVER TRANSFER COUNT  **7
995             SUB.B    D0,S_CMDPTR(A2)        REDUCE COMMAND POINTER     **7
996             ENDI                            END IF COMMAND PHASE       **7
997
998             BRA      PHASE_PREP             PREPARE FOR THE NEXT PHASE
999
1000 ****************************************************************
1001
1002      * SAVE CURRENT DATA POINTERS
1003
1004      SAVE_CUR_PTRS
1005            MOVE.B   SPC_TCH,S_TCH(A2)
1006            MOVE.B   SPC_TCM,S_TCM(A2)
1007            MOVE.B   SPC_TCL,S_TCL(A2)      SAVE TRANSFER COUNT
1008
1009            MOVE.W   SPC_ASBD,S_ASBD(A2)
1010            MOVE.B   SPC_ASBC,S_ASBC(A2)    SAVE ASSEMBLY REGISTERS
1011
1012      * STORE ODD BYTE IN THE IN DIRECTION
```

```
1013    * DMA START REGISTER POINTS TO NEXT LOCATION TO BE TRANSFERED - 2
1014    * LONG INDEXING FORM IS USED BECAUSE IT IS A SIGNED VALUE
1015
1016          MOVE.B    S_ASBC(A2),D0              GET ASSEMBLY CONTROL         **4
1017          ANDI.B    #(SA_IN+SA_FILLED),D0                                   **4
1018          IF.B      D0 <EQ> #(SA_IN+SA_FILLED) THEN   IF IN AND FILLED      **4
1019          MOVE.B    S_ASBD_IN(A2),D0           GET ASSEMBLY DATA IN         **4
1020          CLR.L     D1                                                      **4
1021          MOVE.W    DMB_START1,D1              GET DMA START ADDRESS        **4
1022          ADDQ.W    #2,D1                      ADD 2 TO OFFSET PREINCREMENT **4
1023          LEA       DMBBUF,A0                                               **4
1024          MOVE.B    D0,(A0,D1.L)               STORE IN DMA BUFFER          **4
1025          ENDI                                 END IF IN AND FILLED         **4
1026
1027    * STORE DMA REGISTERS
1028
1029          TST.L     S_TC(A2)
1030          IF        <NE> THEN                  IF THERE IS MORE TO TRANSFER
1031                                               *THE MOST COMMON CASE
1032          MOVE.W    DMB_START1,S_START(A2)
1033          MOVE.W    DMB_END1,S_END(A2)
1034          MOVE.W    DMB_CONTROL1,S_CONTROL(A2) SAVE DMA REGISTERS
1035
1036    * algorithm to back up DMA only in the out direction
1037    *
1038    * assembly    SPC FIFO      DMA          assembly data
1039    *  empty       empty        same          same
1040    *  filled      empty        same          same
1041    *
1042    *  empty       even         back up       cleared
1043    *  empty       odd          back up       changed
1044    *  filled      even         back up       changed
1045    *  filled      odd          back up       cleared
1046    *
1047    * calculate FIFO count
1048    * if SPC FIFO filled
1049    *    if assembly filled
1050    *       FIFO count = FIFO count + 1
1051    *    DMA start = DMA start - FIFO count
1052    *    clear assembly
1053    *    if FIFO count odd then
1054    *       DMA start = DMA start + 1
1055    *       assembly data = data at DMA start   * remember it is physical - 2
1056    *       set assembly filled
1057
1058          IF.B      S_OUTDIR(A2) <NE> #0 THEN  IF OUT DIRECTION             **4
1059
1060    * CALCULATE FIFO COUNT
1061    * LONG INDEXING FORM IS USED BECAUSE IT IS A SIGNED VALUE                **4
1062
1063          CLR.L     D0                                                      **4
1064          MOVE.B    SPC_TCL,D0                 GET TCL
1065          SUB.B     SPC_MBC,D0                 SUBTRACT MBC
1066          ANDI.B    #$0F,D0                    GET THE FOUR LOW-ORDER BITS  **4
1067    *****CHECK FOR ERROR
1068
1069          IF.B      D0 <NE> #0 THEN            IF FIFO CONTAINS DATA
1070          MOVE.B    S_ASBC(A2),D1
1071          ANDI.B    #SA_FILLED,D1
1072          IF        <NE> THEN
1073          ADDQ.B    #1,D0                      ADD ASSEMBLY COUNT TO FIFO COUNT
1074          ENDI                                 END IF ASSEMBLY FILLED
1075
1076          SUB.W     D0,S_START(A2)             BACK UP DMA BY FIFO COUNT
1077          ANDI.B    #~SA_FILLED,S_ASBC(A2)     CLEAR ASSEMBLY
1078
1079          BTST      #0,D0
1080          IF        <NE> THEN                  IF FIFO COUNT ODD
1081          ADDQ.W    #1,S_START(A2)             ROUND UP DMA START ADDRESS
1082
1083          LEA       DMBBUF,A0
1084          CLR.L     D0                                                      **4
1085          MOVE.W    S_START(A2),D0
1086          MOVE.B    1(A0,D0.L),S_ASBD_OUT(A2)  GET DATA FROM DMA START TO ASBD **4
1087          ORI.B     #SA_FILLED,S_ASBC(A2)      SET ASSEMBLY TO FILLED
1088
1089          ENDI                                 END IF FIFO COUNT ODD
1090          ENDI                                 END IF FIFO CONTAINS DATA
1091
1092          ENDI                                 END IF OUT DIRECTION         **4
1093          ENDI                                 END IF THERE IS MORE TO TRANSFER
1094
```

```
1095            MOVE.W   #DC_RESET,DMB_CONTROL1      RESET DMA CHANNEL 1       **4
1096            MOVE.W   #0,DMB_CONTROL1                                       **4
1097            MOVE.W   #0,DMB_START1                                         **4
1098            MOVE.W   #0,DMB_END1                                           **4
1099            MOVE.W   #0,DMB_CHAIN1                                         **4
1100
1101            MOVE.B   SPC_SCMD,S_SCMD(A2)         STORE COMMAND REGISTER
1102
1103    * CALCULATE ACTUAL LENGTH
1104
1105            MOVE.W   S_XFRLENC(A2),D0    GET REQUESTED LENGTH
1106            SUB.W    S_TCM(A2),D0        ACTUAL LENGTH = REQUESTED - LEFT OVER
1107            MOVE.W   D0,S_ACTLEN(A2)     STORE ACTUAL LENGTH
1108
1109            RTS
1110
1111    *****************************************************************************
1112
1113    * RESTORE CURRENT DATA POINTERS
1114
1115    RESTORE_CUR_PTRS
1116
1117    * START DMA ONLY IF WE NEED TO TRANSFER AT LEAST ONE BYTE
1118
1119            IF.L     S_TC(A2) <NE> #0 THEN       IF COUNT NOT ZERO         **4
1120
1121            MOVE.W   #DC_RESET,DMB_CONTROL1      RESET CHANNEL 1
1122            MOVE.W   #0,DMB_CHAIN1                                         **4
1123            MOVE.W   S_START(A2),DMB_START1
1124            MOVE.W   S_END(A2),DMB_END1
1125            MOVE.W   S_CONTROL(A2),DMB_CONTROL1  RESTORE DMA REGISTERS
1126            ENDI                                 END IF TRANSFER COUNT NOT ZERO
1127
1128            MOVE.W   S_ASBD(A2),SPC_ASBD
1129            MOVE.B   S_ASBC(A2),SPC_ASBC         RESTORE ASSEMBLY REGISTERS
1130
1131            MOVE.B   S_TCH(A2),SPC_TCH
1132            MOVE.B   S_TCM(A2),SPC_TCM
1133            MOVE.B   S_TCL(A2),SPC_TCL           RESTORE TRANSFER COUNT
1134
1135            MOVE.B   S_PCTL(A2),SPC_PCTL         SET UP PHASE
1136            RTS
1137
1138    *****************************************************************************
1139
1140    * NEXT PHASE PREPARATION
1141    * TARGET HAS CHANGED PHASE OR WE GUESSED THE WRONG PHASE.
1142    * PREPARE FOR TRANSFER IN THE NEW PHASE
1143    * IF TARGET HAS NOT ASSERTED REQUEST, WE WILL WAIT FOR MESSAGE IN PHASE
1144    * IF WE MUST HAVE A TRANSFER IN PROGRESS AT ALL TIME TO DETECT
1145    * WHEN THE TARGET WANTS TO TALK TO US
1146
1147    * DMA transfer is used for all except COMMAND OUT. Program transfer
1148    * out expect the data after transfer started (target request with the
1149    * proper phase). Program transfer in will not interrupt unless the
1150    * data is read by the microprocessor.
1151
1152    * CMD_PREP cannot be set up ahead of time because it is a program
1153    * transfer. It has to wait until transfer has started. This is
1154    * done with MSG_IN_PREP.
1155
1156    * DMA engine is not started unless there is more than one byte
1157    * transfer (DATA phase).
1158
1159    * BRANCH BASED ON PHASE SENSE
1160
1161    PHASE_PREP
1162            CLR.L    D0                                                    **4
1163            MOVE.B   SPC_PSNS,D0
1164            BTST     #SBB_REQ,D0                                           **8
1165            BEQ      MSG_IN_PREP         IF NO REQUEST, WAIT FOR MSG IN    **8
1166            ANDI.B   #SB_PHASE,D0        GET PHASE BITS
1167            LSL.W    #2,D0               FORM INDEX
1168            MOVEA.L  PHASE_PREP1(PC,D0.W),A1  GET PHASE JUMP TABLE ADDRESS
1169            JMP      (A1)
1170    PHASE_PREP1
1171            DC.L     DATA_PREP           0 DATA IN
1172            DC.L     DATA_PREP           1 DATA OUT
1173            DC.L     CMD_PREP            2 COMMAND
1174            DC.L     STAT_PREP           3 STATUS
1175            DC.L     INV_PHASE           4
1176            DC.L     INV_PHASE           5
```

```
1177            DC.L    MSG_OUT_SERV         6 MESSAGE OUT
1178            DC.L    MSG_IN_PREP          7 MESSAGE IN
1179
1180  ************************************************************
1181
1182  * DATA TRANSFER PREPARATION
1183
1184  DATA_PREP
1185            TST.L   S_TC(A2)                    CHECK TRANSFER COUNT
1186            IF      <NE> OR.B S_PADC(A2) <NE> #0 THEN  IF THERE IS MORE TO TRANSFER
1187                                                *OR PAD
1188            BSR     RESTORE_CUR_PTRS            RESTORE CURRENT DATA POINTERS
1189
1190            MOVE.B  S_SCMD(A2),SPC_SCMD         START TRANSFER
1191
1192            ELSE
1193            BRA     MSG_IN_PREP                 * WE CAN GET INTO A LOOP    **4
1194
1195            ENDI                                END IF THERE IS MORE TO TRANSFER
1196
1197            BRA     PREP_DONE
1198
1199  ************************************************************
1200
1201  * COMMAND TRANSFER PREPARATION
1202
1203  CMD_PREP
1204            MOVE.B  #SP_CMD,SPC_PCTL            SET UP PHASE
1205
1206            CLR.L   D1                                                      **7
1207            MOVE.B  S_CMDPTR(A2),D1             GET COMMAND POINTER         **7
1208            LEA     S_CMDC(A2,D1),A0            SET UP COMMAND ADDRESS      **7
1209
1210            MOVE.B  S_CMDCNTC(A2),D0            GET TOTAL COMMAND COUNT     **7
1211            SUB.B   D1,D0                       SUBTRACT COMMAND POINTER    **7
1212            IF.B    D0 <HI> #8 THEN             IF LEFT OVER IS MORE THAN 8 **7
1213            MOVE.B  #8,D0                       MAX TRANSFER IS 8           **7
1214            ENDI                                END IF LEFT OVER IS MORE THAN 8 **7
1215            ADD.B   D0,S_CMDPTR(A2)             ADVANCE COMMAND POINTER     **7
1216
1217            CLR.B   SPC_TCH
1218            CLR.B   SPC_TCM
1219            MOVE.B  D0,SPC_TCL                  SET UP TRANSFER COUNT
1220            MOVE.B  #(SCM_XFR+SC_PROG_XFR),SPC_SCMD   TRANSFER COMMAND      **8
1221
1222            SUBQ.B  #1,D0
1223            LEA     SPC_DREG,A1
1224  CMD_PREP1
1225            MOVE.B  (A0)+,(A1)
1226            DBF     D0,CMD_PREP1                PUT COMMAND IN DREG
1227
1228            BRA     PREP_DONE
1229
1230  ************************************************************
1231
1232  * STATUS PREPARATION
1233
1234  STAT_PREP
1235            MOVE.B  #$FF,SPC_ASBD_IN            PUT SOMETHING INVALID TO BE SAFE **4
1236            MOVE.B  #SA_IN,SPC_ASBC             SET ASSEMBLY REGISTER: IN, EMPTY
1237
1238            CLR.B   SPC_TCH
1239            CLR.B   SPC_TCM
1240            MOVE.B  #1,SPC_TCL                  TBC = 1
1241            MOVE.B  #SP_STATUS,SPC_PCTL         SET UP PHASE
1242            MOVE.B  #(SCM_XFR),SPC_SCMD         TRANSFER COMMAND
1243            BRA     PREP_DONE
1244
1245  ************************************************************
1246
1247  * MESSAGE OUT PREPARATION
1248  * ALL MESSAGE OUT PHASE IS ERROR EXCEPT FOR AFTER SELECTION
1249
1250  MSG_OUT_SERV
1251            MOVE.B  #SMSG_ABORT,D0              PUT ABORT MSG
1252
1253  * D0 CONTAINS THE MESSAGE TO BE SENT
1254
1255  MSG_OUT_PREP
1256            MOVE.B  D0,SPC_ASBD_OUT             PUT MSG
1257            MOVE.B  #SA_FILLED,SPC_ASBC         SET ASSEMBLY REGISTER: OUT, FILLED
1258
```

```
1259            CLR.B      SPC_TCH
1260            CLR.B      SPC_TCM
1261            MOVE.B     #1,SPC_TCL              TBC = 1
1262
1263            MOVE.B     #SP_MSG_OUT,SPC_PCTL    SET UP PHASE
1264            MOVE.B     #(SCM_XFR),SPC_SCMD     TRANSFER COMMAND
1265            BRA        PREP_DONE
1266
1267    *************************************************************
1268
1269    * MESSAGE IN PREPARATION
1270
1271    MSG_IN_PREP
1272            MOVE.B     #$FF,SPC_ASBD_IN        PUT SOMETHING INVALID TO BE SAFE    **4
1273            MOVE.B     #SA_IN,SPC_ASBC         SET ASSEMBLY REGISTER: IN. EMPTY
1274
1275            CLR.B      SPC_TCH
1276            CLR.B      SPC_TCM
1277            MOVE.B     #1,SPC_TCL              TBC = 1
1278
1279            MOVE.B     #SP_MSG_IN,SPC_PCTL     SET UP PHASE
1280            MOVE.B     #(SCM_XFR),SPC_SCMD     TRANSFER COMMAND
1281    *       BRA        PREP_DONE
1282
1283    *************************************************************
1284
1285    * DATA TRANSFER PREPARATION DONE
1286
1287    PREP_DONE
1288            BRA        INTR_DONE
1289
1290    *************************************************************
1291
1292    * INVALID PHASE
1293    *   SIGNAL TASK
1294
1295    INV_PHASE
1296            MOVE.B     #(SI_SERV),SPC_INTS     RESET SERVICE REQUIRED INTERRUPT **4
1297            MOVE.B     #SDR_PROT_ERR,S_IREPLY(A2)
1298            BSR        SIGNAL                  SIGNAL TASK
1299            BRA        INTR_DONE
1300
1301    *************************************************************
1302
1303    * COMMAND COMPLETE INTERRUPT
1304
1305    CMD_CMP_INTR
1306            MOVE.B     #SI_CMD_CMP,SPC_INTS    RESET INTERRUPT
1307
1308            MOVE.B     SPC_SCMD,D0
1309            ANDI.B     #SC_CMD,D0              GET SPC COMMAND
1310            CMPI.B     #SCM_XFR,D0             TRANSFER COMMAND?
1311            BEQ.S      XFR_CMP
1312    *       BRA.S      SEL_CMP                 OR SELECT COMMAND
1313
1314    *************************************************************
1315
1316    * SELECT COMPLETE
1317
1318    SEL_CMP
1319            BTST       #SIB_DIS,SPC_INTS       CHECK FOR DISCONNECTION     **17
1320            IF         <NE> THEN               IF DISCONNECTED             **17
1321            MOVE.B     #SI_DIS,SPC_INTS        RESET DISCONNECTION INTR    **17
1322            BRA        TIME_OUT_INTR           TREAT AS TIME OUT INTERRUPT **17
1323            ENDI                                                           **17
1324
1325            MOVEA.L    BCBADR(A5),A0           GET BUS CONTROL BLOCK ADDRESS
1326            MOVE.B     #CS_CON,B_SPC_STATE(A0)   SPC STATE = CONNECTED
1327
1328            CLR.L      D0
1329            MOVE.B     S_BUS_NO(A2),D0         GET WAITED BUS NO
1330            MOVE.B     S_DEV_NO(A2),D1
1331            BCLR.B     D1,B_DEV_WAIT(A0,D0.W)  TAKE OFF WAITING DEVICES
1332
1333            MOVE.B     #IDENTIFY,D0            PUT IDENTIFY MSG
1334            BRA        MSG_OUT_PREP            NEXT PHASE: MESSAGE OUT
1335
1336    *************************************************************
1337
1338    * TRANSFER COMPLETE
1339
```

```
1340    XFR_CMP
1341
1342            IF.B    SPC_SERR <NE> #0 THEN      IF SPC ERROR                **4
1343            MOVE.B  #SDR_SPC_ERR,S_IREPLY(A2)  SET ERROR REPLY
1344            ENDI                               END IF SPC ERROR            **4
1345
1346    * PROCESS BASED ON CONTROL PHASE
1347
1348            CLR.L   D0                                                     **4
1349            MOVE.B  SPC_PCTL,D0
1350            ANDI.B  #SP_PHASE,D0    GET PHASE BITS
1351            LSL.W   #2,D0           FORM INDEX
1352            MOVEA.L XFRCMP1(PC,D0.W),A1  GET PHASE JUMP TABLE ADDRESS
1353            JMP     (A1)
1354    XFRCMP1
1355            DC.L    DATA_CMP        0 DATA OUT
1356            DC.L    DATA_CMP        1 DATA IN
1357            DC.L    CMD_CMP         2 COMMAND                              **7
1358            DC.L    STAT_CMP        3 STATUS
1359            DC.L    PHASE_PREP      4 INVALID PHASE                        **8
1360            DC.L    PHASE_PREP      5 INVALID PHASE                        **8
1361            DC.L    PHASE_PREP      6 MESSAGE OUT                          **8
1362            DC.L    MSG_IN_CMP      7 MESSAGE IN
1363
1364    *************************************************************
1365
1366    DATA_CMP
1367            MOVE.W  DMB_STATUS,D0
1368            ANDI.W  #DS_ERR1,D0     CHECK FOR DMA ERROR
1369            BNE     HW_ERR
1370            BSR     SAVE_CUR_PTRS   SAVE CURRENT DATA POINTERS             **4
1371            BRA     PHASE_PREP                                             **8
1372
1373    *************************************************************
1374
1375    CMD_CMP                                                                **7
1376            MOVE.B  S_CMDPTR(A2),D0     GET COMMAND POINTER                **7
1377            IF.B    D0 <LO> S_CMDCNTC(A2) THEN   IF THERE IS MORE COMMAND  **7
1378            BRA     CMD_PREP            GOTO COMMAND PREP                  **7
1379            ENDI                        END IF THERE IS MORE COMMAND       **7
1380            BRA     PHASE_PREP                                             **8
1381
1382    *************************************************************
1383
1384    STAT_CMP
1385            MOVE.B  SPC_ASBD_IN,S_STAT(A2)    SAVE STATUS
1386            BRA     PHASE_PREP                                             **8
1387
1388    *************************************************************
1389
1390    MSG_IN_CMP
1391
1392            CLR.L   D0                                                     **4
1393            MOVE.B  SPC_ASBD_IN,D0
1394            MOVE.B  D0,S_MSGIN(A2)      STORE MESSAGE
1395            IF.B    D0 <LO> #SMSG_ID AND.B D0 <HI> #SMSG_REJ THEN  IF INVALID MSG
1396            BRA     INV_MSG
1397            ENDI                        END IF INVALID MESSAGE
1398
1399            MOVE.B  #SCM_RST_ACK,SPC_SCMD  RESET ACK
1400            MOVE.B  #SI_CMD_CMP,SPC_INTS   RESET INTERRUPT AGAIN
1401
1402            CMPI.B  #SMSG_ID,D0         IDENTIFY MESSAGE?
1403            BCC     ID_MSG              BRANCH IF HIGHER OR EQUAL
1404            LSL.W   #2,D0               FORM INDEX
1405            MOVEA.L MSG_IN(PC,D0.W),A1  GET PHASE JUMP TABLE ADDRESS
1406            JMP     (A1)
1407    MSG_IN
1408            DC.L    CMD_CMP_MSG     0 COMMAND COMPLETE
1409            DC.L    INV_MSG         1 EXTENDED MESSAGE
1410            DC.L    SAVE_MSG        2 SAVE DATA POINTERS
1411            DC.L    RESTORE_MSG     3 RESTORE DATA POINTERS
1412            DC.L    DIS_MSG         4 DISCONNECT
1413            DC.L    INV_MSG         5 INITIATOR DETECTED ERROR
1414            DC.L    INV_MSG         6 ABORT
1415            DC.L    REJ_MSG         7 MESSAGE REJECT
1416
1417    *************************************************************
1418
1419    * COMMAND COMPLETE MESSAGE
1420
1421    CMD_CMP_MSG
1422
```

```
1423        * SIGNAL TASK
1424
1425              MOVE.B    #SDR_NOERR,S_IREPLY(A2)   NORMAL COMPLETTION
1426              BSR       SIGNAL                    SIGNAL TASK
1427              BRA       PHASE_PREP                                         **8
1428        ******* CHECK FOR DOUBLE SIGNAL
1429
1430        ****************************************************************
1431
1432        * SAVE DATA POINTERS MESSAGE
1433
1434        SAVE_MSG
1435              LEA       S_CUR_PTRS(A2),A0
1436              LEA       S_SAV_PTRS(A2),A1
1437              MOVE.W    #PTRS_LEN,D0
1438              BSR       MVB1              MOVE POINTERS FROM CUR TO SAVED
1439              BRA       PHASE_PREP                                         **8
1440
1441        ****************************************************************
1442
1443        * RESTORE_POINTERS
1444
1445        RESTORE_MSG
1446              LEA       S_SAV_PTRS(A2),A0
1447              LEA       S_CUR_PTRS(A2),A1
1448              MOVE.W    #PTRS_LEN,D0
1449              BSR       MVB1              MOVE POINTERS FROM SAVED TO CUR
1450
1451              BRA       PHASE_PREP                                         **8
1452
1453        ****************************************************************
1454
1455        * DISCONNECT MESSAGE
1456
1457        DIS_MSG
1458              BRA       PHASE_PREP                                         **8
1459
1460        ****************************************************************
1461
1462        * MESSAGE_REJECT MESSAGE
1463
1464        MSG_REJ
1465        * ERROR
1466              BRA       PHASE_PREP                                         **8
1467
1468        ****************************************************************
1469
1470        * IDENTIFY MESSAGE
1471
1472        ID_MSG
1473              MOVE.B    S_MSG(A2),S_IDIN(A2)  SAVE IDENTIFY MESSAGE
1474
1475              LEA       S_SAV_PTRS(A2),A0
1476              LEA       S_CUR_PTRS(A2),A1
1477              MOVE.W    #PTRS_LEN,D0
1478              BSR       MVB1              RESTORE POINTERS
1479
1480              BRA       PHASE_PREP                                         **8
1481
1482        ****************************************************************
1483
1484        * INVALID_MESSAGE
1485        *    SIGNAL TASK
1486
1487        INV_MSG
1488        REJ_MSG
1489              MOVE.B    #SDR_PROT_ERR,S_IREPLY(A2)
1490              BSR       SIGNAL                    SIGNAL TASK
1491              BRA       INTR_DONE
1492
1493        ****************************************************************
1494
1495        * TIMEOUT INTERRUPT
1496
1497        TIME_OUT_INTR
1498              MOVE.B    #SI_TIME,SPC_INTS         RESET INTERRUPT
1499              MOVE.B    #SDR_SEL_TIME,S_IREPLY(A2)  SET REPLY = SELECTION TIME OUT
1500              BSR       SIGNAL                    SIGNAL TASK
1501
1502        * TAKE OFF LIST OF WAITING DEVICES
1503
```

```
1504            CLR.L   D0                                                                  **4
1505            MOVE.B  S_BUS_NO(A2),D0         GET WAITED BUS NO
1506            MOVE.B  S_DEV_NO(A2),D1
1507            MOVEA.L BCBADR(A5),A0           GET BUS CONTROL BLOCK ADDRESS
1508            BCLR.B  D1,B_DEV_WAIT(A0,D0.W)  TAKE OFF WAITING DEVICES
1509
1510    * CHECK IF ANOTHER DEVICE WAITING
1511
1512            BRA     DIS_INTR1
1513
1514    **************************************************************************
1515
1516    * DISCONNECTED INTERRUPT
1517    * OR BUS FREE INTERRUPT
1518
1519    * CHECK IF OTHER BUS RESELECTED OR ONE OF THE BUSES IS WAITED
1520
1521    * reselection has preference over new commands
1522
1523    *                                       other bus
1524    *                       waited free   waited not free   not waited
1525    * current bus
1526    *   waited free         arbitrate -------------------------------
1527    *   waited not free     switch bus    wait SPC          wait SPC
1528    *                       arbitrate     wait bus
1529    *   not waited          switch bus
1530    *                       arbitrate     wait bus
1531    *
1532    * the current bus has preference
1533    * we switch bus only when current bus is not waited and the other
1534    * bus is waited and free
1535
1536    * logic:
1537    *   if bus reselect
1538    *     go to reselect interrupt handler
1539    *   else if current bus waited
1540    *     arbitrate the next device
1541    *   else if other bus waited
1542    *     if other bus free
1543    *       switch bus
1544    *       arbitrate the next device
1545    *   else
1546    *     set interrupt
1547
1548    DIS_INTR
1549            AND.B   #($FF-SP_FREE_EN),SPC_PCTL    DISABLE BUS FREE INTR **21
1549.1          MOVE.B  #SI_DIS,SPC_INTS              RESET INTERRUPT
1550            MOVEA.L BCBADR(A5),A0                 GET BUS CONTROL BLOCK ADDRESS
1551            CMP.B   #CS_OK,B_SPC_STATE(A0)        IF SPC STATE = FREE
1552            BEQ     CUR_BUS_FREE                  CURRENT BUS FREE
1553
1554    DIS_INTR1
1555            MOVEA.L BCBADR(A5),A0                 GET BUS CONTROL BLOCK ADDRESS
1556            MOVE.B  #CS_OK,B_SPC_STATE(A0)        SPC STATE = FREE
1557
1558            MOVE.B  #(BI_RESELA+BI_RESELB),SPC_BINT                              **8
1559            MOVE.B  SPC_BINT,D1                                                  **8
1560            ANDI.B  #(BI_RESELA+BI_RESELB),D1     IF BUS RESELECT                **8
1561            BNE     BUS_RESEL_INTR                GO TO BUS RESELECT             **8
1562
1563            CLR.L   D0
1564            MOVE.B  B_CUR_BUS(A0),D0              GET CURRENT BUS
1565
1566            IF.B    B_DEV_WAIT(A0,D0.W) <NE> #0 THEN   IF CURRENT BUS WAITED
1567            BSR     NEXT_DEV                           ARBITRATE NEXT_DEV
1568
1569            ELSE IF.W B_DEV_WAIT(A0) <NE> #0 THEN IF OTHER BUS WAITED            **8
1570                                                  *NOTE: WORD NOT BYTE
1571            MOVE.B  #(BI_FREEA+BI_FREEB),SPC_BINT                                **8
1572            MOVE.B  SPC_BINT,D1                   GET BUS INTERRUPT STATUS      **8
1573            BSR     FIX_BINT                                                    **8
1574            ANDI.B  #(BI_FREEB),D1                                              **8
1575            IF      <NE> THEN                     IF OTHER BUS FREE
1576            BSR     SWITCH_BUS                    SWITCH BUS
1577            BSR     NEXT_DEV                      ARBITRATE NEXT_DEV
1578            ENDI                                  END IF OTHER BUS FREE
1579
1580            ELSE                                                                **8
1581            BSR     SET_INTR                      SET INTERRUPT
1582            ENDI                                  END IF CURRENT BUS WAITED
1583
1584            BRA     INTR_DONE
1585
```

```
CUR_BUS_FREE
        CLR.L    D0
        MOVE.B   B_CUR_BUS(A0),D0                    GET CURRENT BUS
        IF.B     B_DEV_WAIT(A0,D0.W) <NE> #0 THEN    IF CURRENT BUS WAITED
        BSR      NEXT_DEV                            ARBITRATE NEXT_DEV
                                                                                **B
        ELSE                                                                    **B
        BSR      SET_INTR
        ENDI                                         END IF CURRENT BUS WAITED

BRA      INTR_DONE

*******************************************************************

* SPC RESELECTED INTERRUPT
* PICK TARGET ID BEFORE RESET INTERRUPT.  RESET INTERRUPT WILL CLEAR
* TARGET BUS ID

RESEL_INTR
        MOVE.B   SPC_TEMP,D0             GET TARGET BUS ID
        ANDI.B   #($FF-SL_RESEL_EN),SPC_SCTL DISABLE RESELECTION               **B
        MOVE.B   #SI_RESEL,SPC_INTS      RESET INTERRUPT

MOVEA.L  BCBADR(A5),A0           GET BUS CONTROL BLOCK ADDRESS
        CLR.L    D2
        MOVE.B   B_MDEVNO(A0),D2         GET MAX DEV NO

RESEL_INTR1
        BTST     D2,D0
        DBNE     D2,RESEL_INTR1          ENCODE BUS ID TO BINARY NUMBER

* MAKE SURE IT IS NOT NEGATIVE

IF.B     B_CUR_BUS(A0) <NE> #0 THEN    IF BUS B
        ADD.B    B_MDEVNO(A0),D2
        ADDQ.B   #1,D2                         ADD BUS A DEVICES
        ENDI                                   END IF BUS B
        LSL.W    #2,D2                         MULTIPLY BY 4
        LEA      DCBTAB(A5),A1                 POINT TO DCB
        MOVEA.L  0(A1,D2.W),A2                 POINT TO DCB

****** check for unexpected reselection
        MOVEA.L  BCBADR(A5),A0            GET BUS CONTROL BLOCK ADDRESS
        MOVE.L   A2,B_CUR_DCB(A0)         STORE CURRENT DCB
        MOVE.B   #CS_CON,B_SPC_STATE(A0)  SPC STATE = CONNECTED
        CLR.B    SPC_BINT                 CLEAR BUS INTERRUPT REG

BRA      PHASE_PREP

*******************************************************************

* BUS FREE INTERRUPT

BUS_FREE_INTR
        CLR.B    SPC_BINT                       CLEAR BUS INTERRUPT REG
        MOVEA.L  BCBADR(A5),A0                  GET BUS CONTROL BLOCK ADDRESS

IF.B     B_SPC_STATE(A0) <EQ> #CS_OK THEN  IF SPC STATE = FREE
        CLR.L    D0
        MOVE.B   B_CUR_BUS(A0),D0                  GET CURRENT BUS
        EOR.B    #1,D0                             GET OTHER BUS NO

IF.B     B_DEV_WAIT(A0,D0.W) <NE> #0 THEN  IF OTHER BUS WAITED
        BSR      SWITCH_BUS                        SWITCH BUS
        BSR      NEXT_DEV                          ARBITRATE NEXT_DEV
        ELSE                                       *ELSE
        BSR      SET_INTR                          SET INTERRUPT
        ENDI                                       END IF OTHER BUS WAITED

ENDI                                       END IF SPC STATE = FREE

BRA      INTR_DONE

*******************************************************************

* BUS RESELECTION INTERRUPT
* IT IS EITHER CURRENT OR OTHER BUS RESELECTING OR BOTH.                 **B
* IF WE ARE ARBITRATING                                                  **B
*    IF THE CURRENT BUS RESELECTING                                      **B
```

```
1667  *        MEANS THAT WE LOST AND WE ARE SELECTED.                       **8
1668  *    THE OTHER BUS CANNOT RESELECT BECAUSE THE INTERRUPT IS NOT ENABLED
1669  *                                                                      **8
1670  * BUS INTR REGISTER MUST BE SAVED BEFORE CLEARED                       **8
1671
1672  BUS_RESEL_INTR
1673                                                                         **8
1674        MOVE.B   SPC_BINT,D1
1675        CLR.B    SPC_BINT                        CLEAR BUS INTERRUPT REG **8
1676        MOVEA.L  BCBADR(A5),A0                   GET BUS CONTROL BLOCK ADDRESS
1677
1678        IF.B     B_SPC_STATE(A0) <LS> #CS_WAIT THEN  IF SPC STATE = FREE OR ARBIT
1679        MOVE.B   B_CUR_BUS(A0),D0                                        **8
1680        BSR      FIX_BINT                        GET BUS INTR STATUS     **8
1681        ANDI.B   #BI_RESELA,D1                   CHECK CUR BUS FIRST     **8
1682
1683        IF       <EQ> THEN                       IF OTHER BUS RESELECT   **8
1684        BSR      SWITCH_BUS                      SWITCH BUS
1685        ENDI                                     END IF OTHER BUS RESELECT **8
1686
1687        ORI.B    #SL_RESEL_EN,SPC_SCTL           ENABLE RESELECTION      **8
1688        BTST.B   #SIB_RESEL,SPC_INTS             IF RESELECT INTR
1689        BNE      RESEL_INTR                      GO TO RESELECT
1690        MOVE.B   #CS_RESEL,B_SPC_STATE(A0)       SET SPC STATE = RESELECTING **8
1691        ENDI                                     END IF SPC STATE = FREE
1692
1693        BRA      INTR_DONE
1694
1695  ************************************************************************
1696
1697  * SUBROUTINES TO SAVE STATE
1698
1699  SAVE_SPC_REGS
1700        MOVEA.L  S_STBUF(A2),A1                  GET STATE BUFFER ADDRESS
1701
1702        MOVE.B   SPC_BDID,SST_SPC_BDID(A1)
1703        MOVE.B   SPC_SCTL,SST_SPC_BDID(A1)
1704        MOVE.B   SPC_SCMD,SST_SPC_SCMD(A1)
1705        MOVE.B   SPC_TMOD,SST_SPC_TMOD(A1)
1706        MOVE.B   SPC_INTS,SST_SPC_INTS(A1)
1707        MOVE.B   SPC_PSNS,SST_SPC_PSNS(A1)
1708        MOVE.B   SPC_SSTS,SST_SPC_SSTS(A1)
1709        MOVE.B   SPC_SERR,SST_SPC_SERR(A1)
1710        MOVE.B   SPC_PCTL,SST_SPC_PCTL(A1)
1711        MOVE.B   SPC_MBC,SST_SPC_MBC(A1)
1712        MOVE.B   SPC_DREG,SST_SPC_DREG(A1)  ****** SHOULD NOT BE DONE WHILE ACTIVE
1713        MOVE.B   SPC_TEMP,SST_SPC_TEMP(A1)
1714        MOVE.B   SPC_TCH,SST_SPC_TCH(A1)
1715        MOVE.B   SPC_TCM,SST_SPC_TCM(A1)
1716        MOVE.B   SPC_TCL,SST_SPC_TCL(A1)         SAVE SPC REGISTERS
1717        CLR.B    SST_SPC_EXBF(A1)                CLEAR FILLER
1718
1719        MOVE.B   S_BSEL(A2),SST_BSEL(A1)         SAVE BSEL COPY
1720        MOVE.W   SPC_ASBD,SST_ASBD(A1)
1721        MOVE.B   SPC_ASBC,SST_ASBC(A1)
1722        MOVE.B   SPC_BINT,SST_BINT(A1)           SAVE SPC SUPPORT REGISTERS
1723        CLR.B    SST_FILLER(A1)                  CLEAR FILLER
1724        RTS
1725
1726  SAVE_DMB_REGS
1727        MOVEA.L  S_STBUF(A2),A1                  GET STATE BUFFER ADDRESS
1728        MOVE.W   DMB_STATUS,SST_DMB_STATUS(A1)
1729        MOVE.W   DMB_MASTER,SST_DMB_MASTER(A1)
1730        MOVE.W   DMB_CONTROL0,SST_DMB_CONTROL0(A1)
1731        MOVE.W   DMB_END0,SST_DMB_END0(A1)
1732        MOVE.W   DMB_CHAIN0,SST_DMB_CHAIN0(A1)
1733        MOVE.W   DMB_START0,SST_DMB_START0(A1)
1734        MOVE.W   DMB_CONTROL1,SST_DMB_CONTROL1(A1)
1735        MOVE.W   DMB_END1,SST_DMB_END1(A1)
1736        MOVE.W   DMB_CHAIN1,SST_DMB_CHAIN1(A1)
1737        MOVE.W   DMB_START1,SST_DMB_START1(A1)   SAVE REGISTERS
1738        RTS
1739
1740  SAVE_STATE
1741        TST.L    S_STBUF(A2)
1742        IF       <NE> AND.B S_STATE(A2) <EQ> #0 THEN  IF STATE BUFFER PROVIDED
1743                                               *AND IT IS NOT USED
1744        MOVEA.L  S_STBUF(A2),A1                  GET STATE BUFFER ADDRESS
1745        MOVE.B   S_DVR_ST(A2),SST_DVR_ST(A1)     SAVE DRIVER STATE
1746        MOVE.B   S_PROT_ERR(A2),SST_PROT_ERR(A1) SAVE PROTOCOL ERROR
1747        CLR.B    SST_FILLER(A1)                  CLEAR FILLER
1748        BSR      SAVE_SPC_REGS                   SAVE PPC_REGISTERS
```

```
1749          BSR       SAVE_DMB_REGS            SAVE DMB REGISTERS
1750          MOVE.B    #$FF,S_STATE(A2)         SET STATE VALID
1751          ENDI                               END IF STATE BUFFER PROVIDED
1752          RTS
1753
1754    ******************************************************************
1755
1756    CODE_ERROR
1757
1758    * CODE SPC ERROR
1759
1760          MOVE.B    SPC_SERR,D0
1761          IF.B      D0 <NE> #0 THEN          IF SPC SERR
1762
1763          BTST      #SEB_SPC_ERR,D0
1764          IF <NE> THEN                       IF SPC DATA ERROR
1765          MOVE.B    #SDR_WRITE_PERR,D0       SET CODE = WRITE PARITY ERROR
1766          BRA       CODE_ERROR1
1767          ENDI                               END IF SPC DATA ERROR
1768
1769          BTST      #SEB_SCSI_ERR,D0
1770          IF <NE> THEN                       IF SCSI DATA ERROR
1771          MOVE.B    #SDR_READ_PERR,D0        SET CODE = READ PARITY ERROR
1772          BRA       CODE_ERROR1
1773          ENDI                               END IF SCSI DATA ERROR
1774
1775          MOVE.B    #SDR_PROT_ERR,D0         SET CODE = PROTOCOL  ERROR
1776          BRA       CODE_ERROR1
1777
1778          ENDI                               END IF SPC SERR
1779
1780    * CODE DMB ERROR
1781
1782          MOVE.W    DMB_STATUS,D0            GET DMB_STATUS
1783          ANDI.W    #DS_ERR0,D0
1784          IF        <NE> THEN                IF DMB ERROR
1785          MOVE.B    #SDR_DMB_ERR,D0          SET CODE = DMB ERROR
1786          BRA       CODE_ERROR1
1787          ENDI                               END IF DMB ERROR
1788
1789          MOVE.W    BRD_ERROR,D0
1790          ANDI.W    #BEB_DBDMA_ERR,D0
1791          IF        <NE> THEN                IF DMB CHIP ERROR
1792          MOVE.B    #SDR_DMB_ERR,D0          SET CODE = DMB ERROR
1793          BRA       CODE_ERROR1
1794          ENDI                               END IF DMB CHIP ERROR
1795
1796    CODE_ERROR1
1797          RTS
1798
1799    ******************************************************************
1800
1801    * SUBROUTINE CLEAR ERROR
1802    * CLEAR DMA ERROR
1803    * DMA MIGHT HAVE TO BE CONFIGURED
1804    * INPUT:   A2 = DCB ADDRESS
1805    * USES:    D0 = GENERAL REGISTER
1806
1807    CLEAR_ERROR
1808          MOVE.W    BRD_ERROR,D0
1809          ANDI.W    #BEB_DBDMA_ERR,D0
1810          IF        <NE> THEN                IF DMA CHIP ERROR
1811          MOVE.W    #DM_RESET,DMB_MASTER     MASTER RESET DMA
1812          MOVE.W    #DC_RESET,DMB_CONTROL1   RESET DMA CHANNEL1
1813          MOVE.W    #0,DMB_CONTROL0                                  **4
1814          MOVE.W    #0,DMB_START0                                    **4
1815          MOVE.W    #0,DMB_END0                                      **4
1816          MOVE.W    #0,DMB_CHAIN0                                    **4
1817          MOVE.W    #0,DMB_CONTROL1                                  **4
1818          MOVE.W    #0,DMB_START1                                    **4
1819          MOVE.W    #0,DMB_END1                                      **4
1820          MOVE.W    #0,DMB_CHAIN1                                    **4
1821          ENDI                               END IF DMA CHIP ERROR
1822
1823          MOVE.W    DMB_STATUS,D0            GET DMB_STATUS
1824          ANDI.W    #(DS_ERR1),D0
1825          IF        <NE> THEN                IF DMB ERROR
1826          MOVE.W    #DC_RESET,DMB_CONTROL1   RESET DMA CHANNEL1
1827          MOVE.W    #0,DMB_CONTROL1                                  **4
1828          MOVE.W    #0,DMB_START1                                    **4
1829          MOVE.W    #0,DMB_END1                                      **4
```

```
1830            MOVE.W      #0,DMB_CHAIN1                                        **4
1831            ENDI                            END IF DMB ERROR
1832            RTS
1833
1834   ************************************************************
1835
1836   * SUBROUTINE SPC ERROR HANDLER
1837   * THERE SHOULD BE AN ERROR BEFORE CALLING THIS SUBROUTINE
1838   * CODE ERROR FROM SPC_SERR AND DMB STATUS TO BECOME ONE BYTE REPLY CODE
1839   * SAVE STATUS
1840   * INPUT   : A2 = DCB ADDRESS
1841   * USES    : D1 = GENERAL REGISTER
1842   * RETURN  : D0 = IREPLY CODE (BYTE)
1843
1844   SPC_ERROR
1845            BSR         CODE_ERROR
1846            MOVE.B      D0,D1           SAVE IREPLY CODE
1847            BSR         SAVE_STATE
1848            BSR         CLEAR_ERROR
1849            MOVE.B      D1,D0           RESTORE IREPLY CODE
1850            RTS
1851
1852   ************************************************************
1853                                                                              **8
1854   * SUBROUTINE FIX_BINT                                                      **8
1855   * SWAP UPPER AND LOWER NIBBLE OF D1 IF CURRENT BUS IS NOT ZERO             **8
1856   * THE PURPOSE OF THIS SUBROUTINE IS TO INSURE THE CURRENT BUS STATUS       **8
1857   * AND CONTROL IS ALWAYS ON THE LOWER NIBBLE.                               **8
1858   * IT IS USED BEFORE SETTING BINT OR AFTER READING BINT                     **8
1859   * INPUT : D0 = BUS NO                                                      **8
1860   *       : D1 = STATUS OR CONTROL                                           **8
1861   * OUTPUT: D0 = UNCHANGED                                                   **8
1862   *         D1 = SWAPPED IF D0 IS NOT ZERO                                   **8
1863                                                                              **8
1864   FIX_BINT                                                                   **8
1865            TST.B       D0                                                    **8
1866            IF          <NE> THEN       IF CUR BUS = B                        **8
1867            ROR.B       #4,D1           SWAP UPPER AND LOWER NIBBLE           **8
1868            ENDI                        END IF CUR BUS = B                    **8
1869            RTS                                                               **8
```

We claim:

1. For use in a digital computer system, a device controller comprising:

a first port-input/output controller coupled to a first input/output channel bus; and a second port-input/output controller coupled to a second input/output channel bus;

each of said first and second port-input/output controllers having:

a first ownership latch means for granting shared ownership of said device controller to a first host processor to provide a first data path on a first I/O channel through said first port I/O controller between said first host processor and any peripheral, and at least a second ownership latch means operative independently of said first ownership latch means for granting shared ownership of said device controller to a second host processor independently of said first port input/output controller to provide a second data path on a second I/O channel through said second port I/O controller between said second host processor and any peripheral devices coupled to said device controller.

2. The device controller according to claim 1 further comprising:

a peripheral device-input/output controller; and multiplexer coupled to said peripheral device-input/output controller on one end and coupled to a first SCSI bus and to a second SCSU bus on the other end thereby to provide for connection from said first host processor and said second host processor to either said first SCSI bus or to said second SCSI bus.

3. The device controller according to claim 2 further comprising:

a first bus ("MUS bus") operative at a first clock rate;

a dedicated microprocessor having control over said first bus;

a second bus (data buffer bus), said second bus being synchronous at a second clock rate different from said first clock rate;

a multiple-channel direct memory access (DMA) controller comprising a state machine, said DMA controller having control over said second bus and control over and access to said first I/O channel, said second input/output channel, and said peripheral device I/O controller for arbitrating requests for access to said second bus; and a first bus switch coupled between said first bus and said second bus for communicating first information on said first bus at said first clock rate to said second bus at said second clock rate and second information on said second bus at said second clock rate to said first bus at said first clock rate under control of said DMA controller and upon request of said MPU.

4. The device controller according to claim 3 further comprising:

a peripheral device-input/output controller, said peripheral device-input/output controller having a controller data bus of a first bit width and wherein said second synchronous bus has a second bit width different from said first bit width; and a byte assembly register coupled between said second synchronous bus and said controller data bus for assembling data in bytes and words for exchange between said controller data bus and said second synchronous bus means.

5. The device controller according to claim 4 further comprising:
   a parity converting means coupled between said second bus and said controller bus for converting parity of data passed between said second bus and said controller bus.

6. The device controller according to claim 4 further comprising:
   a multiplexer coupled to said peripheral device-input/output controller on one end and coupled to a first SCSI bus and to a second SCSI bus on the other end to provide for connection to either said first SCSI bus or to said second SCSI bus through said device controller;
   a third bus coupled to said peripheral device-input/output control;
   programmable interrupt logic means coupled between said third bus means and said first SCSI bus and said second SCSI bus for monitoring preselected conditions on each of said first SCSI bus and said second SCSI bus; and
   second bus switch means coupled between said first bus means and said third bus means for passing command messages to said multiplexer means to select between said first SCSI bus and said second SCSI bus, to said programmable interrupt logic means for preselecting conditions which will cause an interrupt to said microprocessor means, and to said device-input/output controller means for controlling a selected SCSI bus.

7. The device controller according to claim 1 further comprising:
   a first bus;
   a dedicated microprocessor having control over said first bus;
   a second bus;
   a multiple-channel direct memory access (DMA) controller comprising a state machine, said DMA controller having control over said second bus and control over and access to said first I/O channel, said second input/output channel, and said peripheral device I/O controller for arbitrating requests for access to said second bus; and
   a bus switch coupled between said first bus and said second bus for communicating first information on said first bus to said second bus and second information on said second bus to said first bus under control of said DMA controller and upon request of said MPU.

8. The device controller according to claim 1 further comprising:
   a first bus ("MPU bus") operative at a first clock rate;
   a dedicated microprocessor having control over said first bus;
   a second bus (data buffer bus), said second bus being synchronous at a second clock rate different from said first clock rate;
   a multiple-channel direct memory access (DMA) controller comprising a state machine, said DMA controller having control over said second bus and control over and access to said first I/O channel, said second input/output channel, and said peripheral device I/O controller for arbitrating requests for access to said second bus; and
   a bus switch coupled between said first bus and said second bus for communicating first information on said first bus at said first clock rate to said second bus at said second clock rate and second information on said second bus at said second clock rate to said first bus at said first clock rate under control of said DMA controller and upon request of said MPU.

9. The device controller according to claim 8, wherein said DMA controller comprises a programmable state machine defining by alternating time allocation a first DMA channel and a second DMA channel on said second bus, said programmable state machine including means for arbitrating time allocation between said first DMA channel and said DMA second channel for data transfer on said second bus, and for allocating time on said second bus to said microprocessor at a lower priority than for said data transfer.

10. The device controller according to claim 8, wherein said programmable state machine further comprises means imposing a latency between a data request and a data acknowledge issued by said state machine of no more than two bus cycles on any channel so that said microprocessor is guaranteed access to said second bus during said latency and wherein maximum latency between a bus request issued by said microprocessor and a bus grant issued by said state machine is dependent upon load of said first channel and said second channel.

11. The device controller according to claim 8, wherein said DMA controller further includes means for generating channel address values in less than one clock period for assuring timely generation of channel address values.

12. The device controller according to claim 8, further including register means and program means for programming said DMA controller during operation.

13. The device controller according to claim 12, wherein said DMA controller further includes means for programming chaining of related data blocks for continuous transfer of priority data on one of said channels independent of the other of said channels.

14. The device controller according to claim 13, wherein said DMA controller further includes programmable means for providing for direct data transfer without intervention of said microprocessor.

15. The device controller according to claim 8, wherein said DMA controller further includes means for predicting address parity, means for generating address parity and means for comparing predicted parity with generated parity in order to verify that said DMA controller is generating correct sequential addresses.

16. The device controller according to claim 8 wherein said bus switch comprises:
   latch means for latching data from said second synchronous bus for reading by said microprocessor means coupled to said first bus;
   three-state buffer means for buffering data sent from said first bus to said second synchronous bus; and
   delay means coupled to an enable input of said three-state buffer means for imposing an interval between successive data transfers via said three-state buffer in synchronism with a selected one of said channels of said second bus means.

17. The device controller according to claim 8 further comprising means coupled to said first bus means for communicating data between DCEs or DTEs via said second bus and said first port-input/output controller or said second port-input/output controller, including at least a universal receiver-transmitter and a synchronous communication controller.

18. The device controller according to claim 8 further including program means for handling Execute Input/Output Commands issued by each of said host processors to said microprocessor means, said program means comprising:
 a peripheral port control driver means and port task means for controlling said first port-input/output controller or said second port-input/output controller;
 device task means in communication with said port task means for designating tasks of devices; and
 device driver means for controlling peripheral devices coupled to said SCSI buses and to said first bus.

19. A digital computer system, including at least a first host processor and a second host processor, a first input/output channel bus coupled to said first host processor, a second input/output channel bus coupled to said second host processor, an interprocessor bus, each of said first and second host processors being coupled together by means of said interprocessor bus, said computer system comprising:
 a first device controller, said first device controller having a first port-input/output controller coupled to said first input/output channel bus and a second port-input/output controller coupled to said second input/output channel bus, a first peripheral device-input/output controller coupled to a first SCSI bus and a second peripheral device-input/output controller coupled to a second SCSI bus; and
 a second device controller, said second device controller having a third port-input/output controller coupled to said first input/output channel bus and a fourth port-input/output controller coupled to said second input/output channel bus, a third peripheral device-input/output controller coupled to said first SCSI bus and a fourth peripheral device-input/output controller coupled to said second SCSI bus;
 said first port-input/output controller having a first ownership latch for granting shared ownership of each said device controller to to said first and at least said second host processors providing at least two data paths between one of said first or second host processors and one of any peripheral devices coupled to said first SCSI bus; and
 said second port-input/output controller having a second ownership latch for granting shared ownership of each said device controller to said first and at least said second host processors providing at least two further data paths between one of said first or second host processors and one of any peripheral devices coupled to said second SCSI bus.

20. The computer system according to claim 19 wherein each said device controller comprises:
 a first bus;
 a dedicated microprocessor having control over said first bus;
 a second bus, said second bus operative at a different speed than the first bus;
 a multiple-channel direct memory access (DMA) controller comprising a state machine, said DMA controller having control over said second bus and control over and access to said first I/O channel, said second input/output channel, and said peripheral device I/O controller for arbitrating requests for access to said second bus; and
 a bus switch coupled between said first bus and said second bus for communicating information on said first bus at a first speed to said second bus at a second speed and information on said second bus at said second speed to said first bus at said first speed under control of said DMA controller and upon request of said MPU.

21. For use in a digital computer system, a method for controlling data and command transfer in a device controller comprising:
 granting shared ownership of said device controller to a first host processor by means of a first ownership latch of a first port input-output controller to provide a first data path on a first I/O channel through said first port I/O controller between said first host processor and any peripheral; and
 granting shared ownership of said device controller to a second host processor independently of said first port input/output controller, by means of a second ownership latch operative independently of said first ownership latch to provide a second data path on a second I/O channel through said second port I/O controller between said second host processor and any peripheral devices coupled to said device controller.

22. The method according to claim 21 further including the steps of:
 defining by alternating time allocation a first DMA channel and a second DMA channel on a synchronous bus; and
 arbitrating time allocation between said first DMA channel and said second DMA channel, by means of a programmable state machine to regulate data transfer on said synchronous bus to allocate time on said synchronous bus to a microprocessor at a lower priority than for said data transfer.

23. The method according to claim 21 further including the steps of:
 imposing a latency between a data request and a data acknowledge issued by said state machine of no more than two bus cycles on any channel so that said microprocessor is guaranteed access to said second bus during said latency and wherein latency between a bus request and a bus grant issued by said state machine is dependent upon load of said first channel and said second channel.

* * * * *